United States Patent
Berliner et al.

(10) Patent No.: US 11,877,203 B2
(45) Date of Patent: Jan. 16, 2024

(54) CONTROLLED EXPOSURE TO LOCATION-BASED VIRTUAL CONTENT

(71) Applicant: Sightful Computers Ltd, Tel Aviv (IL)

(72) Inventors: Tamir Berliner, Tel Aviv (IL); Tomer Kahan, Ramat Hasharon (IL)

(73) Assignee: SIGHTFUL COMPUTERS LTD, Tel Aviv (IL)

( * ) Notice: Subject to any disclaimer, the term of this patent is extended or adjusted under 35 U.S.C. 154(b) by 0 days.

(21) Appl. No.: 18/187,270

(22) Filed: Mar. 21, 2023

(65) Prior Publication Data

US 2023/0300559 A1    Sep. 21, 2023

Related U.S. Application Data

(63) Continuation of application No. PCT/US2023/011401, filed on Jan. 24, 2023.
(Continued)

(51) Int. Cl.
*H04W 4/02* (2018.01)
*G06Q 30/0251* (2023.01)
(Continued)

(52) U.S. Cl.
CPC ............. *H04W 4/02* (2013.01); *G01C 21/00* (2013.01); *G06Q 30/0261* (2013.01); *G06T 19/006* (2013.01)

(58) Field of Classification Search
CPC ....... G06T 19/006; H04W 4/02; G01C 21/00; G06Q 30/0261
(Continued)

(56) References Cited

U.S. PATENT DOCUMENTS 5,168,531 A    12/1992   Sigel
5,977,935 A    11/1999   Yasukawa et al.
(Continued)

FOREIGN PATENT DOCUMENTS

CN    110442245    11/2019
EP    3188075    7/2017
(Continued)

OTHER PUBLICATIONS

Abdul Waheed Khan et al. "VGDRA: A Virtual Grid-Based Dynamic Routes Adjustment Scheme for Mobile Sink-Based Wireless Sensor Networks." IEEE Sensors Journal 15.1, pp. 526-534. (Year: 2015).
(Continued)

*Primary Examiner* — Thomas J Lett
(74) *Attorney, Agent, or Firm* — Finnegan, Henderson, Farabow, Garrett & Dunner LLP

(57) ABSTRACT

Systems, methods, and non-transitory computer readable media including instructions for enabling location-based virtual content. Enabling location-based virtual content includes receiving an initial location of a particular wearable extended reality appliance; performing a first lookup for a first rule associating the particular wearable extended reality appliance with the initial location, the first rule permitting display of a first type of content and preventing display of a second type of content in the initial location; implementing the first rule; receiving a subsequent location of the particular wearable extended reality appliance; performing a second lookup for a second rule associating the particular wearable extended reality appliance with the subsequent location, the second rule preventing display of the first type of content and permitting display of the second type of content in the subsequent location; and implementing the second rule.

20 Claims, 46 Drawing Sheets

Related U.S. Application Data

(60) Provisional application No. 63/302,851, filed on Jan. 25, 2022, provisional application No. 63/307,203, filed on Feb. 7, 2022, provisional application No. 63/307,207, filed on Feb. 7, 2022, provisional application No. 63/307,217, filed on Feb. 7, 2022, provisional application No. 63/319,423, filed on Mar. 14, 2022, provisional application No. 63/344,727, filed on May 23, 2022, provisional application No. 63/357,225, filed on Jun. 30, 2022, provisional application No. 63/406,000, filed on Sep. 13, 2022.

(51) Int. Cl.
*G01C 21/00* (2006.01)
*G06T 19/00* (2011.01)

(58) Field of Classification Search
USPC .................................................. 455/456.2
See application file for complete search history.

(56) References Cited

U.S. PATENT DOCUMENTS

| | | |
|---|---|---|
| 6,023,275 A | 2/2000 | Horvitz et al. |
| 6,388,657 B1 | 5/2002 | Natoli |
| 6,445,364 B2 | 9/2002 | Zwern |
| 7,119,819 B1 | 10/2006 | Robertson et al. |
| 7,542,040 B2 | 6/2009 | Templeman |
| 8,751,969 B2 | 6/2014 | Matsuda et al. |
| 8,947,322 B1 | 2/2015 | Chi et al. |
| 8,947,323 B1 | 2/2015 | Raffle et al. |
| 8,957,916 B1 | 2/2015 | Hedman et al. |
| 9,007,301 B1 | 4/2015 | Raffle et al. |
| 9,081,177 B2 | 7/2015 | Wong et al. |
| 9,244,533 B2 | 1/2016 | Friend et al. |
| 9,613,448 B1 | 4/2017 | Margolin |
| 9,696,795 B2 | 7/2017 | Marcolina et al. |
| 9,726,896 B2 | 8/2017 | von und zu Liechtenstein |
| 9,779,517 B2 | 10/2017 | Ballard et al. |
| 9,939,900 B2 | 4/2018 | Cruz-Hernandez et al. |
| 9,996,797 B1 | 6/2018 | Holz et al. |
| 10,007,359 B2 | 6/2018 | Chung et al. |
| 10,317,505 B1 | 6/2019 | Spiko et al. |
| 10,353,532 B1 | 7/2019 | Holz et al. |
| 10,430,018 B2 | 10/2019 | Black et al. |
| 10,516,853 B1 | 12/2019 | Gibson et al. |
| 10,706,111 B1 | 7/2020 | Nasserbakht et al. |
| 10,916,057 B2 | 2/2021 | Leppanen et al. |
| 10,948,997 B1 | 3/2021 | Victor-Faichney et al. |
| 11,003,307 B1 | 5/2021 | Ravasz et al. |
| 11,042,028 B1 | 6/2021 | Welch et al. |
| 11,060,858 B2 | 7/2021 | Abovitz et al. |
| 11,061,239 B2 | 7/2021 | Lanman et al. |
| 11,106,328 B1 | 8/2021 | Holland et al. |
| 11,178,376 B1 | 11/2021 | Tichenor et al. |
| 11,210,851 B1 | 12/2021 | Nussbaum et al. |
| 11,227,445 B1 | 1/2022 | Tichenor et al. |
| 11,294,475 B1 | 4/2022 | Pinchon et al. |
| 11,307,968 B2 | 4/2022 | Yerli |
| 11,308,686 B1 | 4/2022 | Boissière et al. |
| 11,334,212 B2 | 5/2022 | Ravasz et al. |
| 11,355,043 B1 | 6/2022 | Choi et al. |
| 11,402,871 B1 | 8/2022 | Berliner et al. |
| 11,475,650 B2 | 10/2022 | Berliner et al. |
| 11,480,791 B2 | 10/2022 | Berliner et al. |
| 11,481,963 B2 | 10/2022 | Berliner et al. |
| 11,496,571 B2 | 11/2022 | Berliner et al. |
| 11,514,656 B2 | 11/2022 | Berliner et al. |
| 11,516,297 B2 | 11/2022 | Berliner et al. |
| 2003/0058215 A1 | 3/2003 | Yamaji et al. |
| 2003/0063132 A1 | 4/2003 | Sauer et al. |
| 2004/0100556 A1 | 5/2004 | Stromme |
| 2004/0113888 A1 | 6/2004 | De Waal |
| 2007/0133788 A1 | 6/2007 | Ladouceur et al. |
| 2007/0223792 A1 | 9/2007 | Morimoto et al. |
| 2008/0270947 A1 | 10/2008 | Elber et al. |
| 2009/0015559 A1 | 1/2009 | Day et al. |
| 2009/0183125 A1 | 7/2009 | Magal et al. |
| 2009/0303984 A1 | 12/2009 | Clark et al. |
| 2010/0034457 A1 | 2/2010 | Berliner et al. |
| 2011/0216060 A1 | 9/2011 | Weising et al. |
| 2012/0068921 A1 | 3/2012 | Jacobsen et al. |
| 2012/0113092 A1 | 5/2012 | Bar-Zeev et al. |
| 2012/0194418 A1 | 8/2012 | Osterhout et al. |
| 2012/0202569 A1 | 8/2012 | Maizels et al. |
| 2012/0204133 A1 | 8/2012 | Guendelman et al. |
| 2012/0242603 A1 | 9/2012 | Engelhardt et al. |
| 2012/0249587 A1 | 10/2012 | Anderson et al. |
| 2012/0249741 A1 | 10/2012 | Maciocci et al. |
| 2012/0272179 A1 | 10/2012 | Stafford |
| 2012/0326961 A1 | 12/2012 | Bromer |
| 2013/0033483 A1 | 2/2013 | Im et al. |
| 2013/0069985 A1 | 3/2013 | Wong et al. |
| 2013/0106692 A1 | 5/2013 | Maizels et al. |
| 2013/0107021 A1 | 5/2013 | Maizels et al. |
| 2013/0246955 A1 | 9/2013 | Schwesig et al. |
| 2013/0260822 A1 | 10/2013 | Wu |
| 2013/0278631 A1 | 10/2013 | Border et al. |
| 2013/0283208 A1 | 10/2013 | Bychkov et al. |
| 2013/0321265 A1 | 12/2013 | Bychkov et al. |
| 2013/0321271 A1 | 12/2013 | Bychkov et al. |
| 2013/0328914 A1 | 12/2013 | Smith et al. |
| 2013/0342564 A1 | 12/2013 | Kinnebrew et al. |
| 2013/0342570 A1* | 12/2013 | Kinnebrew ............ G09G 3/003 345/633 |
| 2014/0002496 A1 | 1/2014 | Lamb et al. |
| 2014/0028548 A1 | 1/2014 | Bychkov et al. |
| 2014/0062875 A1 | 3/2014 | Rafey et al. |
| 2014/0063055 A1 | 3/2014 | Osterhout et al. |
| 2014/0082526 A1 | 3/2014 | Park et al. |
| 2014/0091857 A1 | 4/2014 | Bernstein |
| 2014/0123077 A1 | 5/2014 | Kutliroff et al. |
| 2014/0132629 A1 | 5/2014 | Pandey et al. |
| 2014/0152552 A1 | 6/2014 | Berliner et al. |
| 2014/0191927 A1 | 7/2014 | Cho et al. |
| 2014/0208274 A1 | 7/2014 | Smyth et al. |
| 2014/0258942 A1 | 9/2014 | Kutliroff et al. |
| 2014/0272845 A1 | 9/2014 | Hendriks et al. |
| 2014/0282105 A1 | 9/2014 | Nordstrom |
| 2014/0327611 A1 | 11/2014 | Ono et al. |
| 2014/0380230 A1 | 12/2014 | Venable et al. |
| 2015/0067580 A1 | 3/2015 | Um et al. |
| 2015/0091780 A1 | 4/2015 | Lyren |
| 2015/0121287 A1 | 4/2015 | Fermon |
| 2015/0133193 A1 | 5/2015 | Stotler |
| 2015/0160825 A1 | 6/2015 | Dolbier et al. |
| 2015/0205106 A1 | 7/2015 | Norden |
| 2015/0206349 A1 | 7/2015 | Rosenthal et al. |
| 2015/0268721 A1 | 9/2015 | Joo |
| 2015/0294480 A1 | 10/2015 | Marks et al. |
| 2015/0302867 A1 | 10/2015 | Tomlin et al. |
| 2015/0324001 A1 | 11/2015 | Yanai et al. |
| 2015/0338886 A1 | 11/2015 | Seo |
| 2015/0379770 A1 | 12/2015 | Haley, Jr. et al. |
| 2016/0005229 A1 | 1/2016 | Lee et al. |
| 2016/0018985 A1 | 1/2016 | Bennet et al. |
| 2016/0026242 A1 | 1/2016 | Burns et al. |
| 2016/0026253 A1 | 1/2016 | Bradski et al. |
| 2016/0027214 A1 | 1/2016 | Memmott et al. |
| 2016/0027216 A1 | 1/2016 | da Veiga et al. |
| 2016/0041625 A1 | 2/2016 | Maizels et al. |
| 2016/0071325 A1 | 3/2016 | Callaghan |
| 2016/0093108 A1 | 3/2016 | Mao et al. |
| 2016/0191910 A1 | 6/2016 | von und zu Liechtenstein |
| 2016/0209928 A1 | 7/2016 | Kandur Raja et al. |
| 2016/0255748 A1 | 9/2016 | Kim et al. |
| 2016/0259548 A1 | 9/2016 | Ma |
| 2016/0262235 A1 | 9/2016 | Clymer et al. |
| 2016/0282824 A1 | 9/2016 | Smallwood et al. |
| 2016/0306431 A1 | 10/2016 | Stafford et al. |
| 2016/0313868 A1 | 10/2016 | Weng et al. |
| 2016/0313890 A1 | 10/2016 | Walline et al. |
| 2016/0328590 A1 | 11/2016 | Fefferman |

(56) References Cited

U.S. PATENT DOCUMENTS

| | | |
|---|---|---|
| 2016/0370860 A1 | 12/2016 | Bychkov et al. |
| 2016/0370970 A1 | 12/2016 | Chu et al. |
| 2016/0379409 A1 | 12/2016 | Gavriliuc et al. |
| 2017/0039770 A1 | 2/2017 | Lanier et al. |
| 2017/0083104 A1 | 3/2017 | Namba et al. |
| 2017/0109516 A1 | 4/2017 | Engelhardt et al. |
| 2017/0131964 A1 | 5/2017 | Baek et al. |
| 2017/0132199 A1 | 5/2017 | Vescovi et al. |
| 2017/0153866 A1 | 6/2017 | Grinberg et al. |
| 2017/0169616 A1 | 6/2017 | Wiley et al. |
| 2017/0185261 A1 | 6/2017 | Perez et al. |
| 2017/0195629 A1 | 7/2017 | Wexler et al. |
| 2017/0220134 A1 | 8/2017 | Burns |
| 2017/0221264 A1 | 8/2017 | Perry |
| 2017/0242480 A1 | 8/2017 | Dees et al. |
| 2017/0243403 A1 | 8/2017 | Daniels et al. |
| 2017/0262045 A1 | 9/2017 | Rouvinez et al. |
| 2017/0266554 A1 | 9/2017 | Marks et al. |
| 2017/0280090 A1 | 9/2017 | Raskin |
| 2017/0285758 A1 | 10/2017 | Hastings et al. |
| 2017/0315627 A1 | 11/2017 | Yao |
| 2017/0315722 A1 | 11/2017 | Yao |
| 2017/0351097 A1 | 12/2017 | Memmott et al. |
| 2017/0352083 A1 | 12/2017 | Ruck et al. |
| 2018/0045963 A1 | 2/2018 | Hoover et al. |
| 2018/0075658 A1 | 3/2018 | Lanier et al. |
| 2018/0088682 A1 | 3/2018 | Tsang |
| 2018/0089899 A1 | 3/2018 | Piemonte et al. |
| 2018/0090018 A1 | 3/2018 | Gavrilets et al. |
| 2018/0101994 A1 | 4/2018 | Da Veiga et al. |
| 2018/0131847 A1 | 5/2018 | Kokonaski et al. |
| 2018/0131907 A1 | 5/2018 | Schmirler et al. |
| 2018/0150997 A1 | 5/2018 | Austin |
| 2018/0167501 A1* | 6/2018 | Peterson ............... H04W 4/33 |
| 2018/0173323 A1 | 6/2018 | Harvey et al. |
| 2018/0173404 A1 | 6/2018 | Smith |
| 2018/0181626 A1 | 6/2018 | Lyons et al. |
| 2018/0189568 A1 | 7/2018 | Powderly et al. |
| 2018/0197341 A1 | 7/2018 | Loberg et al. |
| 2018/0246324 A1 | 8/2018 | Hada et al. |
| 2018/0267762 A1 | 9/2018 | Aurongzeb et al. |
| 2018/0300952 A1 | 10/2018 | Evans et al. |
| 2018/0314329 A1 | 11/2018 | Bychkov et al. |
| 2018/0314406 A1 | 11/2018 | Powderly et al. |
| 2018/0315248 A1 | 11/2018 | Bastov et al. |
| 2018/0350119 A1 | 12/2018 | Kocharlakota et al. |
| 2018/0350150 A1 | 12/2018 | Powderly et al. |
| 2018/0357472 A1 | 12/2018 | Dreessen |
| 2019/0035234 A1 | 1/2019 | Howard et al. |
| 2019/0073109 A1 | 3/2019 | Zhang et al. |
| 2019/0087015 A1 | 3/2019 | Lam et al. |
| 2019/0107944 A1 | 4/2019 | Glass et al. |
| 2019/0107991 A1 | 4/2019 | Spivack et al. |
| 2019/0114802 A1 | 4/2019 | Lazarow |
| 2019/0114991 A1 | 4/2019 | Selan et al. |
| 2019/0114997 A1 | 4/2019 | Okamoto |
| 2019/0174088 A1 | 6/2019 | Kim et al. |
| 2019/0229495 A1 | 7/2019 | Pierer et al. |
| 2019/0236842 A1 | 8/2019 | Bennett et al. |
| 2019/0237044 A1 | 8/2019 | Day et al. |
| 2019/0265781 A1 | 8/2019 | Kehoe et al. |
| 2019/0270015 A1 | 9/2019 | Li et al. |
| 2019/0295323 A1 | 9/2019 | Gutierrez et al. |
| 2019/0311460 A1 | 10/2019 | Mandy |
| 2019/0318065 A1* | 10/2019 | Brent .................... G06F 21/121 |
| 2019/0324277 A1 | 10/2019 | Kohler et al. |
| 2019/0333275 A1 | 10/2019 | Wang et al. |
| 2019/0335083 A1 | 10/2019 | DiGiantomasso et al. |
| 2019/0340816 A1 | 11/2019 | Rogers |
| 2019/0362557 A1 | 11/2019 | Lacey et al. |
| 2019/0362562 A1 | 11/2019 | Benson |
| 2019/0380792 A1 | 12/2019 | Poltaretskyi et al. |
| 2019/0384406 A1 | 12/2019 | Smith et al. |
| 2020/0004401 A1 | 1/2020 | Hwang et al. |
| 2020/0019156 A1 | 1/2020 | Drew et al. |
| 2020/0035203 A1 | 1/2020 | Kosik et al. |
| 2020/0043243 A1 | 2/2020 | Bhushan et al. |
| 2020/0051337 A1 | 2/2020 | Reynolds et al. |
| 2020/0051527 A1 | 2/2020 | Ngo |
| 2020/0109847 A1 | 4/2020 | Poggio et al. |
| 2020/0110928 A1 | 4/2020 | Al Jazaery et al. |
| 2020/0111255 A1 | 4/2020 | Brodsky et al. |
| 2020/0111257 A1 | 4/2020 | Kim et al. |
| 2020/0111259 A1 | 4/2020 | Sears et al. |
| 2020/0117267 A1 | 4/2020 | Gibson et al. |
| 2020/0117270 A1 | 4/2020 | Gibson et al. |
| 2020/0125322 A1 | 4/2020 | Wilde |
| 2020/0135419 A1 | 4/2020 | Nakano et al. |
| 2020/0174660 A1 | 6/2020 | Klein et al. |
| 2020/0175759 A1 | 6/2020 | Russell et al. |
| 2020/0193938 A1 | 6/2020 | Estruch Tena et al. |
| 2020/0209628 A1 | 7/2020 | Sztuk et al. |
| 2020/0213632 A1 | 7/2020 | Goldberg |
| 2020/0342671 A1 | 10/2020 | Ishihara |
| 2020/0363636 A1 | 11/2020 | Karafin et al. |
| 2020/0364915 A1 | 11/2020 | Ruth et al. |
| 2020/0387215 A1 | 12/2020 | Smathers et al. |
| 2021/0008413 A1 | 1/2021 | Asikainen et al. |
| 2021/0041951 A1 | 2/2021 | Gibson et al. |
| 2021/0121136 A1 | 4/2021 | Dobson et al. |
| 2021/0132683 A1 | 5/2021 | Herling et al. |
| 2021/0173480 A1 | 6/2021 | Osterhout et al. |
| 2021/0185471 A1 | 6/2021 | Jot et al. |
| 2021/0191600 A1 | 6/2021 | Lemay et al. |
| 2021/0201581 A1 | 7/2021 | Xie et al. |
| 2021/0232211 A1 | 7/2021 | McCall |
| 2021/0255458 A1 | 8/2021 | Yoon |
| 2021/0256261 A1 | 8/2021 | Wang et al. |
| 2021/0272373 A1 | 9/2021 | Fradet et al. |
| 2021/0366440 A1 | 11/2021 | Burns et al. |
| 2021/0373672 A1 | 12/2021 | Schwarz et al. |
| 2022/0012920 A1 | 1/2022 | Beith et al. |
| 2022/0084288 A1 | 3/2022 | LeBeau et al. |
| 2022/0107632 A1 | 4/2022 | Sinha et al. |
| 2022/0121344 A1 | 4/2022 | Pastrana Vicente et al. |
| 2022/0130077 A1 | 4/2022 | Rajarathnam et al. |
| 2022/0155853 A1 | 5/2022 | Fan et al. |
| 2022/0172397 A1 | 6/2022 | Herling et al. |
| 2022/0229534 A1 | 7/2022 | Terre et al. |
| 2022/0253093 A1 | 8/2022 | Berliner et al. |
| 2022/0253098 A1 | 8/2022 | Berliner et al. |
| 2022/0253128 A1 | 8/2022 | Berliner et al. |
| 2022/0253130 A1 | 8/2022 | Berliner et al. |
| 2022/0253139 A1 | 8/2022 | Berliner et al. |
| 2022/0253149 A1 | 8/2022 | Berliner et al. |
| 2022/0253188 A1 | 8/2022 | Berliner et al. |
| 2022/0253194 A1 | 8/2022 | Berliner et al. |
| 2022/0253200 A1 | 8/2022 | Berliner et al. |
| 2022/0253201 A1 | 8/2022 | Berliner et al. |
| 2022/0253263 A1 | 8/2022 | Noam et al. |
| 2022/0253264 A1 | 8/2022 | Berliner et al. |
| 2022/0253266 A1 | 8/2022 | Berliner et al. |
| 2022/0253759 A1 | 8/2022 | Berliner et al. |
| 2022/0254112 A1 | 8/2022 | Berliner et al. |
| 2022/0254118 A1 | 8/2022 | Berliner et al. |
| 2022/0254120 A1 | 8/2022 | Berliner et al. |
| 2022/0255974 A1 | 8/2022 | Berliner et al. |
| 2022/0255995 A1 | 8/2022 | Berliner et al. |
| 2022/0256062 A1 | 8/2022 | Berliner et al. |
| 2022/0261091 A1 | 8/2022 | Berliner et al. |
| 2022/0261149 A1 | 8/2022 | Berliner et al. |

FOREIGN PATENT DOCUMENTS

| | | |
|---|---|---|
| EP | 3584692 | 12/2019 |
| WO | WO 2019/126175 | 6/2019 |
| WO | WO 2021/239223 | 12/2021 |

OTHER PUBLICATIONS

International Search Report and Written Opinion for International Application No. PCT/US2022/015546, dated Jun. 29, 2022, 16 pages.

(56) References Cited

OTHER PUBLICATIONS

International Search Report and Written Opinion for International Application No. PCT/US2022/015547, dated Jul. 1, 2022, 16 pages.
International Search Report and Written Opinion for International Application No. PCT/US2022/015548, dated Jun. 30, 2020, 13 pages.
International Search Report and Written Opinion for International Application No. PCT/US2022/038450, dated Feb. 6, 2023, 13 pages.
Kimberly Ruth, Tadayoshi Kohno, Franziska Roesner, "Secure Multi-User Content Sharing for Augmented Reality Applications", Aug. 2019, USENIX Association, Proceedings of the 28th USENIX Secirty Symposium (USENIX Security 19), pp. 141-158.
Yehia ElRakaiby, Frederic Cuppers, Nora Cuppens-Boulahia, "Interactivity for Reactice Access Control", 2008, International Conference on Security and Cryptography (SECRYPT), pp. 57-64.

* cited by examiner

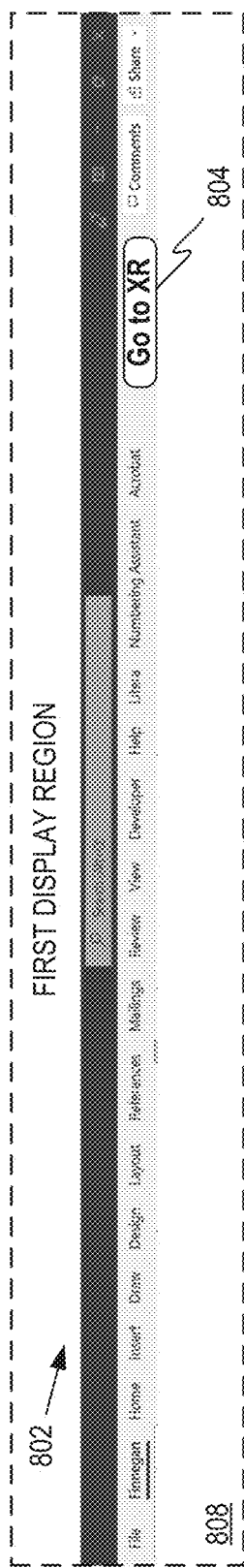
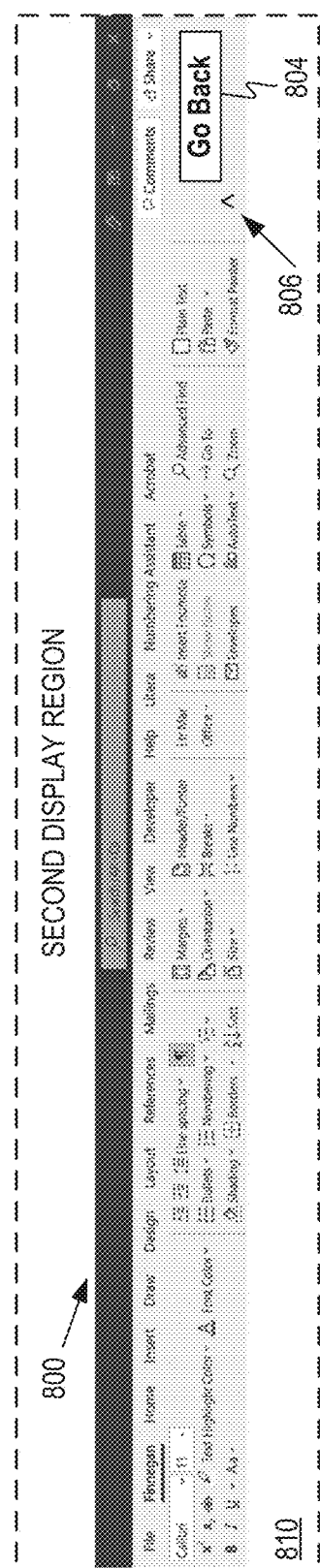
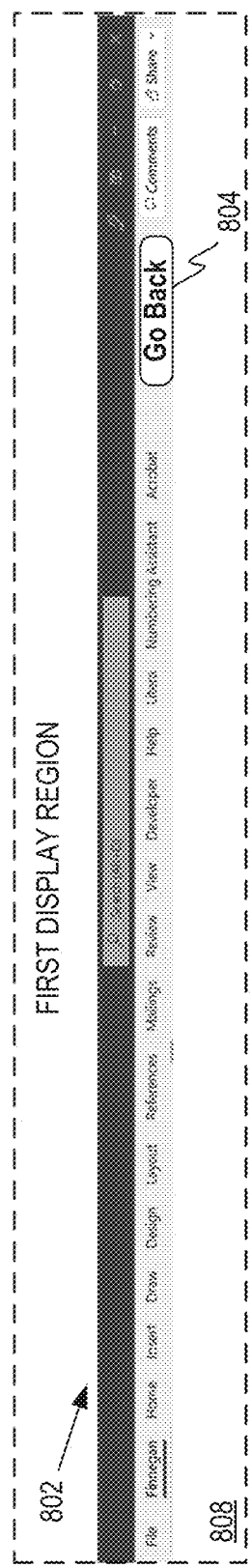
FIG. 8C
FIG. 8D

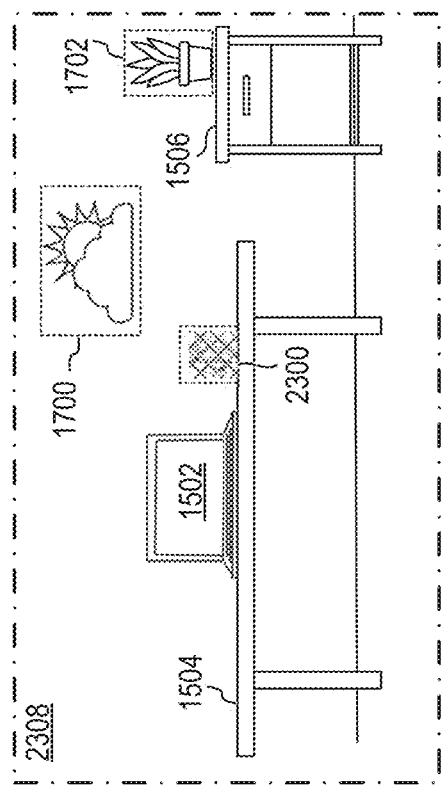
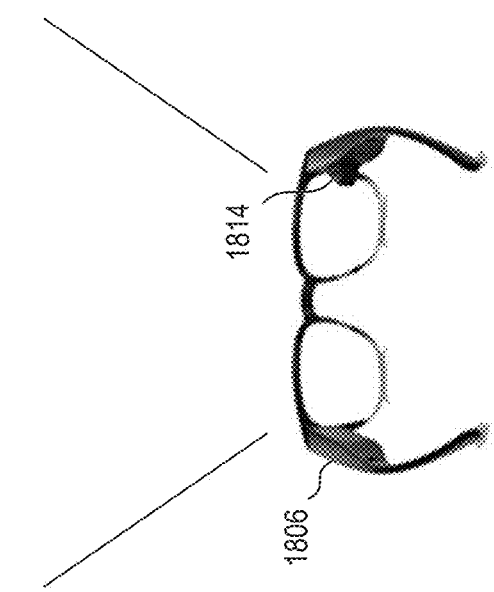
FIG. 22
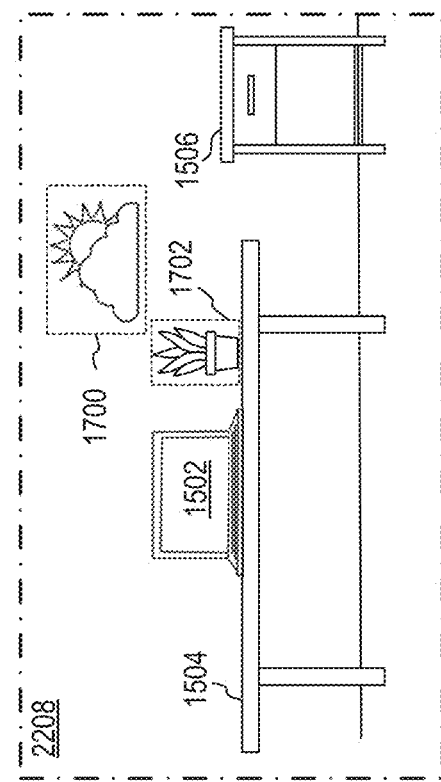
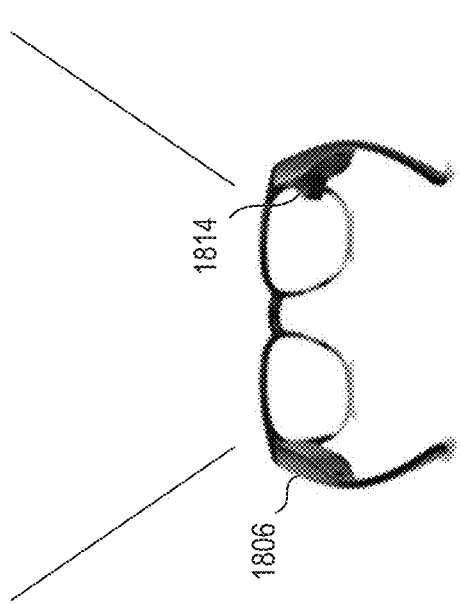
FIG. 23

CONTROLLED EXPOSURE TO LOCATION-BASED VIRTUAL CONTENT

CROSS REFERENCES TO RELATED APPLICATIONS

This application is a continuation of PCT International Application No. PCT/US2023/011401, filed Jan. 24, 2023 which claims the benefit of priority of U.S. Provisional Patent Application No. 63/302,851, filed on Jan. 25, 2022, U.S. Provisional Patent Application No. 63/307,203, filed on Feb. 7, 2022, U.S. Provisional Patent Application No. 63/307,207, filed on Feb. 7, 2022, U.S. Provisional Patent Application No. 63/307,217, filed on Feb. 7, 2022, U.S. Provisional Patent Application No. 63/319,423, filed on Mar. 14, 2022, U.S. Provisional Patent Application No. 63/344,727, filed on May 23, 2022, U.S. Provisional Patent Application No. 63/357,225, filed on Jun. 30, 2022, and U.S. Provisional Patent Application No. 63/406,000, filed on Sep. 13, 2022, all of which are incorporated herein by reference in their entirety.

BACKGROUND

I. Technical Field

The present disclosure generally relates to the field of extended reality. More specifically, the present disclosure relates to systems, methods, and devices for providing productivity applications using an extended reality environment.

II. Background Information

For many years, PC users were faced with a productivity dilemma: either to limit their mobility (when selecting a desktop computer) or to limit their screen size (when selecting a laptop computer). One partial solution to this dilemma is using a docking station. A docking station is an interface device for connecting a laptop computer with other devices. By plugging the laptop computer into the docking station, laptop users can enjoy the increased visibility provided by a larger monitor. But because the large monitor is stationary, the mobility of the user—while improved—is still limited. For example, even laptop users with docking stations do not have the freedom of using two 32" screens anywhere they want.

Some of the disclosed embodiments are directed to providing a new approach for solving the productivity dilemma, one that uses extended reality (XR) to provide a mobile environment that enables users to experience the comfort of a stationary workspace anywhere they want by providing virtual desktop-like screens.

SUMMARY

Embodiments consistent with the present disclosure provide systems, methods, and devices for providing and supporting productivity applications using an extended reality environment.

Some disclosed embodiments may include systems, methods and non-transitory computer readable media for enabling user interface display mode toggling. These embodiments may involve presenting information in a first display region, the first display region having predefined boundaries, wherein the information is manipulatable via a user interface presentable in the first display region; presenting, via a wearable extended reality appliance, a second display region beyond the predefined boundaries of the first display region, wherein the second display region is visible via the wearable extended reality appliance; providing a control for altering a location of the user interface, wherein in a first mode, the user interface is presented in the first display region while the information is presented in the first display region and in a second mode, the user interface is presented in the second display region outside the predefined boundaries of the first display region while the information is presented in the first display region; and enabling toggling between the first mode and the second mode via the control.

Some disclosed embodiments may include systems, methods and non-transitory computer readable media for enabling location-based virtual content. These embodiments may involve receiving an indication of an initial location of a particular wearable extended reality appliance; performing a first lookup in a repository for a match between the initial location and a first extended reality display rule associating the particular wearable extended reality appliance with the initial location, wherein the first extended reality display rule permits a first type of content display in the initial location and prevents a second type of content display in the initial location; implementing the first extended reality display rule to thereby enable first instances of the first type of content to be displayed at the initial location via the particular wearable extended reality appliance while preventing second instances of the second type of content from being displayed at the initial location via the particular wearable extended reality appliance; receiving an indication of a subsequent location of the particular wearable extended reality appliance; performing a second lookup in the repository for a match between the subsequent location and a second extended reality display rule associating the particular wearable extended reality appliance with the subsequent location, wherein the second extended reality display rule prevents the first type of content display in the subsequent location and permits the second type of content display in the subsequent location; and implementing the second extended reality display rule to enable third instances of the second type of content to be displayed at the subsequent location via the particular wearable extended reality appliance while preventing fourth instances of the first type of content from being displayed at the subsequent location via the particular wearable extended reality appliance.

Some disclosed embodiments may include systems, methods and non-transitory computer readable media for managing privacy in an extended reality environment. These embodiments may involve receiving image data from an image sensor associated with a wearable extended reality appliance, the image data is reflective of a physical environment; accessing data characterizing a plurality of virtual objects for association with locations in the physical environment, the data representing a first virtual object and a second virtual object; accessing privacy settings classifying at least one of the first virtual object and a location of the first virtual object as private, classifying a first extended reality appliance as approved for presentation of private information, and classifying a second extended reality appliance as non-approved for presentation of the private information; and simultaneously enabling a presentation of an augmented viewing of the physical environment, such that during the simultaneous presentation, the first extended reality appliance presents the first virtual object and the second virtual object in the physical environment, and the second extended reality appliance presents the second virtual object, omitting presentation of the first virtual object in compliance with the privacy settings.

Some disclosed embodiments may include systems, methods and non-transitory computer readable media for capturing extended reality environments. These embodiments may involve receiving image data representing at least a 140 degrees field of view of a physical environment, the image data being received from at least one image sensor associated with a wearable extended reality appliance; virtually associating at least two extended reality objects with a composite perspective of the physical environment, wherein the at least two extended reality objects are spaced apart by at least 140 degrees from a point of view of the wearable extended reality appliance; displaying, via the wearable extended reality appliance and during a particular time period, changes in one of the at least two extended reality objects while refraining from displaying changes in another of the at least two extended reality objects; and enabling non-synchronous display of concurrent changes in the at least two extended reality objects that took place during the particular time period.

Some disclosed embodiments may include systems, methods and non-transitory computer readable media for managing an extended reality conference. These embodiments may involve facilitating a multi-participant video conference between a plurality of physically dispersed participants; enabling, via a wearable extended reality appliance, viewing of a first environment representing a physical space and a second peripheral environment; enabling a display of the plurality of participants in the second peripheral environment, the plurality of participants including a first participant and a second participant; receiving a first selection of the first participant in the second peripheral environment for virtual movement to the first environment; receiving a first environmental placement location associated with the first selection, wherein the first environmental placement location corresponds to a first region of the physical space; in response to the first selection and the first environmental placement location, moving a virtual representation of the first participant to the first environment in a manner simulating the first participant physically located in the first region of the physical space while the second participant remains in the second peripheral environment; receiving a second selection of the second participant in the second peripheral environment for virtual movement to the first environment; receiving a second environmental placement location associated with the second selection, wherein the second environmental placement location corresponds to a second region of the physical space different from the first region; and in response to the second selection and the second environmental placement location, moving a virtual representation of the second participant to the first environment in a manner simulating the second participant physically located in the second region of the physical space, such that when viewed through the wearable extended reality appliance, the first participant and the second participant are simulated as being physically present simultaneously in the first environment.

Some disclosed embodiments may include systems, methods and non-transitory computer readable media for managing extended reality video conferences. These embodiments may involve receiving a request to initiate a video conference between a plurality of participants; receiving image data captured by at least one image sensor associated with a wearable extended reality appliance, the image data reflecting a layout of a physical environment in which the wearable extended reality appliance is located; analyzing the image data to identify at least one interference region in the physical environment; receiving visual representations of the plurality of participants; and causing the wearable extended reality appliance to display the visual representations of the plurality of participants at multiple distinct locations other than in the at least one interference region, such that the at least one interference region is devoid of any of the visual representations of the plurality of participants.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIGS. 8C-8D together, together, illustrate another dual mode user interface, consistent with some embodiments of the present disclosure.

FIG. 22 illustrates another exemplary view via the second extended reality appliance after one or more virtual objects have been moved from the second location to the first location, consistent with some disclosed embodiments.

FIG. 23 illustrates another exemplary view via the second extended reality appliance, consistent with some disclosed embodiments.

DETAILED DESCRIPTION

Figure 1:
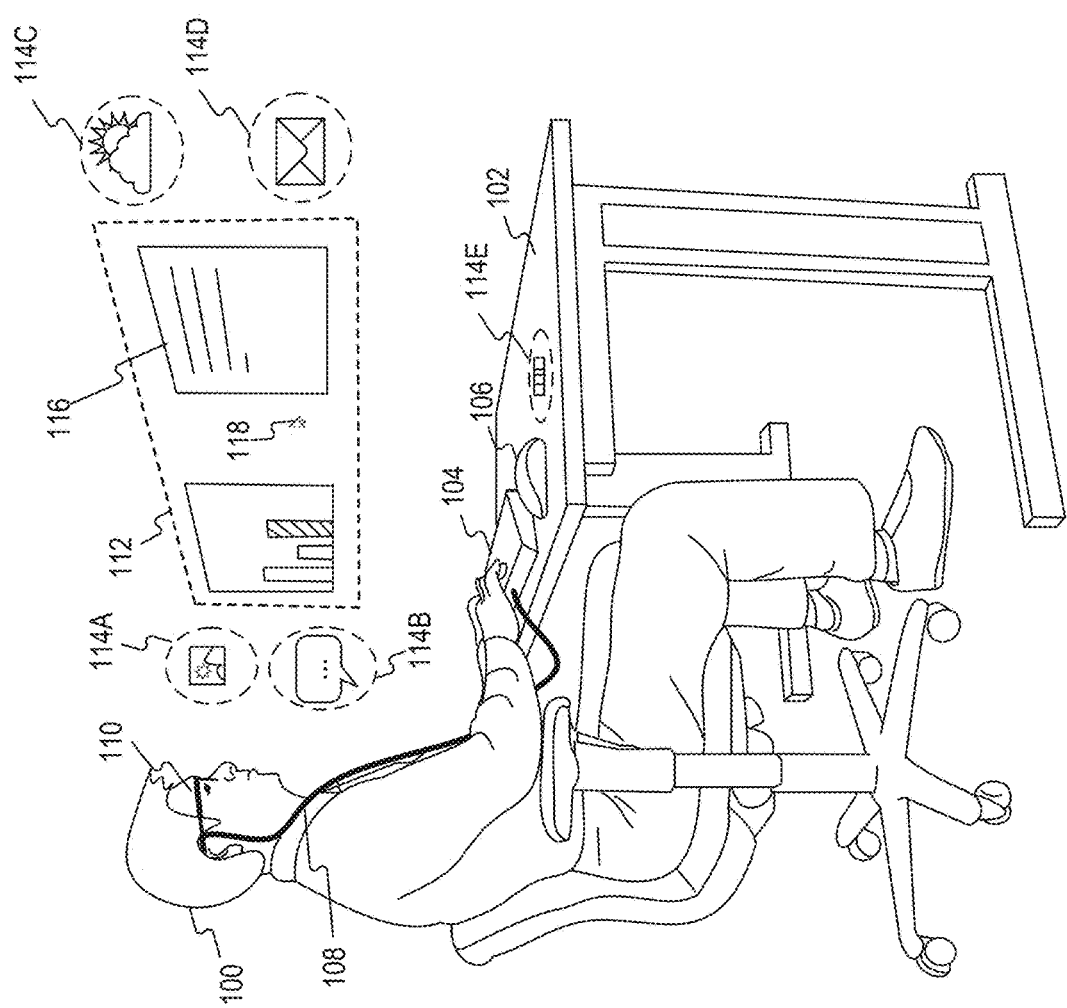
FIG. 1 is a schematic illustration of a user, using an example extended reality system, consistent with some embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Moreover, various terms used in the specification and claims may be defined or summarized differently when discussed in connection with differing disclosed embodiments. It is to be understood that the definitions, summaries, and explanations of terminology in each instance apply to all instances, even when not repeated, unless the transitive definition, explanation or summary would result in inoperability of an embodiment.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

Various terms used in the specification and claims may be defined or summarized differently when discussed in connection with differing disclosed embodiments. It is to be understood that the definitions, summaries and explanations of terminology in each instance apply to all instances, even when not repeated, unless the transitive definition, explanation or summary would result in inoperability of an embodiment.

The present disclosure is directed to systems and methods for providing users an extended reality environment. The term "extended reality environment," which may also be referred to as "extended reality," "extended reality space," or "extended environment," refers to all types of real- and— virtual combined environments and human-machine interactions at least partially generated by computer technology. The extended reality environment may be a completely simulated virtual environment or a combined real- and— virtual environment that a user may perceive from different perspectives. In some examples, the user may interact with elements of the extended reality environment. One non-limiting example of an extended reality environment may be a virtual reality environment, also known as "virtual reality" or a "virtual environment." An immersive virtual reality environment may be a simulated non-physical environment which provides to the user the perception of being present in the virtual environment. Another non-limiting example of an extended reality environment may be an augmented reality environment, also known as "augmented reality" or "augmented environment." An augmented reality environment may involve live direct or indirect view of a physical real-world environment that is enhanced with virtual computer-generated perceptual information, such as virtual objects that the user may interact with. Another non-limiting example of an extended reality environment is a mixed reality environment, also known as "mixed reality" or a "mixed environment." A mixed reality environment may be a hybrid of physical real-world and virtual environments, in which physical and virtual objects may coexist and interact in real time. In some examples, both augmented reality environments and mixed reality environments may include a combination of real and virtual worlds, real-time interactions, and accurate 3D registration of virtual and real objects. In some examples, both augmented reality environment and mixed reality environments may include constructive overlaid sensory information that may be added to the physical environment. In other examples, both augmented reality environment and mixed reality environments may include destructive virtual content that may mask at least part of the physical environment.

In some embodiments, the systems and methods may provide the extended reality environment using an extended reality appliance. The term extended reality appliance may include any type of device or system that enables a user to perceive and/or interact with an extended reality environment. The extended reality appliance may enable the user to perceive and/or interact with an extended reality environment through one or more sensory modalities. Some non-limiting examples of such sensory modalities may include visual, auditory, haptic, somatosensory, and olfactory. One example of the extended reality appliance is a virtual reality appliance that enables the user to perceive and/or interact with a virtual reality environment. Another example of the extended reality appliance is an augmented reality appliance that enables the user to perceive and/or interact with an augmented reality environment. Yet another example of the extended reality appliance is a mixed reality appliance that enables the user to perceive and/or interact with a mixed reality environment.

Consistent with one aspect of the disclosure, the extended reality appliance may be a wearable device, such as a head-mounted device, for example, smart glasses, smart contact lens, headsets or any other device worn by a human for purposes of presenting an extended reality to the human. Other extended reality appliances may include holographic projector or any other device or system capable of providing an augmented reality (AR), virtual reality (VR), mixed reality (MR), or any immersive experience. Typical components of wearable extended reality appliances may include at least one of: a stereoscopic head-mounted display, a stereoscopic head-mounted sound system, head-motion tracking sensors (such as gyroscopes, accelerometers, magnetometers, image sensors, structured light sensors, etc.), head mounted projectors, eye-tracking sensors, and additional components described below. Consistent with another aspect of the disclosure, the extended reality appliance may be a non-wearable extended reality appliance. Specifically, the non-wearable extended reality appliance may include multi-projected environment appliances. In some embodiments, an extended reality appliance may be configured to change the viewing perspective of the extended reality environment in response to movements of the user and in response to head movements of the user in particular. In one example, a wearable extended reality appliance may change the field-of-view of the extended reality environment in response to a change of the head pose of the user, such as by changing the spatial orientation without changing the spatial position of the user in the extended reality environment. In another example, a non-wearable extended reality appliance may change the spatial position of the user in the extended reality environment in response to a change in the position of the user in the real world, for example, by changing the spatial position of the user in the extended reality environment without changing the direction of the field-of-view with respect to the spatial position.

According to some embodiments, an extended reality appliance may include a digital communication device configured to at least one of: receiving virtual content data configured to enable a presentation of the virtual content, transmitting virtual content for sharing with at least one external device, receiving contextual data from at least one external device, transmitting contextual data to at least one external device, transmitting of usage data indicative of usage of the extended reality appliance, and transmitting of data based on information captured using at least one sensor included in the extended reality appliance. In additional embodiments, the extended reality appliance may include memory for storing at least one of virtual data configured to enable a presentation of virtual content, contextual data, usage data indicative of usage of the extended reality appliance, sensor data based on information captured using at least one sensor included in the extended reality appliance, software instructions configured to cause a processing device to present the virtual content, software instructions configured to cause a processing device to collect and analyze the contextual data, software instructions configured to cause a processing device to collect and analyze the usage data, and software instructions configured to cause a processing device to collect and analyze the sensor data. In additional embodiments, the extended reality appliance may include a processing device configured to perform at least one of rendering of virtual content, collecting and analyzing contextual data, collecting and analyzing usage data, and collecting and analyzing sensor data. In additional embodiments, the extended reality appliance may include one or more sensors. The one or more sensors may include one or more image sensors (e.g., configured to capture images and/or videos of a user of the appliance or of an environment of the user), one or more motion sensors (such as an accelerometer, a gyroscope, a magnetometer, etc.), one or more positioning sensors (such as GPS, outdoor positioning sensor, indoor positioning sensor, etc.), one or more temperature sensors (e.g., configured to measure the temperature of at least part of the appliance and/or of the environment), one or more contact sensors, one or more proximity sensors (e.g., configured to detect whether the appliance is currently worn), one or more electrical impedance sensors (e.g., configured to measure electrical impedance of the user), one or more eye tracking sensors, such as gaze detectors, optical trackers, electric potential trackers (e.g., electrooculogram (EOG) sensors), video-based eye-trackers, infra-red/near infra-red sensors, passive light sensors, or any other technology capable of determining where a human is looking or gazing.

In some embodiments, the systems and methods may use an input device to interact with the extended reality appliance. The term input device may include any physical device configured to receive input from a user or an environment of the user, and to provide the data to a computational device. The data provided to the computational device may be in a digital format and/or in an analog format. In one embodiment, the input device may store the input received from the user in a memory device accessible by a processing device, and the processing device may access the stored data for analysis. In another embodiment, the input device may provide the data directly to a processing device, for example, over a bus or over another communication system configured to transfer data from the input device to the processing device. In some examples, the input received by the input device may include key presses, tactile input data, motion data, position data, gestures based input data, direction data, or any other data for supply for computation. Some examples of the input device may include a button, a key, a keyboard, a computer mouse, a touchpad, a touchscreen, a joystick, or another mechanism from which input may be received. Another example of an input device may include an integrated computational interface device that includes at least one physical component for receiving input from a user. The integrated computational interface device may include at least a memory, a processing device, and the at least one physical component for receiving input from a user. In one example, the integrated computational interface device may further include a digital network interface that enables digital communication with other computing devices. In one example, the integrated computational interface device may further include a physical component for outputting information to the user. In some examples, all components of the integrated computational interface device may be included in a single housing, while in other examples the components may be distributed among two or more housings. Some non-limiting examples of physical components for receiving input from users that may be included in the integrated computational interface device may include at least one of a button, a key, a keyboard, a touchpad, a touchscreen, a joystick, or any other mechanism or sensor from which computational information may be received. Some non-limiting examples of physical components for outputting information to users may include at least one of a light indicator (such as a LED indicator), a screen, a touchscreen, a beeper, an audio speaker, or any other audio, video, or haptic device that provides human-perceptible outputs.

In some embodiments, image data may be captured using one or more image sensors. In some examples, the image sensors may be included in the extended reality appliance, in a wearable device, in the wearable extended reality device, in the input device, in an environment of a user, and so forth. In some examples, the image data may be read from memory, may be received from an external device, may be generated (for example, using a generative model), and so forth. Some non-limiting examples of image data may include images, grayscale images, color images, 2D images, 3D images, videos, 2D videos, 3D videos, frames, footages, data derived from other image data, and so forth. In some examples, the image data may be encoded in any analog or digital format. Some non-limiting examples of such formats may include raw formats, compressed formats, uncompressed formats, lossy formats, lossless formats, JPEG, GIF, PNG, TIFF, BMP, NTSC, PAL, SECAM, MPEG, MPEG-4 Part 14, MOV, WMV, FLV, AVI, AVCHD, WebM, MKV, and so forth.

In some embodiments, the extended reality appliance may receive digital signals, for example, from the input device. The term digital signals refers to a series of digital values that are discrete in time. The digital signals may represent, for example, sensor data, textual data, voice data, video data, virtual data, or any other form of data that provides perceptible information. Consistent with the present disclosure, the digital signals may be configured to cause the extended reality appliance to present virtual content. In one embodiment, the virtual content may be presented in a selected orientation. In this embodiment, the digital signals may indicate a position and an angle of a viewpoint in an environment, such as an extended reality environment. Specifically, the digital signals may include an encoding of the position and angle in six degree-of-freedom coordinates (e.g., forward/back, up/down, left/right, yaw, pitch, and roll). In another embodiment, the digital signals may include an encoding of the position as three-dimensional coordinates (e.g., x, y, and z), and an encoding of the angle as a vector originating from the encoded position. Specifically, the digital signals may indicate the orientation and an angle of the presented virtual content in an absolute coordinates of the environment, for example, by encoding yaw, pitch and roll of the virtual content with respect to a standard default angle. In another embodiment, the digital signals may indicate the orientation and the angle of the presented virtual content with respect to a viewpoint of another object (e.g., a virtual object, a physical object, etc.), for example, by encoding yaw, pitch, and roll of the virtual content with respect a direction corresponding to the viewpoint or to a direction corresponding to the other object. In another embodiment, such digital signals may include one or more projections of the virtual content, for example, in a format ready for presentation (e.g., image, video, etc.). For example, each such projection may correspond to a particular orientation or a particular angle. In another embodiment, the digital signals may include a representation of virtual content, for example, by encoding objects in a three-dimensional array of voxels, in a polygon mesh, or in any other format in which virtual content may be presented.

In some embodiments, the digital signals may be configured to cause the extended reality appliance to present virtual content. The term virtual content may include any type of data representation that may be displayed by the extended reality appliance to the user. The virtual content may include a virtual object, inanimate virtual content, animate virtual content configured to change over time or in response to triggers, virtual two-dimensional content, virtual three dimensional content, a virtual overlay over a portion of a physical environment or over a physical object, a virtual addition to a physical environment or to a physical object, a virtual promotion content, a virtual representation of a physical object, a virtual representation of a physical environment, a virtual document, a virtual character or persona, a virtual computer screen, a virtual widget, or any other format for displaying information virtually. Consistent with the present disclosure, the virtual content may include any visual presentation rendered by a computer or a processing device. In one embodiment, the virtual content may include a virtual object that is a visual presentation rendered by a computer in a confined region and configured to represent an object of a particular type (such as an inanimate virtual object, an animate virtual object, virtual furniture, a virtual decorative object, virtual widget, or other virtual representation). The rendered visual presentation may change to reflect changes to a status object or changes in the viewing angle of the object, for example, in a way that mimics changes in the appearance of physical objects. In another embodiment, the virtual content may include a virtual display (also referred to as a "virtual display screen" or a "virtual screen" herein), such as a virtual computer screen, a virtual tablet screen or a virtual smartphone screen, configured to display information generated by an operating system, in which the operating system may be configured to receive textual data from a physical keyboard and/or a virtual keyboard and to cause a display of the textual content in the virtual display screen. In one example, illustrated in FIG. 1, the virtual content may include a virtual environment that includes a virtual computer screen and a plurality of virtual objects. In some examples, a virtual display may be a virtual object mimicking and/or extending the functionality of a physical display screen. For example, the virtual display may be presented in an extended reality environment (such as a mixed reality environment, an augmented reality environment, a virtual reality environment, etc.), using an extended reality appliance. In one example, a virtual display may present content produced by a regular operating system that may be equally presented on a physical display screen. In one example, a textual content entered using a keyboard (for example, using a physical keyboard, using a virtual keyboard, etc.) may be presented on a virtual display in real time as the textual content is typed. In one example, a virtual cursor may be presented on a virtual display, and the virtual cursor may be controlled by a pointing device (such as a physical pointing device, a virtual pointing device, a computer mouse, a joystick, a touchpad, a physical touch controller, and so forth). In one example, one or more windows of a graphical user interface operating system may be presented on a virtual display. In another example, content presented on a virtual display may be interactive, that is, it may change in reaction to actions of users. In yet another example, a presentation of a virtual display may include a presentation of a screen frame, or may include no presentation of a screen frame.

Some disclosed embodiments may include and/or access a data structure or a database. The terms data structure and a database, consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

In some embodiments, the system may determine the confidence level in received input or in any determined value. The term confidence level refers to any indication, numeric or otherwise, of a level (e.g., within a predetermined range) indicative of an amount of confidence the system has at determined data. For example, the confidence level may have a value between 1 and 10. Alternatively, the confidence level may be expressed as a percentage or any other numerical or non-numerical indication. In some cases, the system may compare the confidence level to a threshold. The term threshold may denote a reference value, a level, a point, or a range of values. In operation, when the confidence level of determined data exceeds the threshold (or is below it, depending on a particular use case), the system may follow a first course of action and, when the confidence level is below it (or above it, depending on a particular use case), the system may follow a second course of action. The value of the threshold may be predetermined for each type of examined object or may be dynamically selected based on different considerations.

System Overview

Reference is now made to FIG. 1, which illustrates a user that uses an example extended reality system consistent with embodiments of the present disclosure FIG. 1 is an exemplary representation of just one embodiment, and it is to be understood that some illustrated elements might be omitted and others added within the scope of this disclosure. As shown, a user 100 is sitting behind table 102, supporting a keyboard 104 and mouse 106. Keyboard 104 is connected by wire 108 to a wearable extended reality appliance 110 that displays virtual content to user 100. Alternatively or additionally to wire 108, keyboard 104 may connect to wearable extended reality appliance 110 wirelessly. For illustration purposes, the wearable extended reality appliance is depicted a pair of smart glasses, but, as described above, wearable extended reality appliance 110 may be any type of head-mounted device used for presenting an extended reality to user 100. The virtual content displayed by wearable extended reality appliance 110 includes a virtual screen 112 (also referred to as a "virtual display screen" or a "virtual display" herein) and a plurality of virtual widgets 114. Virtual widgets 114A-114D are displayed next to virtual screen 112 and virtual widget 114E is displayed on table 102. User 100 may input text to a document 116 displayed in virtual screen 112 using keyboard 104; and may control virtual cursor 118 using mouse 106. In one example, virtual cursor 118 may move anywhere within virtual screen 112. In another example, virtual cursor 118 may move anywhere within virtual screen 112 and may also move to any one of virtual widgets 114A-114D but not to virtual widget 114E. In yet another example, virtual cursor 118 may move anywhere within virtual screen 112 and may also move to any one of virtual widgets 114A-114E. In an additional example, virtual cursor 118 may move anywhere in the extended reality environment including virtual screen 112 and virtual widgets 114A-114E. In yet another example, virtual cursor may move on all available surfaces (i.e., virtual surfaces or physical surfaces) or only on selected surfaces in the extended reality environment. Alternatively or additionally, user 100 may interact with any one of virtual widgets 114A-114E, or with selected virtual widgets, using hand gestures recognized by wearable extended reality appliance 110. For example, virtual widget 114E may be an interactive widget (e.g., a virtual slider controller) that may be operated with hand gestures.

Figure 2:
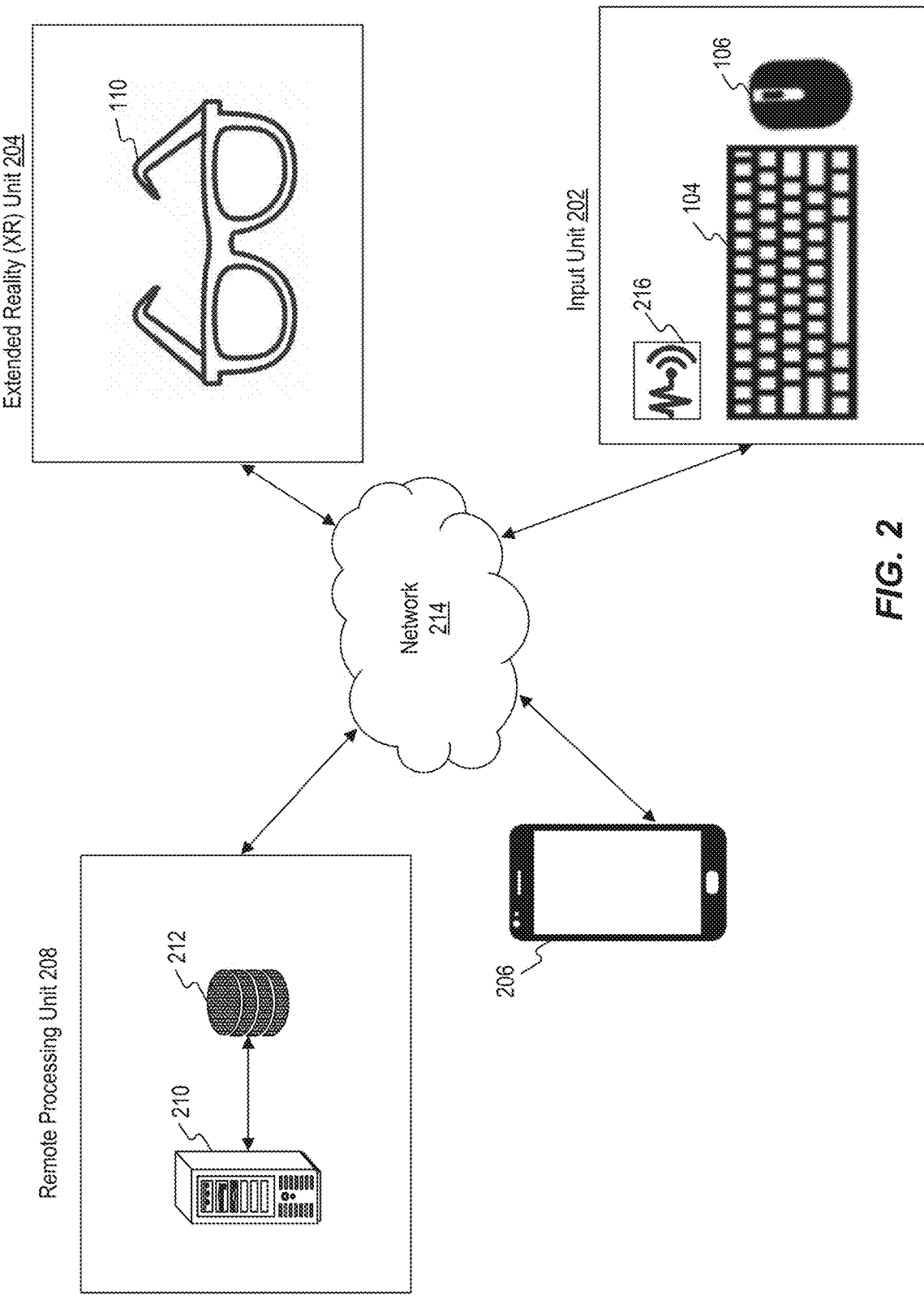
FIG. 2 is a schematic illustration of the main components of the example extended reality system of FIG. 1, consistent with some embodiments of the present disclosure.

FIG. 2 illustrates an example of a system 200 that provides extended reality (XR) experience to users, such as user 100. FIG. 2 is an exemplary representation of just one embodiment, and it is to be understood that some illustrated elements might be omitted and others added within the scope of this disclosure. System 200 may be computer-based and may include computer system components, wearable appliances, workstations, tablets, handheld computing devices, memory devices, and/or internal network(s) connecting the components. System 200 may include or be connected to various network computing resources (e.g., servers, routers, switches, network connections, storage devices, etc.) for supporting services provided by system 200. Consistent with the present disclosure, system 200 may include an input unit 202, an XR unit 204, a mobile communications device 206, and a remote processing unit 208. Remote processing unit 208 may include a server 210 coupled to one or more physical or virtual storage devices, such as a data structure 212. System 200 may also include or be connected to a communications network 214 that facilitates communications and data exchange between different system components and the different entities associated with system 200.

Consistent with the present disclosure, input unit 202 may include one or more devices that may receive input from user 100. In one embodiment, input unit 202 may include a textual input device, such as keyboard 104. The textual input device may include all possible types of devices and mechanisms for inputting textual information to system 200. Examples of textual input devices may include mechanical keyboards, membrane keyboards, flexible keyboards, QWERTY keyboards, Dvorak keyboards, Colemak keyboards, chorded keyboards, wireless keyboards, keypads, key-based control panels, or other arrays of control keys, vision input devices, or any other mechanism for inputting text, whether the mechanism is provided in physical form or is presented virtually. In one embodiment, input unit 202 may also include a pointing input device, such as mouse 106. The pointing input device may include all possible types of devices and mechanisms for inputting two-dimensional or three-dimensional information to system 200. In one example, two-dimensional input from the pointing input device may be used for interacting with virtual content presented via the XR unit 204. Examples of pointing input devices may include a computer mouse, trackball, touchpad, trackpad, touchscreen, joystick, pointing stick, stylus, light pen, or any other physical or virtual input mechanism. In one embodiment, input unit 202 may also include a graphical input device, such as a touchscreen configured to detect contact, movement, or break of movement. The graphical input device may use any of a plurality of touch sensitivity technologies, including, but not limited to, capacitive, resistive, infrared, and surface acoustic wave technologies as well as other proximity sensor arrays or other elements for determining one or more points of contact. In one embodiment, input unit 202 may also include one or more voice input devices, such as a microphone. The voice input device may include all possible types of devices and mechanisms for inputting voice data to facilitate voice-enabled functions, such as voice recognition, voice replication, digital recording, and telephony functions. In one embodiment, input unit 202 may also include one or more image input devices, such as an image sensor, configured to capture image data. In one embodiment, input unit 202 may also include one or more haptic gloves configured to capture hands motion and pose data. In one embodiment, input unit 202 may also include one or more proximity sensors configured to detect presence and/or movement of objects in a selected region near the sensors.

In accordance with some embodiments, the system may include at least one sensor configured to detect and/or measure a property associated with the user, the user's action, or user's environment. One example of the at least one sensor, is sensor 216 included in input unit 202. Sensor 216 may be a motion sensor, a touch sensor, a light sensor, an infrared sensor, an audio sensor, an image sensor, a proximity sensor, a positioning sensor, a gyroscope, a temperature sensor, a biometric sensor, or any other sensing devices to facilitate related functionalities. Sensor 216 may be integrated with, or connected to, the input devices or it may be separated from the input devices. In one example, a thermometer may be included in mouse 106 to determine the body temperature of user 100. In another example, a positioning sensor may be integrated with keyboard 104 to determine movement of user 100 relative to keyboard 104. Such positioning sensor may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, image based positioning technology, indoor positioning technology, outdoor positioning technology, or any other positioning technology.

In accordance with some embodiments, the system may include one or more sensors for identifying a position and/or a movement of a physical device (such as a physical input device, a physical computing device, keyboard 104, mouse 106, wearable extended reality appliance 110, and so forth). The one or more sensors may be included in the physical device or may be external to the physical device. In some examples, an image sensor external to the physical device (for example, an image sensor included in another physical device) may be used to capture image data of the physical device, and the image data may be analyzed to identify the position and/or the movement of the physical device. For example, the image data may be analyzed using a visual object tracking algorithm to identify the movement of the physical device, may be analyzed using a visual object detection algorithm to identify the position of the physical device (for example, relative to the image sensor, in a global coordinates system, etc.), and so forth. In some examples, an image sensor included in the physical device may be used to capture image data, and the image data may be analyzed to identify the position and/or the movement of the physical device. For example, the image data may be analyzed using visual odometry algorithms to identify the position of the physical device, may be analyzed using an egomotion algorithm to identify movement of the physical device, and so forth. In some examples, a positioning sensor, such as an indoor positioning sensor or an outdoor positioning sensor, may be included in the physical device and may be used to determine the position of the physical device. In some examples, a motion sensor, such as an accelerometer or a gyroscope, may be included in the physical device and may be used to determine the motion of the physical device. In some examples, a physical device, such as a keyboard or a mouse, may be configured to be positioned on a physical surface. Such physical device may include an optical mouse sensor (also known as non-mechanical tracking engine) aimed towards the physical surface, and the output of the optical mouse sensor may be analyzed to determine movement of the physical device with respect to the physical surface.

Consistent with the present disclosure, XR unit 204 may include a wearable extended reality appliance configured to present virtual content to user 100. One example of the wearable extended reality appliance is wearable extended reality appliance 110. Additional examples of wearable extended reality appliance may include a Virtual Reality (VR) device, an Augmented Reality (AR) device, a Mixed Reality (MR) device, or any other device capable of generating extended reality content. Some non-limiting examples of such devices may include Nreal Light, Magic Leap One, Varjo, Quest 1/2, Vive, and others. In some embodiments, XR unit 204 may present virtual content to user 100. Generally, an extended reality appliance may include all real- and—virtual combined environments and human-machine interactions generated by computer technology and wearables. As mentioned above, the term "extended reality" (XR) refers to a superset which includes the entire spectrum from "the complete real" to "the complete virtual." It includes representative forms such as augmented reality (AR), mixed reality (MR), virtual reality (VR), and the areas interpolated among them. Accordingly, it is noted that the terms "XR appliance," "AR appliance," "VR appliance," and "MR appliance" may be used interchangeably herein and may refer to any device of the variety of appliances listed above.

Consistent with the present disclosure, the system may exchange data with a variety of communication devices associated with users, for example, mobile communications device 206. The term "communication device" is intended to include all possible types of devices capable of exchanging data using digital communications network, analog communication network or any other communications network configured to convey data. In some examples, the communication device may include a smartphone, a tablet, a smartwatch, a personal digital assistant, a desktop computer, a laptop computer, an IoT device, a dedicated terminal, a wearable communication device, and any other device that enables data communications. In some cases, mobile communications device 206 may supplement or replace input unit 202. Specifically, mobile communications device 206 may be associated with a physical touch controller that may function as a pointing input device. Moreover, mobile communications device 206 may also, for example, be used to implement a virtual keyboard and replace the textual input device. For example, when user 100 steps away from table 102 and walks to the break room with his smart glasses, he may receive an email that requires a quick answer. In this case, the user may select to use his or her own smartwatch as the input device and to type the answer to the email while it is virtually presented by the smart glasses.

Consistent with the present disclosure, embodiments of the system may involve the usage of a cloud server. The term "cloud server" refers to a computer platform that provides services via a network, such as the Internet. In the example embodiment illustrated in FIG. 2, server 210 may use virtual machines that may not correspond to individual hardware. For example, computational and/or storage capabilities may be implemented by allocating appropriate portions of desirable computation/storage power from a scalable repository, such as a data center or a distributed computing environment. Specifically, in one embodiment, remote processing unit 208 may be used together with XR unit 204 to provide the virtual content to user 100. In one example configuration, server 210 may be a cloud server that functions as the operation system (OS) of the wearable extended reality appliance. In one example, server 210 may implement the methods described herein using customized hard-wired logic, one or more Application Specific Integrated Circuits (ASICs), Field Programmable Gate Arrays (FPGAs), firmware, and/or program logic which, in combination with the computer system, cause server 210 to be a special-purpose machine.

In some embodiments, server 210 may access data structure 212 to determine, for example, virtual content to display user 100. Data structure 212 may utilize a volatile or non-volatile, magnetic, semiconductor, tape, optical, removable, non-removable, other type of storage device or tangible or non-transitory computer-readable medium, or any medium or mechanism for storing information. Data structure 212 may be part of server 210 or separate from server 210, as shown. When data structure 212 is not part of server 210, server 210 may exchange data with data structure 212 via a communication link. Data structure 212 may include one or more memory devices that store data and instructions used to perform one or more features of the disclosed methods. In one embodiment, data structure 212 may include any of a plurality of suitable data structures, ranging from small data structures hosted on a workstation to large data structures distributed among data centers. Data structure 212 may also include any combination of one or more data structures controlled by memory controller devices (e.g., servers) or software.

Consistent with the present disclosure, communications network or simply network may include any type of physical or wireless computer networking arrangement used to exchange data. For example, a network may be the Internet, a private data network, a virtual private network using a public network, a Wi-Fi network, a LAN or WAN network, a combination of one or more of the forgoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

The components and arrangements of system 200 shown in FIG. 2 are intended to be exemplary only and are not intended to limit the disclosed embodiments, as the system components used to implement the disclosed processes and features may vary.

Figure 3:
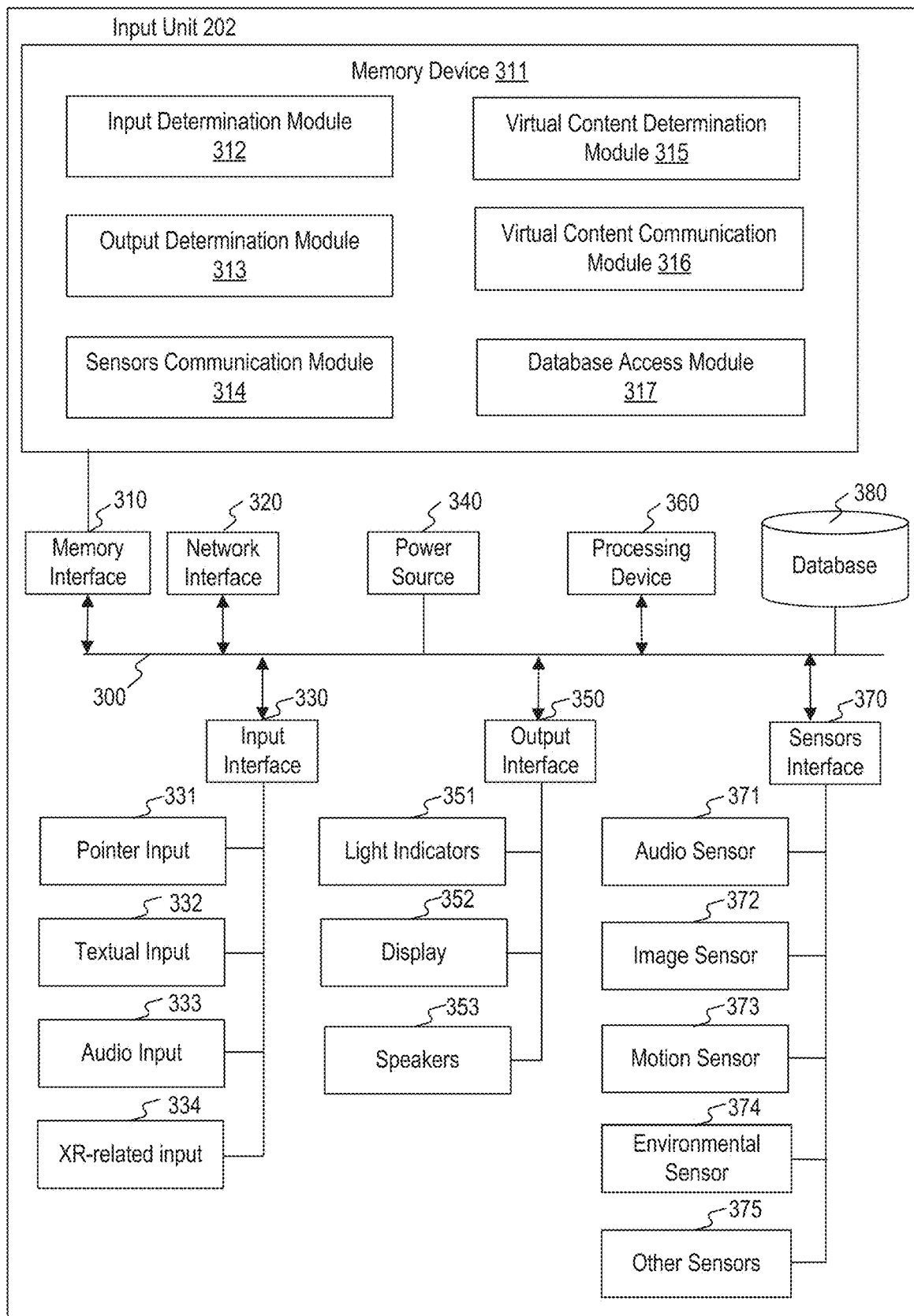
FIG. 3 is a block diagram illustrating some of the components of an input unit, consistent with some embodiments of the present disclosure.

FIG. 3 is a block diagram of an exemplary configuration of input unit 202. FIG. 3 is an exemplary representation of just one embodiment, and it is to be understood that some illustrated elements might be omitted and others added within the scope of this disclosure. In the embodiment of FIG. 3, input unit 202 may directly or indirectly access a bus 300 (or other communication mechanism) that interconnects subsystems and components for transferring information within input unit 202. For example, bus 300 may interconnect a memory interface 310, a network interface 320, an input interface 330, a power source 340, an output interface 350, a processing device 360, a sensors interface 370, and a database 380.

Memory interface 310, shown in FIG. 3, may be used to access a software product and/or data stored on a non-transitory computer-readable medium. As used herein, a non-transitory computer-readable storage medium refers to any type of physical memory on which information or data readable by at least one processor can be stored. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. Accordingly, the term computer-readable storage medium should be understood to include tangible items and exclude carrier waves and transient signals.

In the specific embodiment illustrated in FIG. 3, memory interface 310 may be used to access a software product and/or data stored on a memory device, such as memory device 311. Memory device 311 may include high-speed random-access memory and/or non-volatile memory, such as one or more magnetic disk storage devices, one or more optical storage devices, and/or flash memory (e.g., NAND, NOR). Consistent with the present disclosure, the components of memory device 311 may be distributed in more than units of system 200 and/or in more than one memory device.

Memory device 311, shown in FIG. 3, may contain software modules to execute processes consistent with the present disclosure. In particular, memory device 311 may include an input determination module 312, an output determination module 313, a sensors communication module 314, a virtual content determination module 315, a virtual content communication module 316, and a database access module 317. Modules 312-317 may contain software instructions for execution by at least one processor (e.g., processing device 360) associated with input unit 202. Input determination module 312, output determination module 313, sensors communication module 314, virtual content determination module 315, virtual content communication module 316, and database access module 317 may cooperate to perform various operations. For example, input determination module 312 may determine text using data received from, for example, keyboard 104. Thereafter, output determination module 313 may cause presentation of the recent inputted text, for example on a dedicated display 352 physically or wirelessly coupled to keyboard 104. This way, when user 100 types, he can see a preview of the typed text without constantly moving his head up and down to look at virtual screen 112. Sensors communication module 314 may receive data from different sensors to determine a status of user 100. Thereafter, virtual content determination module 315 may determine the virtual content to display, based on received input and the determined status of user 100. For example, the determined virtual content may be a virtual presentation of the recent inputted text on a virtual screen virtually located adjacent to keyboard 104. Virtual content communication module 316 may obtain virtual content that is not determined by virtual content determination module 315 (e.g., an avatar of another user). The retrieval of the virtual content may be from database 380, from remote processing unit 208, or any other source.

In some embodiments, input determination module 312 may regulate the operation of input interface 330 in order to receive pointer input 331, textual input 332, audio input 333, and XR-related input 334. Details on the pointer input, the textual input, and the audio input are described above. The term "XR-related input" may include any type of data that may cause a change in the virtual content displayed to user 100. In one embodiment, XR-related input 334 may include image data of user 100, a wearable extended reality appliance (e.g., detected hand gestures of user 100). In another embodiment, XR-related input 334 may include wireless communication indicating a presence of another user in proximity to user 100. Consistent with the present disclosure, input determination module 312 may concurrently receive different types of input data. Thereafter, input determination module 312 may further apply different rules based on the detected type of input. For example, a pointer input may have precedence over voice input.

In some embodiments, output determination module 313 may regulate the operation of output interface 350 in order to generate output using light indicators 351, display 352, and/or speakers 353. In general, the output generated by output determination module 313 does not include virtual content to be presented by a wearable extended reality appliance. Instead, the output generated by output determination module 313 include various outputs that relates to the operation of input unit 202 and/or the operation of XR unit 204. In one embodiment, light indicators 351 may include a light indicator that shows the status of a wearable extended reality appliance. For example, the light indicator may display green light when wearable extended reality appliance 110 are connected to keyboard 104, and blinks when wearable extended reality appliance 110 has low battery. In another embodiment, display 352 may be used to display operational information. For example, the display may present error messages when the wearable extended reality appliance is inoperable. In another embodiment, speakers 353 may be used to output audio, for example, when user 100 wishes to play some music for other users.

In some embodiments, sensors communication module 314 may regulate the operation of sensors interface 370 in order to receive sensor data from one or more sensors, integrated with, or connected to, an input device. The one or more sensors may include: audio sensor 371, image sensor 372, motion sensor 373, environmental sensor 374 (e.g., a temperature sensor, ambient light detectors, etc.), and other sensors 375. In one embodiment, the data received from sensors communication module 314 may be used to determine the physical orientation of the input device. The physical orientation of the input device may be indicative of a state of the user and may be determined based on combination of a tilt movement, a roll movement, and a lateral movement. Thereafter, the physical orientation of the input device may be used by virtual content determination module 315 to modify display parameters of the virtual content to match the state of the user (e.g., attention, sleepy, active, sitting, standing, leaning backwards, leaning forward, walking, moving, riding, etc.).

In some embodiments, virtual content determination module 315 may determine the virtual content to be displayed by the wearable extended reality appliance. The virtual content may be determined based on data from input determination module 312, sensors communication module 314, and other sources (e.g., database 380). In some embodiments, determining the virtual content may include determining the distance, the size, and the orientation of the virtual objects. The determination of the position of the virtual objects may be determined based on the type of the virtual objects. Specifically, with regards to the example illustrated in FIG. 1, the virtual content determination module 315 may determine to place four virtual widgets 114A-114D on the sides of virtual screen 112 and to place virtual widget 114E on table 102 because virtual widget 114E is a virtual controller (e.g., volume bar). The determination of the position of the virtual objects may further be determined based on user's preferences. For example, for left-handed users, virtual content determination module 315 may determine placing a virtual volume bar left of keyboard 104; and for right-handed users, virtual content determination module 315 may determine placing the virtual volume bar right of keyboard 104.

In some embodiments, virtual content communication module 316 may regulate the operation of network interface 320 in order to obtain data from one or more sources to be presented as virtual content to user 100. The one or more sources may include other XR units 204, the user's mobile communications device 206, remote processing unit 208, publicly available information, etc. In one embodiment, virtual content communication module 316 may communicate with mobile communications device 206 in order to provide a virtual representation of mobile communications device 206. For example, the virtual representation may enable user 100 to read messages and interact with applications installed on the mobile communications device 206. Virtual content communication module 316 may also regulate the operation of network interface 320 in order to share virtual content with other users. In one example, virtual content communication module 316 may use data from input determination module to identify a trigger (e.g., the trigger may include a gesture of the user) and to transfer content from the virtual display to a physical display (e.g., TV) or to a virtual display of a different user.

In some embodiments, database access module 317 may cooperate with database 380 to retrieve stored data. The retrieved data may include, for example, privacy levels associated with different virtual objects, the relationship between virtual objects and physical objects, the user's preferences, the user's past behavior, and more. As described above, virtual content determination module 315 may use the data stored in database 380 to determine the virtual content. Database 380 may include separate databases, including, for example, a vector database, raster database, tile database, viewport database, and/or a user input database. The data stored in database 380 may be received from modules 314-317 or other components of system 200. Moreover, the data stored in database 380 may be provided as input using data entry, data transfer, or data uploading.

Modules 312-317 may be implemented in software, hardware, firmware, a mix of any of those, or the like. In some embodiments, any one or more of modules 312-317 and data associated with database 380 may be stored in XR unit 204, mobile communications device 206, or remote processing unit 208. Processing devices of system 200 may be configured to execute the instructions of modules 312-317. In some embodiments, aspects of modules 312-317 may be implemented in hardware, in software (including in one or more signal processing and/or application specific integrated circuits), in firmware, or in any combination thereof, executable by one or more processors, alone, or in various combinations with each other. Specifically, modules 312-317 may be configured to interact with each other and/or other modules of system 200 to perform functions consistent with disclosed embodiments. For example, input unit 202 may execute instructions that include an image processing algorithm on data from XR unit 204 to determine head movement of user 100. Furthermore, each functionality described throughout the specification, with regards to input unit 202 or with regards to a component of input unit 202, may correspond to a set of instructions for performing said functionality. These instructions need not be implemented as separate software programs, procedures, or modules. Memory device 311 may include additional modules and instructions or fewer modules and instructions. For example, memory device 311 may store an operating system, such as ANDROID, iOS, UNIX, OSX, WINDOWS, DARWIN, RTXC, LINUX or an embedded operating system such as VXWorkS. The operating system can include instructions for handling basic system services and for performing hardware-dependent tasks.

Network interface 320, shown in FIG. 3, may provide two-way data communications to a network, such as communications network 214. In one embodiment, network interface 320 may include an Integrated Services Digital Network (ISDN) card, cellular modem, satellite modem, or a modem to provide a data communication connection over the Internet. As another example, network interface 320 may include a Wireless Local Area Network (WLAN) card. In another embodiment, network interface 320 may include an Ethernet port connected to radio frequency receivers and transmitters and/or optical (e.g., infrared) receivers and transmitters. The specific design and implementation of network interface 320 may depend on the communications network or networks over which input unit 202 is intended to operate. For example, in some embodiments, input unit 202 may include network interface 320 designed to operate over a GSM network, a GPRS network, an EDGE network, a Wi-Fi or WiMax network, and a Bluetooth network. In any such implementation, network interface 320 may be configured to send and receive electrical, electromagnetic, or optical signals that carry digital data streams or digital signals representing various types of information.

Input interface 330, shown in FIG. 3, may receive input from a variety of input devices, for example, a keyboard, a mouse, a touch pad, a touch screen, one or more buttons, a joystick, a microphone, an image sensor, and any other device configured to detect physical or virtual input. The received input may be in the form of at least one of: text, sounds, speech, hand gestures, body gestures, tactile information, and any other type of physically or virtually input generated by the user. In the depicted embodiment, input interface 330 may receive pointer input 331, textual input 332, audio input 333, and XR-related input 334. In additional embodiment, input interface 330 may be an integrated circuit that may act as bridge between processing device 360 and any of the input devices listed above.

Power source 340, shown in FIG. 3, may provide electrical energy to power input unit 202 and optionally also power XR unit 204. Generally, a power source included in the any device or system in the present disclosure may be any device that can repeatedly store, dispense, or convey electric power, including, but not limited to, one or more batteries (e.g., a lead-acid battery, a lithium-ion battery, a nickel-metal hydride battery, a nickel-cadmium battery), one or more capacitors, one or more connections to external power sources, one or more power convertors, or any combination of them. With reference to the example illustrated in FIG. 3, the power source may be mobile, which means that input unit 202 can be easily carried by a hand (e.g., the total weight of power source 340 may be less than a pound). The mobility of the power source enables user 100 to use input unit 202 in a variety of situations. In other embodiments, power source 340 may be associated with a connection to an external power source (such as an electrical power grid) that may be used to charge power source 340. In addition, power source 340 may be configured to charge one or more batteries included in XR unit 204; for example, a pair of extended reality glasses (e.g., wearable extended reality appliance 110) may be charged (e.g., wirelessly or not wirelessly) when they are placed on or in proximity to the input unit 202.

Output interface 350, shown in FIG. 3, may cause output from a variety of output devices, for example, using light indicators 351, display 352, and/or speakers 353. In one embodiment, output interface 350 may be an integrated circuit that may act as bridge between processing device 360 and at least one of the output devices listed above. Light indicators 351 may include one or more light sources, for example, a LED array associated with different colors. Display 352 may include a screen (e.g., LCD or dot-matrix screen) or a touch screen. Speakers 353 may include audio headphones, a hearing aid type device, a speaker, a bone conduction headphone, interfaces that provide tactile cues, vibrotactile stimulators, and more.

Processing device 360, shown in FIG. 3, may include at least one processor configured to execute computer programs, applications, methods, processes, or other software to perform embodiments described in the present disclosure. Generally, may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact. It is appreciated that other types of processor arrangements could be implemented to provide the capabilities disclosed herein.

Sensors interface 370, shown in FIG. 3, may obtain sensor data from a variety of sensors, for example, audio sensor 371, image sensor 372, motion sensor 373, environmental sensor 374, and other sensors 375. In one embodiment, sensors interface 370 may be an integrated circuit that may act as bridge between processing device 360 and at least one of the sensors listed above.

Audio sensor 371 may include one or more audio sensors configured to capture audio by converting sounds to digital information. Some examples of audio sensors may include: microphones, unidirectional microphones, bidirectional microphones, cardioid microphones, omnidirectional microphones, onboard microphones, wired microphones, wireless microphones, or any combination of the above. Consistent with the present disclosure, processing device 360 may modify a presentation of virtual content based on data received from audio sensor 371 (e.g., voice commands).

Image sensor 372 may include one or more image sensors configured to capture visual information by converting light to image data. Consistent with the present disclosure, an image sensor may be included in the any device or system in the present disclosure and may be any device capable of detecting and converting optical signals in the near-infrared, infrared, visible, and ultraviolet spectrums into electrical signals. Examples of image sensors may include digital cameras, phone cameras, semiconductor Charge-Coupled Devices (CCDs), active pixel sensors in Complementary Metal-Oxide-Semiconductor (CMOS), or N-type metal-oxide-semiconductor (NMOS, Live MOS). The electrical signals may be used to generate image data. Consistent with the present disclosure, the image data may include pixel data streams, digital images, digital video streams, data derived from captured images, and data that may be used to construct one or more 3D images, a sequence of 3D images, 3D videos, or a virtual 3D representation. The image data acquired by image sensor 372 may be transmitted by wired or wireless transmission to any processing device of system 200. For example, the image data may be processed in order to: detect objects, detect events, detect action, detect face, detect people, recognize a known person, or any other information that may be used by system 200. Consistent with the present disclosure, processing device 360 may modify a presentation of virtual content based on image data received from image sensor 372.

Motion sensor 373 may include one or more motion sensors configured to measure motion of input unit 202 or motion of objects in the environment of input unit 202. Specifically, the motion sensors may perform at least one of the following: detect motion of objects in the environment of input unit 202, measure the velocity of objects in the environment of input unit 202, measure the acceleration of objects in the environment of input unit 202, detect the motion of input unit 202, measure the velocity of input unit 202, measure the acceleration of input unit 202, etc. In some embodiments, motion sensor 373 may include one or more accelerometers configured to detect changes in proper acceleration and/or to measure proper acceleration of input unit 202. In other embodiments, motion sensor 373 may include one or more gyroscopes configured to detect changes in the orientation of input unit 202 and/or to measure information related to the orientation of input unit 202. In other embodiments, motion sensor 373 may include one or more using image sensors, LIDAR sensors, radar sensors, or proximity sensors. For example, by analyzing captured images the processing device may determine the motion of input unit 202, for example, using ego-motion algorithms. In addition, the processing device may determine the motion of objects in the environment of input unit 202, for example, using object tracking algorithms. Consistent with the present disclosure, processing device 360 may modify a presentation of virtual content based on the determined motion of input unit 202 or the determined motion of objects in the environment of input unit 202. For example, causing a virtual display to follow the movement of input unit 202.

Environmental sensor 374 may include one or more sensors from different types configured to capture data reflective of the environment of input unit 202. In some embodiments, environmental sensor 374 may include one or more chemical sensors configured to perform at least one of the following: measure chemical properties in the environment of input unit 202, measure changes in the chemical properties in the environment of input unit 202, detect the present of chemicals in the environment of input unit 202, measure the concentration of chemicals in the environment of input unit 202. Examples of such chemical properties may include: pH level, toxicity, and temperature. Examples of such chemicals may include: electrolytes, particular enzymes, particular hormones, particular proteins, smoke, carbon dioxide, carbon monoxide, oxygen, ozone, hydrogen, and hydrogen sulfide. In other embodiments, environmental sensor 374 may include one or more temperature sensors configured to detect changes in the temperature of the environment of input unit 202 and/or to measure the temperature of the environment of input unit 202. In other embodiments, environmental sensor 374 may include one or more barometers configured to detect changes in the atmospheric pressure in the environment of input unit 202 and/or to measure the atmospheric pressure in the environment of input unit 202. In other embodiments, environmental sensor 374 may include one or more light sensors configured to detect changes in the ambient light in the environment of input unit 202. Consistent with the present disclosure, processing device 360 may modify a presentation of virtual content based on input from environmental sensor 374. For example, automatically reducing the brightness of the virtual content when the environment of user 100 becomes darker.

Other sensors 375 may include a weight sensor, a light sensor, a resistive sensor, an ultrasonic sensor, a proximity sensor, a biometric sensor, or other sensing devices to facilitate related functionalities. In a specific embodiment, other sensors 375 may include one or more positioning sensors configured to obtain positioning information of input unit 202, to detect changes in the position of input unit 202, and/or to measure the position of input unit 202. Alternatively, GPS software may permit input unit 202 to access an external GPS receiver (e.g., connecting via a serial port or Bluetooth). Consistent with the present disclosure, processing device 360 may modify a presentation of virtual content based on input from other sensors 375. For example, presenting private information only after identifying user 100 using data from a biometric sensor.

The components and arrangements shown in FIG. 3 are not intended to limit the disclosed embodiments. As will be appreciated by a person skilled in the art having the benefit of this disclosure, numerous variations and/or modifications may be made to the depicted configuration of input unit 202. For example, not all components may be essential for the operation of an input unit in all cases. Any component may be located in any appropriate part of an input unit, and the components may be rearranged into a variety of configurations while providing the functionality of the disclosed embodiments. For example, some input units may not include all of the elements as shown in input unit 202.

Figure 4:
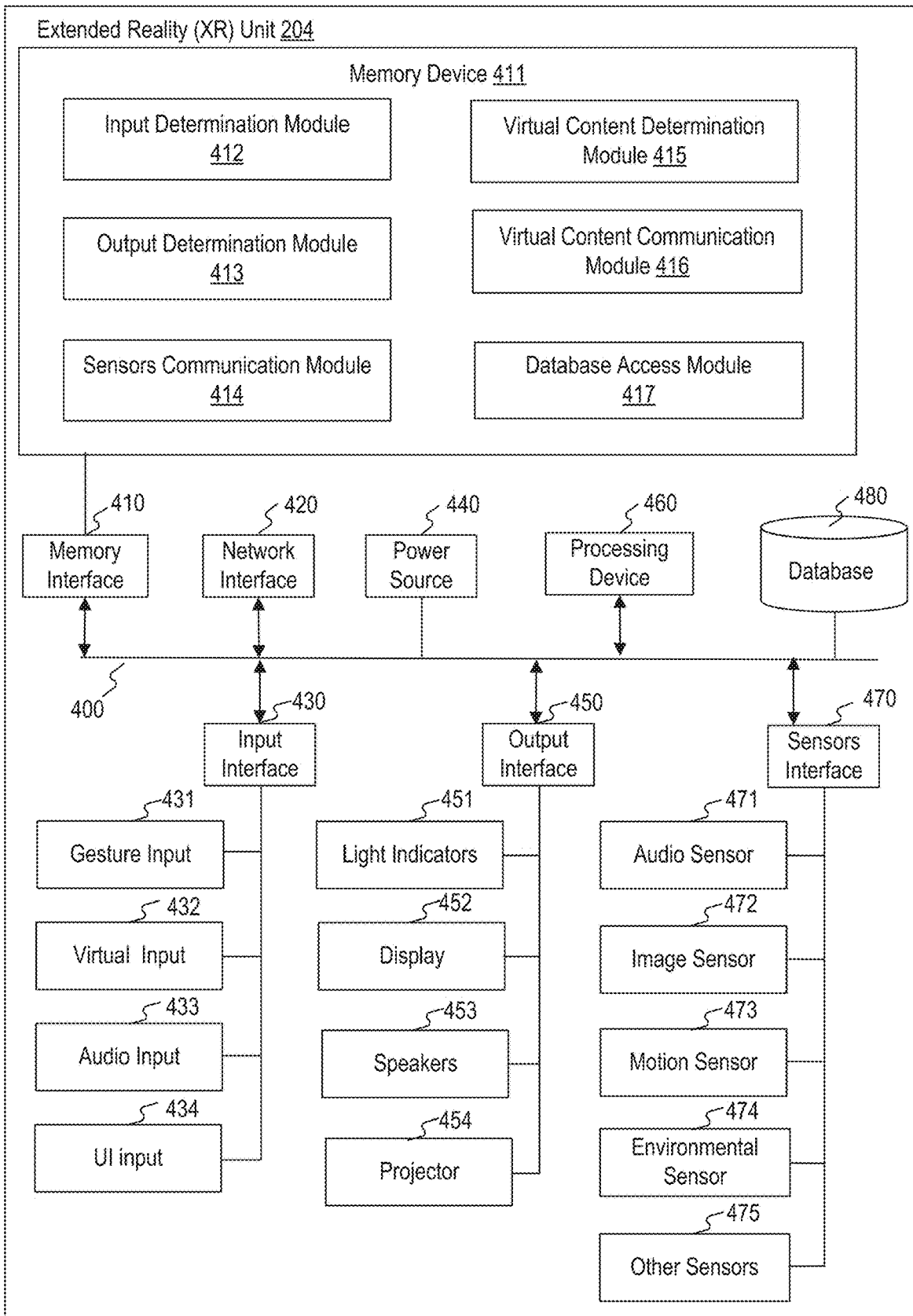
FIG. 4 is a block diagram illustrating some of the components of an extended reality unit, consistent with some embodiments of the present disclosure.

FIG. 4 is a block diagram of an exemplary configuration of XR unit 204. FIG. 4 is an exemplary representation of just one embodiment, and it is to be understood that some illustrated elements might be omitted and others added within the scope of this disclosure. In the embodiment of FIG. 4, XR unit 204 may directly or indirectly access a bus 400 (or other communication mechanism) that interconnects subsystems and components for transferring information within XR unit 204. For example, bus 400 may interconnect a memory interface 410, a network interface 420, an input interface 430, a power source 440, an output interface 450, a processing device 460, a sensors interface 470, and a database 480.

Memory interface 410, shown in FIG. 4, is assumed to have similar functionality as the functionality of memory interface 310 described above in detail. Memory interface 410 may be used to access a software product and/or data stored on a non-transitory computer-readable medium or on memory devices, such as memory device 411. Memory device 411 may contain software modules to execute processes consistent with the present disclosure. In particular, memory device 411 may include an input determination module 412, an output determination module 413, a sensors communication module 414, a virtual content determination module 415, a virtual content communication module 416, and a database access module 417. Modules 412-417 may contain software instructions for execution by at least one processor (e.g., processing device 460) associated with XR unit 204. Input determination module 412, output determination module 413, sensors communication module 414, virtual content determination module 415, virtual content communication module 416, and database access module 417 may cooperate to perform various operations. For example, input determination module 412 may determine User Interface (UI) input received from input unit 202. At the same time, sensors communication module 414 may receive data from different sensors to determine a status of user 100. Virtual content determination module 415 may determine the virtual content to display based on received input and the determined status of user 100. Virtual content communication module 416 may retrieve virtual content not determined by virtual content determination module 415. The retrieval of the virtual content may be from database 380, database 480, mobile communications device 206, or from remote processing unit 208. Based on the output of virtual content determination module 415, output determination module 413 may cause a change in a virtual content displayed to user 100 by projector 454.

In some embodiments, input determination module 412 may regulate the operation of input interface 430 in order to receive gesture input 431, virtual input 432, audio input 433, and UI input 434. Consistent with the present disclosure, input determination module 412 may concurrently receive different types of input data. In one embodiment, input determination module 412 may apply different rules based on the detected type of input. For example, gesture input may have precedence over virtual input. In some embodiments, output determination module 413 may regulate the operation of output interface 450 in order to generate output using light indicators 451, display 452, speakers 453, and projector 454. In one embodiment, light indicators 451 may include a light indicator that shows the status of the wearable extended reality appliance. For example, the light indicator may display green light when the wearable extended reality appliance 110 are connected to input unit 202, and blinks when wearable extended reality appliance 110 has low battery. In another embodiment, display 452 may be used to display operational information. In another embodiment, speakers 453 may include a bone conduction headphone used to output audio to user 100. In another embodiment, projector 454 may present virtual content to user 100.

The operations of a sensors communication module, a virtual content determination module, a virtual content communication module, and a database access module are described above with reference to FIG. 3, details of which are not repeated herein. Modules 412-417 may be implemented in software, hardware, firmware, a mix of any of those, or the like.

Network interface 420, shown in FIG. 4, is assumed to have similar functionality as the functionality of network interface 320, described above in detail. The specific design and implementation of network interface 420 may depend on the communications network(s) over which XR unit 204 is intended to operate. For example, in some embodiments, XR unit 204 is configured to be selectively connectable by wire to input unit 202. When connected by wire, network interface 420 may enable communications with input unit 202; and when not connected by wire, network interface 420 may enable communications with mobile communications device 206.

Input interface 430, shown in FIG. 4, is assumed to have similar functionality as the functionality of input interface 330 described above in detail. In this case, input interface 430 may communicate with an image sensor to obtain gesture input 431 (e.g., a finger of user 100 pointing to a virtual object), communicate with other XR units 204 to obtain virtual input 432 (e.g., a virtual object shared with XR unit 204 or a gesture of avatar detected in the virtual environment), communicate with a microphone to obtain audio input 433 (e.g., voice commands), and communicate with input unit 202 to obtain UI input 434 (e.g., virtual content determined by virtual content determination module 315).

Power source 440, shown in FIG. 4, is assumed to have similar functionality as the functionality of power source 340 described above, only it provides electrical energy to power XR unit 204. In some embodiments, power source 440 may be charged by power source 340. For example, power source 440 may be wirelessly changed when XR unit 204 is placed on or in proximity to input unit 202.

Output interface 450, shown in FIG. 4, is assumed to have similar functionality as the functionality of output interface 350 described above in detail. In this case, output interface 450 may cause output from light indicators 451, display 452, speakers 453, and projector 454. Projector 454 may be any device, apparatus, instrument, or the like capable of projecting (or directing) light in order to display virtual content onto a surface. The surface may be part of XR unit 204, part of an eye of user 100, or part of an object in proximity to user 100. In one embodiment, projector 454 may include a lighting unit that concentrates light within a limited solid angle by means of one or more mirrors and lenses, and provides a high value of luminous intensity in a defined direction.

Processing device 460, shown in FIG. 4, is assumed to have similar functionality as the functionality of processing device 360 described above in detail. When XR unit 204 is connected to input unit 202, processing device 460 may work together with processing device 360. Specifically, processing device 460 may implement virtual machine technologies or other technologies to provide the ability to execute, control, run, manipulate, store, etc., multiple software processes, applications, programs, etc. It is appreciated that other types of processor arrangements could be implemented to provide the capabilities disclosed herein.

Sensors interface 470, shown in FIG. 4, is assumed to have similar functionality as the functionality of sensors interface 370 described above in detail. Specifically sensors interface 470 may communicate with audio sensor 471, image sensor 472, motion sensor 473, environmental sensor 474, and other sensors 475. The operations of an audio sensor, an image sensor, a motion sensor, an environmental sensor, and other sensors are described above with reference to FIG. 3, details of which are not repeated herein. It is appreciated that other types and combination of sensors may be used to provide the capabilities disclosed herein.

The components and arrangements shown in FIG. 4 are not intended to limit the disclosed embodiments. As will be appreciated by a person skilled in the art having the benefit of this disclosure, numerous variations and/or modifications may be made to the depicted configuration of XR unit 204. For example, not all components may be essential for the operation of XR unit 204 in all cases. Any component may be located in any appropriate part of system 200, and the components may be rearranged into a variety of configurations while providing the functionality of the disclosed embodiments. For example, some XR units may not include all of the elements in XR unit 204 (e.g., wearable extended reality appliance 110 may not have light indicators 451).

Figure 5:
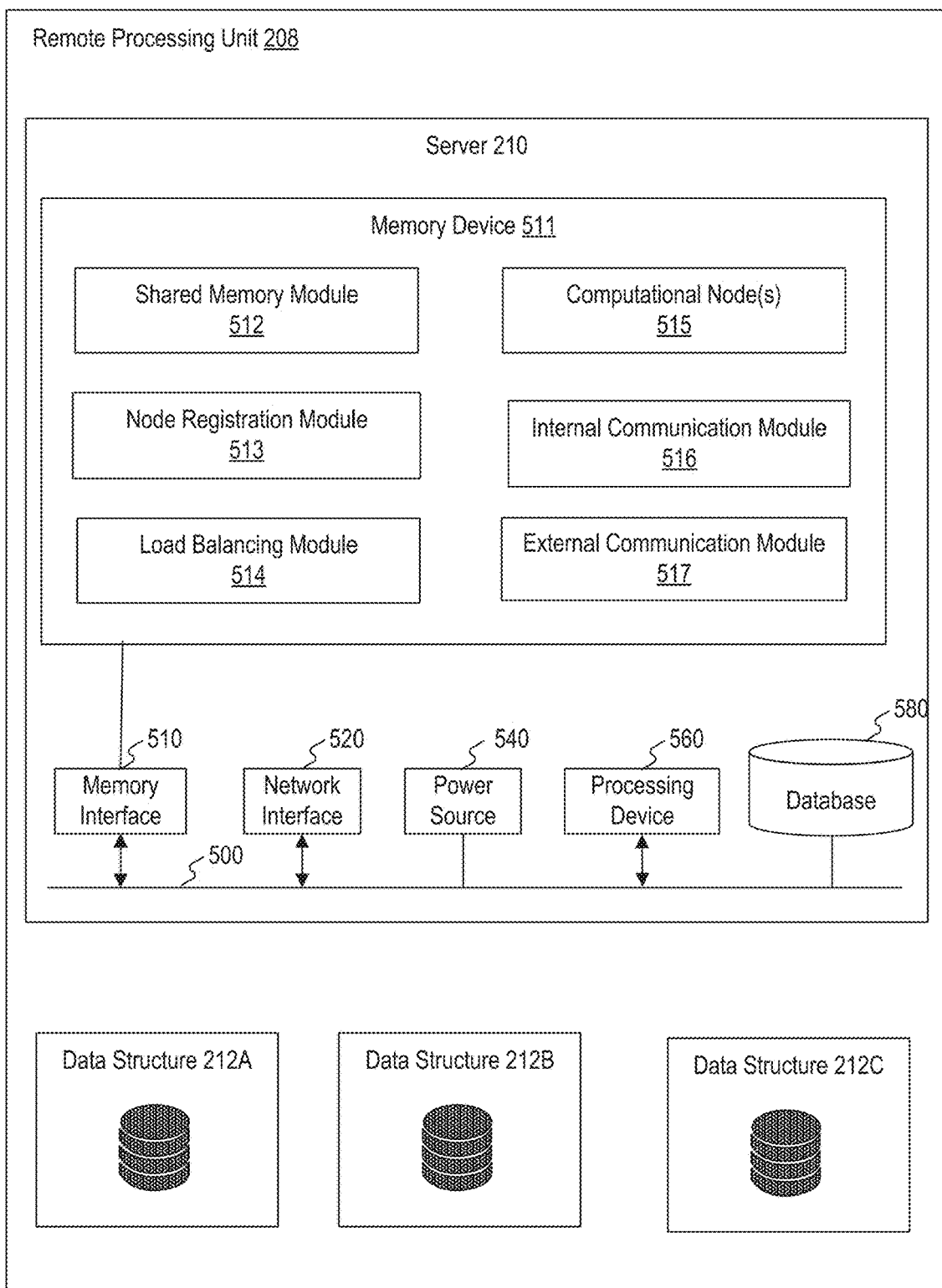
FIG. 5 is a block diagram illustrating some of the components of a remote processing unit, consistent with some embodiments of the present disclosure.

FIG. 5 is a block diagram of an exemplary configuration of remote processing unit 208. FIG. 5 is an exemplary representation of just one embodiment, and it is to be understood that some illustrated elements might be omitted and others added within the scope of this disclosure. In the embodiment of FIG. 5, remote processing unit 208 may include a server 210 that directly or indirectly accesses a bus 500 (or other communication mechanism) interconnecting subsystems and components for transferring information within server 210. For example, bus 500 may interconnect a memory interface 510, a network interface 520, a power source 540, a processing device 560, and a database 580. Remote processing unit 208 may also include a one or more data structures. For example, data structures 212A, 212B, and 212C.

Memory interface 510, shown in FIG. 5, is assumed to have similar functionality as the functionality of memory interface 310 described above in detail. Memory interface 510 may be used to access a software product and/or data stored on a non-transitory computer-readable medium or on other memory devices, such as memory devices 311, 411, 511, or data structures 212A, 212B, and 212C. Memory device 511 may contain software modules to execute processes consistent with the present disclosure. In particular, memory device 511 may include a shared memory module 512, a node registration module 513, a load balancing module 514, one or more computational nodes 515, an internal communication module 516, an external communication module 517, and a database access module (not shown). Modules 512-517 may contain software instructions for execution by at least one processor (e.g., processing device 560) associated with remote processing unit 208. Shared memory module 512, node registration module 513, load balancing module 514, computational module 515, and external communication module 517 may cooperate to perform various operations.

Shared memory module 512 may allow information sharing between remote processing unit 208 and other components of system 200. In some embodiments, shared memory module 512 may be configured to enable processing device 560 (and other processing devices in system 200) to access, retrieve, and store data. For example, using shared memory module 512, processing device 560 may perform at least one of: executing software programs stored on memory device 511, database 580, or data structures 212A-C; storing information in memory device 511, database 580, or data structures 212A-C; or retrieving information from memory device 511, database 580, or data structures 212A-C.

Node registration module 513 may be configured to track the availability of one or more computational nodes 515. In some examples, node registration module 513 may be implemented as: a software program, such as a software program executed by one or more computational nodes 515, a hardware solution, or a combined software and hardware solution. In some implementations, node registration module 513 may communicate with one or more computational nodes 515, for example, using internal communication module 516. In some examples, one or more computational nodes 515 may notify node registration module 513 of their status, for example, by sending messages: at startup, at shutdown, at constant intervals, at selected times, in response to queries received from node registration module 513, or at any other determined times. In some examples, node registration module 513 may query about the status of one or more computational nodes 515, for example, by sending messages: at startup, at constant intervals, at selected times, or at any other determined times.

Load balancing module 514 may be configured to divide the workload among one or more computational nodes 515. In some examples, load balancing module 514 may be implemented as: a software program, such as a software program executed by one or more of the computational nodes 515, a hardware solution, or a combined software and hardware solution. In some implementations, load balancing module 514 may interact with node registration module 513 in order to obtain information regarding the availability of one or more computational nodes 515. In some implementations, load balancing module 514 may communicate with one or more computational nodes 515, for example, using internal communication module 516. In some examples, one or more computational nodes 515 may notify load balancing module 514 of their status, for example, by sending messages: at startup, at shutdown, at constant intervals, at selected times, in response to queries received from load balancing module 514, or at any other determined times. In some examples, load balancing module 514 may query about the status of one or more computational nodes 515, for example, by sending messages: at startup, at constant intervals, at pre-selected times, or at any other determined times.

Internal communication module 516 may be configured to receive and/or to transmit information from one or more components of remote processing unit 208. For example, control signals and/or synchronization signals may be sent and/or received through internal communication module 516. In one embodiment, input information for computer programs, output information of computer programs, and/or intermediate information of computer programs may be sent and/or received through internal communication module 516. In another embodiment, information received though internal communication module 516 may be stored in memory device 511, in database 580, in data structures 212A-C, or other memory device in system 200. For example, information retrieved from data structure 212A may be transmitted using internal communication module 516. In another example, input data may be received using internal communication module 516 and stored in data structure 212B.

External communication module 517 may be configured to receive and/or to transmit information from one or more components of system 200. For example, control signals may be sent and/or received through external communication module 517. In one embodiment, information received though external communication module 517 may be stored in memory device 511, in database 580, in data structures 212A-C, and or any memory device in the system 200. In another embodiment, information retrieved from any of data structures 212A-C may be transmitted using external communication module 517 to XR unit 204. In another embodiment, input data may be transmitted and/or received using external communication module 517. Examples of such input data may include data received from input unit 202, information captured from the environment of user 100 using one or more sensors (e.g., audio sensor 471, image sensor 472, motion sensor 473, environmental sensor 474, other sensors 475), and more.

In some embodiments, aspects of modules 512-517 may be implemented in hardware, in software (including in one or more signal processing and/or application specific integrated circuits), in firmware, or in any combination thereof, executable by one or more processors, alone, or in various combinations with each other. Specifically, modules 512-517 may be configured to interact with each other and/or other modules of system 200 to perform functions consistent with disclosed embodiments. Memory device 511 may include additional modules and instructions or fewer modules and instructions.

Network interface 520, power source 540, processing device 560, and database 580, shown in FIG. 5, are assumed to have similar functionality as the functionality of similar elements described above with reference to FIGS. 4 and 5. The specific design and implementation of the above-mentioned components may vary based on the implementation of system 200. In addition, remote processing unit 208 may include more or fewer components. For example, remote processing unit 208 may include an input interface configured to receive direct input from one or more input devices.

Consistent with the present disclosure, a processing device of system 200 (e.g., processor within mobile communications device 206, a processor within a server 210, a processor within a wearable extended reality appliance, such as, wearable extended reality appliance 110, and/or a processor within an input device associated with wearable extended reality appliance 110, such as keyboard 104) may use machine learning algorithms in order to implement any of the methods disclosed herein. In some embodiments, machine learning algorithms (also referred to as machine learning models) may be trained using training examples. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value for an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may include shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long/short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

In some embodiments, analyzing image data (for example by the methods, steps and modules described herein) may comprise analyzing the image data to obtain a preprocessed image data, and subsequently analyzing the image data and/or the preprocessed image data to obtain the desired outcome. Some non-limiting examples of such image data may include one or more images, videos, frames, footages, 2D image data, 3D image data, and so forth. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth.

In some embodiments, analyzing image data (for example, by the methods, steps and modules described herein) may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth.

In some embodiments, analyzing image data (for example, by the methods, steps and modules described herein) may comprise analyzing pixels, voxels, point cloud, range data, etc. included in the image data.

Consistent with the present disclosure, a processing device of system 200 may analyze image data captured by an image sensor (e.g., image sensor 372, image sensor 472, or any other image sensor) in order to implement any of the methods disclosed herein. In some embodiments, analyzing the image data may comprise analyzing the image data to obtain a preprocessed image data, and subsequently analyzing the image data and/or the preprocessed image data to obtain the desired outcome. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth. In some examples, analyzing the image data may include calculating at least one convolution of at least a portion of the image data, and using the calculated at least one convolution to calculate at least one resulting value and/or to make determinations, identifications, recognitions, classifications, and so forth.

Consistent with other aspects of the disclosure, a processing device of system 200 may analyze image data in order to implement any of the methods disclosed herein. In some embodiments, analyzing the image may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result, and more. In some embodiments, analyzing image data (for example by the methods, steps and modules described herein) may comprise analyzing pixels, voxels, point cloud, range data, etc. included in the image data.

A convolution may include a convolution of any dimension. A one-dimensional convolution is a function that transforms an original sequence of numbers to a transformed sequence of numbers. The one-dimensional convolution may be defined by a sequence of scalars. Each particular value in the transformed sequence of numbers may be determined by calculating a linear combination of values in a subsequence of the original sequence of numbers corresponding to the particular value. A result value of a calculated convolution may include any value in the transformed sequence of numbers. Likewise, an n-dimensional convolution is a function that transforms an original n-dimensional array to a transformed array. The n-dimensional convolution may be defined by an n-dimensional array of scalars (known as the kernel of the n-dimensional convolution). Each particular value in the transformed array may be determined by calculating a linear combination of values in an n-dimensional region of the original array corresponding to the particular value. A result value of a calculated convolution may include any value in the transformed array. In some examples, an image may comprise one or more components (such as color components, depth component, etc.), and each component may include a two dimensional array of pixel values. In one example, calculating a convolution of an image may include calculating a two dimensional convolution on one or more components of the image. In another example, calculating a convolution of an image may include stacking arrays from different components to create a three dimensional array, and calculating a three dimensional convolution on the resulting three dimensional array. In some examples, a video may comprise one or more components (such as color components, depth component, etc.), and each component may include a three dimensional array of pixel values (with two spatial axes and one temporal axis). In one example, calculating a convolution of a video may include calculating a three dimensional convolution on one or more components of the video. In another example, calculating a convolution of a video may include stacking arrays from different components to create a four dimensional array, and calculating a four dimensional convolution on the resulting four dimensional array.

User interfaces may be indispensable for interacting with computing devices but may occupy significant space on an electronic display, leaving less room for displaying documents, images, or other information. Interfacing with a computing device while wearing a wearable extended reality appliance may alleviate some of these constraints by allowing a user to move a user interface to an area in the extended reality space (e.g., virtual space), beyond predefined boundaries of an electronic screen.

In some embodiments, operations may be performed for enabling user interface display mode toggling. Information in a first display region may be presented, the first display region having predefined boundaries, wherein the information is manipulatable via a user interface presentable in the first display region. A second display region may be presented via a wearable extended reality appliance, beyond the predefined boundaries of the first display region, wherein the second display region is visible via the wearable extended reality appliance. A control for altering a location of the user interface may be provided, wherein in a first mode, the user interface is presented in the first display region while the information is presented in the first display region and in a second mode, the user interface is presented in the second display region outside the predefined boundaries of the first display region while the information is presented in the first display region. Toggling may be enabled between the first mode and the second mode via the control.

Figure 6A:
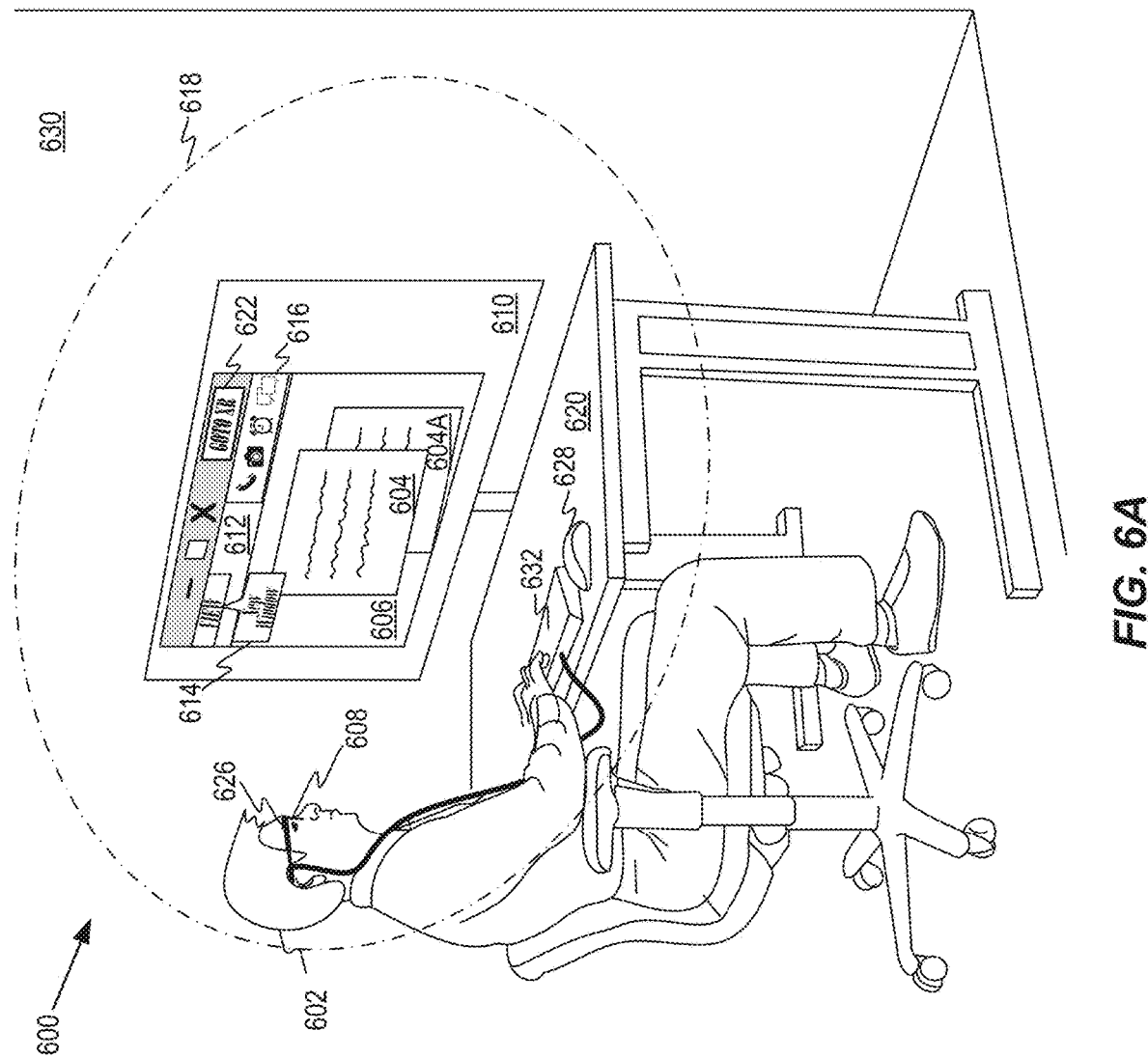
FIG. 6A illustrates an exemplary system for enabling a user interface display toggled to a first mode of operation, consistent with some embodiments of the present disclosure.
Figure 6B:
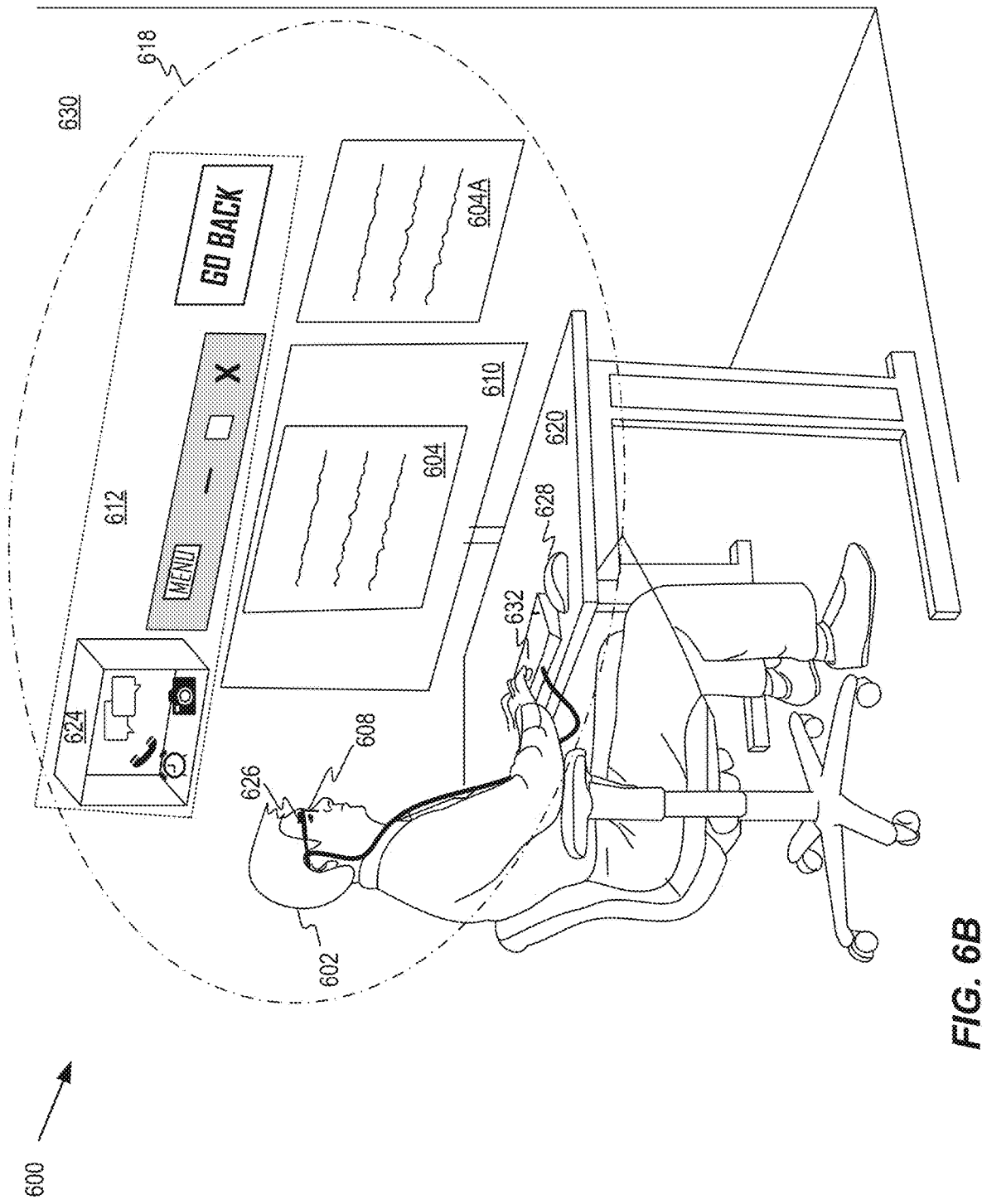
FIG. 6B illustrates the exemplary system of FIG. 6A for enabling a user interface display toggled to a second mode of operation, consistent with some embodiments of the present disclosure.
Figure 9:
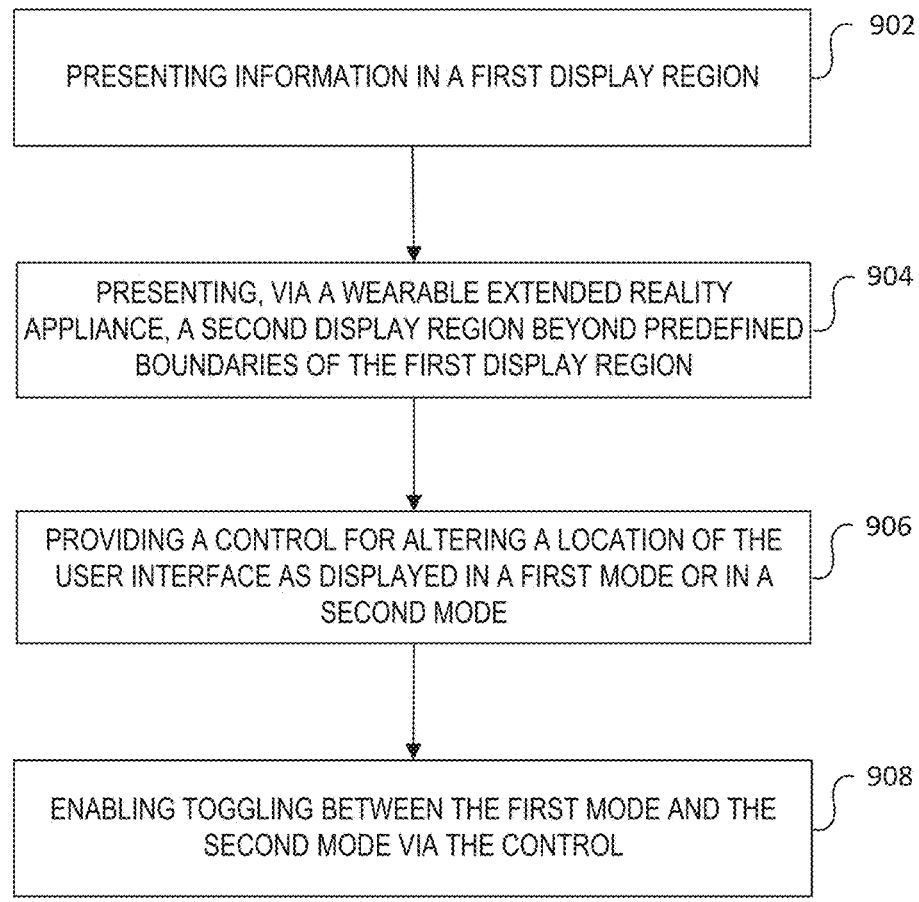
FIG. 9 illustrates a flowchart of an example process for enabling user interface display mode toggling, consistent with embodiments of the present disclosure.

In some instances, the description that follows may refer to FIGS. 6A-6B to 9, which taken together, illustrate exemplary implementations for enabling user interface display mode toggling, consistent with some disclosed embodiments. FIGS. 6A-6B to 9 are intended merely to facilitate conceptualization of one exemplary implementation for performing operations for selectively operating a wearable extended reality appliance and do not limit the disclosure to any particular implementation.

Some embodiments involve a non-transitory computer readable medium containing instructions that when executed by at least one processor cause the at least one processor to perform operations for enabling user interface display mode toggling. A non-transitory computer-readable medium may be understood as described earlier. A computer-readable medium containing instructions may refer to such a medium including program code instructions stored thereon, for example to be executed by a computer processor. The instructions may be written in any type of computer programming language, such as an interpretive language (e.g., scripting languages such as HTML and JavaScript), a procedural or functional language (e.g., C or Pascal that may be compiled for converting to executable code), object-oriented programming language (e.g., Java or Python), logical programming language (e.g., Prolog or Answer Set Programming), and/or any other programming language. In some embodiments, the instructions may implement methods associated with machine learning, deep learning, artificial intelligence, digital image processing, optimization algorithms, and/or any other computer processing technique. At least one processor may include one or more processing devices as described earlier (e.g., processing device 460 of FIG. 4). Instructions executed by at least one processor may include implementing one or more program code instructions in hardware, in software (including in one or more signal processing and/or application specific integrated circuits), in firmware, or in any combination thereof, as described earlier. Causing a processor to perform operations may involve causing the processor to calculate, execute, or otherwise implement one or more arithmetic, mathematic, logic, reasoning, or inference steps, for example by a computing processor. Enabling may include allowing or permitting an implementation or instance, e.g., of a software code execution by at least one processor.

A user interface or UI (e.g., a graphical user interface, or GUI) may include multiple elements (e.g., visually displayed objects) configured to enable interactions between a user and a computing device (e.g., via any of input devices of input unit 202 of FIG. 2). An element of a UI may include text, graphics, images, or a combination thereof and may be displayed in color and/or grey-scale, as one-, two-, or three-dimensional objects. UI elements may include one or more menu bars, tabs, buttons, checkboxes, menus (e.g., drop down menus), text boxes, links, and/or forms, each presenting text and/or graphics (e.g., images and/or icons). Each UI element may be registered with an event listener configured to notify a software application (e.g., an operating system) of a user input. Providing a user input to a UI element (e.g., by entering text into a text box or form, pressing a button or checkbox, clicking a link, and/or performing a gesture) may invoke one or more corresponding actions. Actions that may be performed via a UI may relate to an electronic file storing information, and may include opening, closing, sharing, navigating, storing, protecting, printing, recovering, deleting, inserting, maximizing, minimizing, moving, formatting, and/or editing at least a portion of a document, displaying information associated with a document (e.g., using the Help or About menus), and/or performing any other user-invoked action on a document. For instance, a UI may include elements to invoke or terminate an application, edit information (e.g., such as to insert, copy, delete, and/or otherwise change a display of text and/or graphics, for instance, in a main body, header, footer, reference, or comment in a document, navigate and/or search a document), reference (e.g., cross reference) information with other information, review information (e.g., for spelling and grammar), adjust a display of information (e.g., by adjusting a margin, orientation, size, page break, page number, spacing, indentation, style, color, font, and/or size), share information (e.g., with a different user and/or account), secure information (e.g., via privacy settings, encryption, signature and/or a watermark), organize one or more windows presenting information (e.g., by managing, opening, closing, minimizing, maximizing, and/or moving one or more concurrent windows), transform and/or convert information (e.g., from a linear format to a table, chart, graph, and/or the reverse), access information (e.g., by retrieving and/or sending information from a local and/or remote computing device), authenticate information (e.g., via a form to enter personal identifying information), or perform any other technique for processing information via a user interface.

A display mode for a user interface may include one or more settings for parameters defining which, how, and/or where one or more UI elements may be presented (e.g., graphically) to a user, and/or how a user may interact with a UI (e.g., how UI elements may receive and/or display information). A UI display mode may include one or more settings defining one or more of a display region (e.g., a boundary defining a location for presenting one or more UI elements), which UI elements may be presented and/or activated (e.g., based on use context and/or a size of a display region), one or more display characteristics for one or more UI elements (e.g., a format, style, size, color, texture, dimensionality, and/or transparency), one or more functionalities associated with one or more UI elements, a display medium (e.g., physical and/or virtual media) for graphically presenting a UI to a user, one or more user interface devices (e.g., keyboard, mouse, pointer, electronic display device, camera, gesture recognition software, microphone, speaker, and/or speech recognition software) to facilitate receiving user inputs and presenting a response to a user input (e.g., via one or more UI elements), and/or any other setting or characteristic affecting a display of a UI. Toggling may refer to switching, changing, or alternating, e.g., between one or more display modes for a UI. For instance, a UI may include one or more controls, that when selected by a user, allow switching back and forth (e.g., toggling) between different display modes.

Some embodiments involve presenting information in a first display region. A display region may include a position or location (e.g., associated with an area or volume) for visually presenting content. In some embodiments, a display region may be associated with a single electronic display (e.g., a physical electronic screen viewable by anyone or a wearable extended reality appliance viewable only by a wearer). In some embodiments, a display region may be associated with multiple display devices (e.g., an electronic screen viewable by anyone in conjunction with a wearable extended reality appliance viewable only by a wearer, and/or multiple electronic screens viewable by anyone). For instance, a wearable extended reality appliance may superimpose a display of virtual content over an electronic screen displaying (e.g., non-virtual) content such that the virtual content and the non-virtual content are displayed in the same display region with respect to a field of view of a user wearing the wearable extended reality appliance, (e.g., using two different electronic display devices). In some embodiments, a display region may be associated with one or more pixels or voxels (e.g., adjacent or contiguous pixels or voxels) of an electronic display and/or multiple electronic displays. The pixels or voxels may be selected, activated, deactivated and/or set (e.g., by defining a color, hue, shade, saturation, transparency, opacity, or any other display characteristic) to present information. In some instances, an electronic display (e.g., including a display region defined by one or more pixels) may correspond to physical electronic screen, and the display region be viewable by anyone (e.g., multiple users) within a viewing range of the physical display screen (e.g., display 352 of FIG. 3). In some instances, an electronic display (e.g., including a display region defined by one or more pixels or voxels) may correspond to a viewer of a wearable extended reality appliance, and the display region may be viewable only by the wearer of the wearable extended reality appliance. In some embodiments, a display region may be associated with at least a portion of a field of view (FOV) of a user (e.g., wearing a wearable extendible reality appliance). In some embodiments, a display region may be associated with a physical object (e.g., a portion of a wall, ceiling, or flat surface) onto which content may be projected (e.g., using an LED, LCD, or laser projector). In some embodiments, a size of a display region (e.g., predefined boundaries) may be determined and/or defined based on software considerations (e.g., as a window, frame, or picture-in-picture, based on one or more user-defined and/or default settings). In some embodiments, a size of a display region (e.g., predefined boundaries) may be determined and/or defined based on hardware (e.g., based on a number of pixels of an electronic display, a physical size of an electronic display, available memory and/or channel bandwidth). Information may include data (e.g., storing facts and/or knowledge encoded as bits or bytes) and/or content (e.g., digital content) rendered using text, graphics, images, sound, video, tactile indicators, or any combination thereof. Information may be associated with one or more documents, files, software applications, protocols (e.g., security, communication, and/or memory management protocols), settings (e.g., defining how data may be displayed, shared, protected, stored, searched, edited, deleted, restored, received, or transmitted), computing devices, networks, memory devices and/or processors (e.g., local and/or remote, physical and/or virtual). Information may include content to be displayed and/or metadata associated with content, e.g., describing how to process, analyze, store, send, receive, and/or display content. In some embodiments, information may be associated with and/or manipulated via a user interface of a software application. Presenting may include displaying (e.g., information) visually in a manner to allow viewing by a user, e.g., by activating one or more pixels of an electronic display. Presenting information (e.g., visually presenting information) may include one or more of selecting a display medium for displaying data or content, determining a layout, size, and/or style for displaying information or content, selecting a region for displaying information or content (e.g., in association with a software application, window, frame, or functionality), selecting, setting, adjusting, activating and/or deactivating one or more pixels (or voxels) of an electronic display to visually present information to a user, activating one or more LEDs, LCDs and/or lasers to project information (e.g., on a wall), and/or perform any other action allowing information stored in a memory device (e.g., memory device 411) to be visually perceived by a user. For example, presenting information in a display region may include displaying a document inside a window of a text editor, displaying a video in a picture-in-picture, displaying a message in a messaging application, displaying an alert in a popup window, or perform any other rendering of content for visual perception by a user. In some embodiments, an electronic display may present information capable of being viewed by anyone in a vicinity of the electronic display, such as a physical screen presenting information as light emitted into a room, and/or a projector presenting information as an image projected onto a wall and reflected anywhere in a room, allowing anyone in the room to view the information. In some embodiments, an electronic display may present information for viewing by one user. For example, a wearable extended reality appliance may present information as a virtual image for viewing by a user wearing the wearable extended reality appliance.

For example, a document (e.g., information) may be displayed inside a window (e.g., a software defined display region) of a software application by activating selected pixels of a physical electronic display device (e.g., a hardware defined display region) that may be viewed by any user within a viewing distance of the physical electronic display device. As another example, a 3D chart (e.g., information) may be displayed by activating selected voxels of a wearable extended reality appliance and may be viewed only by the wearer of the wearable extended reality appliance. As a further example, a video (e.g., information) may be displayed by projecting successive frames of the video on a section of a wall (e.g., a physical display region) using a laser projector.

In some embodiments, the first display region has predefined boundaries. A boundary may refer to a border or edge defining a limit, or demarcating an area or space (e.g., a 2D or 3D space), e.g., with respect to one or more other areas or spaces. A boundary of a display region may refer to a border or edge demarcating a limit for displaying information. In some embodiments, a boundary of a display region may be software defined, e.g., by designating pixels of an electronic display defining a line or curve (e.g., enclosing a space) demarcating a display region, such that pixels (or voxels) on one side of the line or curve may be included in a display region (e.g., and may be selected for displaying content associated with the display region), and pixels (or voxels) on the opposite side of the line or curve may be excluded from a display region (e.g., and may not be selected for displaying content associated with the display region). For example, the boundary may be a boundary of a virtual display screen presented via a wearable extended reality appliance. In some embodiments, a boundary of a display region may be hardware defined, e.g., as a size limitation of an electronic screen. In some embodiments, a boundary of a display region may be based on a field of view of a user (e.g., wearing a wearable extended reality appliance). A predefined boundary may refer to a border for a display region defined or determined in advance, e.g., according to one or more settings. For instance, a predefined boundary may be associated with one or more physical and/or software considerations. Physical considerations for defining a predefined boundary may include hardware considerations, such as a physical size of an electronic display, a number of available pixels or voxels of an electronic display device, a pixel or voxel size, a memory (e.g., buffer) limitation, as well as one or more physical objects in proximity to an electronic display device (e.g., obstructing a portion of a display), illumination conditions in proximity to an electronic display device, and/or any other physical considerations affecting the display of content via an electronic display device. Software considerations for defining a predefined boundary (e.g., for delimiting a display region for presenting information) may include a type, size, context, timing, and/or amount of information to be displayed, additional content displayed concurrently (e.g., inside one or more additional windows or frames optionally associated with a different software application), an amount of available memory or processing time, a focus, transparency, and/or level of a window or frame associated with displaying information, one or more default and/or user-defined settings and/or considerations associated with an operating system and/or a software application associated with displaying the information, or any other software considerations for determining where to display information on an electronic display device. Examples of display regions having predefined boundaries may include a default window of a text editor (e.g., a software application) for presenting a document (e.g., information), a user-defined picture-in-picture for displaying a video, physical dimensions of an electronic display device, and/or a field of view seen through an extended reality appliance.

In some embodiments, the information is manipulatable via a user interface presentable in the first display region. A user interface may be understood as described earlier. In some embodiments, the user interface includes at least one of a menu bar, a drop down menu, a favorites column, tabs, an application tray, a settings menu, a task bar, or any other UI element that allows users to perform actions, input data, or access information in a clear and intuitive way. A menu bar may refer to a graphical control element (e.g., displayed as a thin bar) containing labels (e.g., including descriptive text and/or icons) for menu items, each menu item corresponding to a category of parameter settings and/or functions associated with a software application. In some embodiments, selecting a label of a menu item invokes a corresponding action. For example, selecting a disc icon (e.g., a menu item) on a menu bar may cause a document to be saved to disc. A drop down menu may refer to a menu item for a particular category of parameter settings and/or functions that when selected, presents labels for parameter settings and/or functions for sub-categories of the particular category. In some embodiments, selecting a label of a drop down menu displays another drop down menu for a further sub-category of parameter settings and/or functions. In some embodiments, selecting a label of a drop down menu invokes a corresponding action.

For example, selecting a Font menu item of a menu bar may present a drop down menu including multiple options (e.g., sub-categories) for formatting text. Selecting the Highlight option from the drop down menu of the Font menu item may present another drop down menu including multiple color options (e.g., a sub-category of a sub-category) for highlighting text. Selecting a specific color from the drop down menu of the Highlight option may cause text to be highlighted with the selected color. A favorites column (e.g., or list) may include one or more previously selected, viewed, and/or accessed contacts, documents, or files. In some embodiments, a favorites column may be displayed on a drop down menu. A tab may refer to a graphical index for locating and/or selecting a document, panel, window, frame, or application. For instance, selecting a tab in a window for a browser application may cause the browser application to fetch new content from a website associated with the selected tab and render the new content in the window. An application tray may include multiple graphic elements (e.g., including icons, and/or text) each associated with a different software application such that selecting a graphic element invokes the software application. For instance, an application tray may include icons for frequently used applications. A settings menu may include multiple options (e.g., displayed in a list or nested lists) affecting operational aspects of a computing device, such as connectivity, privacy, security, display, sound, and/or communication options. A task bar may refer to a display region of an electronic display dedicated to displaying elements (e.g., as icons) corresponding to software applications, such that selecting an element invokes the corresponding software application.

A user interface presentable in a display region may refer to one or more UI elements formatted (e.g., selected, styled, and/or sized) for displaying via at least a portion of an electronic display. In some embodiments, a UI may be presented in a peripheral portion (e.g., at the top, sides, or bottom) of a window, e.g., to avoid distracting a user focusing on information displayed in a central portion of the window. In some embodiments, a location for presenting a UI may be adjusted by a user. Information that is manipulatable may refer to information that may be processed or modified, e.g., via a UI of a software application. Examples of processing or modifying (e g, manipulating) information may include performing arithmetic or logical operations on information (e.g., in association with a spreadsheet application), transforming numerical or text information to a graphical format and the reverse, editing (e.g., by inserting, deleting, copying, pasting, or formatting) information, converting linear information to a hierarchical or tabular form, converting information for use by a different software application (e.g., text to image and the reverse), storing, deleting, recovering, copying, printing, and/or sharing information, linking information to other information (e.g., by adding references to information), determining a layout for displaying information (e.g., by defining a header, footer, margin, page break, page number, page size, color, style, resolution) or performing any other type of operation to modify and/or process information.

For example, a menu bar including multiple UI elements for a text editing application may be presented in a top portion of a window (e.g., a first display region) displaying an editable document (e.g., information). A user may invoke an action to manipulate the document by selecting one or more of the UI elements. For instance, selecting an Insert UI element may allow adding special characters or graphics to the document, and selecting a View UI element may allow viewing the document using a different layout or format. As another example, an application tray including icons corresponding to different software applications may be presented at the side or bottom of a home page of an operating system allowing a user to invoke a software applications by selecting a corresponding icon. For instance, a software application may permit sharing information with a different user, device, or account.

By way of a non-limiting example, reference is made to FIG. 6A illustrating an exemplary system 600 for enabling user interface display mode toggling in a first mode of operation, consistent with some embodiments of the present disclosure. System 600 includes a user 602 viewing information 604 (e.g., a document) inside a window 606 (e.g., of a text editing application) while wearing a wearable extended reality appliance 608. Information 604 is presented on an electronic screen 610 (e.g., a first display region) having a predefined number of pixels for displaying content (e.g., a predefined boundary). In some embodiments, electronic screen 610 is configured with mobile communications device 206 and remote processing unit 208 of FIG. 2. User 602 may manipulate information 604 by selecting one or more options of a user interface 612 displayed inside window 606 presented on electronic screen 610 (e.g., the first display region). For example, user interface 612 may present a drop down "View" menu presenting a "New Window" element 614 to view a copy 604A of information 604, thereby manipulating the display of information 604. User interface 612 may additionally include a task bar 616 presenting multiple applications that may be invoked by selecting a corresponding icon. In another example, information 604 may include text, and user interface 612 may enable changing fonts, size, color, and so forth of selected portions of the text. In yet another example, information 604 may include an image, and user interface 612 may enable changing brightness, contrast and so forth of the image.

Some embodiments involve presenting, via a wearable extended reality appliance, a second display region beyond the predefined boundaries of the first display region. A wearable extended reality appliances may refer to a head-mounted device, for example, smart glasses, smart contact lens, headsets or any other device worn by a human for purposes of presenting an extended reality to the human, as described earlier. A second display region beyond predefined boundaries of a display region may refer to a portion of the display that may be external to or outside predefined limits (e.g., determined in advance) of a display region. A second display region beyond the predefined boundaries of a first display region may include another position or location corresponding to an area or volume for visually presenting content that is different (e.g., at least partially non-overlapping) than the first display region. In some embodiments, the first display region and the second display region may be distinct (e.g., entirely non-overlapping). In some instances, a first display region and a second display region may correspond to different portions (e.g., at least partially non-overlapping) of a field of view (FOV) of a user, such that at least part of the second display region may be outside the limits (e.g., beyond the boundaries) of the first display region. In some instances, a first display region and a second display region may be associated with different display devices (e.g., different types of display devices and/or different display devices of the same type), different regions of a single display device (e.g., different portions of an electronic screen or of a viewer of an extended reality appliance), different regions of a physical space (e.g., for projecting information and/or displaying virtual information), and/or different software applications. For instance, a first display region and a second display region may correspond to bottom and top halves, respectively, of an electronic display screen. As another example, a first display region may be associated with an active portion of a wearable extended reality appliance (e.g., including pixels selected to emit light to project an image) and may be viewable by a user wearing the wearable extended reality appliance and a second display region may be associated with a physical wall on which an image is projected, and may be viewed by a user through a transparent portion (e.g., an inactive portion) of a wearable extended reality appliance (e.g., as well as by anyone else in viewing distance of the wall).

In some embodiments, the second display region is visible via the wearable extended reality appliance. Visible may refer to a capability of being seen, visually perceived or sensed (e.g., by a human) A display region visible via a wearable extended reality appliance may refer to a point or location of an area or volume that may be seen (e.g., visually perceived) by a user wearing a wearable extended reality appliance. For example, a display region visible via a wearable extended reality appliance may include a portion of a field of view of a user wearing the wearable extended reality appliance aligned with one or more activated pixels displaying virtual content, e.g., via a non-transparent or a semi-transparent section of a wearable extended reality appliance. As another example, a display region visible via a wearable extended reality appliance may include a portion of a field of view of a user wearing a wearable extended reality appliance aligned with at least a partially transparent section of the wearable extended reality appliance allowing the user to see information (e.g., displayed on a physical screen or projected on a wall) through the wearable extended reality appliance, and corresponding to one or more inactive pixels of the wearable extended reality appliance.

For instance, a user wearing a wearable extended reality appliance may view, through a transparent section of the wearable extended reality appliance (e.g., corresponding to a first portion of an FOV of the user), information displayed on an electronic screen (e.g., the first display region) and which may be viewable by anyone within a viewing distance, including users not wearing a wearable extended reality appliance. Concurrently, the user may view, through a non-transparent or semi-transparent section of the wearable extended reality appliance, (e.g., corresponding to a second portion of the FOV of the user), virtual information displayed by the wearable extended reality appliance (e.g., the second display region).

By way of a non-limiting example, in FIG. 6A, an FOV of user 602 may include a central region aligned with electronic screen 610 (e.g., a first display region having predefined boundaries), and a peripheral region 618, surrounding the central region (e.g., a second display region beyond the predefined boundaries of the first display region) for viewing virtual content. Both electronic screen 610 and peripheral region 618 may be viewable via wearable extended reality appliance 608. User 602 may view information 604 displayed on electronic screen 610 through a transparent section of wearable extended reality appliance 608 (e.g., where pixels of wearable extended reality appliance 608 are inactivate) while concurrently viewing virtual content in a non-transparent section of wearable extended reality appliance 608 (e.g., including activated pixels of wearable extended reality appliance 608).

In some embodiments, the predefined boundaries are associated with a virtual screen and the display of the information occurs via the wearable extended reality appliance. A virtual screen (e.g., a virtual display screen) may refer to simulation of a physical screen (e.g., using a wearable extended reality appliance) that may not be confined to a location and/or dimensions of a physical screen (e.g., the size, position, orientation, color, transparency, opacity, and/or other visual characteristic of a virtual screen may be defined by software). For instance, a wearable extended reality appliance may display a virtual screen to a user wearing the wearable extended reality appliance by selectively activating pixels to project an image of the virtual screen. In some embodiments, a virtual screen may be located anywhere within an FOV of a user. For example, a virtual screen may remain in an FOV of a user wearing a wearable extended reality appliance as the user changes their directional gaze (e.g., the virtual screen may be locked to the directional gaze of the user). By contrast, a physical screen may disappear from an FOV of a user when the user changes their directional gaze, e.g., away from the physical screen. Predefined boundaries associated with a virtual screen may refer to a border or perimeter (e.g., defined in advance) demarcating an area or volume withing which a virtual screen may be displayed. Predefined boundaries associated with a virtual screen may be associated with one or more physical, hardware, and/or software considerations. For instance, a boundary of a virtual screen may be determined based on one or more of an FOV of a user, a number of pixels included in a wearable extended reality appliance, a physical size of a wearable extended reality appliance, position of a physical object (e.g., obstructing a portion of an FOV of a user), a lighting condition, an algorithm allocating portions of an FOV of a user and/or portions of a viewer of a wearable extended reality appliance, and/or one or more settings (e.g., default and/or user-defined software setting). A display of information occurring via a wearable extended reality appliance may involve receiving information for display, determining a format and/or layout for displaying information (e.g., by determining a size, resolution, style, and/or color palette for the information), selecting a display region for a wearable extended reality appliance (e.g., by selecting pixels corresponding to a portion of a viewer of the wearable extended reality appliance and/or aligned with a portion of an FOV of a user), mapping information to a pattern of pixels, and/or activating a pattern of pixels to project an image corresponding to information.

Figure 7:
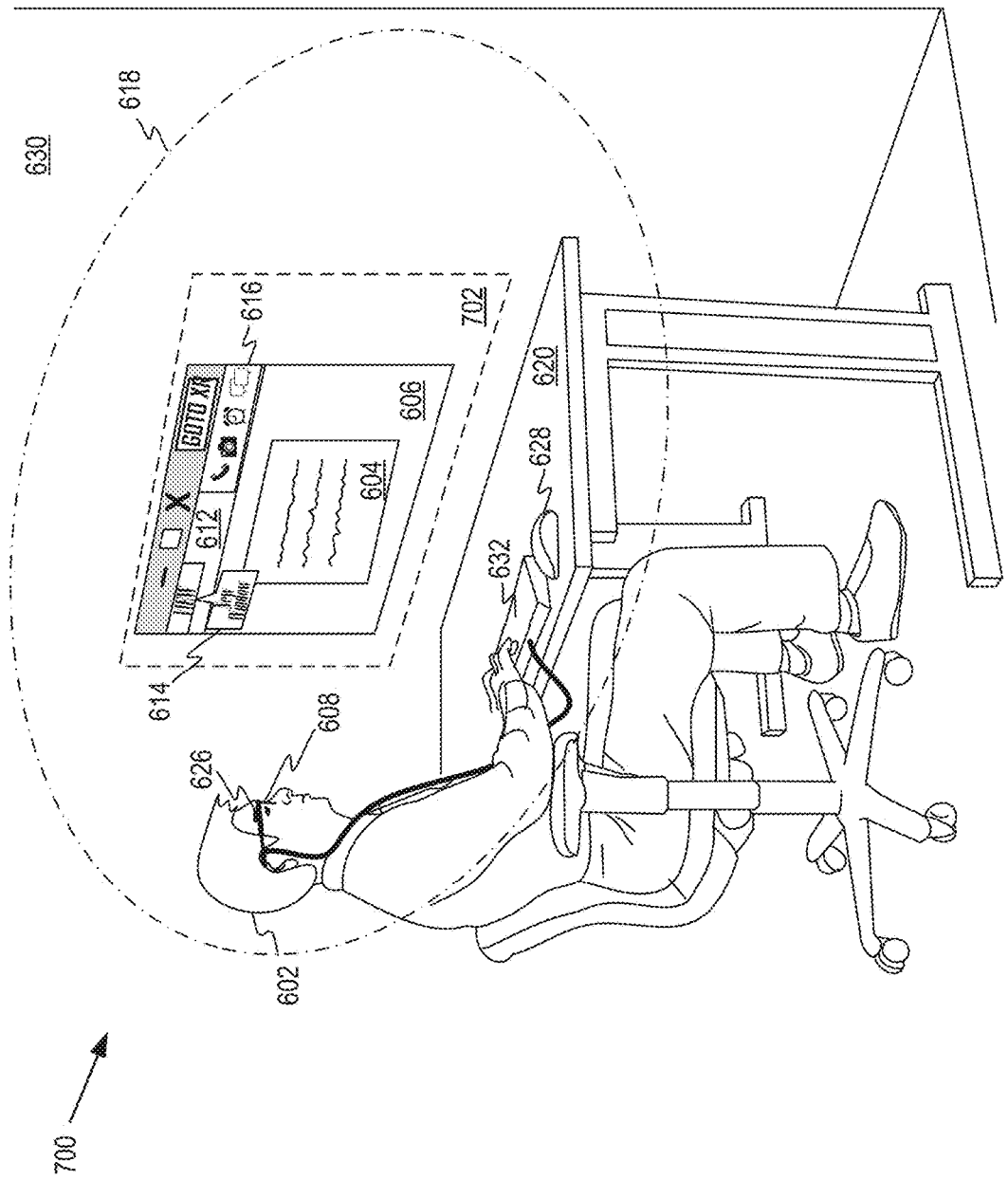
FIG. 7 illustrates another system for enabling user interface display mode toggling, consistent with some embodiments of the present disclosure.

By way of a non-limiting example, FIG. 7 illustrates a system 700 for enabling user interface display mode toggling, consistent with some embodiments of the present disclosure. System 700 may be substantially similar to system 600 with a notable difference that information 604 may be presented to user 602 inside a virtual screen 702 displayed via wearable extended reality appliance 608. Boundaries of virtual screen 702 may be defined by a software application associated with information 604, /or by an algorithm allocating a portion of wearable extended reality appliance 608 and/or allocating a portion of the FOV of user 602 for virtual screen 702.

In some embodiments, the predefined boundaries are associated with a physical screen and the display of the information occurs via the physical screen. A physical screen may refer to an electronic display device including an array of pixels configured to project a pattern of light by selectively activating at least some of the pixels, where the pattern may be viewed by anyone within viewing range of the array of pixels, (e.g., without requiring wearing a wearable extended reality appliance). Predefined boundaries associated with a physical screen may refer to software, physical and/or hardware limitations affecting a display of information via an electronic display device, such as the physical dimensions of an electronic display device, a number of available pixels of an electronic display device, a size of a container (e.g., window) associated with displaying information (e.g., defined by a software application), memory limitations of an electronic display, processing limitations of at least one processor associated with an electronic display, and/or one or more user-defined and/or default settings for an electronic display (e.g., splitting a screen into one or more sections). A display of information occurring via a physical screen may involve one or more of detecting, locating, and/or identifying a physical screen, determining a size and/or resolution for a physical screen, selecting a display area within a physical screen, receiving information for display, formatting and/or determining a layout for displaying information (e.g., by adjusting a size, resolution, style, and/or color palette for displaying the information), and/or selecting, activating, deactivating, and/or setting a color, hue, shade, transparency, and/or opacity for one or more pixels of a physical screen, e.g., corresponding to a layout for presenting information. For example, information may be displayed on an electronic display device display (e.g., display 352 of FIG. 3) having fixed physical dimensions, and a fixed number of pixels.

By way of a non-limiting example, in FIG. 6A, electronic screen 610 may be a physical or tangible display device (e.g., corresponding to display 352) resting on a physical or tangible surface 620. Electronic screen 610 may include a fixed number of pixels per square inch (e.g., 72 PPI) and may have a fixed size (e.g., measured diagonally from corner to corner, and/or measured as length vs height) defining a boundary associated with electronic screen 610. Information 604 (e.g., a document) may be displayed on electronic screen 610 within the boundaries defined (e.g., predefined) by the physical dimensions of electronic screen 610.

In some embodiments, the predefined boundaries are associated with a physical object and the display of the information is performed by the wearable extended reality appliance by overlaying the information in virtual form, on the physical object. A physical object may refer to matter (e.g., tangible matter) contained within an identifiable volume or area that may be moved as a unit. Some examples of physical objects may include a surface of a desk, a shelf (e.g., supporting other physical objects), a wall, a ceiling, a floor, a physical keyboard device, an electronic mouse, and a stylus. A physical object may be moveable or stationary, at least partially opaque, translucent, and/or transparent. In some embodiments, a physical object may have a flat, smooth surface suitable as a background for a display of information (e.g., in a virtual and/or projected form). Predefined boundaries associated with a physical object may include dimensions (e.g., length, width, height) of at least a part of a physical object. For instance, predefined boundaries associated with a physical object may correspond to at least a portion of a physical object contained within an FOV of a user (e.g., wearing a wearable extended reality appliance), within a viewing range of a wearable extendible reality appliance, and/or within a projection range of a projector device. Information in virtual form may refer to information mapped to a pattern of pixels (e.g., of a wearable extended reality appliance), such that activating the pattern of pixels causes an image corresponding to the information (e.g., via the mapping) to be projected onto a retina of a user, allowing the user to receive the information as an image. In some embodiments, information in virtual form may be manifested optically (e.g., as an image) but may lack a tangible form. In some embodiments, information in virtual may be viewable only by a wearer of a wearable extendible reality appliance. Overlaying may refer to superimposing, positioning, or displaying on top of an object. Overlaying information in virtual form on a physical object may include one or more of detecting a physical object within viewing range of a wearable extendible reality appliance, determining a boundary of a physical object, determining a layout and/or format for displaying information within a boundary of a physical object, mapping a layout and/or format for displaying information onto a pattern of pixels of a wearable extendible reality appliance, and activating a pattern of pixels to cause an image corresponding to the information to be projected for viewing by a user such that the image may appear as though displayed over (e.g., overlayed or superimposed) on a physical object.

For example, a wearable extended reality appliance may project an image of a keyboard onto a retina of a user to appear as though a keyboard (e.g., information in virtual form) is resting (e.g., overlayed) on a surface of a desk (e.g., a physical object). As another example, a wearable extended reality appliance may project an image of a document onto a retina of a user to appear as though a document (e.g., information in virtual form) is displayed (e.g., overlayed) on a wall (e.g., a physical object).

Some embodiments involve providing a control for altering a location of the user interface. A control may refer to an element (e.g., an interactive element) associated with one or more managing, governing, commanding, adjusting, maneuvering, and/or manipulating functionalities (e.g., control functionalities). A control may allow a user to decide one or more operational aspects for a software application (e.g., whether, how, where, and when information may be displayed and/or processed). Examples of control elements may include buttons, tabs, switches, check boxes, input fields, clickable icons or images, links, and/or any other text and/or graphical element configured to receive an input and invoke a corresponding action in response. Providing a control may include displaying a graphic element (e.g., a graphic control element), associating a graphic control element with one or more control functionalities, enabling a graphic control element to receive an input (e.g., using an event listener), associating a user input received via a graphic control element with a control functionality, and invoking an action corresponding to a control functionality upon receiving an input via a graphic control element. Altering may refer to changing, moving, modifying, and/or adjusting. A location may refer to a position (e.g., defined in 2D or 3D space). A location may be absolute (e.g., relative to a fixed point on the Earth) or relative (e.g., with respect to a user and/or a wearable extendible reality appliance). Altering a location of a user interface may involve one or more of determining a new location for displaying a user interface, determining a layout and/or format for displaying a user interface at a new location, selecting pixels for displaying a user interface at a new location, activating selected pixels for displaying a user interface at a new location, or deactivating pixels displaying a user interface at a prior location. For example, a control button may be displayed in association with a UI of a software application allowing a user to maneuver the display of the UI by clicking the control button. Clicking the control button may collapse the UI, or move the UI to a location external to a window associated with the software application.

By way of a non-limiting example, FIG. 6A illustrates a control button 622 (e.g., "GOTO XR") for altering a location of user interface 612. Pressing control button 622 may cause user interface 612 to be displayed in peripheral region 618, e.g., external to the boundaries of electronic screen 610, to alter the location of user interface 612.

In some embodiments, in a first mode, the user interface is presented in the first display region while the information is presented in the first display region. A mode may refer to a way or manner in which something may occur or may be experienced, expressed, or done, e.g., in association with one or more parameter settings and/or definitions for a specific context or use case. For instance, a software application may include multiple modes (e.g., use modes) each associated with a set of parameter settings and definitions allowing to tailor, adapt, and/or adjust one or more functionalities of the software application for one or more contexts, use cases, users, accounts, and/or devices. Parameter settings and definitions of a mode may affect a location, style, size, and/or device for displaying content, and/or functionalities of a software application. For example, a first mode may include settings allowing a user to interact with a software application via a single electronic display, and a second mode may include settings allowing a user to interact with a software application via multiple electronic displays. As another example, a first mode may be associated with a private use-case, (e.g., non-networked use) and a second mode may be associated with a collaborative use-case with multiple users (e.g., via a communications network). As a further example, a first mode may be associated with a first subset of available functionalities and a second mode may be associated with a second subset of the available functionalities (e.g., each subset associated with a different use case or context). Presenting a user interface in a display region while information is presented in the display region may refer to displaying information and a UI (e.g., allowing to manipulate the information) concurrently in the same display region, thereby allowing a user to view and interact (e.g., via the UI) with information inside the same display region. For instance, in a first mode, a UI may be displayed as a bar inside a window displaying information using an electronic screen (e.g., viewable by anyone). As another example, in a first mode, a virtual UI may be presented with a virtual display of information via a wearable extended reality appliance. Presenting a user interface in a display region while information is presented in the display region may include one or more of identifying one or more electronic displays associated with a display region (e.g., a physical screen and/or a wearable extended reality appliance), determining a size of a display region (e.g., as a number of pixels of an electronic display device and/or a portion of an FOV), determining a layout and/or format for presenting information together with a user interface in a display region (e.g., based on a size of a display region), mapping a layout and/or format for presenting information together with a user interface to a pattern of pixels of one or more electronic displays, and/or activating a pattern of pixels associated with one or more electronic displays (e.g., corresponding to a presentation of information together with a user interface).

By way of a non-limiting example, FIG. 6A illustrates user interface 612 presented in electronic screen 610 (e.g., a first display region) while information 604 is presented in electronic screen 610, where the boundaries of electronic screen 610 are limited by a physical size of electronic screen 610.

In some embodiments, in a second mode, the user interface is presented in the second display region outside the predefined boundaries of the first display region while the information is presented in the first display region. Outside may refer to external to, or beyond boundaries of, e.g., a display region. A second mode may refer to one or more parameter setting and/or definitions causing a UI and information to be displayed concurrently in different display regions. For instance, information may be displayed in a first display region and a UI may be displayed in a section of a second display region that does not overlap with the first display region such that the UI and the information are displayed in separate or distinct display regions. In some embodiments, the first mode and second mode are associated with differing display regions provided by the same display device. In some embodiments, the first and second mode are associated with differing display regions provided by differing display devices.

By way of a non-limiting example, reference is made to FIG. 6B illustrating exemplary system 600 for enabling user interface display mode toggled to a second mode of operation, consistent with some embodiments of the present disclosure. FIG. 6B may be substantially similar to FIG. 6A with a notable difference that user interface 612 may be presented in peripheral region 618 of the FOV of user 602 (e.g., the second display region), corresponding to at least a partially non-transparent section of wearable extended reality appliance 608, and external to the predefined boundaries of electronic screen 610 (e.g., the first display region), thereby displaying information 604 and user interface 612 concurrently using two different and non-overlapping display regions.

In some embodiments, in the first mode, manipulation of the information in the first display region is enabled from within the first display region, and in the second mode, manipulation of the information in the first display region is enabled from the second display region. Manipulating information from within a display region may include interfacing with at least one processor by submitting an input (e.g., using a keyboard, a pointing device, a gesture, or any other interfacing device) while a cursor is positioned inside a display region, thereby associating the display region with the at least one processor, associating an input with an action to manipulate (e.g., modify or change) information, and invoking an action to manipulate information in response to an input. Consequently, inputs received may be applied to information presented inside the display region. For instance, in the first mode, a UI may be displayed in the same display region as the information, such that a user may interface with the UI to manipulate the information from inside the same display region. Similarly, in the second mode, a UI may be displayed in a second display region while the information may be displayed in the first region, such that a user may interface with the UI to manipulate the information from a different display region than where the information is displayed.

By way of a non-limiting example, in FIG. 6A, user 602 may manipulate information 604 presented in window 606 on electronic screen 610 (e.g., the first display region) by interacting with user interface 612 displayed with information 604 inside window 606 (e.g., from within the first display region). In FIG. 6B, user 602 may manipulate information 604 presented in window 606 on electronic screen 610 (e.g., the first display region) by interacting with user interface 612 displayed in peripheral region 618 via wearable extended reality appliance 608 (e.g., from within the second display region).

Some embodiments involve enabling toggling between the first mode and the second mode via the control. Enabling may refer to facilitating, permitting, and/or allowing. Enabling toggling between the first mode and the second mode may include facilitating, permitting, and/or allowing to switch back and forth between a first set of parameter settings and/or definitions associated with a first mode and a second set of parameter settings and/or definitions associated with a second mode. Enabling toggling between the first mode and the second mode via the control may include one or more of recording in memory (e.g., memory 411) a set of parameter settings and/or definitions for a first mode and a second mode for a software application, associating a current mode for a software application with one of a first mode and a second mode, displaying an interactive element (e.g., a control) for switching a mode for a software application, receiving an input via an interactive element for switching a mode, retrieving from memory a set of parameters settings and/or definitions associated with a mode other than a current mode, and/or applying a set of parameter setting and/or definitions to a software application to thereby switch to a mode other than a current mode. In some embodiments, the control is configured to receive an input to enable the toggling between the first mode and the second mode. An input may include data entered by a user (e.g., via a user interface). An input may include text, speech, a gesture, a selection by a pointing device, or any other type of user interaction with at least one control. A user may send an input to at least one processor using an input device (e.g., included in input unit 202). A control configured to receive an input may refer to an interactive element (e.g., associated with an event listener), such that when data is submitted using an input device in association with the interactive element, a notification associated with the input may be transmitted to at least one processor. For instance, a user interface of a software application displayed in a first display region may include an interactive button prompting a user to switch from a current mode to a different mode. Upon receiving an input (e.g., a click event) via the interactive button, the software application may adjust or modify one or more parameter settings causing the user interface to be displayed in the second region, e.g., according to the different mode. The user interface displayed in the second region may include an interactive button (e.g., the same or different interactive button) prompting a user to switch back to the current mode, thereby enabling a user to toggle between the current mode and the different mode.

By way of a non-limiting example, in FIG. 6A, user interface 612 displayed via electronic screen 610 (e.g., a first display region) includes a control button 622 (e.g., an interactive button "GOTO XR") prompting user 602 to switch to an extended reality mode (e.g., a second mode). Upon receiving a user input (e.g., a click event) via control button 622, one or more parameter settings may be retrieved from memory (e.g., memory device 411) in association with an extended reality display mode. In FIG. 6B, the one or more parameter settings may be applied to thereby display user interface 612 in peripheral region 618 via wearable extended reality appliance 608.

Figure 8A:
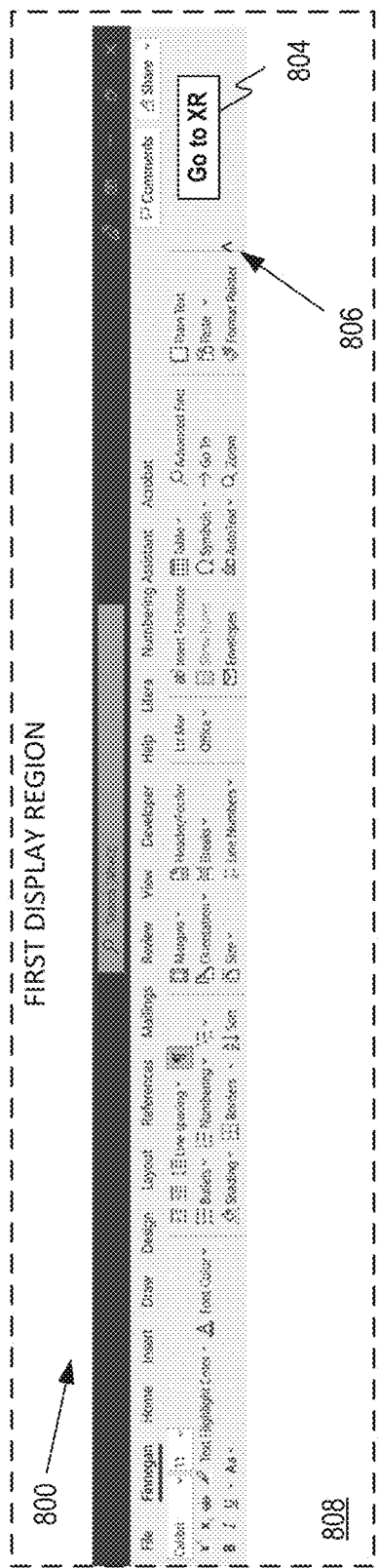
FIGS. 8A-8B together, illustrate a dual mode user interface, consistent with some embodiments of the present disclosure.
Figure 8B:
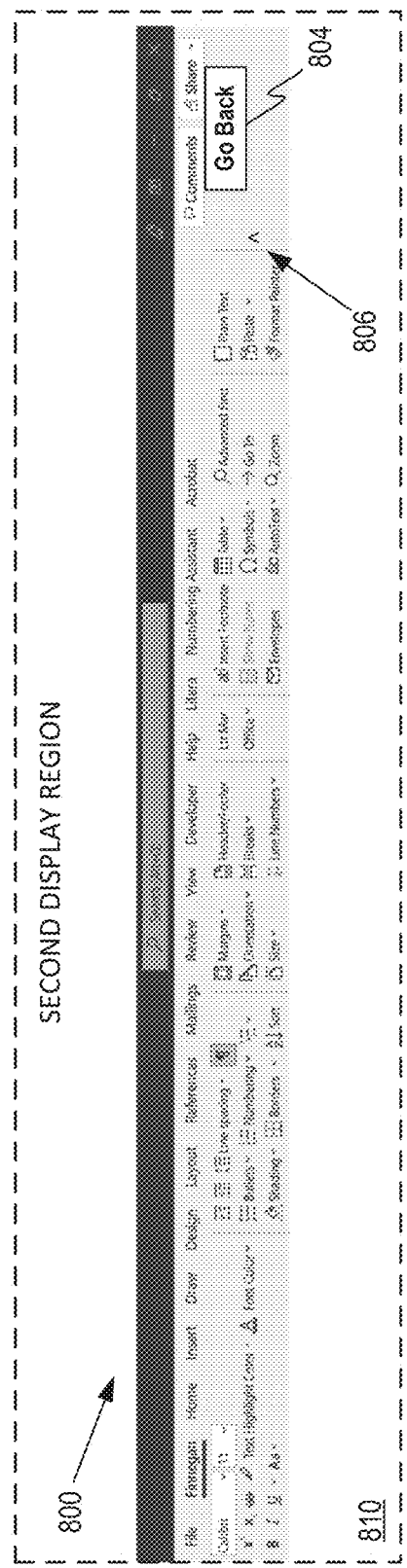

By way of another non-limiting example, reference is made to FIGS. 8A-8B, which together, illustrate a dual mode user interface, consistent with some embodiments of the present disclosure. In FIG. 8A, in a first mode, user interface 800 may be displayed in a first display region 808 having predefined boundaries (e.g., corresponding to first display region 610) concurrently with information (e.g., information 604). To obtain more space in first display region 808, user interface 800 may include a control 804 (e.g., "Goto XR") which may be selected to switch to a second mode. For instance, user 602 may select control 804 using an electronic mouse 628. Control 804 may be an interactive element (e.g., a clickable button) that when selected, applies parameter settings to toggle between the first mode and the second mode. Thus, if a current is the first mode, selecting control 804 may switch to a second mode. In FIG. 8B, in the second mode, user interface 800 may be displayed in a second display region 810 (e.g., included in peripheral region 618) beyond the predefined boundaries of first display region 808, while information is displayed in first display region 808. While displayed in the second display region, user interface 800 may present control 804 (e.g., "Go Back") for returning the display of user interface 800 to first display region 808 (e.g., according to the first mode), and thereby enable toggling between the first mode and the second mode.

In some embodiments, in the first mode the user interface is presented in a two dimensional form and in the second mode the user interface is presented in a three dimensional form. A two-dimensional form may refer to a display format spanning a flat or planar area having two degrees of freedom (e.g., x and y coordinates corresponding to horizontal and vertical axes), such that a display of two or more elements associated with the same x and y coordinates may be displayed at the same location (e.g., overlapping or coinciding). A three-dimensional form may refer to a display format spanning a volume having three degrees of freedom (e.g., x, y, and z coordinates corresponding to horizontal, vertical, and depth axes), such that a display of two or more elements associated with the same x and y coordinates may be displayed at differing locations due to differing values of the z coordinate. Examples of two-dimensional forms may include a rectangle, a triangle, a circle, or an ellipse. Examples of three-dimensional forms may include a cuboid, a cone or tetrahedron, a sphere, or an ellipsoid. For instance, in a first mode, a user interface may be displayed as a flat panel including multiple flat interactive elements such that two different elements cannot be interactively displayed at the same vertical and horizontal positions. Whereas in a second mode, a user interface may be displayed inside a volume such that two different elements may be interactively displayed at the same vertical and horizontal positions but at differing depths. Presenting a user interface in a two dimensional form may include presenting at least a portion of a user interface in two dimensional form, e.g., by activating one or more pixels of a two-dimensional electronic display. Presenting a user interface in a three dimensional form may include presenting at least a portion of a user interface in three dimensional form, e.g., by activating one or more voxels of a three-dimensional electronic display. For instance, a control may allow a user to toggle between a two-dimensional rendering of a user interface (e.g., a first mode) and a three-dimensional rendering of a user interface (e.g., a second mode). In some embodiments, a two-dimensional form for a user interface may be displayed using an electronic screen and/or a wearable extended reality appliance. In some embodiments, a three-dimensional form for a user interface may be displayed using a wearable extended reality appliance.

By way of a non-limiting example, in FIG. 6A, in a first mode, user interface 612, displayed via electronic screen 610 (e.g., the first display region) includes a task bar 616 (e.g., rendered as a two-dimensional user interface element) presenting multiple clickable icons, each associated with a different software application. Each clickable icon of task bar 616 may be associated with different vertical and horizontal coordinates such that the icons do not overlap. Turning to FIG. 6B, upon receiving a user input via control button 622, at least one processor (e.g., processing device 460) may display user interface 612 according to a second mode (e.g., an extended reality "XR" mode). In the second mode, user interface 612 may be displayed in peripheral region 618 (e.g., the second display region) via wearable extended reality appliance 608 and may include a three-dimensional application tray 624, (e.g., corresponding to task bar 616 of FIG. 6A) presenting multiple clickable icons. Some of clickable icon of application tray 624 may be associated with the same or similar vertical and horizontal coordinates but may have different depths coordinates such that the clickable icons do not overlap.

In some embodiments, in the first mode the user interface has a first appearance, and in the second mode the user interface has a second appearance different than the first appearance. An appearance may refer to one or more visible characteristics, such as a style (e.g., text versus graphic), font, size, color (e.g., color scheme), luminance, hue, shade, transparency, opacity, location, two versus three dimensional rendering, spacing, margins, headers, footers, or any other visible display characteristic. For example, in a first mode, the user interface may include graphic icons for differing functionalities (e.g., a home icon to represent a home menu, and a file icon to represent a file menu), and in a second mode, the user interface may substitute text for differing functionalities (e.g., "Home" for a home menu and "File" for a File menu). Switching between the first and second modes may allow a user to switch between a graphic-based user interface and a text-based user interface. As another example, in a first mode a menu bar of a user interface may be displayed at a top of a window displaying information, whereas in a second mode, the menu bar of a user interface may be displayed at a bottom or a side of the window. As a further example, in a first mode, a user interface may be displayed on an electronic screen with an opacity level of 100% and in a second mode, a user interface may be displayed virtually via a wearable extended reality appliance with an opacity level of 70%, allowing a user to see partially through the user interface.

By way of a non-limiting example, FIG. 6A illustrates user interface 612 displayed as an upper bar of window 606 presenting information 604 on electronic screen 610. To conserve space within the predefined boundaries of electronic screen 610 and/or window 606 (e.g., the first display region corresponding to the first mode), elements of user interface 612 may be crowded together and stacked on top of each other (e.g., a first appearance). FIG. 6B illustrates user interface 612 (e.g., as viewed by user 602 via wearable extended reality appliance 608) as multiple interactive features "floating" in peripheral region 618 (e.g., the second display region) above electronic screen 610. Boundaries of peripheral region 618 may be limited by the field of view of user 602 may be larger than the predefined boundaries of electronic screen 610, allowing to space elements of user interface 612 further apart (e.g., a second appearance).

In some embodiments, the first appearance is a minimized version of the user interface, and the second appearance is an unminimized version of the user interface. A minimized version of a user interface may refer to an at least partially collapsed or hidden state of a user interface, for instance to unclutter a display or to view other documents without closing the user interface. Minimizing a user interface may cause a user interface to at least partially disappear from view and may limit invocation of one or more associated functionalities, while the user interface may continue to run in a background process. In some embodiments, a minimized user interface may be restored to an unminimized version using an interactive element (e.g., a button). An unminimized version of a user interface may refer to an unhidden or expanded state of a user interface presenting a user with multiple interactive elements for invoking one or more functionalities, as described earlier. In some embodiments, at least some functionalities available via an unminimized version of the user interface may be unavailable when interfacing via a minimized version of the user interface. A user may toggle between the minimized and unminimized views of a user interface using a control, (e.g., implemented as an interactive button.)

By way of a non-limiting example, reference is made to FIGS. 8C-8D, which together, illustrate another dual mode user interface, consistent with some embodiments of the present disclosure. In FIG. 8C, to save space, a minimized version 802 of a user interface may present only a subset of the interactive elements provided by user interface 800 (e.g., an unminimized version of the user interface). In some embodiments, in a first mode, minimized version 802 of user interface 800 may be displayed in first display region 808 (e.g., corresponding to first display region 610) concurrently with information (e.g., information 604). Minimized user interface 802 may include control 804 (e.g., "Go to XR") allowing to toggle between the first mode and the second mode, such that selecting control 804 while in the first mode invokes the second mode. In FIG. 8D, upon switching to the second mode, unminimized version 800 of the user interface may be presented in second display region 810 (e.g., included in peripheral region 618) Unminimized version 800 may present interactive elements that may not be included in minimized version 802 and may thus have a different appearance than minimized version 802. Unminimized version 800 may include control 804 (e.g., "Go Back") such that selecting control 804 while in the second mode switches back to the first mode, thereby enabling toggling between the first mode and the second mode. For example, user 602 may select control 804 using electronic mouse 628.

In some embodiments, in the first mode, an unminimized version of the user interface is presented in the first display region and in the second mode, the unminimized version of the user interface is presented in the second display region outside the predefined boundaries of the first display region while a minimized version of the user interface is presented in the first display region. For instance, the first display region may present at least some functionalities of a user interface in both the first and second mode, allowing a user to at least partially manipulate information from inside the first display region in both modes. However, in the first mode, the unminimized version of the user interface presented in the first display region may provide a full set of functionalities for manipulating information from inside the first display region. In the second mode, the minimized version of the user interface presented in the first display region may provide only a partial set of functionalities for manipulating information from inside the first display region. Concurrently, in the second mode, an unminimized version of the user interface presented in the second display region may provide a full set of functionalities for manipulating information (presented in the first display region) from the second display region.

By way of a non-limiting example, in FIG. 8A, in a first mode, unminimized version 800 of the user interface may be displayed in first display region 808 (e.g., corresponding to first display region 610 having predefined boundaries). In FIG. 8D, in a second mode, unminimized version 800 of the user interface may be displayed in second display region 810 (e.g., included in peripheral region 618), outside the predefined boundaries of first display region 610 while minimized version 802 of the user interface may be displayed in first display region 808 (e.g., corresponding to first display region 610), for example, as a top bar of window 606 offering a subset of functionalities for manipulating information 604.

In some embodiments, activation of a particular UI element in the first mode causes a predetermined action within the predefined boundaries, and activation of the particular UI element in the second mode causes the predetermined action outside the predefined boundaries. A UI element may refer to a graphically displayed item (e.g., a button, textbox, radio button, drop-down menu, application icon, or tab) configured to interface between a user and a software application by receiving an input from a user and/or presenting an output to a user. A particular UI element may refer to a selected one of multiple available UI elements. Activation of a UI element may involve providing an input via a UI element to trigger execution of an associated function (e.g., via an event listener). Inputs that may be provided via a UI element may include text entered via a keyboard device, a click event entered using an electronic pointing device (e.g., mouse or stylus) or touch sensitive screen, or any other type of user input. For example, clicking a "Paste" UI element may insert data stored in temporary memory (e.g., a clipboard) into a document, and clicking a "Save" UI element may cause changes to the document to be written to disk. Activating a particular UI element (e.g., interacting with the UI element) in the first mode may invoke execution of a function inside the first display region, whereas activating a particular UI element in the second mode may invoke execution of the function inside the second display region. For instance, in the first mode, clicking a "Share" UI element to send a document to another user may open an email client inside the first display region. In the second mode, clicking a "Share" UI element may open an email client inside the second display region.

By way of a non-limiting example, in FIG. 6A (e.g., the first mode), selecting "New Window" element 614 (e.g., activating a particular UI element) may display a second copy 604A of information 604 on electronic screen 610 (e.g., causing a predetermined action within the predefined boundaries of the first display region). In FIG. 6B (e.g., the second mode) selecting "New Window" element 614 may present second copy 604A of information 604 in peripheral region 618, outside the predefined boundaries of electronic screen 610 (e.g., causing the predetermined action outside the predefined boundaries of the first display region).

In some embodiments, activation of a particular UI element in the first mode causes a first action, and activation of the particular UI element in the second mode causes a second action different from the first action. An action may refer to an implementation (or result or outcome) of an execution of one or more software instructions, e.g., invoked by interacting with a UI element. For instance, interacting with a UI element in the first mode may invoke execution of a first function and interacting with the UI element in the second mode may invoke execution of a second function including at least some instructions that differ from the first function. Executing the second function may produce a different outcome than executing the first function (e.g., by displaying information differently, in a different location and/or using a different device, according to a different size, resolution, style, transparency, opacity, or any other display characteristic.)

By way of a non-limiting example, in FIG. 6A, selecting "New Window" element 614 presents copy 604A behind information 604, such that at least a portion of copy 604A is obstructed from view by information 604. In FIG. 6B, selecting "New Window" UI element 614 presents copy 604A in peripheral region 618, alongside information 604, such that copy 604A is not obstructed from view. Thus, the outcome (e.g., location of copy 604A) in FIG. 6B is different from the outcome (e.g., location of copy 604A) in FIG. 6A.

Some embodiments involve providing an additional control for presenting a minimized version of the user interface in the first display region or in the second display region. An additional control may refer to a second control distinct from a control (e.g., the original control) configured to allow toggling the display of the user interface in the first and second modes. For example, a user interface may include a circumflex character (e.g., "^") to minimize a user interface, and may include clickable menu items (e.g., "File" and "Home") to unminimize the minimized user interface.

By way of a non-limiting example, FIGS. 8A-8B and 8D illustrate an additional control 806 to minimize unminimized version 800 of the user interface such that minimized version 802 of the user interface replaces unminimized version 800. Control 806 may be presented in second display region 810 (shown in FIGS. 8B and 8D) and/or in first display region 808 (as shown in FIG. 8A).

In some embodiments, the input is received from an image sensor associated with the wearable extended reality appliance. An image sensor may refer to a device configured to sense light (e.g., visible light, infrared light, UV light, radio waves, or any other wavelengths of electromagnetic radiation) for capturing an image (e.g., a photograph) as an array of pixels. In some embodiments, an image sensor may include a camera. In some embodiments, an image sensor may also include a transmitter to transmit the captured images to at least one processing device. An image sensor associated with a wearable extended reality appliance may include a camera configured to operate in conjunction with a wearable extended reality appliance, e.g., by transmitting one or more captured images to at least one processor associated with a wearable extended reality appliance (e.g., using wired and/or wireless communication). For example, a camera may be mechanically connected to or may be an integral part of a wearable extended reality appliance for capturing images of user inputs (e.g., displayed on an electronic screen). As another example, a camera may be positioned in the vicinity of (e.g., but mechanically disconnected from) a wearable extended reality appliance. Inputs received from an image sensor may include gestures (e.g., hand, arm, body, head, and/or facial gestures), and/or digital content displayed on an electronic display, digital content projected on a physical object (e.g., a wall), or any other image data that may be received from a user. Some embodiments involve analyzing image data from the image sensor to identify a gesture initiated by a user of the wearable extended reality appliance for moving the user interface to a position beyond the predefined boundaries of the first display region. Analyzing may include one or more of comparing, measuring, querying, sorting, correlating, smoothing, filtering, and/or performing any other type logical and/or arithmetic operations on data. Analyzing image data from an image sensor may include performing one or more of filtering, edge detection, convolution, segmentation, compression, clustering, Fourier transform operations, machine learning, and/or any other image processing techniques on image data received from a camera. Identifying may include recognizing, e.g., to associated with something known. A gesture may refer to a form of non-verbal communication that may convey information using visible bodily motions. An image sensor may detect a gesture by capturing multiple frames (or images) of a user performing a gesture (e.g., over a time period). At least one processor may analyze the frames to identify the gesture and associate the gesture with a corresponding action. A gesture initiated by a user may refer to a predefined bodily motion performed by a user, e.g., in range of an image sensor, in order to invoke a corresponding action. At least one processing device may receive a gesture input as multiple sequential frames or images from image sensor, where the sequential frames may collectively capture a user performing a gesture. The at least one processor may analyze the sequential frames to identify the gesture and may invoke a corresponding action in response. A gesture for moving a user interface may refer to a predefined bodily motion, that when detected by at least one processor, may invoke an action to change a location for presenting a user interface. For example, a camera may capture sequential frames of a user pointing at a control with an index finger and moving the index finger in an upwards sweeping motion. At least one processor may receive and analyze the sequential frames to detect a gesture associated with presenting a user interface in the second display region (e.g., beyond the boundaries of the first display region). In response to identifying the gesture, the at least one processor may present the user interface in the second display region located above the first display region, as described earlier.

By way of a non-limiting example, in FIG. 6A, wearable extended reality appliance 608 includes a camera 626 for detecting hand gestures of user 602 as an input for toggling between the first and second modes.

In some embodiments, the input is received from a pointer associated with the wearable extended reality appliance. A pointer may refer to an electronic device configured to target, focus on, or select an object (e.g., a digital object). Examples of pointers may include an electronic mouse, a stylus, a finger on a touch sensitive screen, a joystick, a trackball, or any other type of pointing device. A pointer associated with a wearable extended reality appliance may refer to an electronic pointing device configured to communicate with at least one processor associated with a wearable extended reality appliance. Receiving an input from a pointer may include detecting a pointing or selection event by an electronic pointing device and sending an indication of the pointing or selection to at least one processor. For instance, a user may use an electronic mouse (e.g., a pointer) to click on a control (e.g., a UI element) for toggling a mode for presenting a user interface. The electronic mouse may communicate the click event to at least one processor which may toggle the mode for the user interface in response. In some embodiments, the operations further include analyzing the input from the pointer to determine a cursor drag-and-drop movement of the user interface to a position beyond the predefined boundaries of the first display region. A cursor may refer to a moveable graphic indicator displayed on an electronic display showing a current position for interacting with a user via a pointing or keyboard device, e.g., where typed text may be entered and/or how a click event may be registered. A drag-and-drop movement may refer to a gesture implemented with a pointing device to maneuver a graphic element displayed on an electronic display. A user may implement a drag-and-drop by maneuvering a pointing device to position a cursor on an element, pressing a button of the pointing device while the cursor is positioned on the element (e.g., "grabbing" the element), moving the pointing device while pressing the button to cause a corresponding movement on the element, and releasing (e.g., "dropping") the button to position the element at a new position.

By way of a non-limiting example, FIG. 6A shows an electronic mouse 628 (e.g., a pointing device) associated with wearable extended reality appliance 608. In one implementation, user 602 may use electronic mouse 628 to click on control button 622 to toggle between the first mode (e.g., corresponding to FIG. 6A) and the second mode (e.g., corresponding to FIG. 6B). In another implementation, user 602 may use electronic mouse 628 to drag-and-drop user interface 612 to an edge of electronic screen 610, thereby moving user interface 612 beyond the predefined boundaries of electronic screen 610.

In some embodiments, the wearable extended reality appliance is paired with a physical keyboard, the keyboard enables insertion of textual content to the information, and the input is received from the keyboard. A keyboard may refer to a textual input device (e.g., keyboard 104), as described earlier. A physical keyboard may refer to a tangible, mechanical keyboard. Pairing devices may refer to establishing wireless communication between two devices (e.g., using a Bluetooth protocol) by having each device find and identify the other device by broadcasting and detecting a signal. Pairing a wearable extended reality appliance with a keyboard may involve each of the keyboard and the wearable extended reality appliance broadcasting and detecting a pairing signal to identify the other device, and establishing a communications protocol there between (e.g., a wireless protocol such as Bluetooth). Textual content may refer to information encoded as words formed by character strings. Inserting textual content to information may involve pressing selected keys of a keyboard device to cause characters corresponding to the selected keys to be added to the information (e.g., at a location of a cursor). Receiving input from a keyboard may involve detecting keystrokes on a keyboard, storing characters (e.g., bytes) associated with detected keystrokes in a buffer, notifying at least one processor of detected keystrokes, and adding characters stored in a buffer to a file (e.g., at a location corresponding to a cursor). For example, upon pairing a keyboard to a wearable extended reality appliance, a user may position a cursor in document (e.g., using an electronic mouse) and type a sequence of characters using the keyboard such that the characters appear in the document at the position of the cursor. The pairing of the keyboard to the wearable extended reality appliance may inform at least one processor associated with the wearable extended reality appliance of the added characters. For instance, if the information is displayed virtually via the wearable extended reality appliance, the inserted characters may be displayed virtually.

By way of a non-limiting example, in FIG. 6A, keyboard 632 may be paired with wearable extended reality appliance 608. User 602 may insert text into information 604 using a keyboard 632. The inserted text may be displayed in information 604 on electronic screen 610 at a position corresponding to a cursor. By way of another non-limiting example, in FIG. 7, upon pairing keyboard 632 with wearable extended reality appliance 608, user 602 may type text using keyboard 632. The typed text may be displayed in information 604 on virtual screen 702.

In some embodiments, in the first mode, the information in the first display region is presented at a first size, and in the second mode, the information in the first display region is presented at a second size greater than the first size. A size may refer to dimensions of an element, e.g., measured as a number of pixels, inches, or millimeters. In some instances, a size for presenting information may be constrained by other information displayed concurrently (e.g., in a non-overlapping manner), such as a user interface. In the first mode, displaying the user interface concurrently with the information in the same display region may limit a number of pixels that may be devoted to present other information, e.g., an editable document. For example, when the user interface occupies 20% of a window, at most 80% of the window may be available for presenting the document. In the second mode, displaying the user interface in the second display region, beyond the boundaries of the first display region, may free pixels previously devoted to displaying the user interface. Consequently, the freed pixels may be used for presenting the document in a larger format (e.g., to occupy as much as 100% of the window).

By way of a non-limiting example, in FIG. 6A (e.g., corresponding to the first mode), information 604 may be presented inside window 606 in electronic screen 610 (e.g., the first display region) at a size allowing to concurrently display user interface 612 inside window 606. In FIG. 6B (e.g., corresponding to the second mode), user interface 612 may be displayed in peripheral region 618 via wearable extended reality appliance 608, thereby freeing up some space in window 606. Consequently, information 604 may be presented inside window 606 using a larger format than in FIG. 6A.

In some embodiments, in the second mode, a volume of information presented in the first display region is greater than a volume of information presented in the first mode. A volume of information may refer to a number of bytes of information. A greater volume of information may refer to a greater number of bytes, e.g., more characters or lines of text. For example, moving a user interface to a second display region in a second mode may free up space in a first display region, allowing to display a larger portion of a document (e.g., a greater volume of information) than in the first mode. For instance, if in the first mode, 30 lines of a text document may be presented inside a window, moving the user interface to the second display region in the second mode may allow displaying 40 lines of the text document inside the window (e.g., without changing a font size or zoom setting).

Some embodiments involve receiving image data captured using an image sensor associated with the wearable extended reality appliance. Image data may refer to sensed light encoded as pixels in a file format suitable for images (e.g., bitmap, PDF, PNG, JPEG, GIF). An image sensor associated with a wearable extended reality appliance may refer to a camera configured to operate in conjunction with a wearable extended reality appliance, as described earlier, e.g., by communicating with at least one processor associated with the wearable extended reality appliance. Receiving image data captured using an image sensor may include one or more of detecting an image sensor, establishing communication with an image sensor (e.g., wired and/or wireless communication), and/or receiving one or more image files from an image sensor. Some embodiments involve analyzing the image data to detect a physical object. A physical object may refer to matter contained within an identifiable volume, as described earlier. Examples of a physical object may include a wall, desk, or pen. Analyzing image data to detect a physical object may include applying one or more image processing techniques to image data to identify an object, as described earlier. For example, the image data may be analyzed using an object detection algorithm and/or using a machine learning model to detect the physical object. In another example, a convolution of at least part of the image data may be calculated to obtain a result value. Further, the detection of the physical object may be based on the result value. For example, when the result value is one numerical value, one physical object may be detected, and when the result value is another numerical value, a different physical object may be detected. Some embodiments involve, based on the detected physical object, selecting a position outside the predefined boundaries of the first display region for the presentation of the user interface in the second mode; and in the second mode, enabling interaction with the user interface through interaction with the physical object. Enabling interaction with the user interface through interaction with the physical object may include one or more of identifying a physical object, associating a physical object for user interactions, detecting an interaction with a physical object, and/or performing an action in response to an interaction with a physical object. For example, a user may use a conventional pen (e.g., lacking electronic components) to point to a virtual UI element. A camera may capture one or more images of the pen pointing in the direction of the virtual UI element and transmit the images to at least one processor for analysis. The at least one processor may associate the pointing action of the pen with a request to invoke a function associated with the virtual UI element, thereby enabling interaction with the user interface through interaction with a physical object.

In some embodiments, image data captured using an image sensor associated with the wearable extended reality appliance may be received, for example as described above. Further, the image data may be analyzed to determine suitability of the physical environment of the wearable extended reality appliance to the second mode. For example, an environment with high level of movements (e.g., above a selected threshold) may be unsuitable for the second mode, and/or an environment with a low level of movements (e.g., below a selected threshold) may be suitable for the second mode. The image data may be analyzed using a visual motion detection algorithm to determine the level of movements. In another example, an environment with high illumination level (e.g., above a selected threshold) may be unsuitable for the second mode, and/or an environment with a low illumination level movements (e.g., below a selected threshold) may be suitable for the second mode. In yet another example, an environment including people in a selected region may be unsuitable for the second mode, and/or an environment with no person in the selected region may be suitable for the second mode. In one example, the image data may be analyzed using a person detection algorithm to determine whether people are present in the suitable for the second mode. In some example, a machine learning model may be trained using training examples to determine suitability of physical environments from images and/or videos. An example of such training example may include a sample image of a sample physical environment, together with a label indicating whether the sample physical environment is suitable for the second mode. The received image data may be analyzed using the trained machine learning model to determine the suitability of the physical environment of the wearable extended reality appliance to the second mode. In some examples, a convolution of at least part of the image data may be calculated to obtain a result value. Further, when the result value is one numerical value, it may be determined that the physical environment is suitable for the second mode, and when the result value is another numerical value, it may be determined that the physical environment is unsuitable for the second mode. In some examples, when the physical environment is unsuitable for the second mode, the control for altering the location of the user interface may be hidden (for example, removed from the user interface, not displayed, displayed as unavailable, and so forth). In other examples, when the physical environment is unsuitable for the second mode and the user attempts to use the control for altering the location of the user interface, a notification may be provided (for example, a visual notification may be provided via a physical display screen and/or via the wearable extended reality appliance, an audible notification may be provided via an audio speaker, and so forth), and/or the toggling to the second mode may be avoided.

By way of a non-limiting example, in FIG. 6A, camera 626 configured with wearable extended reality appliance 608 may capture an image of a view seen by user 602. At least one processor (e.g., processing device 460) may receive and analyze the image to detect a wall 630 (e.g., a physical object) behind electronic screen 610. Based on detecting wall 630, at least one processor (e.g., processing device 460) may select a position on wall 630, outside the predefined boundaries of window 606 and electronic screen 610 for presenting user interface 612 in the second mode. In FIG. 6B, in the second mode, user 602 may interact with wall 630 to thereby interact with user interface 612.

FIG. 9 illustrates a flowchart of example process 900 for enabling user interface display mode toggling, consistent with embodiments of the present disclosure. In some embodiments, process 900 may be performed by at least one processor (e.g., processing device 460) to perform operations or functions described herein. In some embodiments, some aspects of process 900 may be implemented as software (e.g., program codes or instructions) that are stored in a memory (e.g., memory device 411 of extended reality unit 204, shown in FIG. 4) or a non-transitory computer readable medium. In some embodiments, some aspects of process 900 may be implemented as hardware (e.g., a specific-purpose circuit). In some embodiments, process 900 may be implemented as a combination of software and hardware.

Referring to FIG. 9, process 900 may include a step 902 of presenting information in a first display region, the first display region having predefined boundaries, wherein the information is manipulatable via a user interface presentable in the first display region. Process 900 may include a step 904 of presenting, via a wearable extended reality appliance, a second display region beyond the predefined boundaries of the first display region, wherein the second display region is visible via the wearable extended reality appliance. Process 900 may include a step 906 of providing a control for altering a location of the user interface, wherein in a first mode, the user interface is presented in the first display region while the information is presented in the first display region and in a second mode, the user interface is presented in the second display region outside the predefined boundaries of the first display region while the information is presented in the first display region. Process 900 may include a step 908 of enabling toggling between the first mode and the second mode via the control.

Some embodiments involve a system for enabling user interface display mode toggling. The system may include at least one processing device configured to: present information in a first display region, the first display region having predefined boundaries, wherein the information is manipulatable via a user interface presentable in the first display region; present, via a wearable extended reality appliance, a second display region beyond the predefined boundaries of the first display region, wherein the second display region is visible via the wearable extended reality appliance; provide a control for altering a location of the user interface, wherein in a first mode, the user interface is presented in the first display region while the information is presented in the first display region and in the second mode, the user interface is presented in a second display region outside the predefined boundaries of the first display region while the information is presented in the first display region; and enable toggling between the first mode and the second mode via the control.

By way of a non-limiting example, FIGS. 6A-6B, taken together, illustrate a system 600 including at least one processor (e.g., processing device 460) configured to present information 604 in a first display region (e.g., window 606 on electronic screen 610), the first display region having predefined boundaries (e.g., corresponding to the dimensions of electronic screen 610). Information 604 may be manipulatable via user interface 612 presented in the first display region. The at least one processor may present, via wearable extended reality appliance 608, a second display region (e.g., peripheral region 618) beyond the predefined boundaries of the first display region (e.g., beyond the predefined of electronic screen 610). The second display region (e.g., peripheral region 618) may be visible to user 602 via wearable extended reality appliance 608. The at least one processor may provide a control button 622 for altering a location of user interface 612. In a first mode (e.g., illustrated in FIG. 6A), user interface 612 may be presented in the first display region (e.g., inside window 606 of electronic screen 610) while information 604 is presented in the first display region. In the second mode, (e.g., illustrated in FIG. 6A), user interface 612 may be presented in a second display region (e.g., peripheral region 618) outside the predefined boundaries of the first display region while information 604 is presented in the first display region. The at least one processor may enable toggling between the first mode and the second mode via control button 622.

As locations of a wearable extended reality appliance change, preferences regarding the types of content a user of a wearable extended reality appliance may prefer to view may also change, for example due to the change in location. Systems, methods, and computer program products are provided, allowing for application of different rules in different locations for displaying different types of content via a wearable extended reality appliance.

In some embodiments, operations may be performed for enabling location-based virtual content. An indication of an initial location of a particular wearable extended reality appliance may be received. A first lookup may be performed in a repository for a match between the initial location and a first extended reality display rule associating the particular wearable extended reality appliance with the initial location, where the first extended reality display rule permits a first type of content display in the initial location and prevents a second type of content display in the initial location. The first extended reality display rule may be implemented to thereby enable first instances of the first type of content to be displayed at the initial location via the particular wearable extended reality appliance while preventing second instances of the second type of content from being displayed at the initial location via the particular wearable extended reality appliance. An indication of a subsequent location of the particular wearable extended reality appliance may be received. A second lookup may be performed in the repository for a match between the subsequent location and a second extended reality display rule associating the particular wearable extended reality appliance with the subsequent location, where the second extended reality display rule prevents the first type of content display in the subsequent location and permits the second type of content display in the subsequent location. The second extended reality display rule may be implemented to enable third instances of the second type of content to be displayed at the subsequent location via the particular wearable extended reality appliance while preventing fourth instances of the first type of content from being displayed at the subsequent location via the particular wearable extended reality appliance In some instances, the description that follows may refer to FIGS. 10 to 14, which taken together, illustrate exemplary implementations for enabling location-based virtual content, consistent with some disclosed embodiments. FIGS. 10 to 14 are intended merely to facilitate conceptualization of one exemplary implementation for performing operations for operating a wearable extended reality appliance and do not limit the disclosure to any particular implementation.

Some embodiments involve a non-transitory computer readable medium containing instructions that when executed by at least one processor cause the at least one processor to perform operations for enabling location-based virtual content. A non-transitory computer-readable medium may be understood as described elsewhere in this disclosure. A computer readable medium containing instructions may refer to such a medium including program code instructions stored thereon, for example to be executed by a computer processor. The instructions may be written in any type of computer programming language, such as an interpretive language (e.g., scripting languages such as HTML and JavaScript), a procedural or functional language (e.g., C or Pascal that may be compiled for converting to executable code), object-oriented programming language (e.g., Java or Python), logical programming language (e.g., Prolog or Answer Set Programming), and/or any other programming language. In some embodiments, the instructions may implement methods associated with machine learning, deep learning, artificial intelligence, digital image processing, optimization algorithms, and/or any other computer processing technique. At least one processor may include one or more processing devices as described elsewhere in this disclosure (e.g., processing device 460 of FIG. 4). Instructions executed by at least one processor may include implementing one or more program code instructions in hardware, in software (including in one or more signal processing and/or application specific integrated circuits), in firmware, or in any combination thereof, as described elsewhere in this disclosure. Causing a processor to perform operations may involve causing the processor to calculate, execute, or otherwise implement one or more arithmetic, mathematics, logic, reasoning, or inference steps, for example by a computing processor. Enabling may include allowing or permitting an implementation or instance, e.g., of a software code execution by at least one processor.

Content may refer to data or media, e.g., formatted according to a distinct specification for presenting information via an interface of an electronic device. Content may include any combination of data formatted as text, image, audio, video, haptic, and any other data type for conveying information to a user. Virtual content may refer to synthesized content that may exist wholly within the context of one or more processing devices, for example within an extended reality environment. Virtual content may be distinguished from physical or real-world content that may exist or be generated independent of a processing device. For example, voice data for a synthesized digital avatar may be virtual content, whereas a recorded voice message of a human user may be associated with physical, real-world (e.g., non-virtual) content. By way of another example, virtual content may be a synthesized image, in contrast to a real-world image. In some embodiments, virtual content may include digital content projected by a wearable electronic display (e.g., integrated with a wearable extended reality appliance) for exclusive viewing by a user wearing the wearable electronic display. In some embodiments, virtual content may include digital content displayed to appear as though embedded within the physical (e.g., real) environment surrounding a user. In some embodiments, a display area for virtual content may be constrained by a field of view (FOV) of a user wearing a wearable extended reality appliance (e.g., to contrast with a non-virtual rendition of digital content constrained by a size of an electronic screen).

Location-based virtual content may refer to virtual content associated with a bearing or position (e.g., a geoposition) of a user wearing a wearable extended reality appliance. An association of virtual content with a location (e.g., bearing or geo-position) may include an association based on a region (e.g., determining a language for presenting textual virtual content), a context (e.g., outdoors vs indoors, leisure or home vs work, public vs private locations), lighting conditions at a location (e.g., affecting illumination and saturation settings for displaying virtual content), a location type (e.g., a commercial establishment vs a public facility, such as a government building or hospital), safety regulations (e.g., to prevent distracting a user performing a critical task, such as driving or crossing a street), incentives to display promotional content (e.g., accessing a service at a location in exchange for viewing an advertisement), one or more user preferences, or any other criterion associating virtual content with a location. For example, a digital map guiding a user through a hospital may be relevant only to locations within the hospital. As another example, a user may prefer to block advertising content while driving but may wish to view advertising content while shopping in a supermarket. As a further example, a first user may prefer viewing personal notifications at work whereas a second user may prefer blocking personal notifications at work.

Some embodiments involve receiving an indication of an initial location of a particular wearable extended reality appliance. A wearable extended reality appliance may refer to a head-mounted device, for example, smart glasses, smart contact lens, headsets or any other device worn by a human for purposes of presenting an extended reality to the human, as described elsewhere in this disclosure. A particular wearable extended reality appliance may refer to an individual or specific (e.g., uniquely identifiable) wearable extended reality appliance, e.g., associated with an individual user, context, use case, and/or user account. In some embodiments, a particular wearable extended reality appliance may be associated with a unique identifier allowing at least one processor to access data associated with the particular wearable extended reality appliance by submitting a query including the unique identifier. A location may refer to a place or position. A location of an electronic device (e.g., of a particular wearable extended reality appliance) may refer to a position of an electronic device relative to one or more sensors (e.g., a cellular tower, a Wi-Fi and/or BlueTooth antenna, a camera, a LIDAR detector, a radar detector, and/or an ultrasound detector) and/or relative to the Earth (e.g., latitude and longitude coordinates). In some embodiments, a location may refer to a specific point (e.g., measured with reference to a coordinate system). In some embodiments, a location may include a locus of points within a predefined distance from a specific point. For example, a location of an electronic device may include a plurality of points within communication distance of a sensor capable of detecting the electronic device. Initial may refer to any instance that occurs prior to a subsequent instance. An initial location may refer to a specific location at which a user may be positioned prior to moving from the initial location to arrive at a subsequent location.

An indication may refer to a sign or signal containing information or evidence of something. An indication of an initial location may include any combination of signals associated with a GPS, cellular, Wi-Fi, and/or BlueTooth network, a motion sensor (an IMU and/or radar), a camera and/or LIDAR detector, an ultrasonic tracking device, and/or any other signal emitted from a sensor configured to detect a location of an electronic device.

Receiving may refer to accepting delivery of, acquiring, retrieving, generating, obtaining or otherwise gaining access to. For example, information or data may be received in a manner that is detectable by or understandable to a processor. The data may be received via a communications channel, such as a wired channel (e.g., cable, fiber) and/or wireless channel (e.g., radio, cellular, optical, IR). The data may be received as individual packets or as a continuous stream of data. The data may be received synchronously, e.g., by periodically polling a memory buffer, queue or stack, or asynchronously, e.g., via an interrupt event. For example, the data may be received from an input device or sensor configured with input unit 202 (FIG. 1), from mobile communications device 206, from remote processing unit 208, or from any other local and/or remote source, and the data may be received by wearable extended reality appliance 110, mobile communications device 206, remote processing unit 208, or any other local and/or remote computing device. In some examples, the data may be received from a memory unit, may be received from an external device, may be generated based on other information (for example, generated using a rendering algorithm based on at least one of geometrical information, texture information or textual information), and so forth. Receiving an indication of an initial location of a particular wearable extended reality appliance may include performing one or more operations. Such operations may include, for example, identifying a particular wearable extended reality appliance, identifying at least one location sensor, and/or establishing a communications link between a particular wearable extended reality appliance and at least one sensor. Such operations may additionally include communicating at least one initial location signal (e.g., an indication of an initial location) between a particular wearable extended reality appliance and a location sensor (e.g., including transmitting an initial location signal from a particular wearable extended reality appliance to a location sensor and/or receiving an initial location signal by at least one processor associated with a particular wearable extended reality appliance from a location sensor). Such operations may further include using at least one location signal associated with a wearable to determine an initial location for a particular wearable extended reality appliance.

For example, a remote processing unit (e.g., server 210) may receive from a wearable extended reality appliance digital signals indicating a GPS-based location of the wearable extended reality appliance. As another example, a remote processing unit may receive a combination of Wi-Fi signals indicating a proximity of a wearable extended reality appliance to a Wi-Fi beacon together with image data acquired by a camera, which may be processed to determine a more precise location of the wearable extended reality appliance relative to the Wi-Fi beacon. For instance, based on the received data, a remote processing unit may determine that a user wearing a wearable extended reality appliance has entered an establishment, such as a restaurant, supermarket, or hospital. As a further example, at least one processor (e.g., associated with a particular wearable extended reality appliance) may receive image data from a camera positioned in proximity to the particular wearable extended reality appliance as an indication of a location. In one example, the wearable extended reality appliance may include a positioning sensor, such as a GPS sensor or an indoor positioning sensor, and the indication of a location of the wearable extended reality appliance (such as the initial location or the subsequent location) may be based on information captured using the positioning sensor included in the wearable extended reality appliance. In another example, the wearable extended reality appliance may include a motion sensor, such as an inertial measurement unit or an accelerometer, and data captured using the motion sensor included in the wearable extended reality appliance may be analyzed to determine motion of the wearable extended reality appliance from an original location, thereby determining a new location of the wearable extended reality appliance (such as the initial location or the subsequent location), and the indication of a location (such as the initial location or the subsequent location) may be based on information captured using the motion sensor included in the wearable extended reality appliance. In yet another example, the wearable extended reality appliance may include an image sensor, and image data captured using the image sensor included in the wearable extended reality appliance may be analyzed to determine a location of the wearable extended reality appliance (such as the initial location or the subsequent location), and the indication of a location (such as the initial location or subsequent location) may be based on the analysis of the image data. For example, the image data may be analyzed using an ego-motion algorithm to determine motion of the wearable extended reality appliance, and the determined motion may be used to determine the location of the wearable extended reality appliance as described above in relation to the information captured using the motion sensor. In another example, the image data may be analyzed using a scene-classification algorithm to determine the location of the wearable extended reality appliance (such as the initial location or the subsequent location). For example, the scene classification may determine that the wearable extended reality appliance is in a coffee house, and the location may be the category of locations corresponding to the coffee house. In another example, the scene classification may determine that the wearable extended reality appliance is in a specific coffee house, and the location may be the specific coffee house. In some examples, a machine learning model may be trained using training examples to determine locations from images and/or videos. An example of such training example may include a sample image data, together with a label indicating a sample location associated with the sample image data. The machine learning model may be used to analyze the image data captured using the image sensor included in the wearable extended reality appliance to determine a location of the wearable extended reality appliance (such as the initial location or the subsequent location). In some examples, a convolution of the image data captured using the image sensor included in the wearable extended reality appliance may be calculated to determine a result value, and a location of the wearable extended reality appliance (such as the initial location or the subsequent location) may be determined based on the result value. For example, when the result value is a first numerical value, the location may be determined to be a first location, and when the result value is a second numerical value, the location may be determined to be a second location. The second location may differ from the first location.

Figure 10:
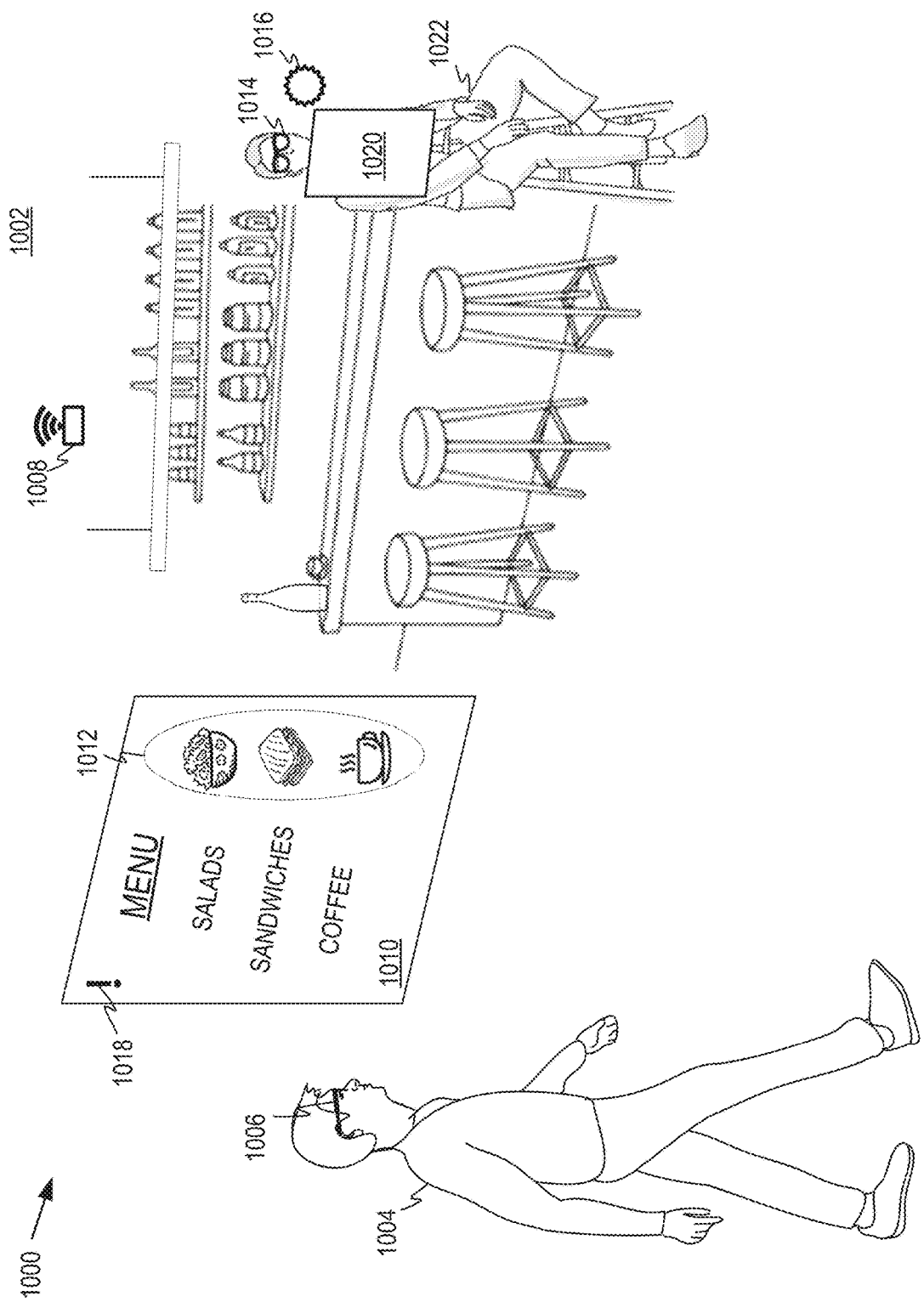
FIG. 10 illustrates an exemplary system for enabling location-based virtual content at an initial location, consistent with embodiments of the present disclosure.

By way of a non-limiting example, reference is made to FIG. 10 illustrating an exemplary system 1000 for enabling location-based virtual content at an initial location 1002, consistent with embodiments of the present disclosure. System 1000 includes a user 1004 wearing a wearable extended reality appliance 1006 (e.g., a pair of smart glasses) at initial location 1002 (e.g., a restaurant). A Wi-Fi beacon 1008 positioned at initial location 1002 may establish a Wi-Fi communication link with wearable extended reality appliance 1006 (e.g., via network interface 420) and may transmit an indication of the Wi-Fi communication link to a computing device (e.g., server 210) indicating that wearable extended reality appliance 1006 is within a Wi-Fi communication distance of Wi-Fi beacon 1008 at initial location 1002.

Some embodiments involve performing a first lookup in a repository for a match between the initial location and a first extended reality display rule associating the particular wearable extended reality appliance with the initial location. A repository may refer to a storage medium configured to store data in digital form, and may include a database, a data center, and/or a distributed computing environment associated with one or more servers (e.g., cloud servers), such as data structure 212 associated with server 210. Data may be stored in a repository inside one or more data structures, such as tables, arrays, lists (e.g., linked lists), hierarchies (e.g., trees), graphs, ontologies, objects, classes, and/or any other type of structure for storing data. Information stored in a repository may be accessed by searching an index associated with the repository, by traversing (e.g., crawling) a graph or network associated with the repository, by applying one or more inference, extrapolation, interpolation, and/or estimation techniques, and/or using any other searching method. A lookup may include a query or search operation. In some embodiments, a lookup may include querying an index storing key-value pairs such that finding a match for a queried key allows retrieving a corresponding value. For example, performing a lookup with a unique user identifier may allow retrieving a user profile associated with the unique user identifier. A lookup in a repository may include a request to access data stored in a repository, e.g., to determine if an instance of a specific data item or items exist in a repository. A lookup in a repository may be formulated as a query, such as a structured query (e.g., formulated for a structured or relational database, such as using SQL) and/or an unstructured query (e.g., formulated for a non-relational, semantic, or ontological database). A match between two data items may refer to a determination of similarity between two data items (e.g., based on a distance measure). In some embodiments, a match between two data items may include determining identicality between two data items (e.g., when comparing security credentials). In some embodiments, a match between two data items may include determining that a distance (e.g., an information distance) between two data items falls within a predefined threshold (e.g., measured as a least squares distance, k-means clustering, Manhattan distance, Murkowski distance, Euclidian distance, Hamming distance, and/or any other type of distance measure), for example in an artificial intelligence context.

An extended reality display rule may refer to one or more guidelines and/or criteria for displaying content via an extended reality appliance, e.g., specifying a type of content that may be displayed, when content may be displayed, and/or how content may be displayed. For instance, one or more extended reality display rules may specify a context for displaying certain types of content and/or for blocking a display of certain types of content display. As another example, one or more extended reality display rules may define display characteristics (e.g., color, format, size, transparency, opacity, style) for displaying content in different types of situations. An extended reality display rule associating a particular wearable extended reality appliance with a location may include one or more criteria specifying what, when, and how data may be displayed based on a location of a wearable extended reality appliance (e.g., based on one or more user-defined, device-specific, and/or default settings). For instance, information may be associated with a specific location based on a particular context, use case, user preference, default setting, and/or relevance. To prevent unwanted distractions, a display rule for a specific location may limit the display of content via a wearable extended reality appliance, e.g., to only display content that is relevant to the particular context or use case. Performing a lookup in a repository for a match between a location and an extended reality display rule associating a wearable extended reality appliance with the location may include performing one or more operations. For example such operations may include determining a unique identifier for a user and/or a wearable extended reality appliance, identifying a location of a wearable extended reality appliance, and/or accessing a repository storing multiple extended reality display rules. Such operation may additionally include determining a data structure type associated with a repository, determining a query language for querying data stored in a repository, and/or formulating a query for a location. Such operations may further include submitting a query for a location to a repository storing one or more extended reality display rules, and/or matching a queried location to one or more extended reality display rules. Such operations may additionally include determining that one or more extended reality display rules matching a queried location associate a wearable extended reality appliance with a location (e.g., the queried location), and/or receiving one or more extended reality display rules associating a wearable extended reality appliance with a location.

For example, a first extended reality display rule associating a wearable extended reality appliance with a street intersection may block content unrelated to assisting a user in crossing the street. Upon receiving an indication that a user wearing a wearable extended reality appliance is at an intersection, at least one processor may query a repository for the intersection location to obtain the first extended reality display rule. As another example, a second extended reality display rule associating a wearable extended reality appliance with a shopping mall may allow displaying promotional content in the shopping mall. Upon receiving an indication of a Wi-Fi connection between the wearable extended reality appliance and a Wi-Fi beacon in the shopping mall, at least one processor may query a repository for the shopping mall location to retrieve the second extended reality display rule.

By way of a non-limiting example, in FIG. 10, at least one processor associated with wearable extended reality appliance 1006 may perform a first lookup in data structure 212 for a match between initial location 1002 and a first extended reality display rule associating wearable extended reality appliance 1006 with initial location 1002. For example, the first extended reality display rule may allow displaying a menu 1010 presenting food items offered at initial location 1002 and may block display of other content unassociated with initial location 1002.

In some embodiments, the first extended reality display rule permits a first type of content display in the initial location and prevents a second type of content display in the initial location. A type of content may refer to one or more of a category for content (e.g., email, messaging, news, promotional, navigation, weather, time, calendar), a content format (e.g., image, text, video, audio), a content size (e.g., a number of bytes and/or a percent of a field of view occupied by displaying content), an amount of content (e.g., how many different objects or elements to be displayed), an association of content (e.g., an institution or establishment associated with content), one or more display characteristics for content (e.g., style, color, saturation, hue, shade, transparency, opacity), and/or any other attribute characterizing content. Permit may refer to allow or enable. A rule permitting a type of content display in a location may involve at least one criterion designating a type of content that may be displayed via a wearable extended reality appliance while positioned at a location. Prevent may refer to prohibit or block. A rule preventing a type of content display in a location may include at least one criterion designating a type of content that may be blocked or prevented from being displayed via a wearable extended reality appliance while positioned at a location.

For instance, a rule permitting to display a type of content via a wearable extended reality appliance while positioned at a location may be based on one or more default settings, user preferences, safety considerations, lighting conditions, context, preferences of an establishment associated with the location, other content currently displayed via the wearable extended reality appliance, and/or any other factor that may be used to decide whether to display content at a location. As an example, a rule associating a wearable extended reality appliance with a street intersection may only permit displaying a navigation map and warning alerts using a semi-transparent display setting and may block all other types of content. As another example, a commercial establishment may prefer blocking content associated with competing commercial establishments.

Some embodiments involve implementing the first extended reality display rule to thereby enable first instances of the first type of content to be displayed at the initial location via the particular wearable extended reality appliance while preventing second instances of the second type of content from being displayed at the initial location via the particular wearable extended reality appliance. Implementing may refer to carrying out or putting into action, e.g., by at least one processor. Implementing a rule may refer to enforcing one or more conditions or constraints associated with a rule to cause conformance and/or compliance with the rule. An instance of content may refer to a digital copy or replica of content allowing content to be stored in multiple memory locations and/or processed by multiple processors, e.g., simultaneously. For example, to display content stored on disk on an electronic display, the content may be copied from the disk onto a memory buffer of the electronic display, such that the content may be simultaneously stored on disk and (e.g., an instance stored) in the memory buffer. As another example, to share an electronic file stored on a first device with a second device, a replica (e.g., an instance) of the electronic file may be transmitted by the first device to the second device via a communications network, such that the content may be simultaneously stored in a memory of the first device and in a memory of the second device. Implementing the first extended reality display rule to thereby enable first instances of the first type of content to be displayed at the initial location via the particular wearable extended reality appliance may involve performing one or more operations. Such operations may include, for example, obtaining an extended reality display rule while positioned at an initial location, receiving a request to display first content, and/or determining whether first content requested for display corresponds to a first content type permitted for display at an initial location according to an extended reality display rule. Implementing the first extended reality rule may also involve obtaining an instance of the first content, displaying an instance of the first content via a particular wearable extended reality appliance (e.g., by calculating a layout for the first content and activating pixels according to the layout), and/or repeatedly confirming an initial location of a particular wearable extended reality appliance while displaying an instance of first content when the first content corresponds to a first content type permitted for display at the initial location. Implementing the first extended reality display rule to prevent second instances of the second type of content from being displayed at the initial location via the particular wearable extended reality appliance may involve performing one or more operations. Such operations may include, for example, receiving a request to display a second content while a wearable extended reality appliance is at an initial location, and/or determining whether second content corresponds to a second content type blocked from display at an initial location according to an extended reality display rule. Implementing the first extended reality display rule may also include preventing a display of instances of the second content via a wearable extended reality appliance positioned at an initial location, and/or repeatedly confirming an initial location of a particular wearable extended reality appliance while preventing display of instances of second content, when the second content corresponds to a second content type blocked from display at an initial location.

As an example, while at an intersection, at least one processor may implement a rule associating a wearable extended reality appliance with an intersection by allowing to display an instance of a navigation map with warning indicators (e.g., a first type of content) while blocking a display of promotional and social media content (e.g., a second type of content).

By way of a non-limiting example, in FIG. 10, at least one processor (e.g., processing device 460 and/or server 210) may query data structure 212 for a first rule associating wearable extended reality appliance 1006 with initial location 1002 (e.g., a specific restaurant). For example, the first rule may specify that while user 1004 is at initial location 1002, content associated with initial location 1002 may be permitted for display, whereas content for other establishments (e.g., unrelated to initial location 1002) may be blocked. The at least one processor may receive a request (e.g., from a computing device associated with initial location 1002) to display menu 1010 and may determine that menu 1010 corresponds to a first type of content permitted for display at initial location 1002 according to the first rule. The at least one processor may obtain an instance of menu 1010 (e.g., from the computing device associated with initial location 1002) and may display the instance of menu 1010 via wearable extended reality appliance 1006 while positioned at initial location 1002. Upon receiving a request to display a second type of content (e.g., associated with a different establishment), the at least one processor may determine that the second type of content may be blocked from display at initial location 1002 according to the first rule. In response, the at least one processor may block the display of the second type of content via wearable extended reality appliance 1006 while at initial location 1002, to thereby implement the first rule.

Figure 11:
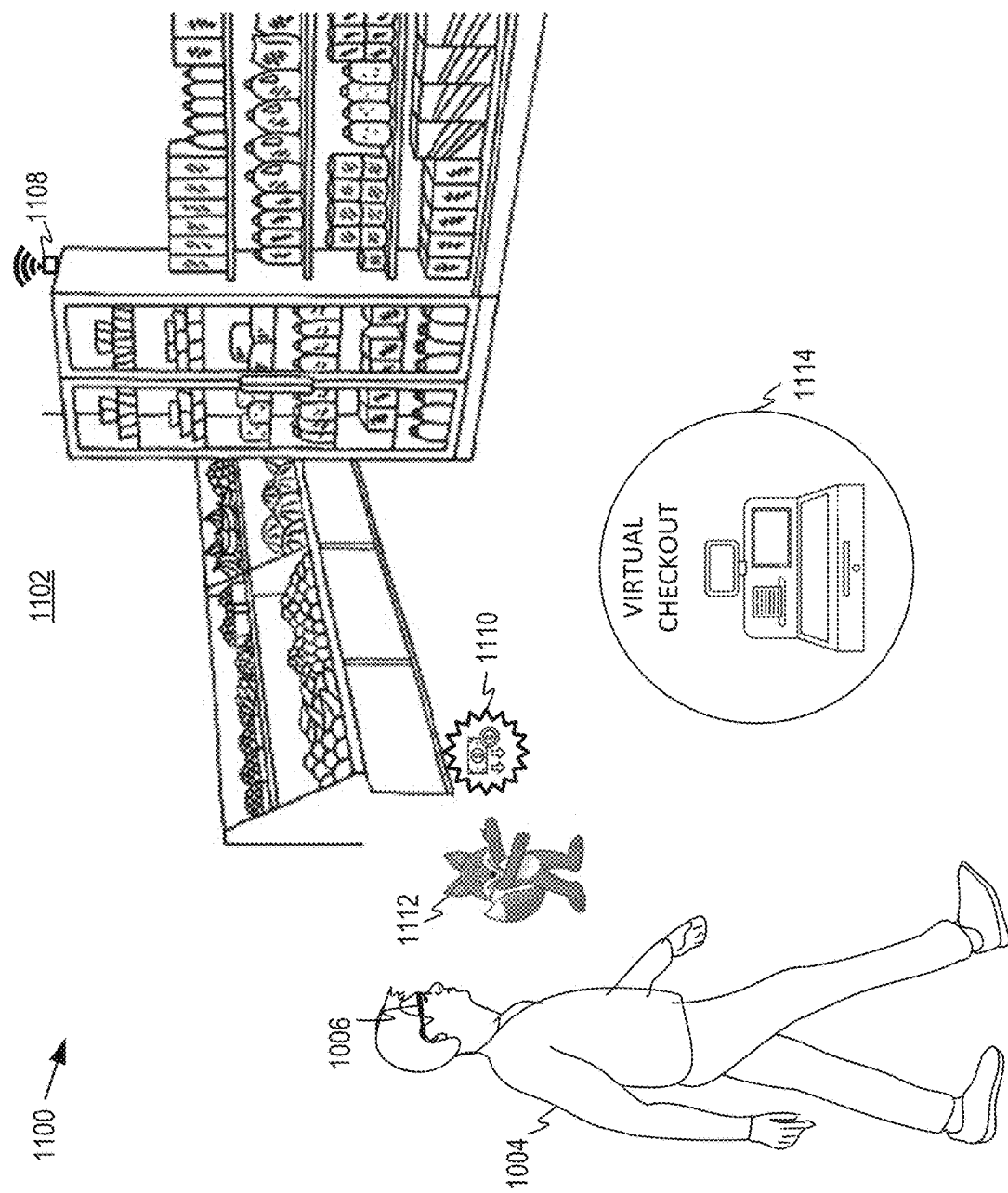
FIG. 11 illustrates an exemplary system for enabling location-based virtual content at a subsequent location, consistent with embodiments of the present disclosure.

For example, reference is made to FIG. 11 illustrating an exemplary system 1100 for enabling location-based virtual content at a subsequent location 1102, consistent with embodiments of the present disclosure. System 1100 is substantially similar to system 1000 with the notable difference that user 1004 has moved from initial location 1002 to subsequent location 1102 (e.g., a supermarket) configured with a Wi-Fi beacon 1108. A promotional coupon 1110 (e.g., second type of content) may be associated with subsequent location 1102. Returning back to FIG. 10, upon receiving a request to display promotional coupon 1110 while wearable extended reality appliance 1006 is at initial location 1002, the at least one processor may prevent instances of promotional coupon 1110 from being displayed at initial location 1002 via wearable extended reality appliance 1006, in compliance with the first rule.

In some embodiments, the first type of content includes layers of content and wherein the operations further include receiving revisions to the first extended reality display rule in real time for selectively enabling content layer display at the initial location via the particular wearable extended reality appliance. Layers of content may refer to transparent or semi-transparent panes, each pane associated with different content such that superimposing multiple layers allows content associated with each layer to be viewed. In some embodiments, each layer may be associated with a different content type (e.g., images, text, background color), a different illumination or saturation level, or different characteristics of the content. A layer may be turned on or off to display or block content accordingly. A revision to an extended reality display rule may refer to an alteration, amendment or modification to an existing extended reality display rule. For example, a revision may relax or add one or more constraints to a rule. Selectively enabling content layer display may refer to choosing which layer to turn on thereby choosing which content to display, and choosing which layer to turn off, thereby choosing which content to block from being displayed. Real time may refer to a response time by a computing device that is sufficiently brief to appear or seem to be effectively instantaneous. Receiving revisions to the first extended reality display rule in real time for selectively enabling content layer display at the initial location via the particular wearable extended reality appliance may include receiving an input from a user of a wearable extended reality appliance at an initial location. The input from the user may indicate whether a particular layer is to be turned on or off. Receiving the revisions to the first extended reality display rule may include analyzing an input received from a user in real time, determining a selection of a content layer displayable via a wearable extended reality appliance, turning a content layer on in response to a selection of a content layer, and/or turning a content layer off in response to a deselection of a content layer.

By way of a non-limiting example, in FIG. 10, menu 1010, food items 1012, and a GUI element 1018 may each be associated with a different content layer. A first extended reality display rule associating wearable extended reality appliance 1006 with initial location 1002 may cause all three layers to be turned on, thereby displaying menu 1010, food items 1012, and GUI element 1018 concurrently. User 1004 may perform a hand gesture to override (e.g., revise) the first rule by selecting the layer associated with GUI element 1018 to be turned off, thereby removing GUI element 1018 from display via wearable extended reality appliance 1006 at initial location 1002. At least one processor may receive and respond to the hand gesture input in real time to implement the revised rule by removing the display of GUI element 1018.

In some embodiments, the layers of content include at least one of a virtual facilities layer, a mapping layer, an advertising layer, a coupon layer, an information layer, or an age-restricted layer. A virtual facility layer may refer to a layer dedicated to display simulated (e.g., virtual) amenities, equipment, or resources. A mapping layer may refer to a layer dedicated to content associated with navigation or guidance. An advertising layer may refer to a layer dedicated to promotional content, announcements, or public relations. A coupon layer may refer to a layer dedicated to vouchers, tokens or certificates granting a discount or special offer. An information layer may refer to a layer dedicated to updates (e.g., a weather forecast, a calendar event), news, warnings, notifications, and/or additional data about offered products or services. An age-restricted layer may refer to a layer dedicated to content associated with nudity, alcohol, drugs, violence, or other sensitive content.

By way of a non-limiting example, in FIG. 10, GUI element 1018 may belong to a coupon layer, menu 1010 may belong to a virtual facility layer, and virtual food items 1012 may belong to an information layer.

Some embodiments involve receiving an indication of a subsequent location of the particular wearable extended reality appliance. Subsequent may refer to following, ensuing, or after. For example, a user wearing a wearable extended reality appliance may leave an initial location at a first time and arrive at a subsequent location at a second time after the first time. A subsequent location may include any location arrived at by a user wearing a wearable extended reality appliance after leaving an initial location. Receiving an indication of a subsequent location of a particular wearable extended reality appliance may include one or more operations similar to the operations described for receiving an indication of an initial location of the particular wearable extended reality appliance described earlier. For example, at least one processor associated with a particular wearable extended reality appliance may continually receive indications updating a location of the particular wearable extended reality appliance over time.

By way of a non-limiting example, in FIG. 11, Wi-Fi beacon 1108 positioned at subsequent location 1102 may detect a Wi-Fi communication link established with wearable extended reality appliance 1006 (e.g., via network interface 420) at subsequent location 1102 and may transmit an indication of the Wi-Fi communication link to a computing device (e.g., server 210) indicating proximity of wearable extended reality appliance 1006 at subsequent location 1102 (e.g., within a Wi-Fi communication distance of Wi-Fi beacon 1108).

In some embodiments, the initial location and the subsequent location are each a location category. A location category may refer to a classification or characterization of a location. Examples of location categories may include indoor versus outdoor locations, public versus private locations, locations associated with a particular activity (e.g., a library, sports arena, or shopping mall), locations associated with a particular context (e.g., a commercial establishment, a government office, an academic institution, a vacation compound, or a medical facility), locations associated with a specific time (e.g., office hours, or public transportation schedules), locations associated with a time frame (e.g., a fleeting time frame for a mobile vehicle, or an extended time frame associated with a stationary activity), or any other factor that may characterize a location. For instance, the initial location may be a university campus corresponding to the category: academic institutions (e.g., a first location category) and the subsequent location may be a shopping mall corresponding to the category: commercial establishments (e.g., a second location category). The first type of content (e.g., a class schedule) may be associated with the first location category (e.g., academic institutions) and the second type of content (e.g., a promotion for an end-of-season sale) may be associated with the second location category (e.g., commercial establishments).

By way of a non-limiting example, in FIG. 10, location 1002 may be a café categorized as a leisure venue. In FIG. 11, location 1102 may be a supermarket categorized as a retail venue. Thus initial location 1002 and subsequent location 1102 may be associated with different location categories.

In some embodiments, the initial location is a first specific location and the subsequent location is a second specific location. A specific location may refer to a particular or uniquely identifiable location. Examples of a specific location may include a particular branch of a franchise restaurant, a particular intersection, a particular vehicle (e.g., where the wearable extended reality appliance moves with a moving vehicle and is therefore stationary relative to the moving vehicle). For example, the first location may be associated with a street address for a medical clinic and the second location may be associated with a street address for a coffee shop.

By way of a non-limiting example, in FIG. 10, location 1002 may be associated with a specific street address for a café, specific GPS coordinates, and/or a unique identifier for Wi-Fi beacon 1008. In FIG. 11, location 1102 may be associated with a specific street address for a supermarket, specific GPS coordinates, and/or a unique identifier for Wi-Fi beacon 1108. Thus initial location 1002 and subsequent location 1102 may be associated with different specific locations.

In some embodiments, the initial location and the subsequent location are associated with different establishments. An establishment may include a venue, a workplace, an institution, an enterprise, a building, a campus, an organization, and/or locations, structures, or items associated with some type of business, leisure, or other activity. Different establishments may refer to establishments of a differing types (e.g., a government campus versus a private restaurant) or separate establishments of the same type (e.g., two different restaurants, or two different government offices).

By way of a non-limiting example, in FIG. 10, location 1002 may be categorized as a leisure establishment. In FIG. 11, location 1102 may be associated with a retail establishment. Thus initial location 1002 and subsequent location 1102 may be associated with different establishments.

Some embodiments involve performing a second lookup in the repository for a match between the subsequent location and a second extended reality display rule associating the particular wearable extended reality appliance with the subsequent location. Performing a second lookup in the repository for a match between the subsequent location and a second extended reality display rule associating the particular wearable extended reality appliance with the subsequent location may include one or more operations similar to the operations described earlier for performing the first lookup in the repository. For example, at least one processor associated with a particular wearable extended reality appliance may query a repository for a subsequent location to retrieve a rule associating a particular wearable extended reality appliance with the subsequent location.

In some embodiments, the second extended reality display rule prevents the first type of content display in the subsequent location and permits the second type of content display in the subsequent location. A second extended reality display rule preventing a first type of content display in a subsequent location and permitting a second type of content display in a subsequent location may be similar to the first extended reality display rule described above, where a display of content associated with the initial location may be blocked and a display of content associated with the subsequent location may be allowed.

By way of a non-limiting example, in FIG. 11, at least one processor (e.g., associated with wearable extended reality appliance 1006) may perform a second lookup in data structure 212 for a match between subsequent location 1102 and a second extended reality display rule associating wearable extended reality appliance 1006 with subsequent location 1102. For example, the second extended reality display rule may permit displaying an instance of promotional coupon 1110 (e.g., a second type of content) for a product sold in subsequent location 1102 and may prevent an instance of menu 1010 of FIG. 10 (e.g., (e.g., a first type of content) from being displayed via wearable extended reality appliance 1006 at subsequent location 1102.

Some embodiments involve implementing the second extended reality display rule to enable third instances of the second type of content to be displayed at the subsequent location via the particular wearable extended reality appliance while preventing fourth instances of the first type of content from being displayed at the subsequent location via the particular wearable extended reality appliance. Implementing the second extended reality display rule to enable third instances of the second type of content to be displayed at the subsequent location via the particular wearable extended reality appliance while preventing fourth instances of the first type of content from being displayed at the subsequent location via the particular wearable extended reality appliance may include one or more operations similar to the operations described earlier for implementing the first extended reality display rule, where the first type of content may be blocked from being displayed and the second type of content may be permitted for display via the particular wearable extended reality appliance at the subsequent location. For instance, at least one processor may deactivate pixels used to display the instance of the first type of content via the particular wearable extended reality appliance at the initial location, retrieve an instance of the second type of content (e.g., from a memory storage associated with the subsequent location), calculate a layout for displaying the second type of content, and activate pixels of the particular wearable extended reality appliance to display the instance of the second type of content while at the subsequent location.

By way of a non-limiting example, in FIG. 11, at least one processor (e.g., processing device 460 and/or server 210) may query data structure 212 for subsequent location 1102 (e.g., a supermarket) to retrieve a second rule associating wearable extended reality appliance 1006 with subsequent location 1102. For instance, the second rule may specify that while user 1004 is at subsequent location 1102, content associated with subsequent location 1102 may be permitted for display displayed, whereas content promoting other establishments (e.g., unassociated with and/or competing with subsequent location 1102) may be blocked. The at least one processor may receive a request (e.g., from a computing device associated with subsequent location 1102) to display promotional coupon 1110 and may determine that promotional coupon 1110 corresponds to a second type of content permitted for display at subsequent location 1102 according to the second rule. The at least one processor may obtain an instance of promotional coupon 1110 (e.g., from a repository, for example associated with subsequent location 1102) and may display the instance of promotional coupon 1110 via wearable extended reality appliance 1006 at subsequent location 1102. Upon receiving a request to display menu 1010 (e.g., associated with initial location 1002), the at least one processor may block menu 1010 from display at subsequent location 1102 according to the second rule.

In some examples, while enabling the third instances of the second type of content to be displayed at the subsequent location via the particular wearable extended reality appliance and preventing the fourth instances of the first type of content from being displayed at the subsequent location via the particular wearable extended reality appliance, an indication that a physical object (such as a person, a moving object, etc.) is entering in the environment of the subsequent location may be received. For example, image data captured using an image sensor included in the wearable extended reality appliance may be analyzed to determine the present of the physical object, for example using a visual object detection algorithm. Further, the second extended reality display rule may include an exception associated with the physical object. Based on the exception and the entrance of the physical object, the prevention of the fourth instances of the first type of content from being displayed at the subsequent location via the particular wearable extended reality may be halted. In some examples, while enabling the third instances of the second type of content to be displayed at the subsequent location via the particular wearable extended reality appliance and preventing the fourth instances of the first type of content from being displayed at the subsequent location via the particular wearable extended reality appliance, an indication that an occurrence of a physical event in the environment of the subsequent location may be received. For example, image data captured using an image sensor included in the wearable extended reality appliance may be analyzed to determine the occurrence of the physical event, for example using a visual event detection algorithm. Further, the second extended reality display rule may include an exception associated with the physical event. Based on the exception and the occurrence of the physical event, the prevention of the fourth instances of the first type of content from being displayed at the subsequent location via the particular wearable extended reality may be halted. In some examples, while enabling the third instances of the second type of content to be displayed at the subsequent location via the particular wearable extended reality appliance and preventing the fourth instances of the first type of content from being displayed at the subsequent location via the particular wearable extended reality appliance, an indication that a relation between two physical objects (such as people, objects, etc.) in the environment of the subsequent location has changed to a particular type of relationship may be received. For example, image data captured using an image sensor included in the wearable extended reality appliance may be analyzed to determine the type of relationship between the two physical objects, for example using a visual classification algorithm. Further, the second extended reality display rule may include an exception associated with the particular type of relationship. Based on the exception and the change in the relationship, the prevention of the fourth instances of the first type of content from being displayed at the subsequent location via the particular wearable extended reality may be halted.

In some embodiments, the first instances of the first type of content include a first plurality of virtual objects, and wherein the second instances of the second type of content include a second plurality of virtual objects. An object may include an item, element, structure, building, thing, device, document, message, article, person, animal, or vehicle. A virtual object may include any one of the forgoing presented as a simulation or synthetization. The virtual object may be presented electronically or digitally. Such electronic or digital presentations may occur in extended reality, virtual reality, augmented reality, or any other format in which objects may be presented digitally or electronically. The presentation may occur via an electronic display (e.g., a wearable extended reality appliance), and/or as a visual presentation of information rendered by a computer. A virtual object may be displayed in two or three dimensions, opaquely (e.g., such that the user may not be able to see a physical environment through the virtual object) or at least partially transparently (e.g., allowing the user to at least partially see a physical environment through the virtual object). Other examples of virtual objects may include virtual widgets (e.g., associated with software applications), virtual navigation maps, virtual alerts, virtual messages, virtual documents, and/or any other type of digital content.

By way of a non-limiting example, in FIG. 10, while at location 1002, user 1004 may view via wearable extendible realty appliance 1006 multiple virtual objects associated with initial location 1002, such as virtual menu 1010 and corresponding virtual food items 1012. In FIG. 11, at subsequent location 1102, user 1004 may view via wearable extendible realty appliance 1006 multiple virtual objects associated with subsequent location 1102, such as promotional coupon 1110, a virtual guide 1112, and a virtual checkout 1114. At initial location 1002, at least one processor (e.g., processing device 460 and/or server 210) may block the display of promotional coupon 1110, virtual guide 1112, and virtual checkout 1114 via wearable extended reality appliance 1106, and at subsequent location 1102, at least one processor may block the display of virtual menu 1010 and virtual food items 1012.

In some embodiments, at least one of the second plurality of virtual objects includes a location-based description of associated services. A location-based description may refer to explanation or characterization of something in relation to, relevant to, or otherwise associated with a location (e.g., a particular location, place, site, area, scene, presentation mode, or orientation). Services may include, for example, amenities, aid, support, assistance, or any other provision answering one or more needs. Examples of services may include provision of food by a food provider, providing of medical advice and/or treatment by a medical clinic, providing of regulation advice and assistance by a government office, or providing a product for sale by a retailer. Associated services (e.g., for a location) may include one or more services relevant to, having to do with, or limited to (e.g., supplied or provided at) a location. Location-based description of associated services may include content related to a service, whether the content is an explanation, a promotion, or material related in any way to the associated services. By way of non-limiting example, location-based descriptions may include content promoting available services at a nearby establishment (e.g., a service station), a guide mapping out offices in an establishment (e.g., clinics inside a hospital), or a map of locations in an area (e.g., academic registrars in a university campus).

By way of a non-limiting example, FIG. 11 illustrates a virtual checkout 1114 that may include a label "VIRTUAL CHECKOUT" with a graphic depiction of a cash machine informing user 1004 of an option for virtual self-checkout at subsequent location 1102 (e.g., a location-based description of a service associated with subsequent location 1102). Virtual checkout 1114 may be unassociated with initial location 1002 and may therefore be included in the second plurality of virtual objects prevented from display at first location 1002 according to the first extended reality display rule.

In some embodiments, at least one of the second plurality of virtual objects includes a virtual user interface for enabling purchases of location-based services. A purchase (e.g., purchases) may refer to an acquisition of an asset or service in exchange for payment. A user interface or UI (e.g., a graphical user interface, or GUI) may include multiple elements (e.g., visually displayed objects) configured to enable interactions between a user and a computing device (e.g., via any of input devices of input unit 202 of FIG. 2), as described elsewhere in this disclosure. A virtual user interface may refer to a UI that allows a user to interact with a computing device without requiring direct interactions with a physical electronic screen (e.g., via a physical electronic device, such as a keyboard or electronic pointing device). An example of a virtual user interface may include a gesture-enabled UI displayed via a wearable extended reality appliance, or dashboard viewable via a head-up display controllable by eye motion and/or eye gestures. A virtual user interface for enabling purchase of location-based services may refer to a virtual user interface allowing a user to acquire a product or service associated with a location in exchange for payment. For example, the virtual user interface may display multiple offered products or services that may be added to a virtual "shopping cart" (e.g., by selecting or dragging a targeted product or service) and may be purchased via a digital payment platform linked to the virtual user interface. Examples of virtual user interfaces for enabling purchase of location-based services may include a virtual form to schedule an annual car inspection at a local service station, a virtual form for reserving a specific room at a specific hotel, or a virtual form to deliver groceries to a particular address.

By way of a non-limiting example, in FIG. 11, in addition to allowing to purchase groceries at subsequent location 1102, virtual checkout 1114 may allow user 1004 to purchase a home delivery option for the purchased groceries (e.g., a location-based service).

In some embodiments, at least one of the second plurality of virtual objects includes an interactive virtual object for assisting a wearer of the particular wearable extended reality appliance to navigate in the subsequent location of the particular wearable extended reality appliance. Interactive may refer to a framework allowing a two-way flow of information between a computing device and a user, including a request for information in one direction and a response to the request in the opposite direction. An interactive virtual object may refer to a virtual object that may be responsive to one or more user inputs. Examples of interactive virtual objects may include an avatar, an interactive virtual map, or a virtual calendar widget allowing scheduling of meetings. For instance, a user may enter an input targeted to the virtual object (e.g., as a gesture) and a software application associated with the virtual object may perform a corresponding action in response. Assisting may include aiding or facilitating. Navigate may include guide or direct, e.g., along a route. An interactive virtual object for assisting a wearer of the particular wearable extended reality appliance to navigate in the subsequent location of the particular wearable extended reality appliance may include an interactive map showing a drive route inside a neighborhood, an interactive map of a hospital showing locations of different clinics inside the hospital, or an interactive guide describing different sections or aisles inside a supermarket.

By way of a non-limiting example, in FIG. 11, user 1004 make emit a voice command for a product (e.g., "I want olive oil") to virtual guide 1112. The voice command may be detected by a microphone (e.g., audio sensor 471) and processed by a voice recognition algorithm associated with wearable extended reality appliance 1006 to produce a query. The at least one processor (e.g., processing device 460) may submit the query to a data structure associated with subsequent location 1102 (e.g., data structure 212) and in response, may retrieve a specific location inside subsequent location 1102 (e.g., a shelf in an aisle storing olive oil) with navigation information associated with a path from a current location of user 1104 to the specific location. The at least one processor may invoke virtual guide 1112 to point user 1004 in the direction of the specific location based on the navigation information, thereby assisting user 1004 in navigating in subsequent location 1102 in an interactive manner. In some embodiments, virtual guide 1112 may emit an audible guidance (e.g., "continue down the aisle, the olive oil is on the left.") via a speaker (e.g., speakers 453) to thereby interact with user 1004 audibly.

In some embodiments, at least one of the second plurality of virtual objects includes promoted content. Promoted content may refer to content presented for the purpose of advertising goods and/or services (e.g., commercial, retail, and/or wholesale trade) or for drawing attention to a cause (e.g., a political, social, environmental, and/or religious cause). Examples of promotional content may include a coupon for coffee, an end-of-year holiday sale, or content advocating for a political candidate.

By way of a non-limiting example, in FIG. 11, while pointing user 1004 to an aisle in subsequent location 1102 carrying a requested product, virtual guide 1112 may additionally present promotional coupon 1110 (e.g., promoted content) for a specific brand of the requested product.

Some embodiments involve prior to performing the first lookup and the second lookup, receiving parameters of the first extended reality display rule and the second extended reality display rule. A parameter may refer to an attribute, a setting, and/or a variable or argument that may take on multiple different values. In some instances, a parameter may be a numerical quantity. In some instances, a parameter may be a value submitted to a called function (e.g., an API). In some instances, a parameter may be associated with one or more user-defined preferences, e.g., to override a default display setting. For example, a user may set a parameter to change a display setting relating to a size, a style, a transparency level, and/or a duration for displaying content at a specific location, e.g., via a user interface presented via a wearable extended reality appliance. In some embodiments, a parameter may be associated with a location type (e.g., to display content differently depending on the type of location). For example, a parameter for a display rule associated with an indoor location may cause content to be displayed at a relatively low intensity (e.g., lower saturation and/or illumination) and a parameter for a display rule associated with an outdoor location may cause content to be displayed at a relatively high intensity (e.g., high saturation and/or illumination). As another example, a parameter for a display rule associated with a work location may prevent personal messages from being displayed during a scheduled work meeting, and a parameter for a display rule associated with a location other than a work location may allow personal messages to be displayed. Prior to performing the first lookup and the second lookup may refer to a time period earlier than when the indications of the initial location and the subsequent location are received by at least one processor associated with a wearable extended reality appliance, for instance, before the user wearing the wearable extended reality appliance arrives at the initial location, or at an initializing stage for a wearable extended reality appliance (e.g., immediately after the wearable extended reality appliance is powered on or reset).

Receiving parameters may include one or more of accessing a memory storage (e.g., associated with a wearable extended reality appliance) and retrieving one or more parameters from the memory storage (e.g., in associated with a user account), displaying a user interface allowing user selection of one or more parameters, receiving one or more indications of selected, modified, added, and/or removed parameters, and/or storing one or more parameters in a memory device (e.g., associated with a wearable extended reality appliance). Parameters of the first extended reality display rule and the second extended reality display rule may include parameters associated with one or more locations, one or more wearable extended reality appliances, and/or one or more users or user accounts. For example, upon switching on a wearable extended reality appliance (e.g., as part of an initialization stage), at least one processor associated with a wearable extended reality appliance may retrieve from an associated memory device one or more user-defined parameters for subsequently applying to one or more extended reality display rules. For example, a parameter for the first extended reality display rule (e.g., associated with an initial location) may define a priority ranking for content displayed while at the initial location, and a parameter for the second extended reality display rule (e.g., associated with a subsequent location) may define a priority ranking for content displayed while at the subsequent location.

By way of a non-limiting example, in FIG. 10, prior to user 1004 arriving at initial location 1002 (e.g., therefore prior to receiving an indication of initial location 1002 and performing a first lookup using the indication), at least one processor (e.g., processing device 460 and/or server 210) may retrieve via database access module 417, one or more parameters for subsequently applying to the first and second extended reality display rules. For example, a parameter for the first extended reality display rule may permit linking content (e.g., menu 1010) with a digital payment platform when displaying menu 1010 at initial location 1002 and a parameter for the second extended reality display rule may define a size for displaying promotional content (e.g., promotional coupon 1110) at subsequent location 1102. As another example, a first parameter indicating a high priority may be received in association with the first extended reality display rule subsequently causing the instance of menu 1010 to occupy a large portion of the field-of-view of user 1004. Similarly, a second parameter indicating a lower priority may be received in association with the second extended reality display rule subsequently causing the instance of promotional coupon 1110 to occupy a small portion of the field-of-view of user 1004.

In some embodiments, one or more of the parameters define locations for permitted content display. Locations for permitted content display may refer to one or more regions of a viewer of a wearable extended reality appliance (e.g., corresponding to one or more pixels) that may be used for displaying content, e.g., as opposed to one or more regions of the viewer that must remain transparent and may be blocked from displaying content. For example, a user may set a parameter to automatically block content from being displayed in a central portion of the field of view (FOV) of the user when crossing a street and limit the display of content to peripheral portions of the FOV. In some embodiments, the received parameters are obtained via the particular wearable extended reality appliance. Receiving parameters via the particular wearable extended reality appliance may include receiving one or more parameters via a user interface presented on a particular wearable extended reality appliance, from a memory associated with a particular wearable extended reality appliance (e.g., data structure 212, database 380, and/or database 480), from a server (e.g., a cloud server) associated with a particular wearable extended reality appliance, and/or from another device connected (e.g., paired) to a particular wearable extended reality appliance (e.g., mobile communications device 206). For instance, a user wearing a particular wearable extended reality appliance may set one or more parameters using a gesture or voice command directed to a virtual user interface presented via the particular wearable extended reality appliance, or alternatively via a mobile device paired to particular wearable extended reality appliance. For example, upon switching on a particular wearable extended reality appliance, a user may enter one or more parameters defining where content may be displayed via the particular wearable extended reality appliance at different locations. For instance, while crossing a street, a first parameter may prohibit content from being displayed at a central region of an FOV of the user, and while interfacing with a user interface, a second parameter may allow content to be displayed at the central region of the FOV.

By way of a non-limiting example, in FIG. 10, a parameter received by at least one processor associated with wearable extended reality appliance 1006 prior to arriving at initial location 1002 may subsequently cause menu 1010 to be displayed in a central region of the FOV of user 1004.

Figure 12:
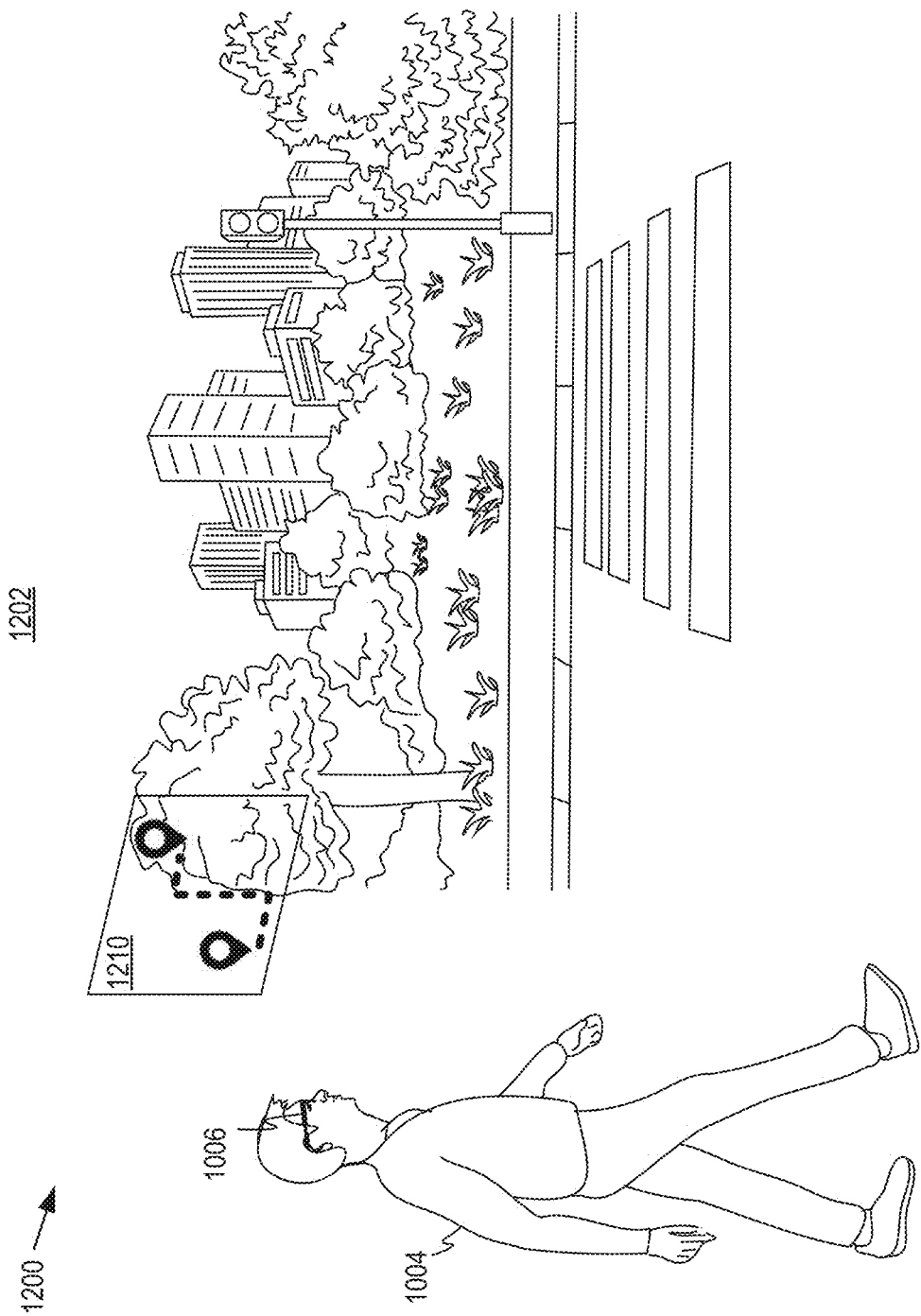
FIG. 12 illustrates an exemplary system for enabling location-based virtual content at another location, consistent with embodiments of the present disclosure.

By way of another non-limiting example, reference is now made to FIG. 12 illustrating an exemplary system 1200 for enabling location-based virtual content at another location 1202 (e.g., a new location), consistent with embodiments of the present disclosure. System 1200 is substantially similar to system 1000 with the notable difference that user 1004 has moved from subsequent location 1102 (e.g., a supermarket) to new location 1202 (e.g., outdoors). A parameter received by at least one processor associated with wearable extended reality appliance 1006 prior to arriving at new location 1202 may subsequently cause a navigation map 1210 to be displayed in a peripheral region of the FOV of user 1004 using a semi-transparent setting and may prevent display of content unrelated to the activity of crossing a street.

Some embodiments involve, while the particular wearable extended reality appliance is in the initial location, receiving via the particular wearable extended reality appliance a toggle signal permitting display of the second instances of the second type of content at the initial location via the particular wearable extended reality appliance. A signal may refer to information encoded for transmitting via a physical medium. Examples of signals may include signals in the electromagnetic radiation spectrum (e.g., AM or FM radio, Wi-Fi, Bluetooth, radar, visible light, LIDAR, IR, and/or GPS signals), sound or ultrasonic signals, electric signals (e.g., voltage, current, inductance, or capacitance signals), electronic signals (e.g., as digital data), tactile (e.g., touch) signals, and/or any other type of information encoded for transmission via a physical medium. A toggle signal may refer to a signal indicating a request to switch, change, or alternate (e.g., between different display rules). For instance, a user may submit a toggle signal to a wearable extended reality appliance using an input interface (e.g., configured with input unit 202) to prevent blocking of the second type of content while positioned at the initial location. For instance, a GUI displayed via a wearable extended reality appliance may include a virtual button, that when selected, allows alternatively displaying or blocking a display of the second type of content while at the initial location.

By way of a non-limiting example, in FIG. 10, while at initial location 1002, user 1004 may issue a voice command (e.g., "show promotions") to permit a display of promotion coupon 1110 via wearable extended reality appliance 1006 at initial location 1002.

Some embodiments involve receiving an indication of a new location of the particular wearable extended reality appliance; performing a third lookup in the repository for a match between the new location and an extended reality display rule associating the particular wearable extended reality appliance with the new location; and when no match associating the particular wearable extended reality appliance with the new location is found, implementing a default extended reality display rule. A new location may refer to a location different than the initial and subsequent locations. A default (e.g., value) may refer to a preexisting value of a user-configurable setting, for example a factory setting. A default rule (e.g., a default extended reality display rule) may refer to a preexisting rule that may be applied in the absence of a different rule overriding the default rule. Performing a third lookup in the repository for a match between the new location and an extended reality display rule associating the particular wearable extended reality appliance with the new location may include one or more operations similar to the operations described earlier for performing the first and/or second lookups in the repository, after a user of the particular wearable arrives at a new location, different than an initial location and a subsequent location. For example, at least one processor associated with a particular wearable extended reality appliance may query a data store with the new location for a rule associating the particular wearable extended reality appliance with the new location. When a rule associating the particular wearable extended reality appliance with the new location is not found in the data store, the at least one processor may retrieve a default rule instead (e.g., corresponding to a location type for the new location).

By way of a non-limiting example, in FIG. 12, a GPS sensor (e.g., associated with sensors interface 470) configured with wearable extended reality appliance 1006 may transmit a GPS signal to server 210 via communications network 214 indicating new location 1202 (e.g., a specific intersection). Server 210 may query data structure 212 for a rule associating wearable extended reality appliance 1006 with new location 1202 but may not find a match. In response to not finding a match, server 210 may implement a default rule for a standard intersection. For example, the default rule may prevent a display of promotional content via wearable extended reality appliance 1006 and may limit the display of navigation map 1210 to a peripheral region of the FOV of user 1004 using a semi-transparent setting.

In some embodiments, the default extended reality display rule is predetermined by a wearer of the particular wearable extended reality appliance. Predetermined may include defining or setting in advance. For example, during a setup stage for a wearable extended reality appliance, a user may define one or more extended reality display rules via a user interface configured with the wearable extended reality appliance, and/or another associated computing device (e.g., a paired device, such as a desktop computing device or mobile device). In some embodiments, one or more predetermined extended reality display rules may be associated with an account associated with a user, e.g., as default settings. For example, a user may define in advance a rule to prevent displaying promotional content in selected locations, contexts, and/or times. As another example, a user may define in advance a rule to prevent displaying content in selected regions of an FOV of the user, e.g., while driving or crossing a street.

By way of a non-limiting example, in FIG. 10, prior to arriving at initial location 1002, user 1004 may set an extended reality display rule to block promotional content unassociated with initial location 1002 from display via wearable extended reality appliance 1006 while at initial location 1002.

Some embodiments involve receiving an indication that an additional wearable extended reality appliance is at the initial location. An additional wearable extended reality appliance may refer to a different wearable extended reality appliance, e.g., associated with a different unique device identifier, a different user, and/or a different user account (e.g., for the same or different user). Receiving an indication that an additional wearable extended reality appliance is at the initial location may include one or more operations similar to the operations described for receiving an indication of an initial location described earlier, where the particular wearable extended reality appliance may be replaced by the additional wearable extended reality appliance.

By way of a non-limiting example, FIG. 10 illustrates a second user 1022 wearing an additional wearable extended reality appliance 1014 at initial location 1002. Wi-Fi beacon 1008 may establish a Wi-Fi communication link with wearable extended reality appliance 1014 (e.g., via network interface 420) and may transmit an indication of the Wi-Fi communication link to a computing device (e.g., server 210) indicating that wearable extended reality appliance 1014 is within a Wi-Fi communication distance of Wi-Fi beacon 1008 at initial location 1002.

Some embodiments involve performing a third lookup in the repository for a match between the initial location and a third extended reality display rule associating the additional wearable extended reality appliance with the initial location, wherein the third extended reality display rule permits the first type of content and the second type of content to be displayed in the initial location. Performing a third lookup in the repository for a match between the initial location and a third extended reality display rule associating the additional wearable extended reality appliance with the initial location may include one or more operations similar to the operations described earlier for performing the first lookup in the repository, where the query may be formulated using a unique identifier for the additional wearable extended reality appliance. The third rule may allow both the first type of content and the second type of content to be displayed at the initial location. For example, different users may define display rules differently for a given location. Thus, a second user may define a display rule associating the additional wearable extended reality appliance with the initial location differently than how the first user defined the first rule associating the particular wearable extended reality appliance with the initial location. Some embodiments further involve implementing the third extended reality display rule to thereby enable the first instances of the first type of content and the second instances of the second type of content to be displayed at the initial location via the additional wearable extended reality appliance while preventing the second instances of the second type of content from being displayed at the initial location via the particular wearable extended reality appliance. Implementing the third extended reality display rule may include one or more operations similar to the operations described earlier for implementing the first and second extended reality display rule. For example, a computing device (e.g., a server associated with a software application installed on multiple wearable extended reality appliances via) may enforce different display rules simultaneously on different wearable extended reality appliances, allowing different users to customize what content may be displayed at different locations. Thus, while at an initial location, a first user may define a first rule to only to view content associated with the initial location (e.g., permit display of a first type of content) and may block content unassociated with the initial location (e.g., prevent display of a second type of content). Simultaneously, a second user at the initial location may define another rule to view content associated with the initial location (e.g., permit display of the first type of content) concurrently with content unassociated with the initial location (e.g., permit display of the second type of content).

By way of a non-limiting example, in FIG. 10, at least one processor (e.g., server 210) may implement a third extended reality display rule for additional wearable extended reality appliance 1014 allowing second user 1022 to view an instance of menu 1020 corresponding to menu 1010 associated with initial location 1002 (e.g., a first type of content) together with an instance of promotional coupon 1016 corresponding to promotional coupon 1110 of FIG. 11, and associated with subsequent location 1102 (e.g., a second type of content). Simultaneously, the first extended reality display rule associating wearable extended reality appliance 1006 with initial location 1002 may prevent display of coupon 1016 via wearable extended reality appliance 1006 at initial location 1002.

Some embodiments involve accessing a user profile associated with the particular wearable extended reality appliance, the user profile associating permitted types of content with locations, wherein performing a lookup in the repository to identify an extended reality display rule is based on the user profile. A user profile may refer to information and/or a collection of settings associated with a specific user for use by a software application, e.g., to tailor a user experience for the specific user. Settings of a user profile may relate to how, what, where, and/or when content may be downloaded, displayed, and/or shared, privacy and security settings, communications information, personal identifiable information, account information, and any other information affecting a user experience. Accessing a user profile associated with the particular wearable extended reality appliance may include determining a unique identifier for a user and/or a wearable extended reality appliance (e.g., by prompting a user for a unique identifier and/or accessing account information associated with the user and/or the wearable extended reality appliance), establishing a communications link with a repository storing multiple user profiles associated with multiple users and/or wearable extended reality appliances, formulating a query using a unique identifier for a user and/or a wearable extended reality appliance, submitting a query for a user profile to a repository storing multiple user profiles, and/or retrieving one or more settings and/or preferences of a user profile in response to a query. A user profile associating permitted types of content with locations may refer to one or more (e.g., default and/or user-defined) settings and/or preferences defining what content may be displayed via a wearable extended reality appliance at different locations, e.g., to provide a customized user experience that is location-based. Performing a lookup in a repository to identify an extended reality display rule based on a user profile may include one or more operations similar to the operations for performing a lookup for the first and second extended reality display rules described earlier, where the repository may store multiple user profiles, each including one or more extended reality display rules.

For example, a user may define an extended reality display rule as a setting of a user profile associated with the user and a wearable extended reality appliance. The extended reality display rule may permit displaying personal notifications while at home but may block personal notifications while at work. At least one processor may query a repository for the user profile and may receive the extended reality display rule with the user profile in response. Consequently, personal notifications may be displayed via the wearable extended reality appliance while the user is at home and may be blocked while the user is at work.

By way of a non-limiting example, FIG. 10 shows user 1004 viewing menu 1010 in initial location 1002. User 1004 may be vegan and may have set a user preference to only view vegan food items via wearable extended reality appliance 1006 (e.g., a first extended reality display rule). Upon entering initial location 1002, at least one processor associated with wearable extended reality appliance 1006 (e.g., processing device 460 and/or server 210) may query a repository (e.g., data structure 212) with a unique identifier for location 1002 and may receive a user profile for user 1004 in response. The at least one processor may implement the first extended reality display rule included in the user profile such that food items 1012 and menu 1010 include only vegan choices. However, user 1022 may have set a user preference to view any food items offered at initial location 1002 (e.g., a second extended reality display rule). At least one processor associated with wearable extended reality appliance 1014 may query the repository for the user profile for user 1022 and receive a third extended reality display rule in response. Implementing the third extended reality display rule may cause all food items offered at initial location 1002 to be displayed via menu 1020, e.g., including dairy and meat options.

Some embodiments involve while the particular wearable extended reality appliance is in the initial location: causing the particular wearable extended reality appliance to display a graphical user interface (GUI) element indicative of an existence of the second instances of the second type of content. A graphical user interface element may refer to a visually displayed object configured to enable interactions between a user and a computing device (e.g., via any of input devices of input unit 202 of FIG. 2). An element of a GUI may include text, graphics, images, or a combination thereof and may be displayed in color and/or grey-scale, as one-, two-, or three-dimensional objects. GUI elements may include one or more menu bars, tabs, buttons, checkboxes, menus (e.g., drop down menus), text boxes, links, and/or forms, each presenting text and/or graphics (e.g., images and/or icons). A GUI element indicative of an existence of the second instances of the second type of content may refer to a GUI element notifying or informing a user that the second type of content may be available for viewing or otherwise accessed. For example, the GUI element may be in the form of an alert or a miniaturized version of the second type of content. Causing a wearable extended reality appliance to display a GUI element may include one or more of determining an existence of the second instances of the second type of content, selecting a GUI element to indicate existence of the second instances of the second type of content, determining a layout and location for displaying a GUI element, and/or activating pixels of a wearable extended reality appliance to display a GUI element.

Some embodiments involve identifying an interaction with the GUI element for permitting a display of the second instances of the second type of content at the initial location via the particular wearable extended reality appliance. An interaction with a GUI element may include receiving one or more inputs from a user via a GUI element. Types of inputs that may be received via a GUI element may include gestures (e.g., body, hand, arm, leg, foot, head, and/or eye gestures), text input (e.g., via a keyboard), pointing, selecting, dragging, and/or dropping inputs (e.g., by a pointing device), and/or any other type of input entered by a user to a GUI element. Identifying may include detecting, sensing, determining and/or establishing, e.g., a fact or an occurrence of something. Identifying an interaction with a GUI element may include one or more of associating a GUI element with an event listener, displaying a GUI element (e.g., via a wearable extended reality appliance), receiving a notification from an event listener of an interaction (e.g., a user interaction) with a GUI element, and/or receiving a user input in association with a notification from an event listener. Permitting a display of the second instances of the second type of content at the initial location via the particular wearable extended reality appliance may include overriding an extended reality display rule preventing display of the second instances of the second type of content at the initial location. Some embodiments involve, in response to the identified interaction, causing a display of the second instances of the second type of content at the initial location via the particular wearable extended reality appliance. Causing a display of instances of a second type of content at an initial location via a particular wearable extended reality appliance may include one or more of retrieving an instance of a second type of content, determining an initial location for a particular wearable extended reality appliance, overriding a rule blocking a display of a second type of content via a particular wearable extended reality appliance at an initial location, determining a layout for displaying an instance of a second type of content via a particular wearable extended reality appliance, and/or activating pixels of a particular wearable extended reality appliance according to a layout for an instance of a second type of content. For example, a wearable extended reality appliance may include an override button or widget (e.g., a GUI element) allowing a user to display second content that was formerly blocked from display at a specific location.

By way of a non-limiting example, in FIG. 10, while user 1004 is at initial location 1002, at least one processor (e.g., processing device 460 and/or server 210) may cause an interactive GUI element 1018 to be displayed via wearable extended reality appliance 1006 indicating an existence of promotional coupon 1110 (e.g., the second type of content). User 1004 may select GUI element 1018, for example by performing a pointing gesture that may be captured by a camera associated with wearable extended reality appliance 1006 (e.g., image sensor 472). The at least one processor may identify the gesture as an interaction between user 1004 and GUI element 1018 indicating a permission to display an instance of promotional coupon 1110 at initial location 1002 via wearable extended reality appliance 1006. In response to the pointing gesture (e.g., the identified interaction), the at least one processor may cause an instance of promotional coupon 1110 to be displayed at initial location 1002 via wearable extended reality appliance 1006 (not shown), for example, similar to promotional coupon 1016 displayed to user 1022 via wearable extended reality appliance 1014.

Some embodiments involve receiving an indication of a third location of the particular wearable extended reality appliance. Receiving an indication of a third location of a particular wearable extended reality appliance may include one or more operations similar to the operations for receiving an indication of a first or second location described earlier. Some embodiments involve performing a third lookup in the repository for a match between the third location and a third extended reality display rule associating the particular wearable extended reality appliance with the third location, wherein the third extended reality display rule permits the first type of content and the second type of content to be displayed in the third location. Performing a third lookup in the repository for a match between the third location and a third extended reality display rule associating the particular wearable extended reality appliance with the third location may include one or more operations similar to the operations for performing the first or second lookup, as described earlier, where a third extended reality display rule may be received associating the wearable extended reality appliance with the third location. The third extended reality display rule may permit displaying content permitted for display at the initial location as well as content blocked from being displayed at the initial location. Some embodiments involve implementing the third extended reality display rule to enable fifth instances of the first type of content and sixth instances of the second type of content to be displayed at the third location via the particular wearable extended reality appliance. Implementing the third extended reality display rule may include one or more operations as described earlier for implementing the first and second extended reality display rules, where both the first and second types of content may be displayed (e.g., concurrently) at the third location.

Figure 13:
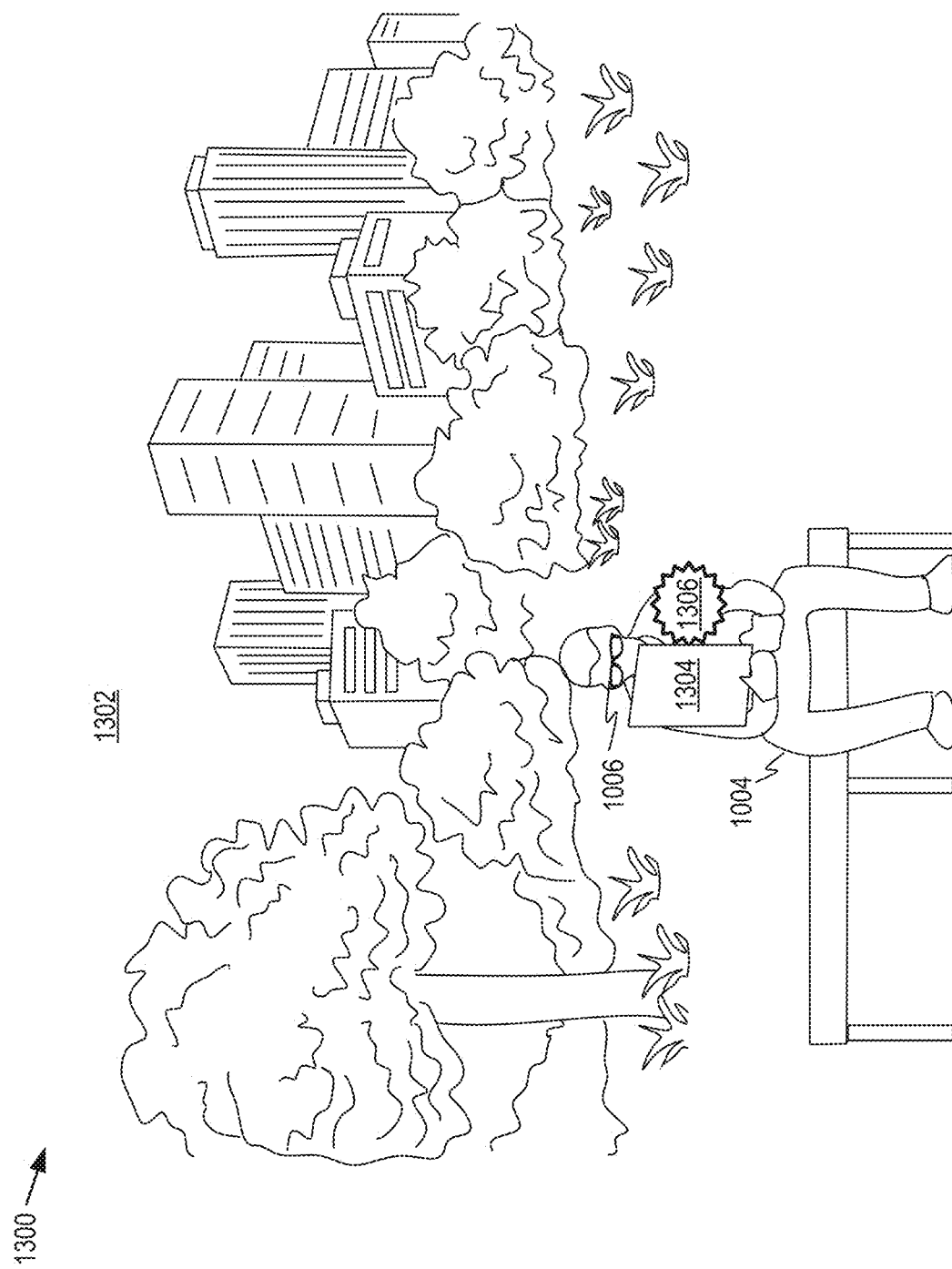
FIG. 13 illustrates an exemplary system for enabling location-based virtual content at an additional location, consistent with embodiments of the present disclosure.

By way of a non-limiting example, reference is made to FIG. 13 which illustrates an exemplary system 1300 for enabling location-based virtual content at an additional location 1302 (e.g., a third location), consistent with embodiments of the present disclosure. System 1300 is substantially similar to system 1000 with the notable difference that user 1004 has moved to third location 1302 (e.g., a public park). At least one processor (e.g., processing device 460 and/or server 210) may receive a GPS signal indicating third location 1302 for wearable extended reality appliance 1006. The at least one processor may perform a third lookup in the repository for a match between third location 1302 and a third extended reality display rule associating wearable extended reality appliance 1006 with third location 1302. The third extended reality display rule may permit first type of content (e.g., a menu 1010) and second type of content (e.g., a promotional coupon 1110) to be displayed in third location 1302. The at least one processor may implement the third extended reality display rule to enable instances of first type of content 1304 (e.g., the menu) and instances of second type of content 1306 (e.g., the promotional coupon) to be displayed at third location 1302 via wearable extended reality appliance 1006.

Some embodiments involve receiving an indication of a fourth location of the particular wearable extended reality appliance. Receiving an indication of a fourth location may include one or more operations similar to the operations for receiving an indication of a first or second location described earlier. Some embodiments involve performing a fourth lookup in the repository for a match between the fourth location and a fourth extended reality display rule associating the particular wearable extended reality appliance with the fourth location, wherein the fourth extended reality display rule prevents the first type of content display and the second type of content from being displayed in the fourth location. Performing a fourth lookup in the repository may include one or more operations similar to the operations for performing a first lookup in the repository, as described earlier. Some embodiments involve implementing the fourth extended reality display rule to prevent seventh instances of the first type of content and eighth instances of the second type of content from being displayed at the fourth location via the particular wearable extended reality appliance. Implementing the fourth extended reality display rule may include one or more operations as described earlier for implementing the first and second extended reality display rules, where both the first and second types of content may be blocked from being displayed at the fourth location.

By way of a non-limiting example, FIG. 12 shows user 1004 at a fourth location 1202 (e.g., corresponding to the new location described earlier). At least one processor (e.g., processing device 460 and/or server 210) may receive a GPS signal indicating fourth location 1202 of wearable extended reality appliance 1006. The at least one processor may perform a fourth lookup in the repository for a match between fourth location 1202 and a fourth extended reality display rule associating wearable extended reality appliance 1006 with fourth location 1202. The fourth extended reality display rule may prevent first type of content and second type of content from being displayed in fourth location 1202, e.g., for safety reasons. The at least one processor may implement the fourth extended reality display rule to block display of instances of first type of content (e.g., a menu 1010) and instances of second type of content (e.g., promotional coupon 1110) from being displayed at fourth location 1202 via wearable extended reality appliance 1006.

Figure 14:
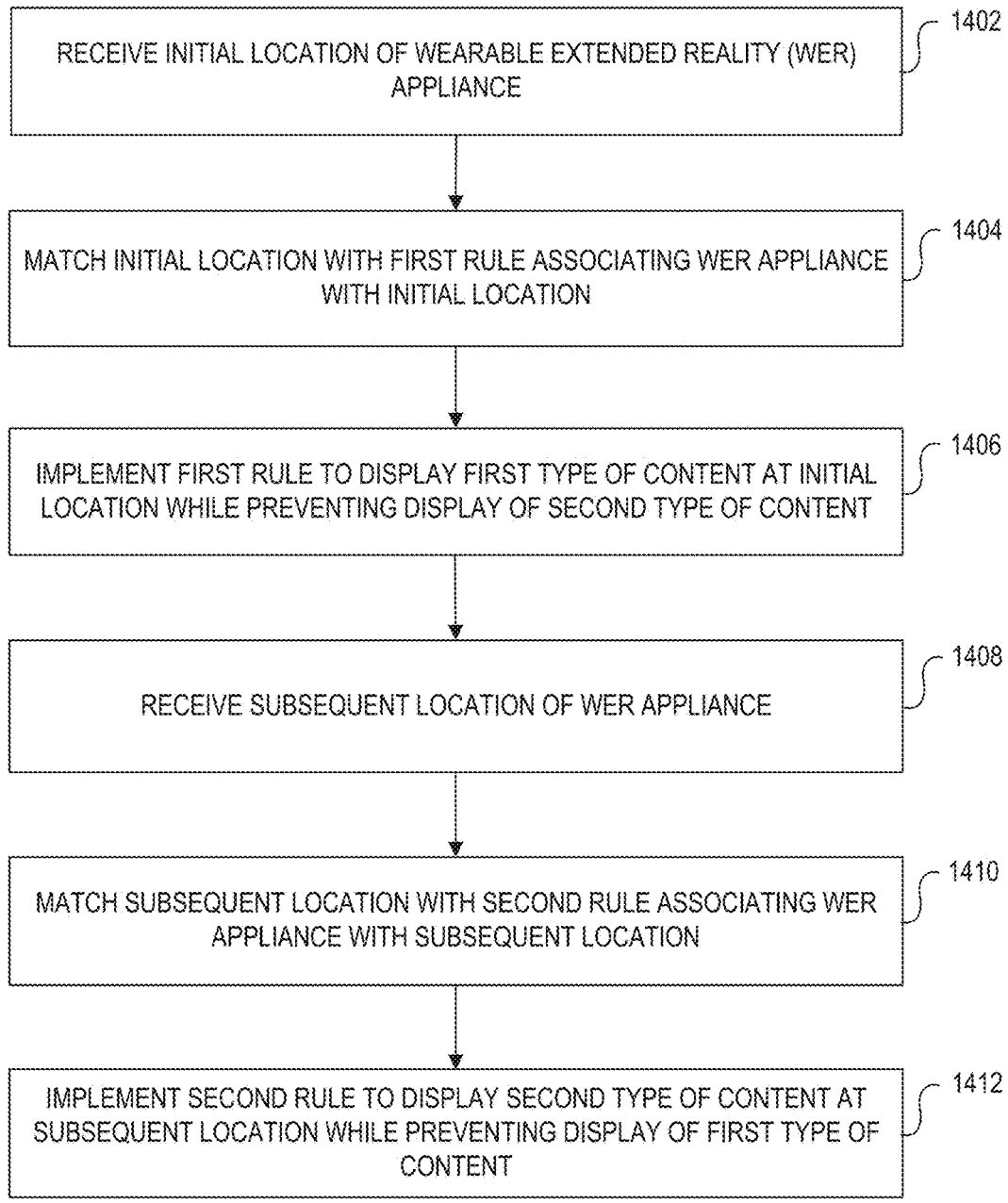
FIG. 14 illustrates an exemplary flowchart of example process for enabling user interface display mode toggling, consistent with embodiments of the present disclosure.

FIG. 14 illustrates a flowchart of an exemplary process 1400 for enabling location-based virtual content, consistent with embodiments of the present disclosure. In some embodiments, process 1400 may be performed by at least one processor (e.g., processing device 460) to perform operations or functions described herein. In some embodiments, some aspects of process 1400 may be implemented as software (e.g., program codes or instructions) that are stored in a memory (e.g., memory device 411 of extended reality unit 204, shown in FIG. 4) or a non-transitory computer readable medium. In some embodiments, some aspects of process 1400 may be implemented as hardware (e.g., a specific-purpose circuit). In some embodiments, process 1400 may be implemented as a combination of software and hardware.

Referring to FIG. 14, process 1400 may include a step 1402 of receiving an indication of an initial location of a particular wearable extended reality appliance. Process 1400 may include a step 1404 of performing a first lookup in a repository for a match between the initial location and a first extended reality display rule associating the particular wearable extended reality appliance with the initial location, wherein the first extended reality display rule permits a first type of content display in the initial location and prevents a second type of content display in the initial location. Process 1400 may include a step 1406 of implementing the first extended reality display rule to thereby enable first instances of the first type of content to be displayed at the initial location via the particular wearable extended reality appliance while preventing second instances of the second type of content from being displayed at the initial location via the particular wearable extended reality appliance. Process 1400 may include a step 1408 of receiving an indication of a subsequent location of the particular wearable extended reality appliance. Process 1400 may include a step 1410 of performing a second lookup in the repository for a match between the subsequent location and a second extended reality display rule associating the particular wearable extended reality appliance with the subsequent location, wherein the second extended reality display rule prevents the first type of content display in the subsequent location and permits the second type of content display in the subsequent location. Process 1400 may include a step 1412 of implementing the second extended reality display rule to enable third instances of the second type of content to be displayed at the subsequent location via the particular wearable extended reality appliance while preventing fourth instances of the first type of content from being displayed at the subsequent location via the particular wearable extended reality appliance.

Some embodiments involve a system for enabling location-based virtual content. The system may include at least one processing device configured to: receive an indication of an initial location of a particular wearable extended reality appliance; perform a first lookup in a repository for a match between the initial location and a first extended reality display rule associating the particular wearable extended reality appliance with the initial location, wherein the first extended reality display rule permits a first type of content display in the initial location and prevents a second type of content display in the initial location; implement the first extended reality display rule to thereby enable first instances of the first type of content to be displayed at the initial location via the particular wearable extended reality appliance while preventing second instances of the second type of content from being displayed at the initial location via the particular wearable extended reality appliance; receive an indication of a subsequent location of the particular wearable extended reality appliance; perform a second lookup in the repository for a match between the subsequent location and a second extended reality display rule associating the particular wearable extended reality appliance with the subsequent location, wherein the second extended reality display rule prevents the first type of content display in the subsequent location and permits the second type of content display in the subsequent location; and implement the second extended reality display rule to enable third instances of the second type of content to be displayed at the subsequent location via the particular wearable extended reality appliance while preventing fourth instances of the first type of content from being displayed at the subsequent location via the particular wearable extended reality appliance.

By way of a non-limiting example, in FIG. 10, at least one processor (e.g., processing device 460 and/or server 210) may receive an indication of initial location 1002 of wearable extended reality appliance 1006. The at least one processor may perform a first lookup in a repository (e.g., data structure 212) for a match between initial location 1002 and a first extended reality display rule associating wearable extended reality appliance 1006 with initial location 1002. The first extended reality display rule may permit a first type of content display (e.g., menu 1010) in initial location 1002 and may prevent a second type of content display (e.g., promotional coupon 1110) in initial location 1002. The at least one processor may implement the first extended reality display rule to thereby enable first instances of the first type of content to be displayed at initial location 1002 via wearable extended reality appliance 1006 while preventing second instances of second type of content from being displayed at initial location 1002 via wearable extended reality appliance 1006. The at least one processor may receive an indication of subsequent location 1102 of wearable extended reality appliance 1006. The at least one processor may perform a second lookup in the repository for a match between subsequent location 1102 and a second extended reality display rule associating wearable extended reality appliance 1006 with subsequent location 1102. The second extended reality display rule may prevent first type of content from being displayed at subsequent location 1102 and may permit the second type of content display in subsequent location 1102. The at least one processor may implement the second extended reality display rule to enable third instances of the second type of content to be displayed at subsequent location 1102 via wearable extended reality appliance 1006 while preventing fourth instances of the first type of content from being displayed at subsequent location 1102 via wearable extended reality appliance 1006.

Some extended reality environments may selectively enforce privacy settings for simultaneously viewing of one or more virtual objects in a physical environment. The privacy settings may allow authorized extended reality appliances to present virtual objects classified as private, while denying other extended reality appliances from presenting virtual objects classified as private. The privacy settings may be applied to one or more virtual objects, one or more locations in a physical environment, and/or in association with one or more physical objects present in the physical environment. This may allow applying privacy settings based on location (e.g., such that moving virtual object to and from private locations may classify and/or declassify virtual objects as private), applying privacy settings based on a virtual object (e.g., independent of location), and/or applying privacy settings based on proximity to a physical object.

In some embodiments, operations may be performed for managing privacy in an extended reality environment. Data may be received from an image sensor associated with a wearable extended reality appliance. The image data may be reflective of a physical environment. Data may be accessed, the data characterizing a plurality of virtual objects for association with locations in the physical environment. The data may represent a first virtual object and a second virtual object. Privacy settings may be accessed, the privacy settings classifying at least one of the first virtual object and a location of the first virtual object as private. A first extended reality appliance may be classified as approved for presentation of private information. A second extended reality appliance may be classified as not-approved for presentation of the private information. A simultaneous presentation of an augmented viewing of the physical environment may be enabled, such that during the simultaneous presentation, the first extended reality appliance may present the first virtual object and the second virtual object in the physical environment, and the second extended reality appliance may present the second virtual object, omitting presentation of the first virtual object in compliance with the privacy settings.

In some instances, the description that follows may refer to FIGS. 15 to 24, which taken together, illustrate exemplary implementations for managing privacy in an extended reality environment, consistent with some disclosed embodiments. FIGS. 15 to 24 are intended merely to facilitate conceptualization of one exemplary implementation for performing operations for selectively operating a wearable extended reality appliance and do not limit the disclosure to any particular implementation.

Some embodiments involve a non-transitory computer readable medium containing instructions that when executed by at least one processor cause the at least one processor to perform operations for managing privacy in an extended reality environment. A non-transitory computer-readable medium containing instructions may be understood as described earlier. At least one processor may include one or more processing devices as described earlier (e.g., processing device 460 of FIG. 4). Privacy, (e.g., information privacy data privacy, and/or data protection) may include one or more policies and/or recommendations regulating the collection, storage, and/or dissemination of private information, e.g., to prevent non-authorized leakage and/or access thereto. For example, a data controller (e.g., associated with a cloud service) may implement one or more protocols associated with the policies and/or recommendations to protect private, sensitive and/or confidential information of a data owner (e.g., a user), e.g., to protect the interest of the data owner. Privacy settings may include varying degrees of protection, e.g., for applying to different contacts, contexts, and/or use cases. Private information may include any information that, if revealed to a non-authorized entity, may cause harm, loss, or injury to an individual or entity associated therewith. Private information may also include information that an entity (e.g., user, person, organization) or data owner may not wish to share with another entity. Some examples of private information (e.g., sensitive data) may include personal identifying information, location information, genetic data, information related to health, financial, business, personal, family, education, political, religious, and/or legal matters, and/or sexual orientation or gender identification.

Managing privacy may include performing one or more operations to protect sensitive (e.g., private) information from being leaked or revealed to a non-authorized entity. Such operations may include, for example, classifying information as sensitive in compliance with one or more privacy policies or recommendations, and/or enforcing one or more rules governing access, storage, and/or sharing capabilities with regards to private information, e.g., to protect an interest of an individual associated with the private information. Operations for managing privacy may additionally include, for example, limiting access and/or sharing of information using a firewall and/or an authentication protocol. Some examples of authentication protocols may include requiring a password, a biometric token, or a digital certificate, and/or or imposing a multi-factor authentication. Operations for managing privacy may additionally include, for example, conditioning access, storage, and/or sharing of information upon receiving consent by the data owner, and/or obscuring sensitive information (e.g., by redacting, editing, censoring, and/or encrypting sensitive information). Operations for managing privacy may further include, for example, testing protective measures for limiting access and/or dissemination of sensitive information for vulnerabilities. An extended reality environment—e.g., also referred to as "extended reality", "extended reality space", or "extended environment", may refer to all types of real- and—virtual combined environments and human-machine interactions at least partially generated by computer technology, as described elsewhere in this disclosure.

Some embodiments involve receiving image data from an image sensor associated with a wearable extended reality appliance. Receiving may involve accepting delivery of, acquiring, retrieving, obtaining, or otherwise gaining access to, e.g., information or data by at least one processor. The data may be received via a communications channel, such as a wired channel (e.g., cable, fiber) and/or wireless channel (e.g., radio, cellular, optical, IR). The data may be received as individual packets or as a continuous stream of data. The data may be received synchronously, e.g., by periodically polling a memory buffer, queue or stack, or asynchronously, e.g., via an interrupt event. Image data may refer to pixel data streams, digital images, digital video streams, data derived from captured images, and data that may be used to construct one or more 2D and/or 3D images, a sequence of 2D and/or 3D images, 2D and/or 3D videos, or a virtual 2D and/or 3D representation, as described earlier. Image data may convey information associated with visual characteristics of a physical environment and may include one or more of pixels or voxels (e.g., directly characterizing visual aspects of a physical environment), and/or metadata (e.g., indirectly characterizing visual aspects of a physical environment). An image sensor may include one or more sensory components capable of detecting and converting optical signals in the near-infrared, infrared, visible, and ultraviolet spectrums into electrical signals, as described elsewhere in this disclosure. A wearable extended reality appliance may refer to a head-mounted device, for example, smart glasses, smart contact lens, headsets or any other device worn by a human for purposes of presenting an extended reality to the human, as described elsewhere in this disclosure.

In some embodiments, the image data is reflective of a physical environment. Reflective may refer to constituting, indicating, exhibiting, and/or revealing, for example, a parallel configuration of an observation. For example, image data may include information having parallel characteristics of a physical environment, thereby revealing characteristics and being reflective of the physical environment. A physical environment may refer to the real-world surroundings of a wearable extended reality appliance, such as the presence of walls, surfaces (e.g., floor, table tops, ceiling), obstructing objects (house plants, people, furniture, walls, doors), windows, supporting objects (e.g., tables, surfaces, shelves), motile objects (e.g., humans, animals, robots), lighting conditions, noise conditions, and/or any other physical characteristic potentially affecting the presentation of content via a wearable extended reality appliance. For example, image data may indicate locations in the physical environment conducive to displaying virtual objects (e.g., as a desk surface, or blank wall, and locations that may not be conducive to displaying virtual objects, such as a window or entryway) Similarly, image data may indicate locations and/or objects for associating with private information, and/or for associating with non-private (e.g., public) information. An image sensor integrated with the wearable extended reality appliance may capture multiple images of the physical environment from differing perspectives. At least one processing device may analyze the images (e.g., by stitching or combining multiple images to obtain a three-dimensional depiction of the physical environment), allowing for determination of locations for presenting virtual objects therein and selectively applying one or more privacy settings.

Figure 15:
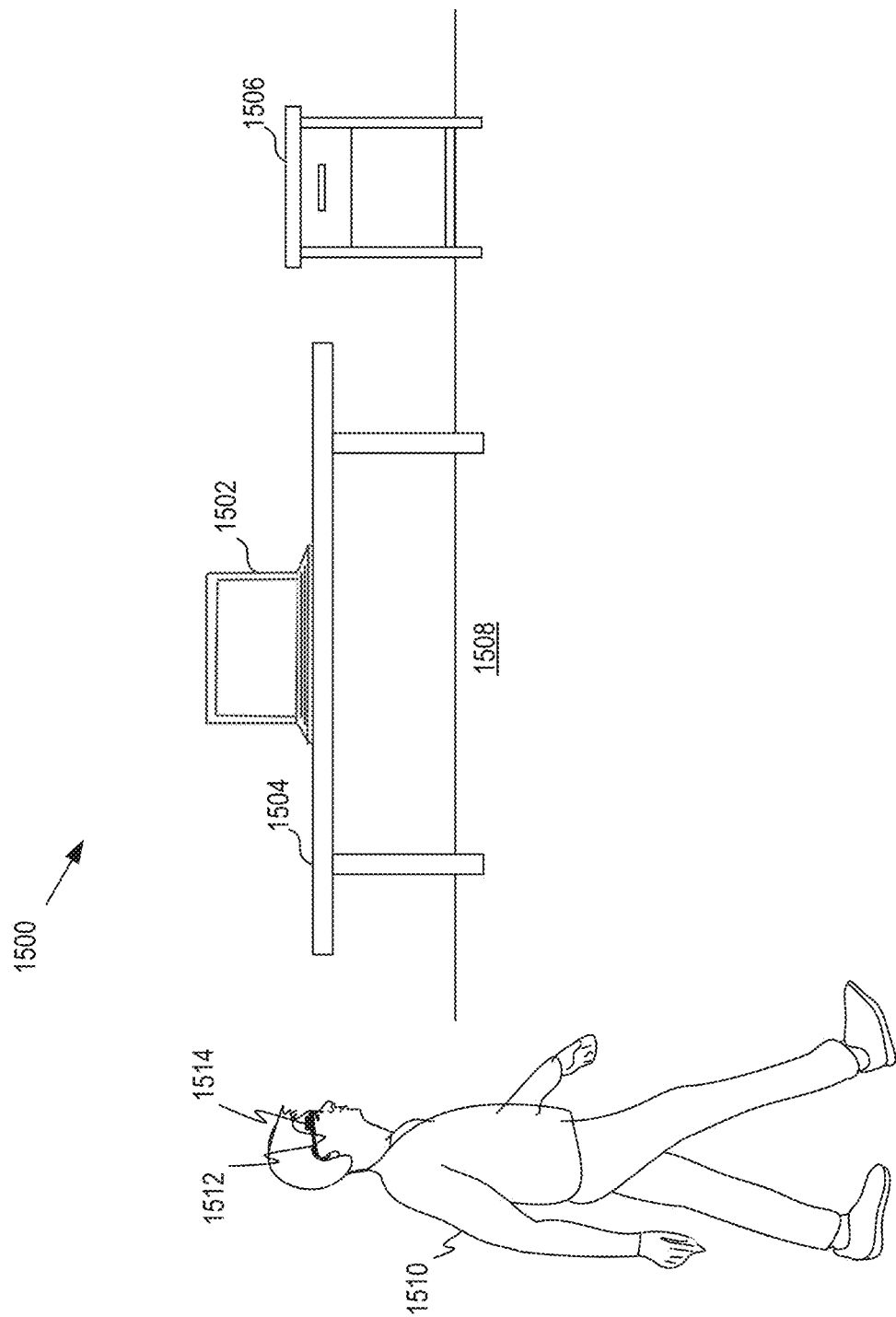
FIG. 15 illustrates an exemplary physical environment, consistent with some embodiments of the present disclosure.

By way of a non-limiting example, FIG. 15 illustrates an exemplary physical environment 1500, consistent with some embodiments of the present disclosure. Physical environment 1500 includes a computer display 1502 resting at a first location 1504 (e.g., a desk surface), and a second location 1506 (e.g., a side-table). First location 1504 and second location 1506 are above a floor 1508 of physical environment 1500. A user 1510 is shown wearing a wearable extended reality appliance 1512 including an image sensor 1514. For example, image sensor 1514 may correspond to image sensor 472 of FIG. 4. Image sensor 1514 may capture image data reflective of physical environment 1500.

Figure 16:
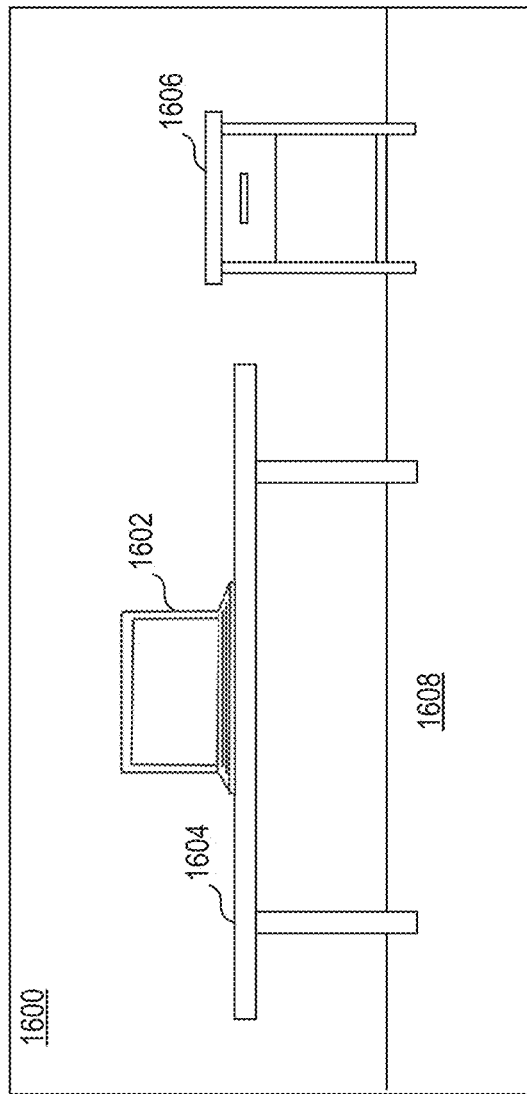
FIG. 16 illustrates an exemplary image of the physical environment of FIG. 15 captured by an image sensor of a wearable extended reality appliance, consistent with some embodiments of the present disclosure.

By way of a non-limiting example, FIG. 16 illustrates an exemplary image 1600 of physical environment 1500 captured by image sensor 1514 of wearable extended reality appliance 1512, consistent with some embodiments of the present disclosure. Image 1600 includes depictions 1602, 1604, 1606, and 1608 of computer display 1502, first location 1504 (e.g., a desk surface), second location 1506 (e.g., a side-table), and floor 1508, respectively, reflective of physical environment 1500. In some embodiments, image sensor 1514 may capture multiple images of physical environment 1500 (e g, similar to image 1600) from differing perspectives. The at least one processor may analyze the multiple images to construct a three-dimensional representation of physical environment 1500, allowing to identify locations, objects, and/or distances therebetween.

Some embodiments involve accessing data characterizing a plurality of virtual objects for association with locations in the physical environment. Accessing data may refer to obtaining information, e.g., at least for the purpose of reading, or acquiring relevant information. Data may be accessed, for example, by querying a data repository, receiving information from one or more sensors and or devices, and/or receiving information from a user (e.g., via an electronic or input device). Data may be accessed locally (e.g., from a local memory storage) and/or remotely (e.g., from a cloud storage via a communications network). Characterizing may include describing, classifying, and/or categorizing. A virtual object may include any visual presentation rendered by a computer or a processing device, as described elsewhere in this disclosure. A location in a physical environment may refer to a physical place or position within a physical environment, e.g., surrounding a wearable extended reality appliance. A location may be two-dimensional (e.g., an area on a wall, floor, ceiling, or table) or three-dimensional (e.g., a volume). In some embodiments, a location may be relative to one or more sensors (e.g., a cellular tower, a Wi-Fi and/or BlueTooth antenna, a camera, a LIDAR detector, a radar detector, and/or an ultrasound detector) and/or relative to the Earth (e.g., latitude and longitude coordinates). In some embodiments, a location may refer to a specific point (e.g., measured with reference to a coordinate system), or a locus of points within a range of a specific point. For example, a location may include a plurality of points within communication distance of a sensor, a plurality of points associated with a presentation of a virtual object, and/or a plurality of points containing a physical object. In some embodiments, a location may be associated with a measuring tolerance and/or a clearance relative to other locations in the physical environment. For instance, when determining a layout for presenting multiple virtual objects in a physical environment, at least one processor may access characterizing data (e.g., features and/or attributes) needed for presenting one or more virtual objects in the physical environment. Examples of characterizing data may include a type, a size, a use-case, an interfacing medium (e.g., gesture, text, electronic pointing device, and/or audio), a context, an association with other virtual and/or physical objects, a color, a transparency or opacity, a luminosity, and/or any other characterizing feature. In some instances, the data characterizing the virtual objects may associate each virtual object with a specific location and/or physical object of the physical environment. For example, the characterizing data may associate some virtual objects as personal or private and may position those virtual objects at a (e.g., first) location and/or docked to a first physical object reserved for private use, where one or more privacy settings may be applied. Similarly, the characterizing data may associate other virtual objects as public or for collaborative use, and may position those virtual objects in a second location and/or docked to a different physical object for viewing by multiple users, where one or more privacy settings may be voided.

For instance, the presentation of virtual objects associated with personal or private use may be tethered to a personal communications device (e.g., a mobile phone) and the presentation of virtual objects associated with collaborative use by multiple users may be tethered to a computer monitor for viewing by anyone in the physical environment.

In some embodiments, the data represents a first virtual object and a second virtual object. Representing may include embodying, depicting or describing details of one or more objects, e.g., to allow rendering instances of the one or more objects on a display of an extended reality appliance. For example, the accessed data may include details defining a size, a format, a type, a shape, a color, a transparency, a luminosity, an interface capability, access permissions, a scope, a context, a permission or authorization, an association with other (e.g., real and/or virtual) objects, and/or any other information required to present the first virtual object and the second virtual object in the physical environment. In some embodiments, the first virtual object may be associated with private use and the second virtual object may be associated with non-private use.

Figure 17:
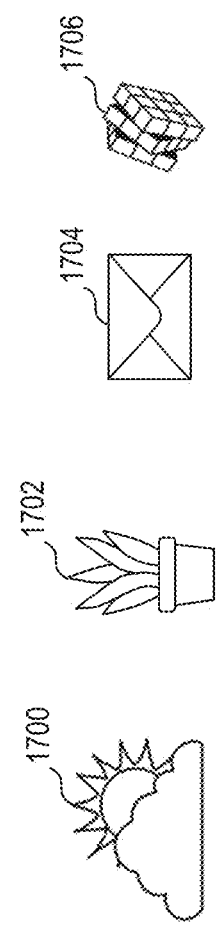
FIG. 17 illustrates an exemplary presentation of an augmented viewing of the physical environment of FIG. 15, consistent with some embodiments of the present disclosure.

By way of a non-limiting example, reference is made to FIG. 17 illustrating a plurality of virtual objects, consistent with some embodiments of the present disclosure. The plurality of virtual objects may include for example, a weather widget (e.g., virtual object 1700), a virtual plant (e.g., virtual object 1702), a mail widget (e.g., virtual object 1704), and a game widget (e.g., virtual object 1706). In the non-limiting examples that follow, virtual object 1706 (e.g., a game widget) may be referred to as the first virtual object, and virtual object 1702 (e.g., a virtual plant) may be referred to as the second virtual object. At least one processor (e.g., remote processing unit 208 of FIG. 2 and/or processing device 460 of FIG. 4) may access data characterizing one or more of virtual objects 1700 to 1706 for associating one or more locations in physical environment 1500 (e.g., first location 1504 and/or second location 1506). For instance, the accessed data may characterize at least first virtual object 1706 (e.g., a game widget) as the first virtual object and second virtual object 1702 (e.g., a virtual plant) as the second virtual object.

Some embodiments involve accessing privacy settings classifying at least one of the first virtual object and a location of the first virtual object as private. Privacy settings may include one or more parameters governing and/or restricting the sharing, storage, and/or exposure of private information (e.g., sensitive data) associated with an electronic device, and/or with a software application (e.g., a browser application, collaborative software, and/or a social media application), or a user account thereof. Privacy settings may include one or more default values (e.g., recommended values) associated with one or more policies and/or recommendations governing data privacy. In some embodiments, some privacy settings may be overridden, e.g., by a user and/or administrator. Some privacy settings may control and/or restrict with whom, when, and/or how selected information may be shared (e.g., regulating sharing), and other privacy setting may prohibit sharing of sensitive information (e.g., blocking sharing). As an example, privacy settings may permit sharing of private information only with a selected group of contacts in an encrypted format, may only permit viewing sensitive information in specified locations (e.g., in an office or home), and/or prohibit accessing private information in other locations (e.g., in public). Accessing privacy settings may include gaining permission to read and/or write to a location in memory allocated for storing privacy settings and performing at least a read operation at the location. Classifying at least one of the first virtual object and a location of the first virtual object as private may include designating and/or categorizing a virtual object and/or a location for presenting the virtual object as privileged, confidential, and/or exclusive (e.g., subject to one or more rules or settings), thereby preventing an unauthorized user and/or device from accessing the first virtual object and/or the location.

In some examples, the privacy settings may classify a virtual object (such as the first virtual object, a different virtual object, etc.) as private based on whether a physical location associated with the virtual object (such as a physical location at which the virtual object is presented via augmentation) is classified as private. For example, privacy settings may classify a virtual object as private when the physical location is classified as private, and may avoid classifying the virtual object as private when the physical object is not classified as private. In some examples, the privacy settings may classify a physical location (such as the physical location associated with a virtual object) as private based on visual characteristics of the physical location. In one example, image data received from an image sensor associated with a wearable extended reality appliance may be analyzed to determine whether the privacy settings classify a physical location (such as the physical location associated with a virtual object) as private. For example, a machine learning model may be trained using training examples to classify physical locations as private based on images and/or videos of the physical locations. An example of such training example may include a sample image of a sample physical location, together with a label indicating whether the sample physical location is classified as private. The received image data may be analyzed using the trained machine learning model to classify the location of the first virtual object as private. Further, based on privacy settings classifying the location of the first virtual object as private, the first virtual object may be classified as private (e.g., at least one processor may apply the privacy settings to classify the first virtual object as private). In another example, privacy settings may classify a physical location as private based on the presence of a physical object of a selected type in the physical location (or in a selected area that includes the physical location). For example, at least one processor may analyze image data of the physical location using a visual object detection and/or recognition algorithm to determine whether a physical object of the selected type is present in the physical location (or in the selected area that includes the physical location), and thereby determine whether the physical location is classified as private. In yet another example, the privacy settings may classify a physical location as private based on a relation between two physical objects in a selected area that includes the physical location. For example, when the relation is of a first kind, the privacy settings may classify the physical location as private, and/or when the relation is of a second kind, the privacy settings may avoid classifying the physical location as private. Some non-limiting examples of such a relation may include proximity, distance between two physical objects, relative orientation of two physical object to one another, relative motion between two physical objects, an involvement of two physical objects in a common action and/or in a common event, and/or any other state of two physical objects exhibiting a relation therebetween. In one example, at least one processor may receive image data and may analyze the image data to determine a relation between two physical objects located in a physical location, to determine of the physical location is classified as private. For example, a machine learning model may be trained using training examples to determine a relation between two physical object from images and/or videos. An example of such training example may include a sample image of a sample pair of physical objects, together with a label indicating the relation between the sample pair of physical objects. At least one processor may use the trained machine learning model to analyze the received image data to determine the relationship between the two physical objects, thereby determining whether the physical location is classified as private.

Some embodiments involve classifying a first extended reality appliance as approved for presentation of private information. An extended reality appliance may refer to an electronic device having an electronic display configured to present one or more virtual objects. Some examples of an extended reality appliance may include a wearable extended reality appliance, as described elsewhere in this disclosure, as well as any of a mobile communications device, a laptop computer, a desktop computer, a monitor, an electronic screen, and/or any other device configured for presenting data. Approved may refer to authorized or permissible, e.g., to access and/or to present data. Private information may include sensitive information, as described elsewhere in this disclosure. Classifying an extended reality appliance as approved for presenting private information may include designating or authorizing an extended reality appliance to access private information (e.g., based on a unique identifier and/or by providing an access-granting credential), and/or authorizing an extended reality appliance to send private information for presentation (e.g., to a memory accessible by another extended reality appliance, to a buffer or queue of an electronic display or printing device, and/or to any other device configured for presenting data).

Some embodiments involve classifying a second extended reality appliance as non-approved for presentation of the private information. Non-approved may refer to unauthorized or forbidden, e.g., from accessing and/or presenting data. Classifying an extended reality appliance as non-approved for presenting private information may include denying authorization to an extended reality appliance to access private information (e.g., based on a unique identifier), withholding an access-granting credential, and/or preventing an extended reality appliance from sending private information for presentation.

Figure 18:
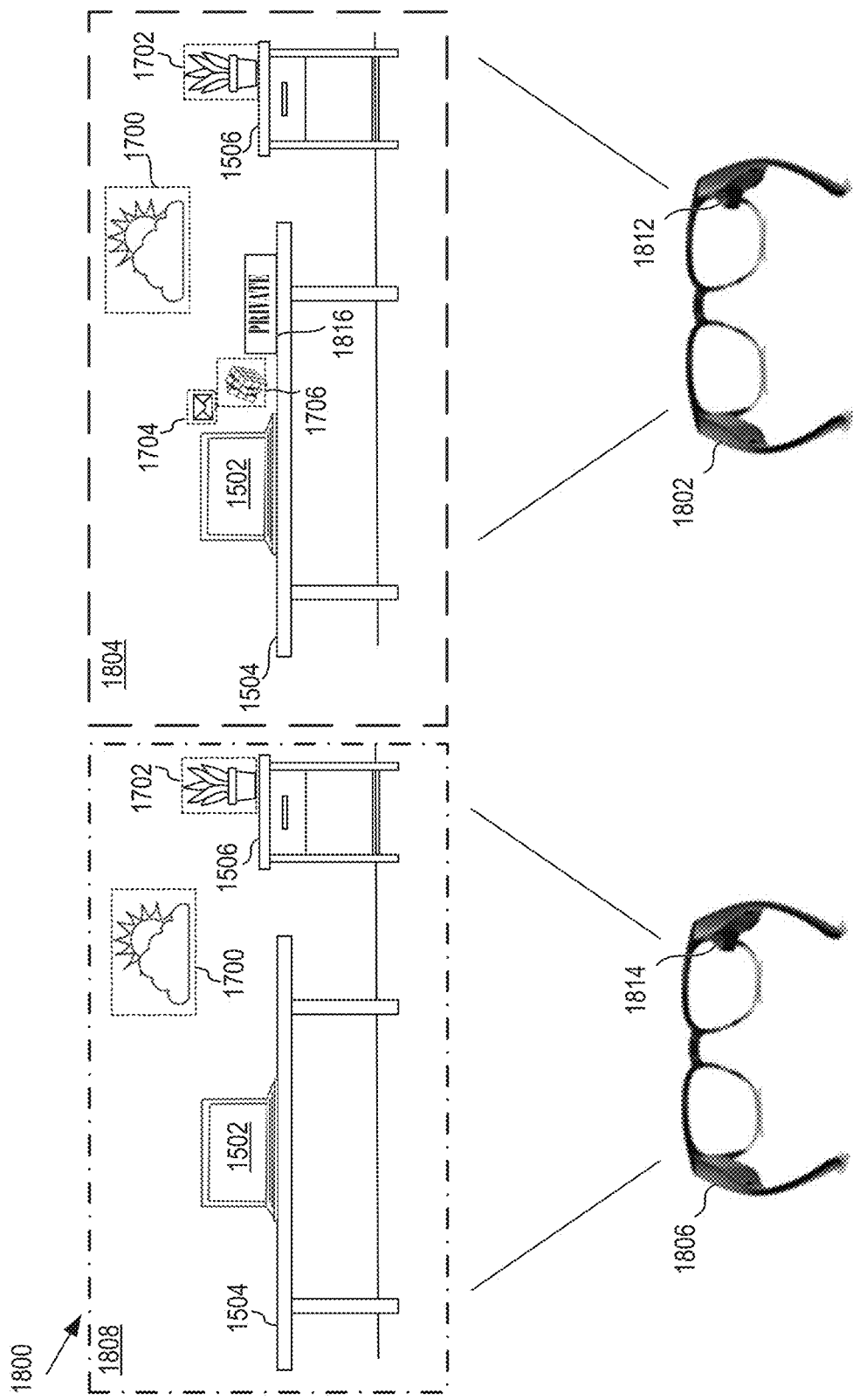
FIG. 18 illustrates an exemplary system for managing privacy in an extended reality environment, consistent with some disclosed embodiments.

By way of a non-limiting example, reference is made to FIG. 18 illustrating a system 1800 for managing privacy in an extended reality environment, consistent with some disclosed embodiments. System 1800 may include at least a first extended reality appliance 1802 for viewing a first view 1804 of physical environment 1500 (e.g., by a first user) and a second extended reality appliance 1806 for viewing a second view 1808 of physical environment 1500 (e.g., by a second user). Physical environment 1500 may include a third extended reality appliance (e.g., computer display 1502) for simultaneous viewing via first extended reality appliance 1802 and via second extended reality appliance 1806, e.g., for collaborating on a filed shared with multiple users. As referred to herein with respect to FIGS. 15 to 24, at least one processor may include at least one remote processing unit 208 of FIG. 2, processing device 460 of FIG. 4 associated with one or more of wearable extended reality appliance 1512, first extended reality appliance 1802, and/or second extended reality appliance 1806.

The at least one processor may access privacy settings stored in memory (e.g., memory device 411 of FIG. 4 and/or data structure 212 of FIG. 2). In some embodiments, the privacy settings may classify one or more of virtual objects 1700 to 1706 as public and one or more of virtual objects 1700 to 1706 as private. For instance, the privacy settings may classify first virtual object 1706 (e.g., a game widget) and/or virtual object 1704 (e.g., a mail widget) as private information, and may classify virtual object 1700 (e.g., a weather widget) and/or second virtual object 1702 (e.g., a virtual plant) as public information. Additionally or alternatively, in some embodiments, the privacy settings may classify a location associated with one or more virtual objects as private or public. For example, the privacy settings may classify first location 1504 as private, for example to present virtual object 1704 (e.g., a mail widget) and/or first virtual object 1706 (e.g., a game widget), and may classify second location 1506 as public, for example to present second virtual object 1702 (e.g., a virtual plant). In addition, the at least one processor may classify first extended reality appliance 1802 as approved for presenting private information (e.g., based on a receiving an authorization credential) and may classify second extended reality appliance 1806 as non-approved for presentation of private information (e.g., based on a lack of an unauthorized certificate). Consequently, private information may be viewed via first extended reality appliance 1802, and may be blocked from viewing via second extended reality appliance 1806.

In some embodiments, the first extended reality appliance is the wearable extended reality appliance. Since the wearable extended reality appliance is the first appliance it may be classified as being authorized to present private information. By way of a non-limiting example, in FIG. 18, first extended reality appliance 1802 (e.g., approved for presenting private information) may be the wearable extended reality appliance (e.g., corresponding to wearable extended reality appliance 1512), with image sensor 1812 of first extended reality appliance 1802 corresponding to image sensor 1514. Image sensor 1812 may acquire image 1600 (e.g., image data) of physical environment 1500, and provide the image data to the at least one processor.

In some embodiments, the second extended reality appliance is the wearable extended reality appliance. Since the wearable extended reality appliance is the second appliance it may be classified as being authorized to present private information By way of a non-limiting example, in FIG. 18, second extended reality appliance 1806 (e.g., non-approved for presenting private information) may be the wearable extended reality appliance (e.g., corresponding to wearable extended reality appliance 1512), with image sensor 1814 of second extended reality appliance 1806 corresponding to image sensor 1514. Image sensor 1814 may acquire image 1600 (e.g., image data) of physical environment 1500, and provide the image data to the at least one processor.

In some embodiments, the wearable extended reality appliance differs from the first extended reality appliance and the second extended reality appliance. The devices that may be authorized or not authorized to present private information may differ from the wearable extended reality appliance. For example, the first and second extended reality devices may be any of a desktop computer, a laptop computer, or a mobile communications device. By way of a non-limiting example, in FIG. 15, image sensor 1514 of wearable extended reality appliance 1512 may acquire image 1600 (e.g., image data) of physical environment 1500, and provide the image data to at least one processor. Wearable extended reality appliance 1512 may differ from first extended reality appliance 1802 and second extended reality appliance 1806.

Some embodiments involve simultaneously enabling a presentation of an augmented viewing of the physical environment. Simultaneously may refer to concurrently, e.g., at the same instant in time, or within a limited time threshold (e.g., several milliseconds or microseconds). An augmented viewing of a physical environment may include an enhanced, diversified, and/or heterogeneous depiction or observation of the physical environment. In some embodiments, an augmented viewing of a physical environment may include one or more virtual objects overlaid or superimposed on the physical environment. Additionally, or alternatively, an augmented viewing of a physical environment may include a plurality of views or perspectives, e.g., including different subsets of physical and/or virtual objects. Simultaneously enabling a presentation of an augmented viewing of the physical environment may involve concurrently displaying two different (e.g., heterogeneous) depictions of a physical environment. For example, an augmented viewing may include displaying a first depiction of the physical environment via a first extended reality appliance and concurrently displaying a second depiction of the physical environment via a second extended reality appliance, where the first and second depictions include at least one differentiating feature. In some embodiments, the augmented viewing may simultaneously allow a first user (e.g., associated with a first viewing device) to see a first set of virtual objects in a first perspective of the physical environment and a second user (e.g., associated with a second viewing device) to see a second set of virtual objects in a second perspective of the physical environment.

In some embodiments, simultaneously enabling a presentation of an augmented viewing may include storing the privacy settings and data characterizing the plurality of virtual objects at a data structure (e.g., data structure 212 of FIG. 2) associated with a server (e.g., server 21), such that multiple extended reality appliances may access the data structure via a communications network (e.g., communications network 214). The server may restrict access to virtual objects classified as private only to authorized extended reality appliances (e.g., conditional on receiving an approved credential) and may grant access to virtual objects classified as public information to any extended reality appliance.

In some embodiments, during the simultaneous presentation, the first extended reality appliance presents the first virtual object and the second virtual object in the physical environment, and the second extended reality appliance presents the second virtual object, omitting presentation of the first virtual object in compliance with the privacy settings. Omitting may involve excluding, barring, and/or withholding (e.g., a presentation of private information). In compliance with the privacy settings may refer to consistent with the privacy settings, e.g., to prevent violation of any rules associated with the privacy settings. For instance, two different extended reality appliances may simultaneously present two different views of the physical environment in keeping with the privacy settings. The first extended reality appliance (e.g., approved for presenting private information) may present the first virtual object (e.g., private information) and the second virtual object (e.g., public information). Concurrently (e.g., simultaneously), the second extended reality appliance (e.g., non-approved for presenting private information) may present only the second virtual object and may be blocked from presenting the first virtual object. The privacy settings may prohibit the second extended reality appliance from accessing data representing the second virtual object and/or from rendering the second virtual object.

By way of a non-limiting example, in FIG. 18, at least one processor may simultaneously enable a presentation of an augmented viewing including first view 1804 via first extended reality appliance 1802 and second view 1808 via second extended reality appliance 1806 of physical environment 1500. During the simultaneous presentation, first extended reality appliance 1802 may present first virtual object 1706 (e.g., corresponding to the game widget and classified as private information) and second virtual object 1702 (e.g., corresponding to the virtual plant and classified as public information) in physical environment 1500, and second extended reality appliance 1806 may present second virtual object 1702 in physical environment 1500, omitting first virtual object 1706, in compliance with the privacy settings.

In some embodiments, the privacy settings classify as private a first location associated with the first virtual object.

A location associated with a virtual object may include a space within the physical environment (e.g., measured as a set of contiguous pixels or voxels when viewed through an extended reality appliance) defined for displaying the virtual object, for linking (e.g., tethering) to the virtual object, for interfacing with the virtual object, and/or for establishing any other type of relationship (e.g., association) with the virtual object. Similarly, a location associated with a virtual object may include a virtual space within a virtual reality environment such as the metaverse or any other simulated environment. A location associated with a virtual object may be absolute (e.g., independent of a location or orientation of an extended reality appliance used for viewing the associated virtual object), or relative (e.g., dependent on a location or orientation of an extended reality appliance used for viewing the associated virtual object). In some examples, the privacy settings may classify the first location as private based on visual characteristics of the first location, for example as described elsewhere in this disclosure. Privacy settings classifying as private a first location associated with the first virtual object may involve at least one processor accessing privacy settings (e.g., associated with the first and/or second extended reality appliances) and subjecting a first location associated with the first virtual object to the privacy settings (e.g., enforcing the privacy settings on any object in the first location), thereby limiting or restricting the presentation of content at the first location. In some embodiments, the at least one processor may designate the first location as private based on the association with the first virtual object. Thus, the designation for enforcing the privacy settings may be location-based.

By way of a non-limiting example, in FIG. 18, the privacy settings may classify first location 1504 as private (e.g., based on an association with first virtual object 1706). Consequently, other virtual objects located on first location 1504 may also be classified as private, based on the association with first location 1504.

Some embodiments may involve designating other virtual objects in the first location as private. Designating may include specifying or categorizing. Designating other virtual objects in the first location as private may include extending restrictions imposed by the privacy settings on the first virtual object (e.g., associated with the first location) to additional virtual objects, based on the other virtual objects being located at the first location. Some embodiments may involve blocking the other virtual objects from display via the second extended reality appliance. Blocking may include preventing, barring, or thwarting. Based on the designation of the first location as private (e.g., and therefore subject to the privacy settings), the at least one processor may prevent the second extended reality appliance (e.g., non-approved for presenting private information) from presenting other virtual objects in the first location, e.g., by blocking access to data required for rendering other virtual objects in the first location. Enforcing the privacy settings on the first location may allow the first extended reality appliance (e.g., approved for presenting private information) to present the first virtual object and the other virtual objects at the first location, and may block the second extended reality appliance (e.g., non-approved for presenting private information) from presenting the first virtual object and the other virtual objects at the first location. Consequently, a first user using the first extended reality appliance may view the first virtual object and the other virtual objects in the first location, and a second user using the second extended reality appliance may see the physical environment via the second extended reality appliance, absent the first virtual object and the other virtual objects.

As an example, a first user and a second user may view a physical environment through a first pair of smart glasses and a second pair of smart glasses, respectively. The first virtual object may be a personal calendar, and the second virtual object may be spreadsheet shared by the first and second users. The personal calendar may be presented in a peripheral region of the physical environment (e.g., the first location) and the spread sheet may be presented in a central region of the physical environment (e.g., the second location). The at least one processor may classify the first location as private and enforce privacy settings on other virtual objects presented at the first location, such as a chat box. By contrast, the at least one processor may withhold privacy settings from the presentation of the spread sheet at the second location. Consequently, only the first user may see the personal calendar and the chat box in the first location via the first pair of smart glasses, whereas both the first and second users may view the spread sheet via the first and second pairs of smart glasses.

By way of a non-limiting example, in FIG. 18, based on the classification of first location 1504 as private, the at least one processor may classify virtual object 1704 (e.g., another virtual object), also located on first location 1504, as private. The private classification may block first virtual object 1706 and virtual object 1704 from being presented via second extended reality appliance 1806.

Some embodiments involve detecting a user-initiated movement of the first virtual object to a second location. A user-initiated movement may include one or more of a gesture (e.g., a head, hand, finger, arm, or leg gesture) detectable by an image sensor, a motion by an electronic pointing device (e.g., a stylus or electronic mouse), a keyboard input (e.g., page up, page down, home, end, and/or text), a voice command (e.g., "move calendar to the right") detectable by a microphone, and/or any other user input detectable via a user interface. Detecting a user-initiated movement of an object to a second location may include at least one processor receiving a user input indicating a change in position of an object from a first (e.g., private) location to a second (e.g., non-private) location. For example, the user-initiated movement may include a selection of the first virtual object (e.g., using a pointing device and/or a voice command) followed by a hand gesture indicating a motion from a first location to the second location. In one example, detecting a user-initiated movement of an object to a second location may include analyzing image data (e.g., analyzing image data received from the image sensor associated with the wearable extended reality appliance). For example, the image data may be analyzed using a visual object detection algorithm to detect a position of the object, which may be used to determine movement of the object to the second location. Further, a machine learning model may be trained using training examples to determine whether movements of objects are user-initiated movements (e.g., based on images and/or videos of the objects in motion). An example of such training example may include a sample video of a sample movement of a sample object, together with a label indicating whether the sample movement is a user-initiated movement. The image data may be analyzed using the trained machine learning model to determine whether the movement of the object to the second location is a user-initiated movement, thereby detecting the user-initiated movement of the object to the second location.

Some embodiments may involve, in response to the user-initiated movement, enabling the second extended reality appliance to present the first virtual object and the second virtual object. For example, if classifying a virtual object as private is location-based (e.g., based on the first location), moving the object to a different location (e.g., a second location classified as non-private) may remove the classification of the virtual object as private. Consequently, upon detecting a user moving the first (e.g., private) virtual object from a first location (e.g., classified as private) to a second location (e.g., not classified as private), the at least one processor may remove restrictions associated with the privacy settings from the first virtual object, allowing the second extended reality appliance to access data for presenting the first virtual at the second location. Although the above example describes moving the first object from a first location (e.g. classified as private) to a second location (e.g., not classified as private), it is to be understood that a user may also be able to provide inputs that may move the first object from a first location (e.g. classified as private) to a second, third, fourth, or any other location (e.g., that may also be classified as private).

Figure 19:
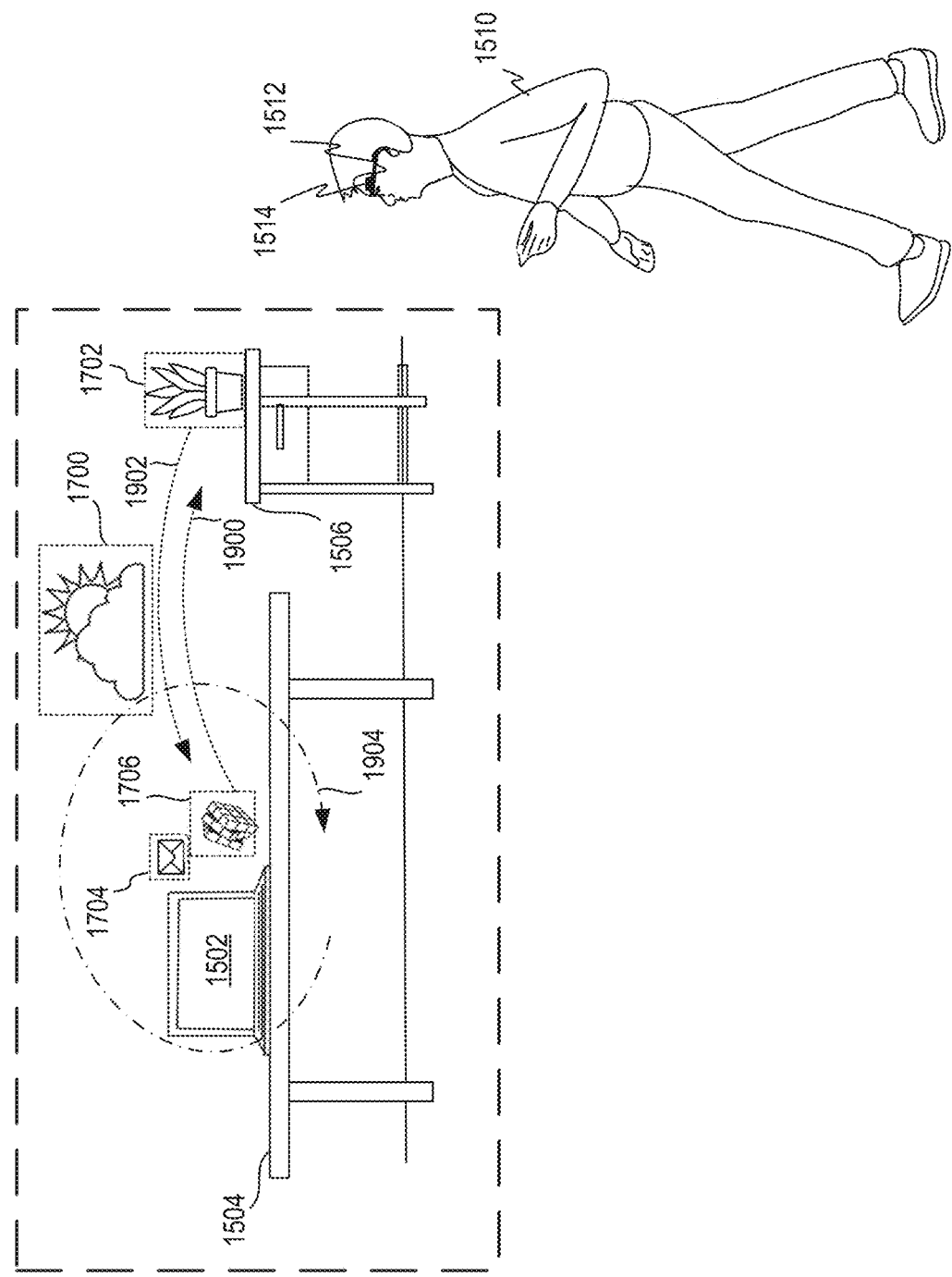
FIG. 19 illustrates the system of FIG. 18 receiving one or more user-initiated inputs to modify privacy settings, consistent with some embodiments of the present disclosure.

By way of a non-limiting example, reference is made to FIG. 19 illustrating system 1800 receiving one or more user-initiated inputs for modifying privacy settings, consistent with some embodiments of the present disclosure. The at least one processor may detect user 1510 selecting first virtual object 1706 (e.g., using a pointing gesture) and moving first virtual object 1706 from first location 1504 to second location 1506 using a user-initiated movement 1900 (e.g., a hand gesture). The user-initiated movement 1900 (e.g., including the point and hand gesture) may be detected using image sensor 1514.

Figure 20:
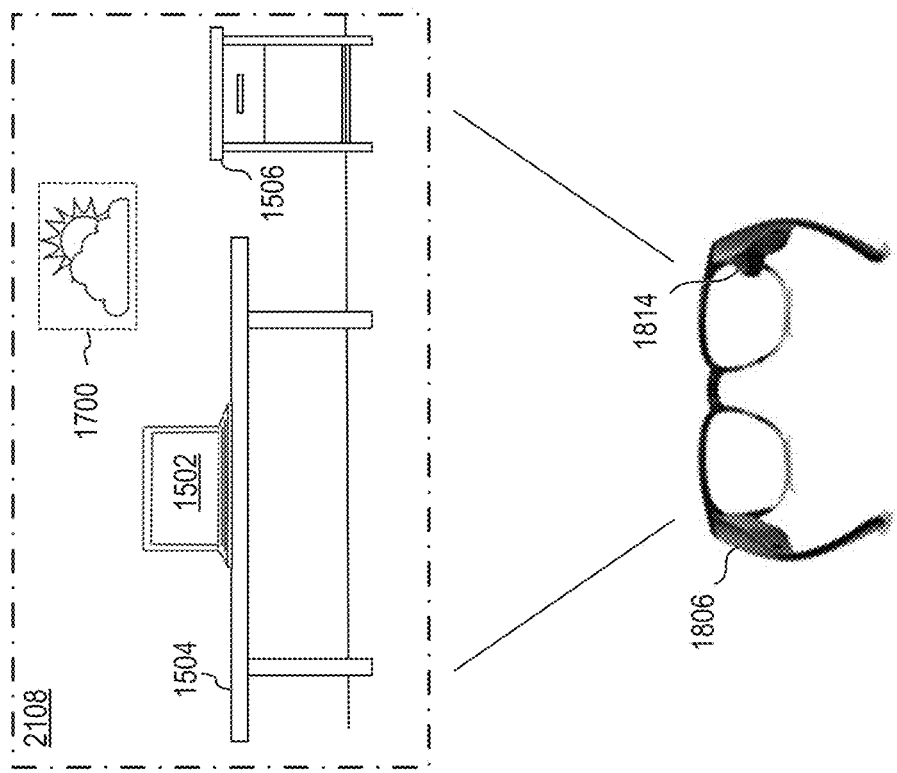
FIG. 20 illustrates an exemplary view via the second extended reality appliance after one or more virtual objects have been moved from the first location to the second location, consistent with some disclosed embodiments.

By way of a non-limiting example, reference is made to FIG. 20 illustrating a third view 2008 via second extended reality appliance 1806 after one or more virtual objects have been moved from the first location to the second location, consistent with some disclosed embodiments. In response to user-initiated movement 1900 moving first virtual object 1706 from first location 1504 (e.g., the desk surface) to second location 1506 (e.g., the side-table), the at least one processor may enable second extended reality appliance 1806 to display view 2008 presenting first virtual object 1706 and second virtual object 1702 at second location 1506.

Some embodiments involve detecting a user-initiated movement of the second virtual object to the first location. Detecting a user initiated movement of the second object to the first location may include at least one processor receiving a user input selecting the second object and changing the position of the second object from the second (e.g., non-private) location to the first (e.g., private) location. The user input may include any of the inputs described elsewhere in this disclosure. Some embodiments may involve, in response to the user-initiated movement, preventing the second extended reality appliance from presenting the second virtual object. If classifying a virtual object as private is location-based, moving a virtual object classified as non-private (e.g., the second virtual object) to a location classified as private (e.g., the first location) may cause the moved virtual object to be classified as private. As a result, the second virtual object may be blocked from being presented via an extended reality appliance non-approved (e.g., non-authorized) for presenting private information. Thus, upon detecting a user moving the second virtual object (e.g. classified as non-private) to the first location (e.g., classified as private), the at least one processor may impose the privacy settings on the second virtual object, blocking the second virtual object from being presented via the second extended reality appliance.

By way of a non-limiting example, in FIG. 19, the at least one processor may detect user 1510 selecting second virtual object 1702 (e.g., via a pointing gesture) and moving second virtual object 1702 from second location 1506 (e.g., the side-table) to first location 1504 (e.g., the desk surface) via user-initiated movement 1902. User-initiated movement 1902 (e.g., including the pointing and hand gesture) may be detected using image sensor 1514. In response, the at least one processor may prevent second extended reality appliance from presenting second virtual object 1702.

Figure 21:
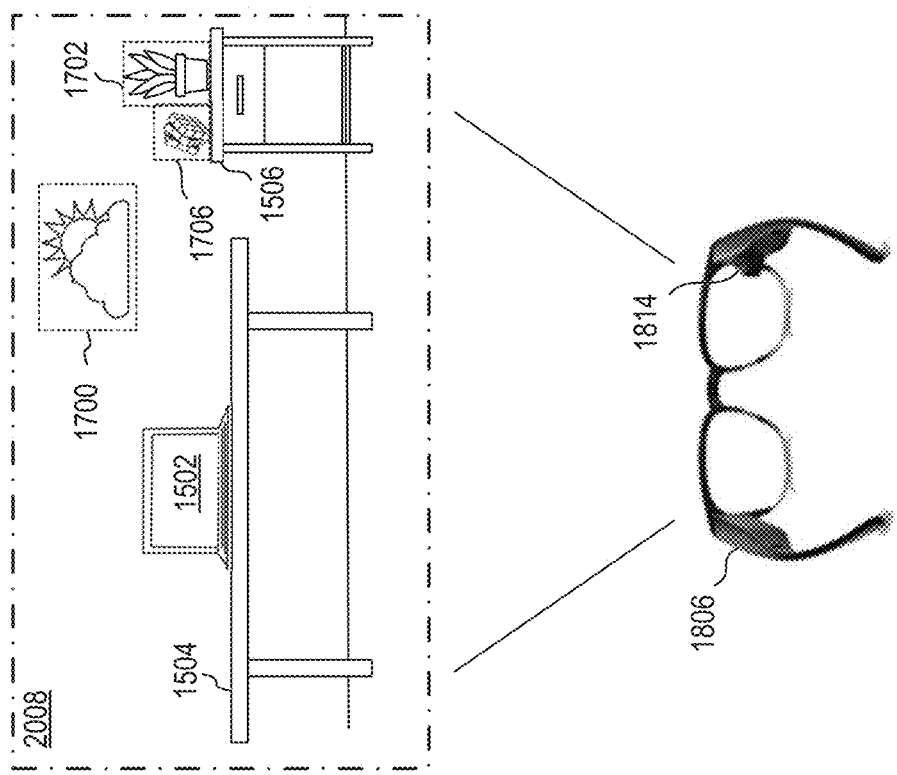
FIG. 21 illustrates another exemplary view via the second extended reality appliance after one or more virtual objects have been moved from the second location to the first location, consistent with some disclosed embodiments.

By way of a non-limiting example, reference is made to FIG. 21, illustrating a fourth view 2108 via second extended reality appliance 1806 after one or more virtual objects have been moved from the second location to the first location, consistent with some disclosed embodiments. In response to user-initiated movement 1902, moving second virtual object 1702 from (e.g., non-private) second location 1506 to (e.g., private) first location 1504, second virtual object 1702 may be absent from view 2108 of physical environment 1500.

In some embodiments, the privacy settings classify the first virtual object as private. Privacy settings classifying the first virtual object as private may involve at least one processor accessing privacy settings (e.g., associated with the first and/or second extended reality appliances) and enforcing the privacy settings on the first virtual object (e.g., independent of location) thereby limiting or restricting the presentation of the first virtual object (e.g., only via extended reality appliances approved for presenting private information). In one example, digital signals associated with the first virtual object may be received. For example, the digital signals may be read from a memory, received from an external device (e.g., using a communications device), generated by at least one processor (for example, based on a geometrical model associated with the first virtual object), and so forth. Some non-limiting examples of digital signals associated with the first virtual object may include digital display signals associated with the first virtual object, a digital three dimensional model associated with the first virtual object, and so forth. Further, at least one processor may analyze digital signals associated with the first virtual object to determine whether the privacy settings classify the first virtual object as private. For example, a machine learning model may be trained using training examples to determine whether virtual objects are private based on digital signals. An example of such training example may include a sample digital signal associated with a sample virtual object, together with a label indicating whether the sample virtual object is private. At least one processor may use the trained machine learning model to analyze the digital signals associated with the first virtual object and determine whether the privacy settings classify the first virtual object as private.

By way of a non-limiting example, in FIG. 18, the at least one processor may use the privacy settings to classify first virtual object 1706 as private. In response, first virtual object 1706 may be visible via first extended reality appliance 1802 and may not be visible via second extended reality appliance 1806.

Some embodiments involve detecting a user-initiated movement of the first virtual object to a second location. Detecting a user initiated movement of the first virtual object to the second location may include at least one processor receiving a user input indicating to change a position of the first (e.g. private) object from the first location to a second location. The user input may include any of the inputs described elsewhere in this disclosure. Some embodiments involve, in response to the user-initiated movement, preventing the second extended reality appliance from presenting the first virtual object at the second location. As noted earlier, if the classification as private is based on the first virtual object, moving the first virtual object from the first location to a different location (e.g., the second location) may not affect the classification of the first virtual object as private. Upon detecting a user initiating a movement of the first (e.g., private) virtual object away from the first location to the second location, the at least one processor may continue enforcing the privacy settings on the first virtual object and may block the second extended reality appliance from accessing data for rendering the first virtual object. In some embodiments, the second location may be associated with the second (e.g., non-private) virtual object, such that the first virtual object and second virtual object may be viewed in the second location via the first extended reality appliance (e.g., approved for presenting private information), whereas only the second virtual object may be viewed at the second location via the second extended reality appliance (e.g., non-approved for presenting private information).

By way of a non-limiting example, in FIG. 19, at least one processor may detect user-initiated movement 1900 for moving first virtual object 1706 to second location 1506. Since first virtual object 1706 is classified as private, in response to user-initiated movement 1900 moving first virtual object 1706 from first location 1504 to second location 1506, the at least one processor may deny second extended reality appliance 1806 from presenting first virtual object 1706 at second location 1506, and the view of physical environment 1500 seen via second extended reality appliance 1806 may correspond to view 1808 of FIG. 18.

Some embodiments involve detecting a user-initiated movement of the second virtual object to a first location associated with the first virtual object. Detecting a user-initiated movement of the second virtual object to a first location associated with the first virtual object may include at least one processor receiving a user input indicating to change a position of the second (e.g., non-private) object from the first location to a second location. The user input may include any of the inputs described elsewhere in this disclosure. Some embodiments may involve enabling the second extended reality appliance to present the second virtual object at the first location. As noted earlier, if the classification as private is based on the first virtual object, moving the second virtual object to the first location may not affect the classification of the second virtual object as non-private. Upon detecting a user initiating a movement of the second (e.g., non-private) virtual object from the second location to the first location, the at least one processor may continue to allow the second extended reality appliance to access data for presenting the second virtual object at the first location. Thus, the first virtual object and second virtual object may be viewed in the first location via the first extended reality appliance (e.g., approved for presenting private information), whereas only the second virtual object may be viewed at the first location via the second extended reality appliance (e.g., non-approved for presenting private information).

By way of a non-limiting example, in FIG. 19, at least one processor may detect user-initiated movement 1902 of second virtual object 1702 to first location 1504 associated with first virtual object 1706.

By way of a non-limiting example, reference is made to FIG. 22 illustrating a fifth view 2208 via second extended reality appliance 1806 after one or more virtual objects have been moved from the second location to the first location, consistent with some disclosed embodiments. Upon classifying first virtual object 1706 (e.g., as private, in response to moving second virtual object 1702 from second location 1506 (e.g., the side-table) to first location 1504 (e.g., the desk surface), the at least one processor may enable second extended reality appliance 1806 present second virtual object 1702 at first location 1504.

Some embodiments involve the privacy settings further classifying at least one of the second virtual object and a location of the second virtual object as public. Public may refer to a status or scope allowing information to be made available for viewing and/or sharing without restriction, e.g., with the general population and/or generic device. For instance, classifying the second virtual object as public may allow the first extended reality device (e.g., approved for presenting private information) and the second extended reality device (e.g., non-approved for presenting private information) to access data for presenting the second virtual object (e.g., by storing the data at a server in communication with the first and second extended reality devices, and by withholding privacy settings). Similarly, classifying the location of the second virtual object as public may allow the first extended reality device (e.g., approved for presenting private information) and the second extended reality device (e.g., non-approved for presenting private information) to present data in the location of the second virtual object.

By way of a non-limiting example, in FIG. 18, the at least one processor may apply the privacy settings to classify second virtual object 1702 and/or second location 1506 (e.g., the second location) as public.

In some embodiments, the privacy settings classify a second location associated with the second virtual object as public. Privacy settings classifying a second location associated with the second virtual object as public may involve at least one processor accessing privacy settings (e.g., associated with the first and/or second extended reality appliances) and determining, based on the privacy settings, that a second location associated with the second virtual object lacks restrictions related to privacy, thereby allowing content located in the second location to be viewed via the first extended reality appliance (e.g., approved for presenting private information) and the second extended reality appliance (e.g., non-approved for presenting private information). For example, the second location may be designated for sharing content for collaboration among multiple users via multiple extended reality appliances.

Some embodiments involve detecting a user-initiated movement of the first virtual object to the second location and in response to the user-initiated movement, enabling the second extended reality appliance to present the first virtual object. For example, if the classification as public is based on the second location, moving the first (e.g., private) virtual object from the first location to the second (e.g., public) location may declassify the first virtual object, allowing the first virtual object to be viewed by a non-authorized extended reality appliance (e.g., non-approved for presenting private information). Thus, upon detecting a user initiating a movement of the first object to the second location, the at least one processor may refrain from imposing privacy restrictions on the first virtual object and may permit the second extended reality appliance to access data for presenting the first virtual object in the second location. Consequently, the first (e.g., declassified) virtual object and the second (e.g., non-private) virtual object may be viewed via the first extended reality appliance (e.g., approved for presenting private information) and also by the second extended reality appliance (e.g., non-approved for presenting private information).

By way of a non-limiting example, in FIG. 18, the at least one processor may apply the privacy settings to classify second location 1506 associated with second virtual object 1702 as public. In FIG. 19, the at least one processor may detect user-initiated movement 1900 (e.g., a hand gesture) for moving first virtual object 1706 from first location 1504 (e.g., classified as private) to second location 1506 (e.g., classified as public). In FIG. 20, in response to user-initiated movement 1900, the at least one processor may enable second extended reality appliance 1806 to present first virtual object 1706 at second location 1506.

In some embodiments, enabling the simultaneous presentation includes causing the second extended reality appliance to present the second virtual object at a second location associated with the second virtual object and to present a distorted representation of the first virtual object at the location of the first virtual object in compliance with the privacy settings. A distorted representation of a virtual object may include an obscured, blurred, pixelated, and/or redacted version of a virtual object, such that one or more selected features of the virtual object may be hidden from view. For instance, the first virtual object may include some information classified as private and some information classified as non-private. The privacy settings may allow the second extended reality appliance (e.g., non-approved for accessing private information) to present a version of the first (e.g., semi-private) virtual object in a manner that hides the private information from view, while revealing the non-private information. The second extended reality appliance may present the second (e.g., non-private) virtual object in the second location and the distorted first (e.g., semi-private) virtual object in the first location. For instance, the first virtual object may be a replica of a child and the distorted representation may obscure the face of the child but allow viewing non-facial features of the child. As another example, the first virtual object may include private and non-private text, and the distorted representation may redact the private text while allowing for viewing of the non-private text.

By way of a non-limiting example, reference is made to FIG. 23 illustrating a sixth view 2308 via second extended reality appliance 1806, consistent with some disclosed embodiments. in FIG. 23, the at least one processor may cause second extended reality appliance 1806 to present second virtual object 1702 at second location 1506 (e.g., the side-table) and present a distorted presentation 2300 of first virtual object 1706 (not shown) at first location 1504, in compliance with the privacy settings. For instance, distorted presentation 2300 may include hashed markings to obfuscate first virtual object 1706.

Some embodiments involve presenting via the wearable extended reality appliance at least one of an indication that the first virtual object is classified as private, an indication that a location associated with the first virtual object is classified as private and an indication that at least one of the first virtual object and the location associated with the first virtual object is classified as private. An indication that an object is classified as private may include a visual cue or sign communicating that an object is classified as private. For example, the first object may be displayed using a highlight, a backlight, encircled, using grey-scale (e.g., non-color), with an accompanying label or icon (e.g., "private"), with a flickering or flashing warning light, or any other type of indication conveying that the first virtual object is intended for private consumption. An indication that a location associated with a virtual object is classified as private may include a visual cue or sign communicating that a location and/or any content (e.g., virtual content) associated therewith may be restricted and handled as private information. For example, the location may be highlighted, backlit, encircled, and/or labeled as private, and/or any virtual object positioned within the location, docked to the location, and/or otherwise linked to the location may be highlighted backlit, encircled, and/or labeled as private. Similarly, an indication that at least one of the first virtual object and the location associated therewith is classified as private may include one or both of the indications described above.

By way of a non-limiting example, in FIG. 18, the at least one processor may present via wearable extended reality appliance 1802 an indication 1816 that one or more of first virtual object 1706 and/or first location 1504 (e.g., the first location) are classified as private.

Some embodiments may involve receiving an input identifying a specific region of the physical environment as private. An input identifying a specific region of the physical environment may include one or more of the inputs described elsewhere in this disclosure, where the input may delineate, select, or otherwise define a region within a physical environment as private. For instance, the input may include a gesture using an electronic pointing device outlining a region, simultaneously accompanied by a voice command (e.g., "private") or by a hand gesture (e.g., a finger touching the lips) indicating the specified region as private. As another example, the input may include an image of a specific region in the physical environment (e.g., a cropped image) capture by an image sensor and tagged as private. Upon receiving the input, at least one processor may apply privacy settings to the specific region and/or any virtual content associated therewith to restrict access therein only to authorized users and/or devices (e.g., the first extended reality appliance). In some examples, the input identifying a specific region of the physical environment as private may include image data received from an image sensor associated with a wearable extended reality appliance. The image data may be analyzed (e.g., in relation to the privacy settings and the physical location associated with a virtual object, as described elsewhere in this disclosure) to determine that the specific region of the physical environment is private.

In some embodiments, the received input includes the image data. For example, at least one processor may receive image data from an image sensor (e.g., a camera) associated with a wearable extended reality appliance as an image or a sequence of images. In some embodiments, the image sensor may be integrated with the wearable extended reality appliance. In some embodiments, the image sensor may be separate and in communication with the wearable extended reality appliance. For instance the image sensor may be located on a surface in the physical environment with the wearable extended reality appliance.

By way of a non-limiting example, in FIG. 19, the at least one processor may receive an input as user-initiated movement 1904 (e.g., a circling hand gesture) indicating the region of physical environment 1500 enclosed by user-initiated movement 1904 as private. The at least one processor may receive the image data from image sensor 1514 of wearable extended reality appliance 1512.

Some embodiments involve analyzing the image data to identify a gesture initiated by a wearer of the wearable extended reality appliance that identifies the specific region of the physical environment as private. Analyzing image data may include applying one or more image processing techniques (e.g., filters, transformations, feature extraction, clustering, pattern recognition, edge detection, fast Fourier Transforms, convolutions, and/or any other type of image processing technique) and/or artificial intelligence (e.g., machine learning, deep learning, neural networks) to extract information from image data. A gesture may refer to a form of communication in which bodily actions or movements communicate information for detection by a sensor (e.g., image sensor 472 and/or motion sensor of FIG. 4). Examples of gestures may include bodily motions by the head, eye, arm, hand, finger, torso, leg, and/or foot. Identifying a gesture initiated by a wearer of the wearable extended reality appliance may include analyzing a sequence of images of the wearer of the wearable extended reality appliance performing a gesture to discern a gesture, comparing the gesture to a library of predefined (e.g., known) gestures stored in memory, and finding a matching gesture associated with designating a specific region of the physical environment as private. For example, at least one processor may receive a sequence of images (e.g., image data) from a camera integrated with a wearable extended reality appliance of the user performing a gesture. The at least one processor may analyze the sequence of images and identify a pointing gesture designating a desk surface as private. In response to the designation, the at least one processor may apply privacy settings to any virtual content associated with the desk surface to restrict access to the virtual content solely to authorized entities (e.g., the user of the first extended reality appliance).

By way of a non-limiting example, in FIG. 19, the at least one processor may analyze the image data received from image sensor 1514 of wearable extended reality appliance 1512 to identify user-initiated movement 1904 initiated by user 1510. User-initiated movement 1904 may encircle the specific region of first location 1504 to indicate this region of physical environment 1500 as private. Consequently, the at least one processor may apply the privacy settings to virtual objects located at first location 1504.

Some embodiments involve analyzing the image data using an object detection algorithm to detect a physical object in the specific region of the physical environment, and identifying the specific region of the physical environment as private based on the detected physical object. A physical object may include a real (e.g. tangible) object, e.g., subject to the laws of physics. Some examples of a physical object in a specific region of a physical environment may include a desk against a wall of a room, a corner shelf, a person (e.g., or part thereof, such as a face), or an animal (e g, a pet dog or bird). Analyzing image data using an object detection algorithm to detect a physical object may include performing one or more of the image processing and/or artificial intelligence techniques described elsewhere in this disclosure to image data of the physical environment for the purpose of identifying a physical object therein. In some embodiments, the physical object may be a person, or an identifying feature thereof, and analyzing image data may include applying a facial recognition algorithm. Identifying the specific region of the physical environment as private based on the detected physical object may include performing one or more operations including, for example, identifying a physical object, and associating the identified physical object with one or more privacy settings. The operations may further include, determining a region containing and/or within a predefined range of the physical object, and/or applying one or more privacy settings to the region. For example, at least one processor may receive image data from a camera integrated with a wearable extended reality appliance of a surface of a desk. The at least one processor may detect the desk surface by analyzing the image data, and may associate the surface and any virtual object located on the surface (e.g., a virtual family photo, a virtual diary, or a virtual game) with privacy settings to restrict access thereto.

As another example, the physical object may be a person (e.g., a child), or an object associated therewith (e.g., a stroller or crib). Upon identifying the child in the image data, the at least one processor may apply privacy settings to the region including and surrounding the child. As another example, the physical object may include text data (e.g., a whiteboard, a digital display screen, a notebook, or a sheet of paper, and so forth). Upon analyzing the text data and identifying private information (e.g., using an Optical Character Recognition algorithm and/or human language interpreting or comprehension algorithm, such as a Natural Language Processing algorithm) the at least one processor may apply privacy settings to the region including the text data.

In some embodiments, in addition to applying privacy settings to one or more virtual objects, one or more privacy setting may be applied to one or more physical objects. For example, the at least one processor may obfuscate the face of the child, or a private text document when viewed via an extended reality appliance non-approved for presenting private information.

By way of a non-limiting example, in FIG. 15, the at least one processor may analyze the image data received from image sensor 1514 to detect computer display 1502 (e.g., a physical object) on first location 1504 (e.g., the specific region) of physical environment 1500. For instance, the at least one processor may use an object recognition software to detect computer display 1502. The at least one processor may identify first location 1504 based on the detection of computer display 1502.

In some embodiments, the physical object is moveable. A moveable physical object may include an object that may be unanchored or unattached to a fixed object in a physical environment and may be relocated or repositioned from a first location to a second, different location. Examples of moveable physical objects may include objects unattached to a wall, floor, and/or ceiling of a physical environment, motile objects (e.g., a human, an animal, or a robot), and/or an object moveable by a human, animal, or robot. Some examples of a moveable physical object may include a mobile communications device, a notebook, a coffee mug, a programming duck, a picture frame, and/or any other physical object capable of being moved in a physical environment.

Some embodiments involve analyzing the image data to identify a movement of the physical object out of the specific region of the physical environment, and reclassifying the specific region of the physical environment as public in response to the movement of the physical object. Identifying a movement of the physical object out of the specific region of the physical environment may include receiving an image sequence of the physical object over a time period, analyzing a first portion of the image sequence to detect the physical object inside (e.g., included in) the specific region, and analyzing a second portion of the image sequence following the first portion to detect the physical object removed (e.g., absent) from the specific region. Reclassifying may include performing a second classification operation (e.g., after a first classification operation) to change one or more associated attributes (e.g., a status, a type, a setting, a privacy setting, and/or definition). Reclassifying the specific region as public may cause revoking, overriding, and/or cancelling one or more privacy settings associated with one or more (e.g., virtual and/or physical) objects located in the specific region to enable access by non-authorized users and/or devices. The reclassification of the specific region as public may be based on the physical object being absent from the specific region.

For example, at least one processor may apply privacy settings to a region surrounding a child, such that any virtual and/or physical object within a predefined distance of the child may be obfuscated from view via an extended reality appliance non-approved for presenting private information. However, removing the child from the specific region may cause the at least one processor to revoke the privacy settings associated with the specific region, allowing any virtual and/or physical objects remaining in the specific region to be viewed via any extended reality appliance (e.g., including appliances non-approved for presenting private information).

By way of a non-limiting example, in FIG. 15, computer display 1502 (e.g., a physical object) may be moveable. The at least one processor may analyze the image data (e.g., received from image sensor 1514 of wearable extended reality appliance 1512 to identify the removal of computer display 1502 from first location 1504 (e.g., classified as private based on the presence of computer display 1502) to second location 1506. In response to the removal of computer display 1502 from first location 1504, the at least one processor may reclassify first location 1504 as public.

Figure 24:
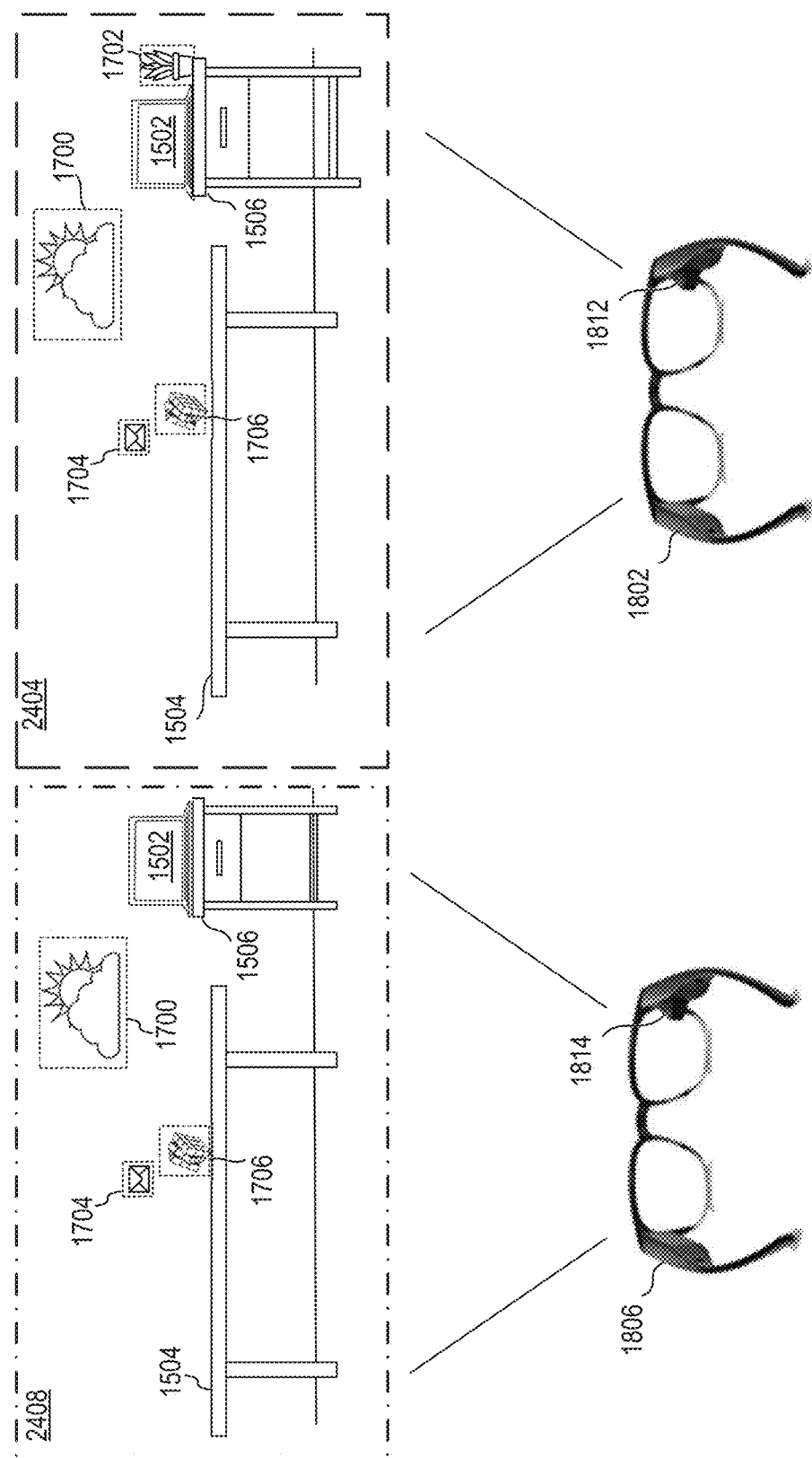
FIG. 24 illustrates another exemplary view via the first extended reality appliance and an eight view via the second extended reality appliance removal of a physical object from the first location to the second location, consistent with some disclosed embodiments.

By way of a non-limiting example, reference is made to FIG. 24 illustrating a seventh view 2404 via first extended reality appliance 1802 and an eight view 2408 via second extended reality appliance 1806 after removal of computer display 1502 (e.g., a physical object) from first location 1504 to second location 1506 (e.g., the second location), consistent with some disclosed embodiments. After reclassifying first location 1504 as public, first extended reality appliance 1802 may present seventh view 2404 of physical environment 1500 including virtual objects 1704, 1706 above first location 1504 (e.g., reclassified as public), and second virtual object 1702 adjacent to computer display 1502 at second location 1506 (e.g., classified as private based on proximity to computer display 1502). Second extended reality appliance 1806 may present eight view 2408 of physical environment 1500 including virtual objects 1704, 1706 at first location 1504 (e.g., reclassified as public), and computer display 1502 at second location 1506 (e.g., classified as private). Notably, second virtual object 1702 may be absent from eight view 2408, due to reclassification of second location 1506 as private based on proximity to computer display 1502.

Some embodiments involve classifying the first virtual object as private when a location of the first virtual object is within the specific region of the physical environment. For example, once the specific region has been identified as private, moving an object to the specific region may cause the at least one processor to apply one or more privacy settings to the object. For instance, a user may designate a desktop as a specific private region of the physical environment. Placing one or more virtual objects (e.g., a photograph, or a personal schedule) in the specific region may cause the at least one processor to apply the privacy settings to the virtual objects, prevent access by extended reality appliances non-approved for presenting private information.

Some embodiments involve classifying the first virtual object as private when a distance of the first virtual object from the specific region of the physical environment is less than a threshold distance A distance may refer to a spatial distance (e.g., measured in a two or three-dimensional coordinate system). A distance less than a threshold distance from a specific region may refer to a buffer zone or tolerance surrounding the specific region, such that any object located inside the buffer zone surrounding the specific region may be subject to the same privacy settings as an object located inside the specific region. For example, the at least one processor may add a buffer zone for added security if the designation of the specific region is an approximation.

By way of a non-limiting example, in FIG. 19, the at least one processor may classify first virtual object 1706 as private when the location of first virtual object 1706 is positioned on first location 1504 (e.g., indicated as private by user 1510) of physical environment 1500, and/or when the distance between first virtual object 1706 and first location 1504 is less than a threshold distance (e.g., 30 cm as measured in pixels via first extended reality appliance 1802 (see FIG. 18).

Some embodiments involve classifying the second virtual object as public when a distance of the second virtual object from the specific region of the physical environment is greater than a threshold distance A distance greater than a threshold distance from a specific region may refer to a location outside a buffer zone or tolerance surrounding the specific region, such that any object located external to the buffer zone may be free of the privacy settings imposed inside the specific region.

By way of a non-limiting example, in FIG. 18, the at least one processor may classify second virtual object 1702 as public when a distance between second virtual object 1702 and first location 1504 (e.g., specified as private) is greater than a threshold distance (e.g., 30 cm as measured in pixels via second extended reality appliance 1806 (see FIG. 18).

Some embodiments involve reclassifying the first virtual object as public when a location of the first virtual object changes from the specific region to a location outside the specific region of the physical environment. Reclassifying the first virtual object as public may include removing or revoking one or more privacy settings preventing access to the first virtual object such that the first virtual object may be presented by an extended reality appliance non-approved for presenting private information. For instance, upon receiving an input identifying a specific region in the physical environment as private, removing a virtual object from the specific region may declassify the virtual object, allowing access to the virtual object by non-authorized users via non-authorized extended reality appliances.

By way of a non-limiting example, in FIG. 20, the at least one processor may reclassify first virtual object 1706 as public when the location of first virtual object 1706 changes from first location 1504 to second location 1506 (e.g., via user-initiated movement 1900, as shown in FIG. 19), outside the specific region defined by user-initiated movement 1904 of physical environment 1500.

Some embodiments involve classifying the first virtual object as private when the first virtual object is docked to a physical object included in the specific region of the physical environment. Docked may refer to locked, anchored, or tethered, as described elsewhere in this disclosure. In some embodiments, a presentation of a virtual object docked to a physical object may be configured to move with the physical object in the environment. A virtual object may be docked to a physical object automatically (e.g., by association with the physical object) or in response to a user command. For example, a virtual calendar stored on a mobile device and presented via a wearable extended reality appliance paired to the mobile device may be automatically docked to the mobile device. Additionally, or alternatively, a user of an extended reality appliance may instruct at least one processor to dock a virtual object to a physical object (e.g., "dock calendar to desk"). Docking one or more virtual objects to a physical object included in a region specified as private may cause the at least one processor to apply privacy settings to the one or more docked virtual objects (e.g., even if a docked virtual object is located external to the specific region).

By way of a non-limiting example, in FIG. 19, the at least one processor may classify first virtual object 1706 as private when first virtual object 1706 is docked to computer display 1502 located in the region of first location 1504 of physical environment 1500 defined by user-initiated movement 1904. For instance, user 1510 may cause first virtual object 1706 to be docked to computer display 1502 using a user input command.

In some embodiments, the physical object is movable and wherein during the simultaneous presentation, other virtual objects in proximity to a current location of the physical object are also blocked from display via the second extended reality appliance. Proximity may refer to neighboring or nearby (e.g., lying within a threshold distance). A current location may refer to a location at a particular point in time. A physical object (e.g., initially included in a region specified for private information) may be used to designate one or more virtual objects based on proximity to the physical object, such that moving the physical object (e.g., causing the location of the physical object to change over time) may impose privacy settings on any virtual object located within a threshold distance of the physical object at a given point in time. In other words, in some embodiments, the physical object may be used to transport privacy settings to any location in the physical environment such that the privacy settings may be applied to any object located within the threshold distance from the physical object.

For example, as a child (e.g., a moveable physical object) walks around a room, the at least one processor may apply privacy settings to any virtual object within a threshold distance of the current position of the child, blocking those virtual objects from being presented via extended reality appliances non-approved for presenting private information.

By way of a non-limiting example, in FIG. 24, computer display 1502 (e.g., a physical object) may be moved from the region of first location 1504 defined by user-initiated movement 1904 (shown in FIG. 19 and classified as private) to second location 1506 (e.g., classified as public). However, moving computer display 1502 may transport privacy settings from the region of first location 1504 to second location 1506. Consequently, during the simultaneous presentation of seventh view 2404 via first extended reality appliance 1802 and eighth view 2408 via second extended reality appliance 1806, second virtual object 1702 (e.g., previously classified as public) currently in proximity to computer display 1502 (e.g., associated with classifying virtual objects as private) may be blocked from display via second extended reality appliance 1806.

Some embodiments involve analyzing the image data using an object detection algorithm to detect a physical object in a particular region of the physical environment, and classifying the particular region of the physical environment as public based on the detected physical object. For instance, certain physical objects may be associated with public information (e.g., a plasma or LCD screen hung on a wall and configured for collaborative sharing by anyone within viewing distance).

By way of a non-limiting example, in FIG. 18, the at least one processor may analyze the image data received from image sensor 1514 of wearable extended reality appliance 1512 (e.g., using an object detection algorithm) and detect computer display 1502 (e.g., configured for collaborative file sharing by multiple users). The at least one processor may classify the region of computer display 1502 as public, allowing users of first extended reality appliance 1802 and second extended reality appliance 1806 to simultaneously view computer display 1502 (e.g., and prevent second extended reality appliance 1806 from obfuscating a region of the display aligned with computer display 1502).

Figure 25:
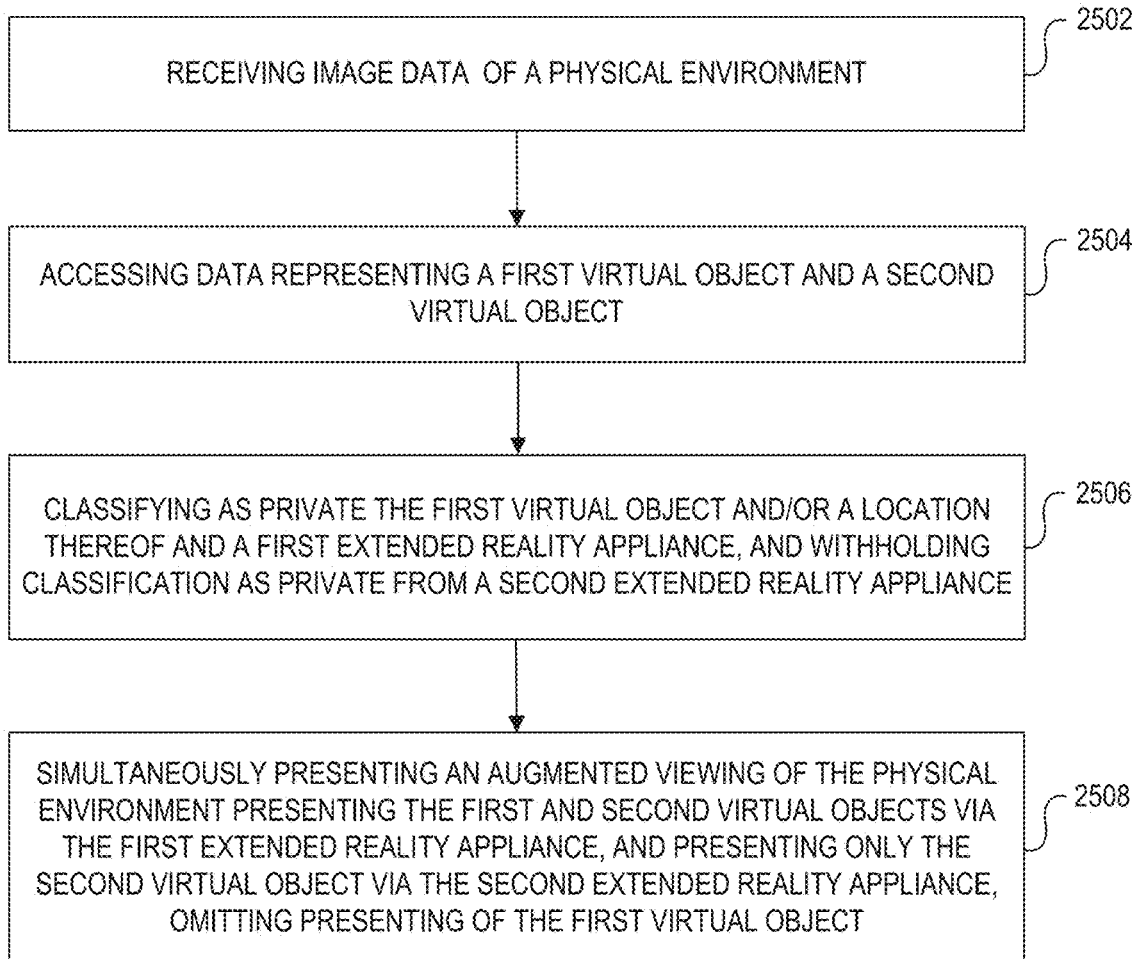
FIG. 25 illustrates a flowchart of an example process for managing privacy in an extended reality environment, consistent with embodiments of the present disclosure.

FIG. 25 illustrates a flowchart of an exemplary process 2500 for managing privacy in an extended reality environment, consistent with embodiments of the present disclosure. In some embodiments, process 2500 may be performed by at least one processor (e.g., processing device 460) to perform operations or functions described herein. In some embodiments, some aspects of process 2500 may be implemented as software (e.g., program codes or instructions) that are stored in a memory (e.g., memory device 411 of extended reality unit 204, shown in FIG. 4) or a non-transitory computer readable medium. In some embodiments, some aspects of process 2500 may be implemented as hardware (e.g., a specific-purpose circuit). In some embodiments, process 2500 may be implemented as a combination of software and hardware.

Referring to FIG. 25, process 2500 includes a step 2502 of receiving image data from an image sensor associated with a wearable extended reality appliance, the image data is reflective of a physical environment. By way of a non-limiting example, in FIG. 15, image sensor 1514 integrated with wearable extended reality appliance 1512 may capture multiple images of physical environment 1500. Process 2500 includes a step 2504 of accessing data characterizing a plurality of virtual objects for association with locations in the physical environment, the data representing a first virtual object and a second virtual object. By way of a non-limiting example, in FIG. 2, processing device 460 (shown in FIG. 4) of wearable extended reality appliance 1512 may access data structure 212 via communications network 214, the data characterizing virtual objects 1700 to 1706 (shown in FIG. 17). In FIG. 17, virtual objects 1700 to 1706 may be associated with different locations in physical environment 1500 (e.g., any of first location 1504 and second location 1506). Process 2500 includes a step 2506 of accessing privacy settings classifying at least one of the first virtual object and a location of the first virtual object as private, classifying a first extended reality appliance as approved for presentation of private information, and classifying a second extended reality appliance as non-approved for presentation of the private information. By way of a non-limiting, in FIG. 2, processing device 460 of wearable extended reality appliance 1512 may access private settings from data structure 212 via communications network 214. In FIG. 18, processing device 460 may apply the privacy settings to classify virtual object 1706 and/or first location 1504 as private, and extended reality appliance 1802 as approved for presenting private information, and to classify the extended reality appliance as non-approved for presenting private information. Process 2500 includes a step 2508 of simultaneously enabling a presentation of an augmented viewing of the physical environment, such that during the simultaneous presentation, the first extended reality appliance presents the first virtual object and the second virtual object in the physical environment, and the second extended reality appliance presents the second virtual object, omitting presentation of the first virtual object in compliance with the privacy settings. By way of a non-limiting, in FIG. 18, processing device 460 of wearable extended reality appliance 1512 may enable extended reality appliances 1802 and 1806 to simultaneously view differing views 1804 and 1808, respectively, of physical environment 1500. View 1804 presented via first extended reality appliances 1802 may present (e.g., private) first virtual object 1706 at first location 1504 and (e.g., public) second virtual object 1702 at second location 1506. View 1808 presented via second extended reality appliances 1806 may only present (e.g., public) second virtual object 1702 at second location 1506, omitting presenting (e.g., private) first virtual object 1706 from first location 1504.

Some embodiments involve a system for managing privacy in an extended reality environment, the system comprising: at least one processing device configured to: receive image data from an image sensor associated with a wearable extended reality appliance, the image data is reflective of a physical environment; access data characterizing a plurality of virtual objects for association with locations in the physical environment, the data representing a first virtual object and a second virtual object; access privacy settings classifying at least one of the first virtual object and a location of the first virtual object as private, classifying a first extended reality appliance as approved for presentation of private information, and classifying a second extended reality appliance as non-approved for presentation of the private information; and simultaneously enable a presentation of an augmented viewing of the physical environment, such that during the simultaneous presentation, the first extended reality appliance presents the first virtual object and the second virtual object in the physical environment, and the second extended reality appliance presents the second virtual object, omitting presentation of the first virtual object in compliance with the privacy settings.

By way of a non-limiting example, in FIG. 18, system 1800 includes at least one processing device (e.g., one or more of processing device 460 of FIG. 4 associated with wearable extended reality appliance 1512, first extended reality appliance 1802, and/or second extended reality appliance 1806, and/or remote processing unit 208). The at least one processing device may receive image data from image sensor 1514 associated with wearable extended reality appliance 1512. The image data may be reflective of physical environment 1500. The at least one processor may access data (e.g., from at least one memory device 411 of FIG. 4 and/or data structure 212 of FIG. 2) characterizing a plurality of virtual objects (e.g., virtual objects 1700, 1702, 1704, and 1706) for association with first location 1504 and second location 1506 in physical environment 1500. The data may represent at least first virtual object 1706 and second virtual object 1702. The at least one processor may access privacy settings classifying at least one of first virtual object 1706 and first location 1504 of first virtual object 1706 as private. The at least one processor may classify first extended reality appliance 1802 as approved for presentation of private information. The at least one processor may classify second extended reality appliance 1806 as non-approved for presentation of the private information. The at least one processor may simultaneously enable a presentation of an augmented viewing (e.g., first view 1804 via first extended reality appliance 1802 and second view 1808 via second extended reality appliance 1806) of physical environment 1500, such that during the simultaneous presentation, first extended reality appliance 1802 presents first virtual object 1706 and second virtual object 1702 in physical environment 1500, and second extended reality appliance 1806 presents second virtual object 1702, omitting presentation of first virtual object 1706 in compliance with the privacy settings.

A wearer of a wearable extended reality appliance may only be able to view extended reality objects and the physical environment (or a representation of the physical environment) where the wearer is located within a certain field of view. For example, the wearer's field of view may be limited to the field of view enabled by the wearable extended reality appliance. As another example, the wearer's field of view may extend to a limit of the wearer's field of view (i.e., the wearer's maximum possible field of view). However, the extended reality environment may include another extended reality object that is not within the wearer's current field of view. For example, an extended reality object may be behind the wearer such that the wearer cannot see the extended reality object based on the direction in which the wearer is looking (i.e., the extended reality object is outside the wearer's current field of view).

A viewer (e.g., a person not wearing the wearable extended reality appliance or the wearer at a later point in time) may be able to see parts of the extended reality environment not currently visible to the wearer. For example, the viewer may view the extended reality environment from a perspective facing the wearer of the wearable extended reality appliance and as such, the viewer may be able to see extended reality objects that the wearer cannot see.

As another example, if the wearer is playing a flight simulator game, the wearer will be in the position of a pilot of an airplane and the wearer's field of view (and also point of view) will be from the position of the pilot. If the wearer wants to later view the flight from a different point of view (e.g., from a point of view of a person outside the airplane), the flight simulator session may be recorded for later playback by the wearer or by another viewer. As another example, it may be possible for the other viewer to view the flight simulation from a different perspective (i.e., from outside the airplane) in real-time while the wearer is viewing the flight simulation from the position of the pilot.

As another example, viewers enjoy watching people play video games; for example, a first-person shooter style game. Consistent with the present disclosure, the wearer may be a person playing the first-person shooter game and the viewer may be a person watching the wearer play the game. As will be described herein, the viewer may be able to select a desired point of view to watch the wearer play the game. For example, the viewer may select between the wearer's point of view, a bird's-eye view of the extended reality environment where the wearer is, or a perspective view of the extended reality environment from a viewer-selected angle.

A non-transitory computer readable medium contains instructions that when executed by at least one processor cause the at least one processor to perform operations for capturing extended reality environments. The terms "non-transitory computer readable medium," "processor," and "extended reality environment are defined elsewhere in this disclosure. In some embodiments, the operations are part of a method for capturing extended reality environments. In some embodiments, the operations are performed by a system including at least one processing device configured to perform the method.

The at least one processor may include one or more of processing device 360, processing device 460, or processing device 560, either alone or working in combination based on a work-sharing arrangement. In some embodiments, the at least one processor may include any processor configured to execute computer programs, applications, methods, processes, or other software as described herein.

The term "capturing" may include viewing in real-time and/or recording for viewing at a later time. Viewing the extended reality environment in real-time may include viewing the extended reality environment while using a wearable extended reality appliance or by viewing the extended reality environment through an external device, such as a display located separate from the wearable extended reality appliance (e.g., display 352 of input unit 202) Similarly, viewing the extended reality environment at a later time may be done via the wearable extended reality appliance or through an external device. For example, the stored recording may be selected through a user interface element accessible via the wearable extended reality appliance or the external device. The recording of the extended reality environment may be stored locally on the wearable extended reality appliance (e.g., in memory device 411 or database 480) or stored externally on input unit 202 (e.g., in memory device 311 or database 380), on remote processing unit 208 (e.g., in memory device 511 or database 580), or on another external storage device (e.g., in a cloud computing environment) that may be accessible via communications network 214. The extended reality environment may be a completely simulated virtual environment or may be a combined real-and—virtual environment that a viewer may perceive from different perspectives, as will be described in detail below.

In some embodiments, the operations include receiving image data representing at least a 140 degrees field of view of a physical environment, the image data being received from at least one image sensor associated with a wearable extended reality appliance. The image data may represent any type of depiction in any form or format, including but not limited to grayscale images, color images, 2D images, 3D images, videos, 2D videos, 3D videos, frames, footages, data derived from other image data, and so forth. Examples of formats include GIF, JPEG, PNG, SVG, WebP, BMP, ICO, and TIFF.

The field of view may include a viewing area of a wearer of the wearable extended reality appliance, relative to where the wearer is looking. For example, a 140 degree field of view may represent a horizontal width of a human's field of vision from a center point based on where the wearer's eyes are focused (e.g., 70 degrees to the left and 70 degrees to the right of where the wearer's eyes are focused). As another example, the 140 degree field of view may represent a horizontal width of the field of view of the wearable extended reality appliance or of the image sensor. It is noted that other horizontal widths of the field of view are contemplated within the scope of this disclosure. For example, the horizontal width of the field of view may extend to 210 degrees, which may be a limit of human perception for the horizontal width of the field of view.

The physical environment includes a location where a wearer of the wearable extended reality appliance is present while wearing the wearable extended reality appliance. For example, the physical environment may include a room in which the wearer of the wearable extended reality appliance may be standing or sitting. As another example, the physical environment may include a portion of an outdoor location occupied by the wearer of the wearable extended reality appliance.

The at least one image sensor may include any device configured to capture visual information by converting light to image data, as described elsewhere in this disclosure. For example, the at least one image sensor may include a camera, a semiconductor Charge-Coupled Device (CCD), an active pixel sensor in Complementary Metal-Oxide-Semiconductor (CMOS), or an N-type metal-oxide-semiconductor (NMOS, Live MOS). The at least one image sensor may be associated with the wearable extended reality appliance such that the wearable extended reality appliance may receive image data from the at least one image sensor. The image sensor may be included in the wearable extended reality appliance, included in another wearable device associated with the wearable extended reality appliance and configured to transmit image data to the wearable extended reality appliance, included in an input device associated with the wearable extended reality appliance and configured to transmit image data to the wearable extended reality appliance, or located in a different device (e.g., input device 202 or other device) in an environment of the wearer such as the different device being located in the physical environment where the wearer is located.

In some embodiments, the at least one image sensor includes a plurality of image sensors. The plurality of image sensors may be associated with the wearable extended reality appliance in a similar manner as described above. The plurality of image sensors may each be a same type of image sensor or may be different types of image sensor.

In some embodiments, the at least one image sensor includes a single image sensor configured to sequentially capture differing portions of the field of view. For example, the singe image sensor may capture different images of the field of view as the wearer moves in the physical environment, such as by the wearer turning their head or by moving within the physical environment. For example, if the width of the field of view is 140 degrees about a point of focus (e.g., extending from 70 degrees to the wearer's left of the point of focus to 70 degrees to the wearer's right of the point of focus), then as the wearer turns their head, the point of focus shifts in the direction that the wearer turns their head, thus sequentially capturing differing portions of the field of view.

The wearable extended reality appliance may include any type of device or system that enables a user to perceive and/or interact with an extended reality environment. For example, the wearable extended reality appliance may include a head-mounted device, smart glasses, smart contact lenses, headsets, or any other device worn by a human for purposes of presenting an extended reality environment to the human.

Figure 26:
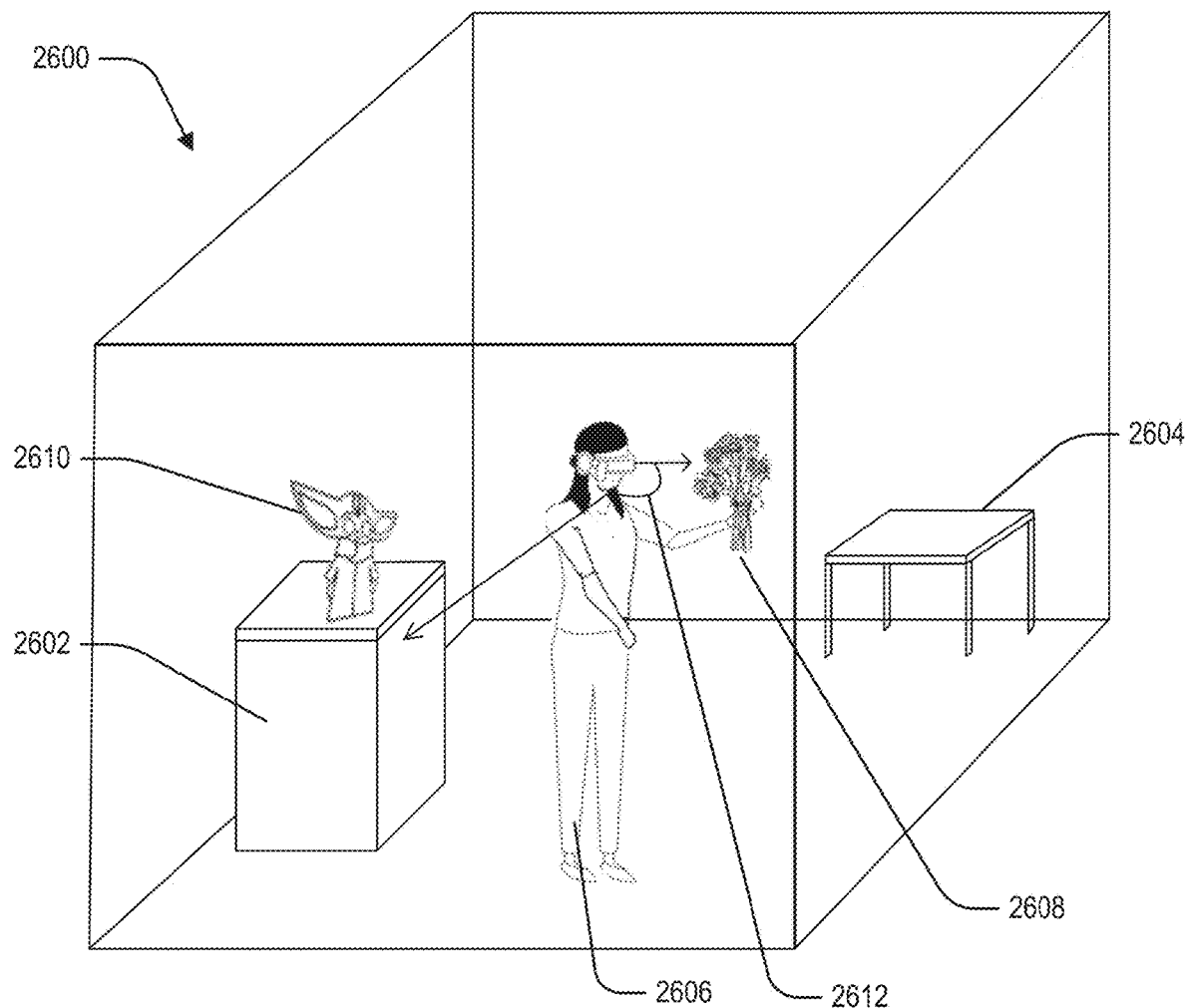
FIG. 26 is an exemplary perspective view showing a wearer of a wearable extended reality appliance in a physical environment, consistent with some embodiments of the present disclosure.

In some embodiments, the operations include virtually associating at least two extended reality objects with a composite perspective of the physical environment, wherein the at least two extended reality objects are spaced apart by at least 140 degrees from a point of view of the wearable extended reality appliance. An extended reality object may include a virtual object, as defined elsewhere in this disclosure, or a physical object rendered in the extended reality environment. The extended reality object may be present in the extended reality environment such that the wearer of the wearable extended reality appliance may view and/or interact with the extended reality object. The term "virtually associating" the extended reality objects with the physical environment means rendering the extended reality objects in the extended reality environment such that the viewer (either the wearer of the wearable extended reality appliance or another viewer) is permitted to view the extended reality objects as if those objects were located in the physical environment. For example, as shown in FIG. 26 and described further below, second extended reality object 2610 may be positioned in the extended reality environment to appear on top of cabinet 2602. In some examples, the received image data of the physical environment may be analyzed to associate the at least two extended reality objects with the composite perspective of the physical environment. For example, the image data may be analyzed using an object detection algorithm to detect positions of physical objects in the physical environment, and each extended reality object may be associated with a position in the physical environment and/or in the composite perspective of the physical environment based on the position of at least one physical object in the physical environment. In another example, the image data may be analyzed using a classification algorithm and/or a scene recognition algorithm to determine a type associated with the physical environment, and the at least two extended reality objects may be selected of a plurality of alternative extended reality objects based on the determined type. In some examples, the composite perspective of the physical environment may be analyzed to associate the at least two extended reality objects with the composite perspective of the physical environment. For example, the composite perspective of the physical environment may be analyzed using an object detection algorithm to detect positions of physical objects in the physical environment and/or in the composite perspective of the physical environment, and each extended reality object may be associated with a position in the physical environment and/or in the composite perspective of the physical environment based on the position of at least one physical object. In another example, the composite perspective of the physical environment may be analyzed using a classification algorithm and/or a scene recognition algorithm to determine a type associated with the physical environment, and the at least two extended reality objects may be selected of a plurality of alternative extended reality objects based on the determined type. In some examples, the received image data of the physical environment and/or the composite perspective of the physical environment may be analyzed using a machine learning model to associate the at least two extended reality objects with the composite perspective of the physical environment. For example, such machine learning model may be a result of training a machine learning algorithm with training examples. An example of such training example may include a sample image of a sample physical environment, together with a label indicating a sample association of sample extended reality objects with a sample composite perspective of the sample physical environment. Another example of such training example may include a sample composite perspective of a sample physical environment, together with a label indicating a sample association of sample extended reality objects with the sample composite perspective of the sample physical environment.

The term "composite perspective of the physical environment" may include real-time images of the physical environment; previously captured images of the physical environment; artificially generated images of a least a portion of the physical environment (as will be described below); or a combination thereof.

FIG. 26 is an exemplary perspective view showing a wearer of a wearable extended reality appliance in a physical environment 2600 and two extended reality objects, consistent with some embodiments of the present disclosure. Physical environment 2600 may include physical objects, such as a cabinet 2602 and a table 2604. A wearer 2606 wearing the wearable extended reality appliance is standing in physical environment 2600.

Wearer 2606 may hold a first extended reality object 2608, shown in FIG. 26 as a bouquet of flowers. A second extended reality object 2610 may be positioned to appear on top of cabinet 2602, shown in FIG. 26 as an animated figure. The positioning of the first extended reality object 2608 (appearing in the wearer's hand) and the second extended reality object 2610 may be such that a field of view 2612 of wearer 2606 may not be wide enough for wearer 2606 to be able to see both first extended reality object 2608 and second extended reality object 2610. In some embodiments, wearer 2606 may be able to see second extended reality object 2610 if second extended reality object 2610 is within field of view 2612. For example, as shown in FIG. 26, if wearer 2606 turns far enough to their right, second extended reality object 2610 would be within field of view 2612.

In some embodiments, the operations further include constructing the composite perspective of the physical environment from image data captured by the plurality of image sensors. The plurality of image sensors may be located on the wearable extended reality appliance, in the physical environment separate from the wearable extended reality appliance, in another physical environment, or a combination thereof. For example, if a plurality of image sensors are used to receive the image data, the composite perspective of the physical environment may be constructed from image data captured from each of the plurality of image sensors. For example, each of the plurality of image sensors may capture a different portion of the physical environment and the composite perspective may be constructed by combining the images of the different portions of the physical environment together. The images may be combined using any known image processing technique to combine images, such as blending, merging, gradient blending, compositing, stitching, Simultaneous Localization And Mapping algorithm (SLAM), or other technique.

In some embodiments, the operations further include constructing the composite perspective of the physical environment from the sequentially captured differing portions of the field of view. For example, if there is a single or multiple image sensors configured to sequentially capture differing portions of the field of view (as described elsewhere in this disclosure), the composite perspective may be constructed from those sequentially captured images. The images may be combined using any known image processing technique to combine images, such as blending, merging, gradient blending, compositing, stitching, or other technique.

The at least two extended reality objects may be spaced apart by different amounts (e.g., more or less than 140 degrees), as long as from the wearer's perspective, at least one of the extended reality objects cannot be seen by the wearer. For example, a first extended reality object may be in front of the wearer such that the wearer can see the first extended reality object and a second extended reality object may be behind the wearer (or otherwise positioned outside the wearer's field of view) such that the wearer cannot see the second extended reality object.

The at least two extended reality objects may be virtually associated with the composite perspective of the physical environment by blending the images of the extended reality objects with images of the physical environment. The blending may be performed using known image blending or combining techniques, such as blending, merging, gradient blending, compositing, or other technique.

The point of view of the wearable extended reality appliance may be based on a center point of where the wearer's eyes are focused. For example, if based on an overhead view, the wearer's focus is at 90 degrees (i.e., the point of view of the wearer is 90 degrees), then the field of view may extend 70 degrees to the left of the wearer (i.e., to 20 degrees) and 70 degrees to the right of the wearer (i.e., to 160 degrees).

In some embodiments, the virtual location of the at least two extended reality objects in locations spaced apart by more than 140 degrees prevents simultaneous viewing of the at least two extended reality objects by a wearer of the wearable extended reality appliance from the point of view of the wearable extended reality appliance. For example, the value of 140 degrees may represent a maximum width of a field of view of the wearer of the wearable extended reality appliance. In some embodiments, this value may be adjustable by a user setting (e.g., a user setting selectable via a user interface element). For example, the wearer may select a different value (e.g., smaller than 140 degrees) up to a maximum value permitted by the wearable extended reality appliance (e.g., 140 degrees).

In some embodiments, the width of the field of view may vary depending on the technical specifications of the wearable extended reality appliance. For example, different models or versions of the wearable extended reality appliance may have different widths of the field of view (i.e., narrower than 140 degrees or wider than 140 degrees). In either circumstance where the width of the field of view is changed, the at least two extended reality objects when separated by more than the width of the field of view would not be visible to the wearer from the point of view of the wearable extended reality appliance.

For example, consider a situation where a first extended reality object (e.g., a ball) is located at an angle of −80 degrees from the point of focus of the wearer of the wearable extended reality appliance and a second extended reality object (e.g., a picture) is located at an angle of +85 degrees from the point of focus of the wearer of the wearable extended reality appliance. The angular span between the two extended reality objects in this case would be 165 degrees and because the angular span is greater than 140 degrees (i.e., greater than the field of view of the wearable extended reality appliance), the wearer may not be able to see either of the two extended reality objects. As another example, assume that the second extended reality object (the picture) is now at +65 degrees from the point of focus of the wearer of the wearable extended reality appliance. In this example, the wearer can see the picture because the picture is now within the field of view (i.e., less than +70 degrees from the point of focus) but cannot see the ball because the angular span between two extended reality objects is 145 degrees, which is greater than the 140 degree field of view.

In some embodiments, the operations include displaying, via the wearable extended reality appliance and during a particular time period, changes in one of the at least two extended reality objects while refraining from displaying changes in another of the at least two extended reality objects. The extended reality objects may be displayed to the wearer of the wearable extended reality appliance as described herein.

For example, assume there are two extended reality objects: a first extended reality object that is viewable by the wearer and a second extended reality object that is not viewable by the wearer (e.g., the second extended reality object is outside the wearer's field of view). It is noted that there may be multiple extended reality objects that the wearer can see based on the wearer's point of view and multiple extended reality objects that the wearer cannot see based on the wearer's point of view. For purposes of explanation only, it is assumed that there are only two extended reality objects, and that the wearer can see the first extended reality object and cannot see the second extended reality object.

Because the wearer can only see the first extended reality object, only changes in the first extended reality object are displayed to the wearer. A change in the first extended reality object may include any type of visible change to the first extended reality object, such as a change in viewing angle (e.g., caused by the wearer manipulating the first extended reality object or by the first extended reality object moving by itself) or a change in a property of the first extended reality object (e.g., a change in shape, size, color, opacity, object orientation, or the like). Even though changes in the second extended reality object (e.g., visible changes similar in scope to changes in the first extended reality object) may be occurring at the same time as changes in the first extended reality object, the changes to the second extended reality object would not be visible to the wearer. However, changes to the second extended reality object may be visible to a viewer (e.g., a non-wearer) either from a different perspective or at a different point in time, as will be explained below.

The term "a particular time period" refers to a period of time during which the wearer is looking at the first extended reality object. The particular time period may be any length of time during which the wearer can see the first extended reality object and cannot see the second extended reality object, based on the point of view of the wearable extended reality appliance.

Figure 27:
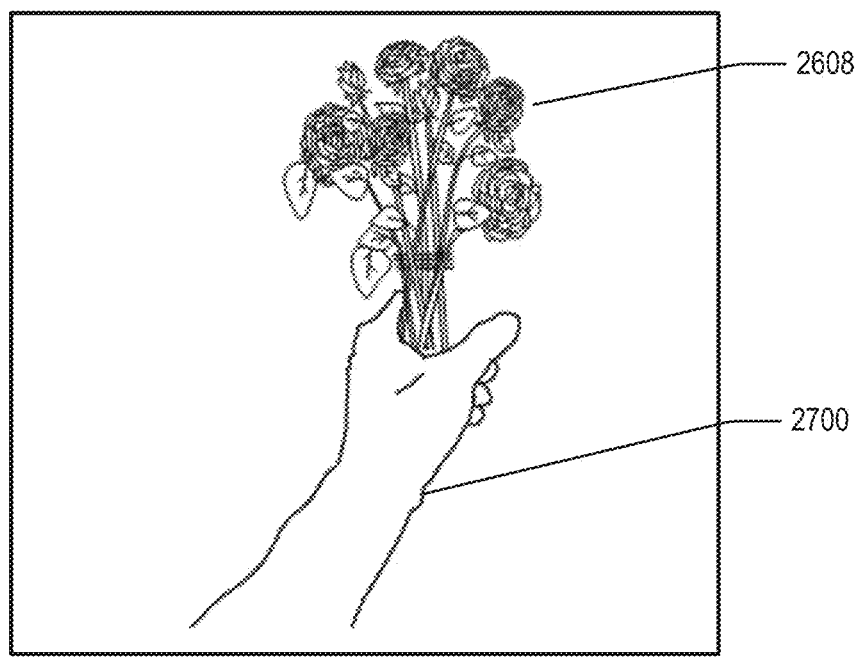
FIG. 27 is an exemplary view of an extended reality object from the perspective of the wearer of the wearable extended reality appliance in FIG. 26.

FIG. 27 is an exemplary view of an extended reality object from the perspective of the wearer of the wearable extended reality appliance, consistent with some embodiments of the present disclosure. As shown in FIG. 27, the wearer of the wearable extended reality appliance may see a virtual representation of the wearer's arm 2700 holding first extended reality object 2608. From this perspective, the wearer of the wearable extended reality appliance may manipulate first extended reality object 2608, for example, by moving it or by changing settings (e.g., color, size, and the like) associated with first extended reality object 2608. For example, the settings may be changed by the wearer making a gesture, saying a command, or accessing a user interface element associated with the wearable extended reality appliance.

It is noted that while the wearer is manipulating first extended reality object 2608, second extended reality object 2610 may also be changing at the same time. For example, second extended reality object 2610 may be moving. But because second extended reality object 2610 is outside the wearer's field of view (with respect to the wearer's point of focus shown in FIG. 27), the wearer cannot see the changes to second extended reality object 2610. Based on the wearer's point of focus as shown in FIG. 27, the wearer is only able to see first extended reality object 2608.

In some embodiments, the composite perspective of the physical environment is based on image data captured prior to the particular time period. As discussed above, the particular time period refers to a period of time during which the wearer is looking at the first extended reality object. For example, the composite perspective of the physical environment may be based on image data that was captured when the wearer activated the wearable extended reality appliance. As another example, the image data may have been captured at an earlier point in time (i.e., prior to the particular time period) and stored in a storage, such as a memory or other storage in the wearable extended reality appliance, a memory or other storage in a device (e.g., input unit 202) associated with the wearable extended reality appliance, or a remote storage (e.g., a cloud-based storage). In this example, the stored image data may be retrieved by the wearable extended reality appliance and the composite perspective of the physical environment may be generated based on the stored image data.

In some embodiments, the operations further include updating the composite perspective of the physical environment based on image data captured during the particular time period. For example, if the composite perspective is based on image data captured prior to the particular time period, the composite perspective may be updated with current image data captured during the particular time period. For example, the image data may include time information about when the image data was captured (e.g., a timestamp or other time indicator). If the particular time period is more than a threshold amount of time (e.g., one hour, one day, one week, or other amount of time) later than the timestamp, the composite perspective may be updated with image data captured during the particular time period (i.e., the period of time during which the wearer is looking at the first extended reality object). The composite perspective may be updated with image data captured during the particular time period to accurately reflect a current state of the physical environment (i.e., the state of the physical environment in real-time while the wearer is viewing the physical environment).

For example, prior to the particular time period, objects in the physical environment may be in a first location and in the particular time period, objects in the physical environment may have been added, moved, or removed from the prior point in time. For example, assume that FIG. 26 represents a prior point in time (i.e., before the particular time period). At the prior point in time, wearer 2606 is facing a wall of physical environment 2600 and table 2604 appears to the wearer's left. Depending on the wearer's point of focus, table 2604 may be within the wearer's field of view. During the particular time period (i.e., a later point in time than that shown in FIG. 26), table 2604 is moved to a different location in physical environment 2600 (e.g., next to cabinet 2602). The composite perspective may then be updated to reflect the current location of table 2604. Again, depending on the wearer's point of focus, table 2604 may be within the wearer's field of view.

In some embodiments, the operations include enabling non-synchronous display of concurrent changes in the at least two extended reality objects that took place during the particular time period. The term "non-synchronous display" means that the concurrent changes in the at least two extended reality objects are not displayed at the same time. The non-synchronous display may include a playback of the particular time period at a later point in time by the wearer or another viewer, or a real-time viewing during the particular time period by another viewer (e.g., a non-wearer). For example, the other viewer may view the extended reality environment from a different angle or point of view, as will be described below.

As an example, during a session, the wearer of the extended reality appliance can only see extended reality objects within the field of view of the wearable extended reality appliance (e.g., a field of view with a width of 140 degrees). However, other extended reality objects that the wearer cannot see (given the wearer's point of view and the width of the field of view) may be present in the extended reality environment and may be changing at the same time. By viewing the extended reality environment from a different perspective than that of the wearer (e.g., by the wearer reviewing the session at a later time or by a non-wearer viewer selecting a different point of view, as will be described below), extended reality objects that are not displayed to the wearer may be displayed to the viewer (i.e., the non-synchronous display).

In some embodiments, the operations further include using the composite perspective to generate a representation of the physical environment during the particular time period. The term "representation of the physical environment" includes, for example, a graphical rendering of the physical environment in the extended reality environment such that the wearer of the extended reality appliance may see the physical environment. The composite perspective (which is based on image data of the physical environment) may be used to generate (i.e., graphically render) the representation of the physical environment by the wearable extended reality appliance. For example, the representation of the physical environment may be displayed to the wearer of the wearable extended reality appliance in a situation in which the wearable extended reality appliance does not include a see-through lens or lenses such that the wearer cannot directly view the physical environment.

In some embodiments, the wearable extended reality appliance may include a see-through lens such that the wearer can directly view the physical environment and the extended reality objects may be projected onto the lens as described herein. In some embodiments, the lens of the wearable extended reality appliance may be opaque such that the wearer cannot directly view the physical environment and the representation of the physical environment may be rendered and projected onto the lens as described herein.

Figure 28:
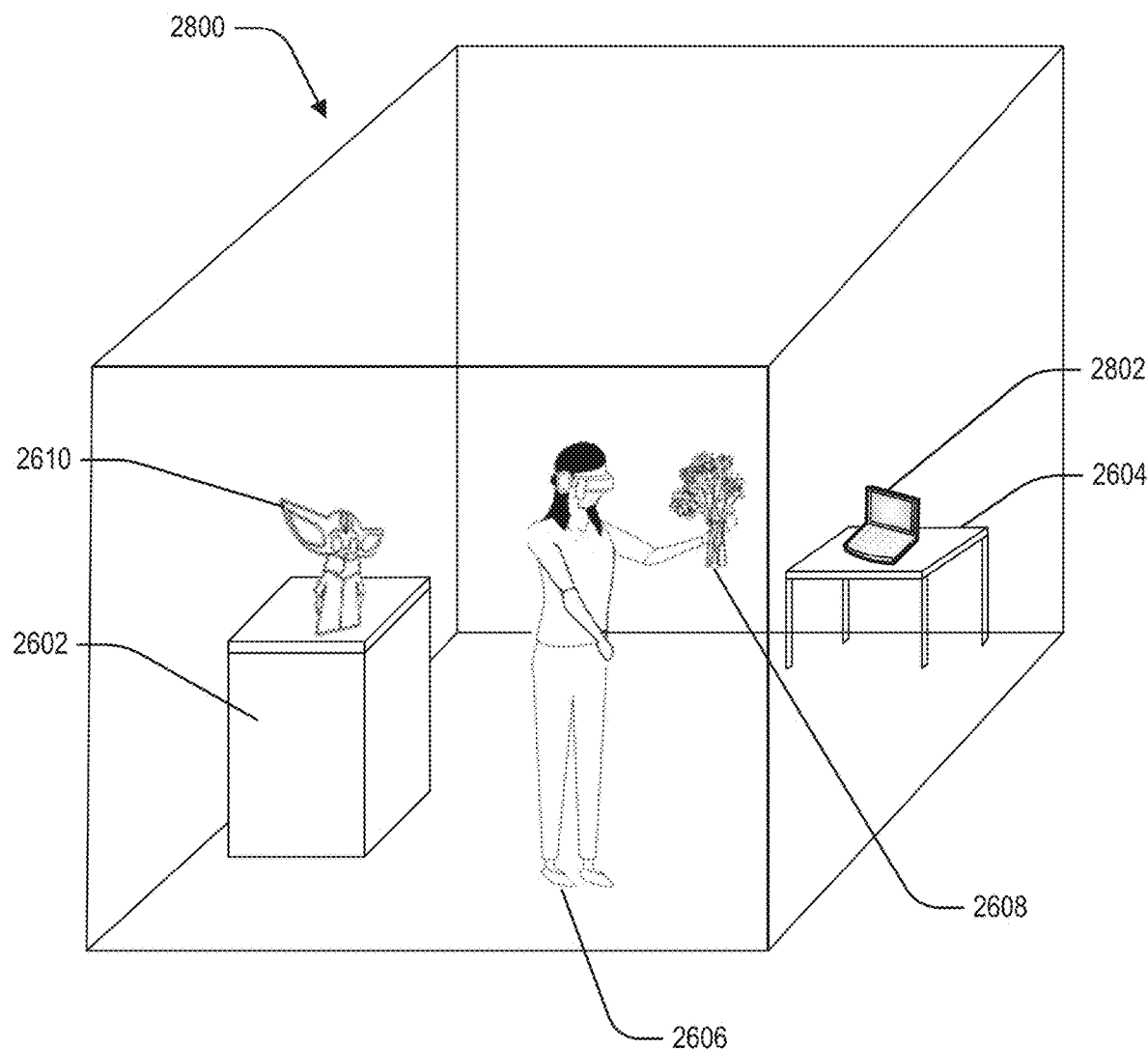
FIG. 28 is another exemplary perspective view showing the wearer of the wearable extended reality appliance in the physical environment of FIG. 26.

In some embodiments, the non-synchronous display includes a presentation of the representation of the physical environment. By presenting a representation of the physical environment in connection with the extended reality objects, a viewer (either a wearer of the wearable extended reality appliance or a non-wearer) may be able to see how the extended reality objects relate to objects in the physical environment. For example, if an extended reality object is presented in the extended reality environment as being located on a physical object (such as second extended reality object 2610 being presented on cabinet 2602 as shown in FIGS. 26 and 28), presenting the physical environment (i.e., cabinet 2602) enables the viewer to see both the physical object and the extended reality object. Continuing this example, if the physical environment was not presented to the viewer, the extended reality object would appear to be floating in the air.

In some embodiments, a portion of the representation of the physical environment is generated artificially based on the captured image data. For example, if the captured image data does not include image data from the entire physical environment, the portion of the physical environment not represented in the captured image data may be artificially generated. As one example, the captured image data may include images representing a 350 degrees view out of a 360 degree view of the physical environment. The missing 10 degrees of the view may be artificially generated to complete the 360 degree view of the physical environment. In some embodiments, a machine learning algorithm may be used to generate the missing portion of the physical environment to "fill in" the image data (e.g., image imputation) such that a complete representation of the physical environment may be generated. For example, the missing part may be a wall and the machine learning algorithm will complete the pattern of the wall. In some cases, the machine learning algorithm may be trained on images of the physical environment (e.g., images including the 350 degree view, the missing 10 degree view, and the complete 360 degree view), the input to the machine learning algorithm may include the image(s) constituting the 350 degrees of view and the output of the machine learning algorithm may include the "missing" 10 degrees of view not covered by the image(s). It is noted that image data including 350 degrees of view and missing 10 degrees of view is one example combination of image data present and image data missing. Other combinations of image data present (e.g., 300 degrees, 270 degrees, etc.) and image data missing (e.g., 60 degrees, 90 degrees) are also contemplated. For example, a k-Nearest Neighbors (kNN) algorithm, a Generative Adversarial Network (GAN), or other machine learning algorithm may be used to generate the missing portion of the image data.

In some embodiments, the portion of the representation artificially generated has display parameters different from display parameters of other portions of the representation associated with regions of the physical environment that were captured by the at least one image sensor. The term "display parameters" refers to characteristics of how the display is presented to a viewer. The display parameters may be predetermined by the display device (e.g., the wearable extended reality appliance or an external display) or may be adjusted by the viewer (e.g., by a user interface configured to receive viewer input to control the display). The display parameters may include, but are not limited to, size, screen position, brightness, contrast, color, and opacity. In some embodiments, one or more display parameters may be grouped together in a "display mode" which may be selected by the viewer and the display parameters for the selected display mode are automatically adjusted. For example, display modes may include, but are not limited to, "standard," "movie," or "game." For example, the artificially generated portion of the representation may have a lower opacity or different colors than the other portions of the representation based on the captured image data.

In some embodiments, at differing times during the particular time period, differing portions of the representation are artificially generated. For example, during the particular time period (i.e., the period of time during which the wearer is looking an extended reality object), the wearer may interact with the extended reality object (e.g., moving the object in the extended reality environment, changing a size of the object, or changing an opacity setting of the object) such that different portions of the physical environment may be visible before and after the interaction. For example, assume that an extended reality object is in a first location at a first time. The wearer moves the extended reality object at a second time from the first location to a second location to the right of the first location (the first time and the second time are both within the particular time period). A portion of the physical environment in the first location at the first time that may have been partially or fully obscured by the extended reality object may be visible at the second time. So as to not display a blank space where the extended reality object was previously located, the portion of the physical representation in the first location that is visible at the second time may be artificially generated. The artificially generated portion of the representation may be generated in a similar manner as described in connection with artificially generating missing image data.

In some embodiments, the operations further include analyzing the image data to identify a private portion of the physical environment and a public portion of the physical environment. As will be described in further detail below, a "private portion" of the physical environment may be hidden from a viewer not present in the physical environment and a "public portion" of the physical environment may be displayed to a viewer not present in the physical environment. For example, portion of the physical environment may be "identified" as either private or public by using an identifier associated with the portion of the physical environment, as will be described further below. As another example, image data that depicts a portion of the physical environment may include a field or other identifier (e.g., a flag) to indicate whether the portion of the physical environment shown in the image is private or public. In some examples, a machine learning model may be trained using training examples to identify private portions and public portions of physical environments from images and/or videos. An example of such a training example may include a sample image of a sample physical environment, together with a label indicating that a first portion of the sample physical environment is private and/or that a second portion of the sample physical environment is public. The trained machine learning model may be used to analyze the image data to identify the private portion of the physical environment and/or the public portion of the physical environment. In some examples, a convolution of at least part of the image data may be calculated to obtain a result value. Further, the identification of the private portion of the physical environment and/or the public portion of the physical environment may be based on the result value. For example, when the result value is a first numerical value, a first portion of the physical environment may be identified as private, and/or when the result value is a second numerical value, the first portion of the physical environment may be identified as public.

It is noted that a viewer that is present in the physical environment will be able to see all objects present in the physical environment if the wearable extended reality appliance has a see-through lens or if the viewer removes the wearable extended reality appliance. If the wearable extended reality appliance worn by a viewer present in the physical environment does not have a see-through lens, then the viewer may not be able to see the "private portion" of the physical environment, which may be determined by a setting accessible via a user interface of the wearable extended reality appliance or may be set by a person or entity in control of the physical environment. For example, the wearer may be in a room in their home and may not want certain objects in the physical environment (e.g., a table or one or more items on the table) to be visible in the representation of the physical environment that may be visible to non-wearer viewers that are not also present in the room. An object in the physical environment or a portion of the physical environment may be designated as "private" based on user configuration.

For example, the wearer may designate an object as "private" by associating a physical tag to the object. For example, the physical tag may broadcast an identifier (e.g., a radio frequency beacon or other wireless signal) that indicates that the object associated with the physical tag is "private." As another example, the physical tag may have a predetermined color, shape, or combination of color and shape such that when the predetermined color and/or shape is identified in an image including the object, the object is identified as "private." The physical tag may include a visual tag, a radio frequency identification tag, or the like. The physical tag may be associated with the physical object may attaching the tag to the object (e.g., fastening the tag to the object, such as with a string, a cord, an adhesive, a nail, a screw, a hook and loop arrangement, or other fastener) or by placing the physical tag on the object (e.g., placing the physical tag on a table surface).

As another example, a portion of the physical environment may be designated as "private" based on positioning data identifying the portion of the physical environment. For example, if the physical environment is a square room, one corner of the room (e.g., the upper left corner as determined from an overhead view) may be designated as "private" and any object location in the upper left corner of the room may also be designated as "private" based on the object being positioned in the "private" portion of the room. As another example, an object or portion of the physical environment may be designated as "private" based on a graphical representation of the physical environment and by interacting with a user interface (e.g., by clicking on the object or portion of the physical environment, by drawing a line or other geometric shape around the object or portion of the physical environment, or by another user interface element that permits the user to select one or more items).

In a similar manner, the wearer may designate one or more objects or portions of the physical environment as "public," such that any object or portion of the physical environment designated as "public" is visible to non-wearer viewers.

In some embodiments, the operations comprise including the public portion of the physical environment in the representation of the physical environment while excluding the private portion of the physical environment from the representation of the physical environment. The term "include in the representation of the physical environment" means that any portion to be included will be displayed in the representation of the physical environment. The term "exclude from the representation of the physical environment" means that any portion to be excluded will not be displayed in the representation of the physical environment. If an object is excluded from the representation of the physical environment, the background of the physical environment behind the excluded object may still be displayed. If an area of the physical environment is excluded from the representation of the physical environment, the area may be artificially generated (in a similar manner as described elsewhere in this disclosure) using image data from areas adjacent to the area excluded. By artificially generating the private area excluded from the representation of the physical environment, it may appear to the viewer that the physical environment is complete (i.e., a blank spot is not displayed where the private area is located). For example, any portion of the physical environment that is designated as "public" may be included in the representation of the physical environment. As another example, any portion of the physical environment that is not designated as "private" may be included in the representation of the physical environment (i.e., any portion of the physical environment that is not designated as "private" may be assumed to be "public").

As another example, any portion of the physical environment that is designated as "private" may be excluded from the representation of the physical environment (e.g., to persons not authorized for viewing the private information). As another example, any portion of the physical environment that is not designated as "public" may be excluded from the representation of the physical environment (i.e., any portion of the physical environment that is not designated as "public" may be assumed to be "private").

In some embodiments, one or more extended reality objects may be designated as "private" such that those extended reality objects may not be visible to non-wearer viewers (or not visible to others who lack permission to view the private information). For example, an extended reality object may be designated as "private" based on user configuration. For example, the wearer may digitally tag or identify an extended reality object as private. This indication may be stored in a data structure of the extended reality object as a field, a flag, or other identifier.

In some embodiments, the extended reality object may be designated as "private" based on a location in the physical environment associated with the extended reality object. For example, if the extended reality object is a vase and the vase is located on a table in the physical environment that is designated as "private" (as described above), then the vase may automatically be designated as "private" based on its association with the "private" table. As another example, if the extended reality object is located in a portion of the physical environment designated as "private," when the object is placed or moved to the designated portion of the physical environment, the object may be automatically designated as "private."

FIG. 28 is an exemplary perspective view showing the wearer of the wearable extended reality appliance in the physical environment, two extended reality objects, and a private portion of the physical environment, consistent with some embodiments of the present disclosure. Physical environment 2800 includes cabinet 2602 and table 2604. Similar to FIG. 26, wearer 2606 is holding first extended reality object 2608, shown in FIG. 28 as a bouquet of flowers. Second extended reality object 2610 is positioned to appear on top of cabinet 2602, shown in FIG. 28 as an animated figure.

As shown in FIG. 28, a laptop computer 2802 is located on table 2604 in the physical environment. Consistent with the embodiments described herein, table 2604 may be designated as a "public" object such that table 2604 is visible to the wearer and a non-wearer viewer. As previously described in this disclosure, a non-wearer viewer may include a viewer of the extended reality environment at a later point in time than the wearer or a viewer using a device (e.g., a different wearable extended reality appliance or other display) to view the extended reality environment in real-time along with the wearer. The non-wearer viewer may be physically located in the physical environment with the wearer or in a physical location separate from the physical environment. Laptop computer 2802 may be designated as a "private" object such that wearer 2606 and the viewer cannot see laptop computer 2802 in the extended reality environment. In some embodiments, wearer 2606 may be able to see laptop computer 2802 (because it is wearer 2606 who designated laptop computer 2802 as "private"), while the viewer cannot see laptop computer 2802.

As another example, table 2604 may be designated as a "private" object and any object placed on table 2604 (e.g., laptop computer 2802) may, by association with table 2604, automatically be designated as a "private" object without further action needed from wearer 2606. In such circumstances, neither laptop computer 2802 nor table 2604 may be visible in the extended reality environment. For example, the non-wearer viewer will not be able to see either laptop computer 2802 or table 2604. As another example, if the wearable extended reality appliance worn by the wearer does not include a see-through lens, the wearer may also not be able to see either laptop computer 2802 or table 2604.

In some embodiments, the non-synchronous display includes a virtual representation of at least one of a wearer of the wearable extended reality appliance or the wearable extended reality appliance. The virtual representation of the wearer or the wearable extended reality appliance may include a graphical rendering of the wearer or the wearable extended reality appliance to be displayed in the extended reality environment. For example, from the point of view of a viewer (i.e., a non-wearer viewing the extended reality environment by using a different wearable extended reality appliance or an external display), a virtual representation of the wearer may be rendered in the extended reality environment and shown on the different wearable extended reality appliance or the external display such that the viewer may see a complete representation of the extended reality environment including the wearer and any actions taken by the wearer. As another example, a virtual representation of the wearable extended reality appliance may be rendered, instead of the wearer. As another example, a virtual representation of the wearer wearing the wearable extended reality appliance may be rendered. In some embodiments, a choice of whether to view the wearer, the wearable extended reality appliance, or both may be made by the wearer or by the viewer. For example, the choice may be made by a user interface element accessible by the wearer or the viewer. In some embodiments, if the choice is made by the wearer, the viewer may not be able to override that choice (i.e., the wearer's choice takes precedence over the viewer's choice).

Figure 29:
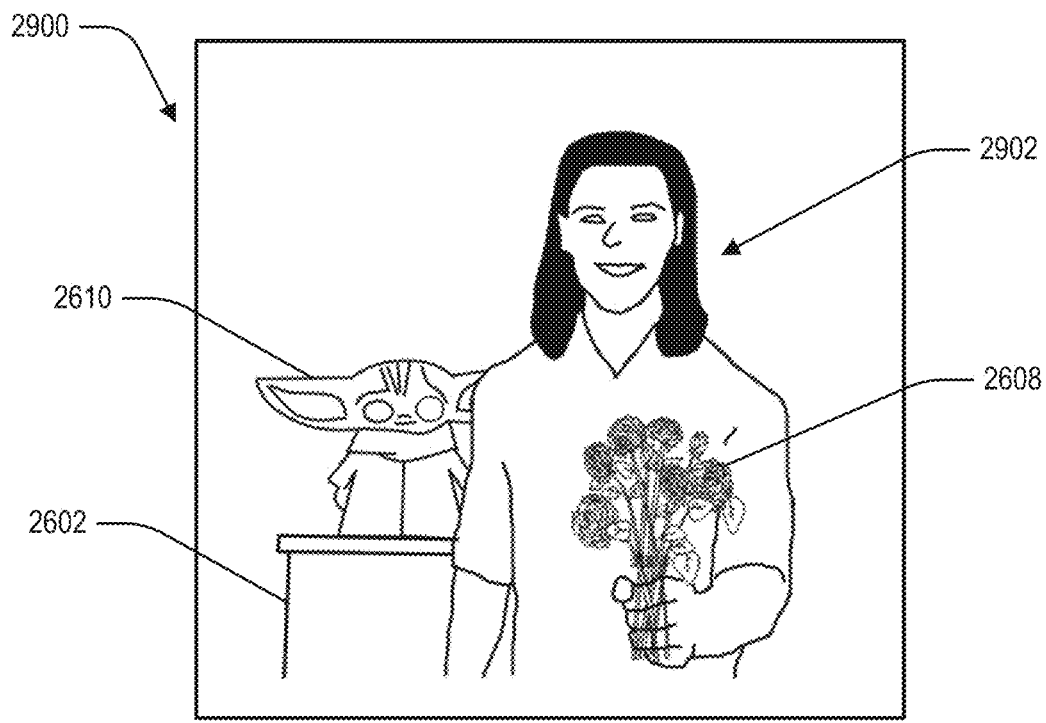
FIG. 29 is an exemplary image of the physical environment of FIG. 26 as seen from the perspective of a viewer.

FIG. 29 is an exemplary composite image of the physical environment, a virtual representation of the wearer of the wearable extended reality appliance, and two extended reality objects, as seen from the perspective of a viewer, consistent with some embodiments of the present disclosure.

Composite image 2900 may include a virtual representation of the wearer 2902 of the wearable extended reality appliance. The viewer may be able to see virtual representation of the wearer 2902, the wearer holding first extended reality object 2608, and cabinet 2602 with second extended reality object 2610 positioned on top of cabinet 2602. From this perspective, the viewer may be able to simultaneously see changes to both first extended reality object 2608 and second extended reality object 2610 (if changes to both objects are simultaneously occurring). For example, the flowers (first extended reality object 2608) may change color while the animated figure (second extended reality object 2610) is dancing.

In some embodiments, the non-synchronous display includes a bird's-eye view of an extended reality environment including the at least two extended reality objects overlying the composite perspective of the physical environment. For example, the bird's-eye view provides a view from a high angle, such as an angled view (i.e., from a steep angle) or an overhead view, of the composite perspective of the physical environment (as described elsewhere in this disclosure) and includes the extended reality objects and in their location in the extended reality environment. The bird's-eye view may be generated using known image processing techniques, such as warp perspective mapping or inverse perspective mapping. In some embodiments, the bird's-eye view may also include an overhead rendering of the wearer. For example, the wearer's position in the physical environment may be determined using a position sensor as described herein.

Figure 30:
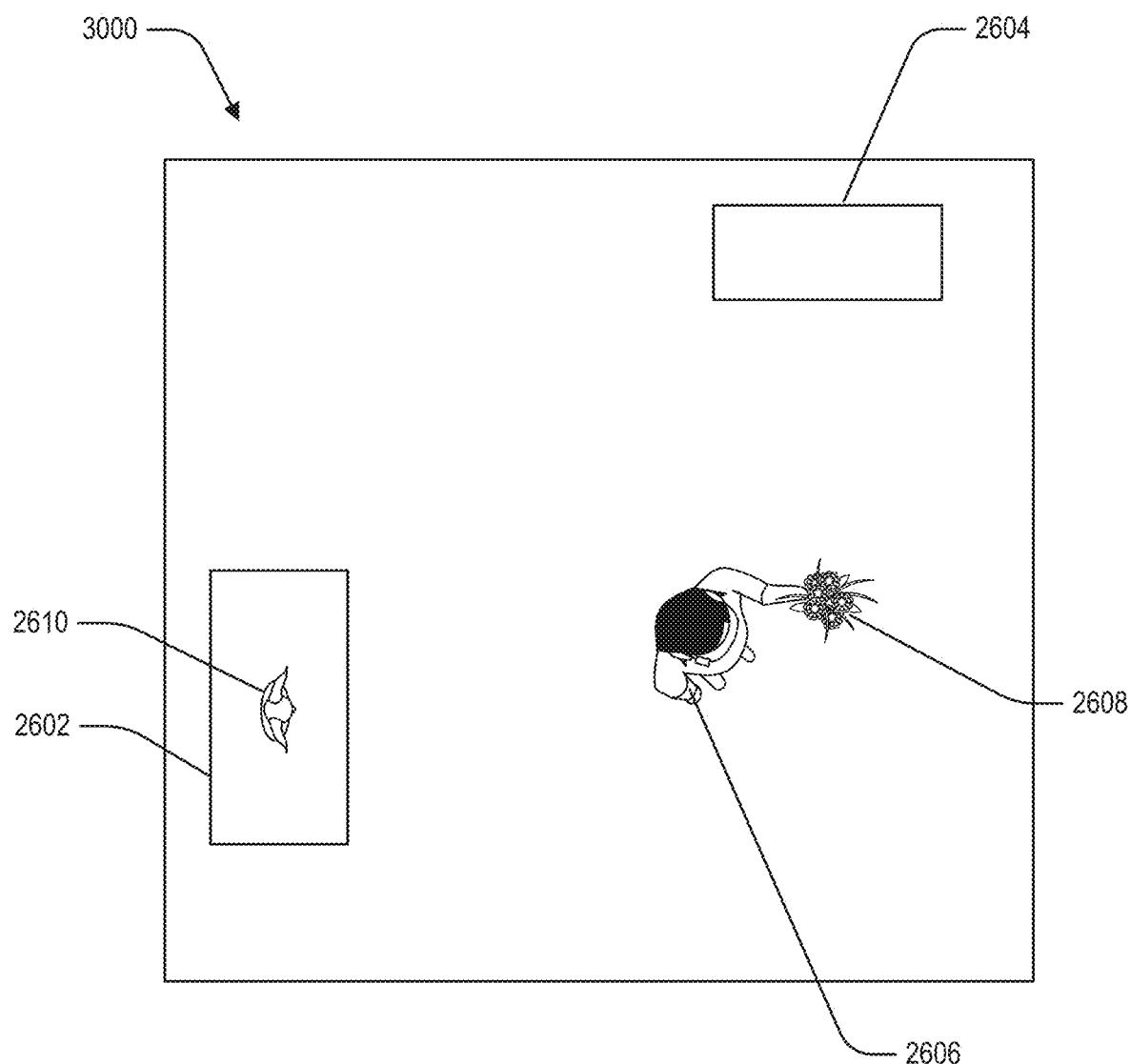
FIG. 30 is an exemplary bird's-eye view of the physical environment of FIG. 26.

FIG. 30 is an exemplary bird's-eye view of a physical environment, the wearer of the wearable extended reality appliance, and two extended reality objects, consistent with some embodiments of the present disclosure. From the bird's-eye view of physical environment 3000, the viewer may see wearer 2606 holding first extended reality object 2608, table 2604, and cabinet 2602 with second extended reality object 2610 positioned on cabinet 2602. From this perspective, the viewer may also see any movements made by wearer 2606, any changes to first extended reality object 2608, and any changes to second extended reality object 2610.

In some embodiments, enabling the non-synchronous display includes enabling a viewer to toggle between viewing only a representation of the physical environment, viewing only an extended reality environment including the at least two extended reality objects, or viewing a representation of both the physical environment and the extended reality environment. In some embodiments, the viewer may toggle (i.e., select) the view by using a user interface element. The user interface element may include buttons, radio buttons, checkboxes, sliders, menus, scrollbars, knobs, dials, meters, and or any other user interface element configured to permit a user to select one of several options. For example, FIG. 31 shows an example user interface element for selecting between the different views.

Figure 31:
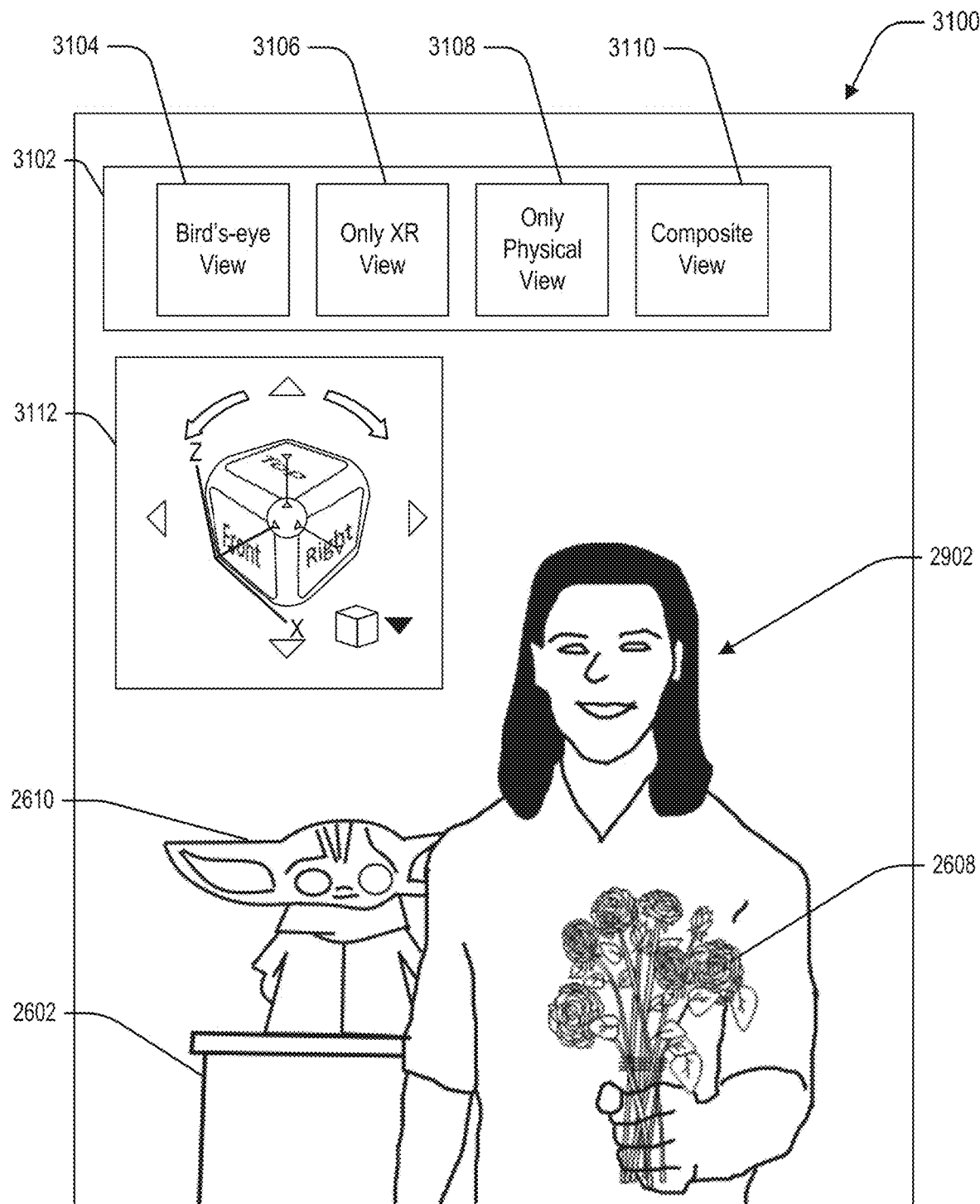
FIG. 31 is an exemplary graphical user interface element for changing views of the extended reality environment and the physical environment, consistent with some embodiments of the present disclosure.

FIG. 31 is an exemplary graphical user interface element for changing views of the extended reality environment and the physical environment, consistent with some embodiments of the present disclosure. Display 3100 includes a view selector (e.g., user interface element 3102) with a bird's-eye view button 3104, an extended reality only view ("Only XR View") button 3106, a physical environment only view ("Only Physical View") button 3108, and a composite view button 3110; and a view rotator element 3112. While user interface elements 3104-3110 are shown as buttons, other user interface controls (e.g., radio button or other user interface element that permits a user to select only one option) may be presented in display 3100 to achieve a similar result. While view rotator element 3112 is shown as a cube with arrows, other configurations of view rotator element 3112 are possible to provide control to the viewer to rotate the displayed image to a desired viewing angle.

By using user interface element 3102, the viewer may select a desired view of the extended reality environment and/or the physical environment. For example, selecting bird's-eye view button 3104 may display a bird's-eye view of the extended reality environment, similar to FIG. 30. Selecting "Only XR View" button 3106 may display only extended reality object, such as shown and described below in connection with FIG. 33. Selecting Only Physical View button 3108 may display only objects in the physical environment, such as shown and described below in connection with FIG. 32. Selecting composite view button 3110 may display a combined physical environment with extended reality objects, such as shown in the lower portion of FIG. 31. In some embodiments, the user interface elements are always displayed such that view selector 3102 and view rotator element 3112 are displayed adjacent to or "on top of" (i.e., displayed with an opacity such that they are at least partially see-through) the selected view, similar to FIG. 31. Once the view is selected, the viewer may use view rotator element 3112 to navigate around in the selected view (i.e., rotate the selected view to achieve a desired perspective of the selected view or a desired viewing angle within the selected view). For example, as shown in FIG. 31, display 3100 includes a composite view (e.g., selected by using composite view button 3110) including virtual representation of the wearer 2902 holding first extended reality object 2608 and second extended reality object 2610 positioned on cabinet 2602.

Figure 32:
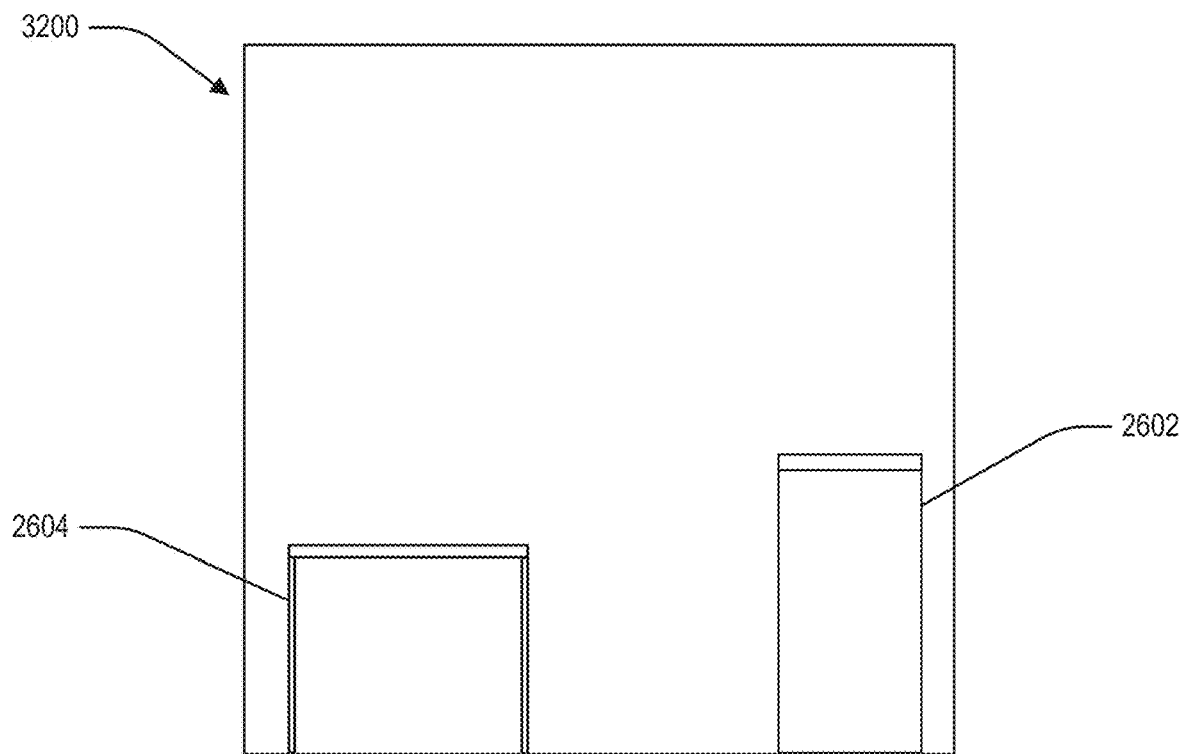
FIG. 32 is an exemplary side view of furniture in the physical environment of FIG. 26.

FIG. 32 is an exemplary side view of the physical environment, consistent with some embodiments of the present disclosure. For example, the viewer may have selected to view only the physical environment (e.g., by using "Only Physical View" button 3108 of user interface element 3102) and used view rotator element 3112 to rotate the view of the physical environment to view only the physical environment from one side. As shown in FIG. 32, side view 3200 includes cabinet 2602 and table 2604.

Figure 33:
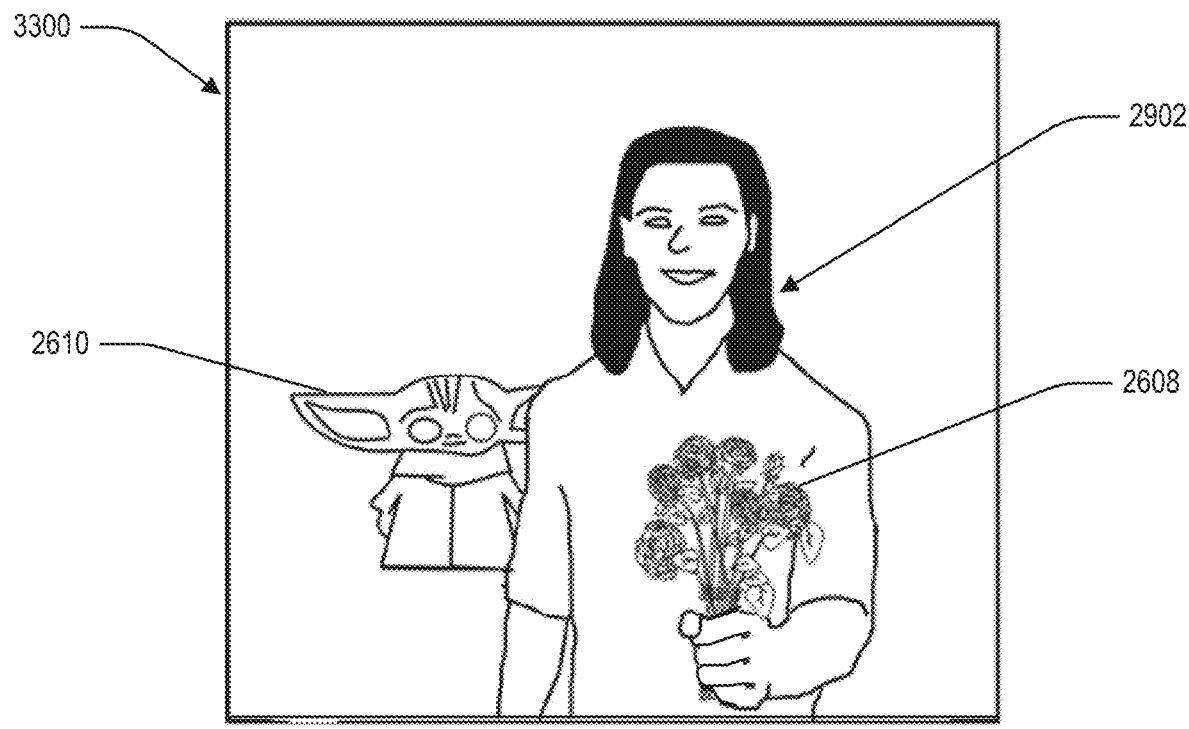
FIG. 33 is an exemplary view of the extended reality environment of FIG. 26, absent furniture.

FIG. 33 is an exemplary view of the extended reality environment, including a virtual representation of the wearer of the wearable extended reality appliance and two extended reality objects, consistent with some embodiments of the present disclosure. For example, the viewer may have selected to view only the extended reality environment (e.g., by using "Only XR View" button 3106 of user interface element 3102). As shown in FIG. 33, the extended reality environment view 3300 includes virtual representation of the wearer 2902 holding first extended reality object 2608 and second extended reality object 2610. Because the extended reality only view does not include objects in the physical environment, in FIG. 33, it appears as if second extended reality object 2610 is "floating" behind virtual representation of the wearer 2902.

In some embodiments, enabling the non-synchronous display includes enabling viewing of a non-realistic visual representation of the physical environment together with an extended reality environment including the at least two extended reality objects. In some examples, enabling the non-synchronous display includes enabling viewing of the physical environment together with an extended reality environment including the at least two extended reality objects morphing gradually to a viewing of a non-realistic visual representation of the physical environment together with the extended reality environment including the at least two extended reality objects. In one example, a machine learning model may be trained using training examples to generate non-realistic visual representations of physical environments. An example of such training example may include data associated with a sample physical environment and a sample category or non-realism, together with a non-realistic visual representation of the sample physical environment associated with the sample category or non-realism. The trained machine learning model may be used to analyze data based on images and/or videos of the physical environment (such as the received image data described above) to generate the non-realistic visual representation of the physical environment. In one example, a category or non-realism may be a level of non-realism, and to generate the gradual morph, non-realistic visual representations of different levels of non-realism may be generated, and may then be available for display, for example in an ascending order of non-realism. In some examples, a category of non-realism may be a type of non-realism. Some non-limiting examples of such type may include impressionism, expressionism, fauvism, surrealism, cubism, manga, and so forth. In one example, the non-realistic visual representation of the physical environment may be in a type selected based on a prospective viewer of the non-realistic visual representation of the physical environment. For example, a first prospective viewer may have an affinity to a first type of non-realism, and the non-realistic visual representation of the physical environment may be a non-realistic visual representation of the physical environment in the first type of non-realism, and/or a second prospective viewer may have an affinity to a second type of non-realism (different from the first type), and the non-realistic visual representation of the physical environment may be a non-realistic visual representation of the physical environment in the second type of non-realism. In one example, an affinity of a particular viewer to a particular type of non-realism may be determined based on at least one of a past behavior of the particular viewer, an input provided by the particular viewer, or an affinity of another viewer (associated with the particular viewer) to the particular type of non-realism.

In some embodiments, enabling the non-synchronous display includes enabling a viewer-selectable perspective for viewing the at least two extended reality objects. For example, the viewer may select any angle (i.e., the viewer-selectable perspective) to view the extended reality environment. In some embodiments, the viewer may use a user interface element to select the desired perspective. For example, view rotator element 3112 of FIG. 31 may be used to select the desired perspective.

In some embodiments, the non-synchronous display depicts a first virtual object included in a first portion of an extended reality environment differently from a second virtual object included in a second portion of the extended reality environment to differentiate between the first portion previously viewed and the second portion previously not viewed. In some embodiments, because a viewer (i.e., a non-wearer) has a different point of view than the wearer, the viewer may be able to visually discern the difference between extended reality objects that the wearer can see (e.g., the first extended reality object) and extended reality objects that the wearer cannot see (e.g., the second extended reality object). For example, the first extended reality object may appear different to the viewer than the second extended reality object. For example, the first extended reality object may appear in color while the second extended reality object may appear in grayscale or similar color differentiation from the first extended reality object. As another example, the first extended reality object may have a higher opacity level than the second extended reality object (i.e., the second extended reality object may appear to be more "see-through" than the first extended reality object). As another example, the first extended reality object may be shown with a solid outline while the second extended reality object may be shown with a dashed or dotted outline. Other ways of visually differentiating between the first extended reality object and the second extended reality object may be used. In some embodiments, the visual differentiation between the first extended reality object and the second extended reality object may be selected by the viewer via a user interface element.

For example, assume that the wearer is playing a virtual reality game in which the wearer is fighting monsters (e.g., a "dungeon crawl" type game) and the viewer is the wearer at a later point in time (e.g., the wearer watching a playback of the game session) or another viewer (e.g., a "fan" of the wearer on a social media site on which the other viewer may watch the wearer play the game in real-time). If the wearer enters a room in the game and looks to the right, the wearer will only see objects on the right side of the room. Any objects on the left side of the room would not be visible to the wearer (i.e., outside the wearer's field of view). But the viewer (via the non-synchronous display) may be able to see the objects on the left side of the room that the wearer cannot see, depending on the viewer's selected point of view and viewing angle, as described elsewhere in this disclosure. In such circumstances, from the viewers perspective, the objects on the left side of the room may be depicted differently than object on the right side of the room, in a manner described above. By differentiating how the object are depicted, the viewer may be able to discern which objects were seen by the wearer and which objects were not seen by the wearer.

In some embodiments, the non-synchronous display depicts a first virtual object included in a first portion of an extended reality environment differently from a second virtual object included in a second portion of the extended reality environment to differentiate between the first portion displayed via the wearable extended reality appliance and the second portion not displayed via the wearable extended reality appliance. For example, the first portion of the extended reality environment may be displayed on the wearable extended reality appliance while the second portion of the extended reality environment may be displayed on an external monitor. The visual differences in depicting the first extended reality object and the second extended reality object may be performed in a similar manner as described above.

Continuing the above example in which the wearer is playing a virtual reality game, the viewer may be able to discern what is currently being displayed to the wearer and what is not being displayed to the wearer by differently depicting the objects. For example, assume the wearer enters a room and starts fighting a first monster in front of the wearer. At the same time, a second monster approaches the wearer from the wearer's right side but out of the wearer's field of view. While the wearer is unable to see the second monster (because it is outside the wearer's field of view), the viewer is able to see the second monster. From the viewer's perspective, the first monster may be depicted differently than the second monster. For example, the first monster may be depicted in color (the same as seen by the wearer) while the second monster may be depicted in grayscale. As another example, the first monster may be depicted in color (the same as seen by the wearer) while the second monster may be depicted in color with a lower opacity. As another example, the first monster may be depicted in color (the same as seen by the wearer) while the second monster may be depicted in color with a different outline (e.g., a dashed or dotted outline). Other display variations are possible to enable the viewer to readily distinguish between objects that the wearer can see and objects that the wearer cannot see.

In some embodiments, the first portion and the second portion change in response to movements of the wearable extended reality appliance. As described above, the portion of the extended reality environment viewable by the wearer is based on a field of view centered around the point of view of the wearable extended reality appliance. As the wearer turns their head in the physical environment, the wearer's point of view changes, and therefore, the portion of the visible extended reality environment (as determined by the field of view) also changes. For example, if the wearer turns their head to the right, the field of view shifts to the right in an amount corresponding to the amount of head movement. For example, if the wearer turns their head to the right by 15 degrees, then the field of view moves to the right by 15 degrees. Any extended reality objects that were not previously visible (i.e., outside the prior field of view) may become visible as the wearer turns their head. For example, if the wearer turns their head to the right by 25 degrees from an initial position and an extended reality object was located outside the initial field of view by 15 degrees to the right, the extended reality object would now be visible by the wearer (i.e., the extended reality object would now be within the shifted field of view). As another example, as the wearer turns their head, the wearer may be able to see a portion of an extended reality object that was not earlier visible. For example, if an extended reality object has writing or a design on one side, from an initial viewing angle, the wearer may not be able to see the writing or design or may only be able to see a portion of the writing or design. As the wearer turns their head, a larger portion or a different portion of the extended reality object may come into view such that the wearer is able to see more of the writing or design.

Continuing the above example in which the wearer is playing a virtual reality game, assume the wearer enters a room and starts fighting a first monster in front of the wearer. At the same time, a second monster approaches the wearer from the wearer's right side but out of the wearer's field of view. If the wearer turns their head far enough to the right, the second monster may become at least partially visible to the wearer. In such circumstances, how the second monster is depicted to the viewer may change. For example, if prior to the wearer turning their head to the right, the second monster was depicted in grayscale, as the wearer turns their head to the right and the second monster becomes visible to the wearer, the second monster as seen by the viewer may also change. For example, the portion of the second monster that the wearer can see may be depicted in color instead of in gray scale.

It is understood that if the wearer does not move the wearable extended reality appliance far enough, extended reality objects that were not visible in the initial position may still not be visible in the new position. For example, if the wearer turns their head to the right by 15 degrees from the initial position and an extended reality object is outside the initial field of view by 35 degrees to the right, the wearer would still not be able to see that extended reality object because the wearer did not turn their head far enough.

In some embodiments, enabling the non-synchronous display includes enabling viewing of the concurrent changes at a time after the particular time period. For example, as described elsewhere in this disclosure, the extended reality session may be recorded for later playback by the wearer or by another (i.e., non-wearer) viewer. Also as described elsewhere in this disclosure, the viewer may select a different point of view and/or a different viewing angle and may be able to see the changes to the extended reality objects that the wearer could not see while wearing the wearable extended reality appliance (i.e., "enabling viewing of the concurrent changes"). For example, if a change to an extended reality object occurred outside the wearer's field of view while the wearer was wearing the wearable extended reality appliance, during the playback session, the viewer can see the concurrent changes in the extended reality object that the wearer was unable to see during the extended reality session.

Continuing the above example in which the wearer is playing a virtual reality game, assume the wearer enters a room and starts fighting a first monster in front of the wearer. At the same time, a second monster approaches the wearer from the wearer's right side but out of the wearer's field of view. While the wearer is unable to see the second monster during the game session, the viewer (e.g., the wearer at a point in time after the game session has ended) may be able to see the same scene from a different point of view such that the viewer can see the second monster approaching the wearer.

In some embodiments, the operations may further include enabling at least one viewer other than a wearer of the wearable extended reality appliance to view the concurrent changes in real time. Because the wearer's ability to view some extended reality objects is limited based on the wearer's field of view, the wearer may not be able to see all changes to all extended reality objects in real-time. However, because viewers other than the wearer have a different point of view, the viewers may be able to see the concurrent changes in multiple extended reality objects in real-time. As further described elsewhere in this disclosure, viewers other than the wearer may be able to view the extended reality session in real-time along with the wearer. Moreover, as described herein, the viewer may be able to select a different point of view and/or viewing angle than that seen by the viewer. By seeing the extended reality session from the different point of view and/or viewing angle, the viewer may be able to see the concurrent changes to multiple extended reality objects.

Continuing the above example in which the wearer is playing a virtual reality game, assume the wearer enters a room and starts fighting a first monster in front of the wearer. At the same time, a second monster approaches the wearer from the wearer's right side but out of the wearer's field of view. While the wearer is unable to see the second monster during the game session, the viewer (assuming that the viewer has selected a point of view different than that of the wearer) can see the second monster approaching the wearer in real-time.

In some embodiments, enabling the non-synchronous display includes enabling a first viewer other than a wearer of the wearable extended reality appliance to view the concurrent changes from a first perspective and enabling a second viewer other than the wearer to view the concurrent changes from a second perspective. As described elsewhere in this disclosure, viewers other than the wearer may be able to view the extended reality session in real-time along with the wearer. For example, the number of non-wearer viewers is not limited to one or two; any number of non-wearer viewers may be able to view the extended reality session in real-time (e.g., as "fans" of the wearer on a social media site). As also described elsewhere in this disclosure, the viewer may be able to select a different point of view and/or viewing angle than that seen by the viewer.

For example, the first viewer and the second viewer may simultaneously view the same extended reality environment as the wearer, but on different devices (e.g., separate monitors or separate wearable extended reality appliances). For example, the first viewer may select the first perspective using a user interface element, such as user interface element 3102 shown in FIG. 31 and described above. Similarly, the second viewer may select the second perspective using user interface element 3102 shown in FIG. 31. Because the first viewer and the second viewer are using different devices, they may select the same perspective (i.e., the first perspective and the second perspective are the same) or they may select different perspectives (i.e., the first perspective and the second perspective are different).

Continuing the above example in which the wearer is playing a virtual reality game, assume that the wearer has a plurality of "fans" on a social media site on which each fan may watch the wearer play the game in real-time. Each fan can select their own point of view and/or viewing angle (for example, by using user interface element 3102 shown in FIG. 31) to watch the wearer play the game.

Figure 34:
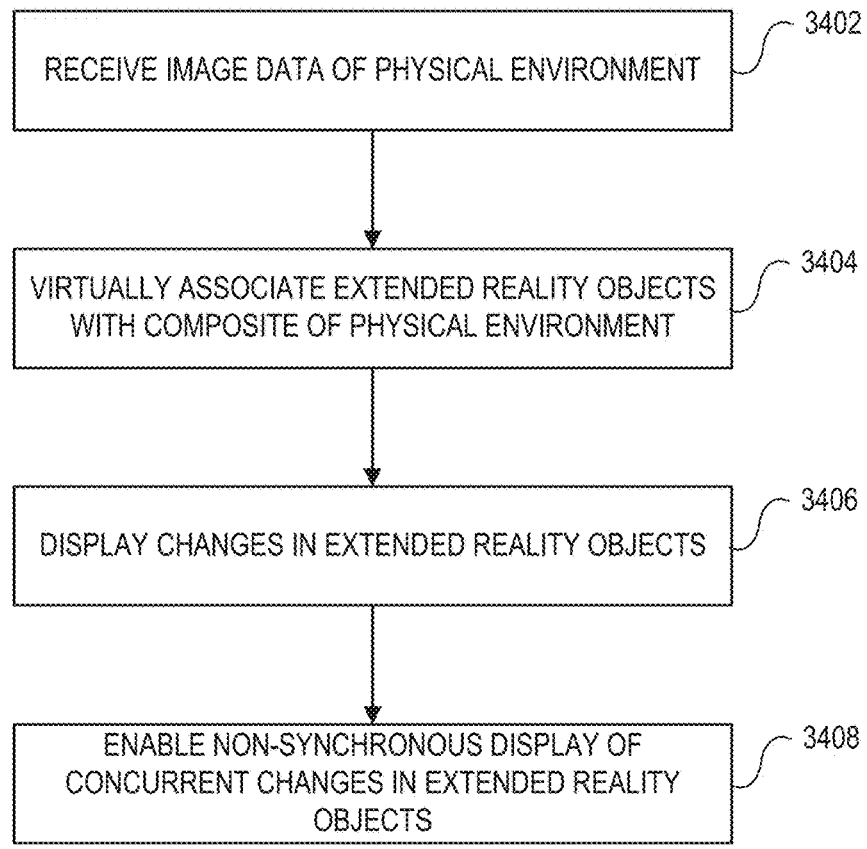
FIG. 34 is a flowchart of an exemplary method for capturing the physical environment and the extended reality environment, consistent with some embodiments of the present disclosure.

FIG. 34 is a flowchart of an exemplary method 3400 for capturing an extended reality environment, consistent with some embodiments of the present disclosure. FIG. 34 is an exemplary representation of just one embodiment, and it is to be understood that some illustrated elements might be omitted and others added within the scope of this disclosure. One or more operations of the method 3400 may be performed by a processor associated with a wearable extended reality appliance. For example, a first processor may be located in the wearable extended reality appliance and may perform one or more operations of the method 3400. As another example, a second processor may be located in an integrated computational interface device associated with the wearable extended reality appliance, and the second processor may perform one or more operations of the method 3400. As another example, the first processor and the second processor may cooperate to perform one or more operations of the method 3400. The cooperation between the first processor and the second processor may include load balancing, work sharing, or other known mechanisms for dividing a workload between multiple processors.

Image data of a physical environment where a wearer of a wearable extended reality appliance is located is received (operation 3402). For example, the image data may be received from at least one image sensor associated with the wearable extended reality appliance. The image data may include images, grayscale images, color images, 2D images, 3D images, videos, 2D videos, 3D videos, frames, footages, data derived from other image data, and so forth. In some embodiments, the received image data may be limited to a predetermined field of view, e.g., a horizontal field of view of 140 degrees centered around a point of view of the wearer (i.e., 70 degrees to the left of the point of view and 70 degrees to the right of the point of view).

One or more extended reality objects in the extended reality environment may be virtually associated with physical objects in the physical environment to create a composite image (operation 3404). The composite image may include real-time images of the physical environment; previously captured images of the physical environment; artificially generated images of a least a portion of the physical environment; or a combination of real-time images, previously captured images, and/or generated images. For example, FIG. 29 is a composite image showing both physical objects from the physical environment and extended reality objects from the extended reality environment.

Changes in the extended reality objects may be displayed to a viewer (operation 3406). For example, the viewer may include the wearer of the wearable extended reality appliance and the wearer may see only virtual objects and/or physical objects within the field of view of the wearable extended reality appliance (e.g., a horizontal 140 degrees). As another example, the viewer may include a non-wearer and the viewer may be able to see extended reality objects that the wearer cannot see (e.g., extended reality objects that are outside the wearer's field of view).

For example, assume there are two extended reality objects: a first extended reality object that is viewable by the wearer and a second extended reality object that is not viewable by the wearer (e.g., the second extended reality object is outside the wearer's field of view). Because the wearer can only see the first extended reality object, only changes in the first extended reality object are displayed to the wearer.

For example, the changes may occur during a particular time period, which may refer to a period of time during which the wearer is looking at the first extended reality object. The particular time period may be any length of time, provided the wearer can see the first extended reality object and cannot see the second extended reality object, based on the point of view of the wearable extended reality appliance.

Non-synchronous display of concurrent changes in the extended reality objects may be enabled (operation 3408). The term "non-synchronous display" may include a playback of the particular time period at a later point in time by the wearer or another viewer, or a real-time viewing during the particular time period by another viewer (e.g., a non-wearer). For example, the other viewer may view the extended reality environment from a different angle or point of view, such as selectable via user interface elements 3102 and 3112 as shown in FIG. 31.

Some embodiments involve a system for capturing extended reality environments. The system may include at least one processor for performing the operations previously described. For example, the system may be configured to: receive image data representing at least a 140 degrees field of view of a physical environment, the image data being received from at least one image sensor associated with a wearable extended reality appliance; virtually associate at least two extended reality objects with a composite perspective of the physical environment, wherein the at least two extended reality objects are spaced apart by at least 140 degrees from a point of view of the wearable extended reality appliance; display, via the wearable extended reality appliance and during a particular time period, changes in one of the at least two extended reality objects while refraining from displaying changes in another of the at least two extended reality objects; and enable non-synchronous display of concurrent changes in the at least two extended reality objects that took place during the particular time period.

In an extended reality environment in which users may use wearable extended reality appliances, the capability of extracting a participant of a video conference and locating a virtual representation of that participant in a physical space may help enhance productivity.

Some embodiments involve a non-transitory computer readable medium containing instructions that when executed by at least one processor cause the at least one processor to perform operations for managing an extended reality conference. The term "non-transitory computer readable medium" may be understood as described elsewhere in this disclosure. The term "instructions" may refer to program code instructions that may be executed by a processor. The instructions may be written in any type of computer programming language, such as an interpretive language (e.g., scripting languages such as HTML and JavaScript), a procedural or functional language (e.g., C or Pascal that may be compiled for converting to executable code), object-oriented programming language (e.g., Java or Python), logical programming language (e.g., Prolog or Answer Set Programming), or any other programming language. In some examples, the instructions may implement methods associated with machine learning, deep learning, artificial intelligence, digital image processing, and any other computer processing technique. The term "processor" may be understood as described elsewhere in this disclosure. For example, the at least one processor may be one or more of the server 210 of FIG. 2, the mobile communications device 206 of FIG. 2, the processing device 360 of FIG. 3, the processing device 460 of FIG. 4, or the processing device 560 of FIG. 5, and the instructions may be stored at any of the data structure 212, the memory devices 311, 411, or 511, or a memory of the mobile communications device 206.

An extended reality conference may refer to, for example, any conference, meeting, conversation, discussion, seminar, call, dialogue, chat, or interaction associated with an extended reality environment. An extended reality environment includes any setting in which at least one element is physically located in the setting and at least one element is simulated in the environment. For example, one person or other object may be physically located in the setting and another person or object may be simulated in the setting. An extended reality conference may provide participants with the ability to interact (e.g., converse, exchange ideas, communicate thoughts, share notes, express opinions, and/or present other desired information) as if co-located, even though one or more participants are not physically located in the setting of the conference. An extended reality conference may be held in an extended reality environment, for example, in which users may use wearable extended reality appliances (as described elsewhere in this disclosure) to participate in the extended reality conference. For example, wearable extended reality appliances may be used to establish a platform for the extended reality conference, for example, by generating a user interface for the extended reality conference, capturing, receiving, or transmitting various types of data associated with the extended reality conference, displaying video associated with the extended reality conference, outputting audio associated with the extended reality conference, or performing any other suitable action or functionality associated with the extended reality conference. Managing an extended reality conference may include, for example, extracting conference participants to an extended reality environment, as described in greater detail below.

Some embodiments involve facilitating a multi-participant video conference between a plurality of physically dispersed participants. A video conference may include, for example, the two-way or multipoint reception and transmission of audio and video signals for real-time communication between people in different locations. A video conference may be facilitated by any step, structure, hardware, or software component that either alone or in combination with one or more other step, structure, hardware, or software component assists, aids, enables, expedites, or supports the establishment or conduct of a video conference. For example, in a video conference, image sensors may be used for capturing video of participants, and audio sensors may be used for capturing audio of participants. The captured data of video and audio of a participant may be transmitted to other devices for outputting to other participants. In this example, each of the steps of capturing the video, capturing the audio, and transmitting either may be independently considered an act of facilitating the video conference. In some examples, a video conference may include multiple participants. A multi-participant video conference may include any desired number of participants (e.g., 2 participants, 3 participants, 4 participants, 5 participants, 6 participants, 7 participants, 8 participants, 9 participants, 10 participants, or any other number of participants). A participant of a video conference may include, for example, any individual or other entity that may participate in, join in, be involved in, be connected to, or be associated with the video conference. The multi-participant video conference may include a plurality of physically dispersed participants. The plurality of physically dispersed participants may be located in different locations (e.g., in different rooms, in different buildings, in different cities, in different countries, etc.). Two or more of the locations of the plurality of physically dispersed participants may have any desired distance therebetween (e.g., 10 meters, 50 meters, 100 meters, 1 kilometer, 2 kilometers, 3 kilometers, 5 kilometers, 10 kilometers, 100 kilometers, 1,000 kilometers, 5,000 kilometers, 10,000 kilometers, or any other distance). In some examples, some participants of the plurality of physically dispersed participants may be located relatively closer to each other, and some other participants of the plurality of physically dispersed participants may be located relatively further away from each other. At least one processor may facilitate the multi-participant video conference between a plurality of physically dispersed participants (e.g., by transmitting audio and/or video between participants). For example, the at least one processor may be configured to receive and/or transmit data associated with the video conference, to cause output of data associated with the video conference, to receive input of data associated with the video conference (e.g., from a user), and/or to perform any other desired functionality associated with the video conference.

Figure 35:
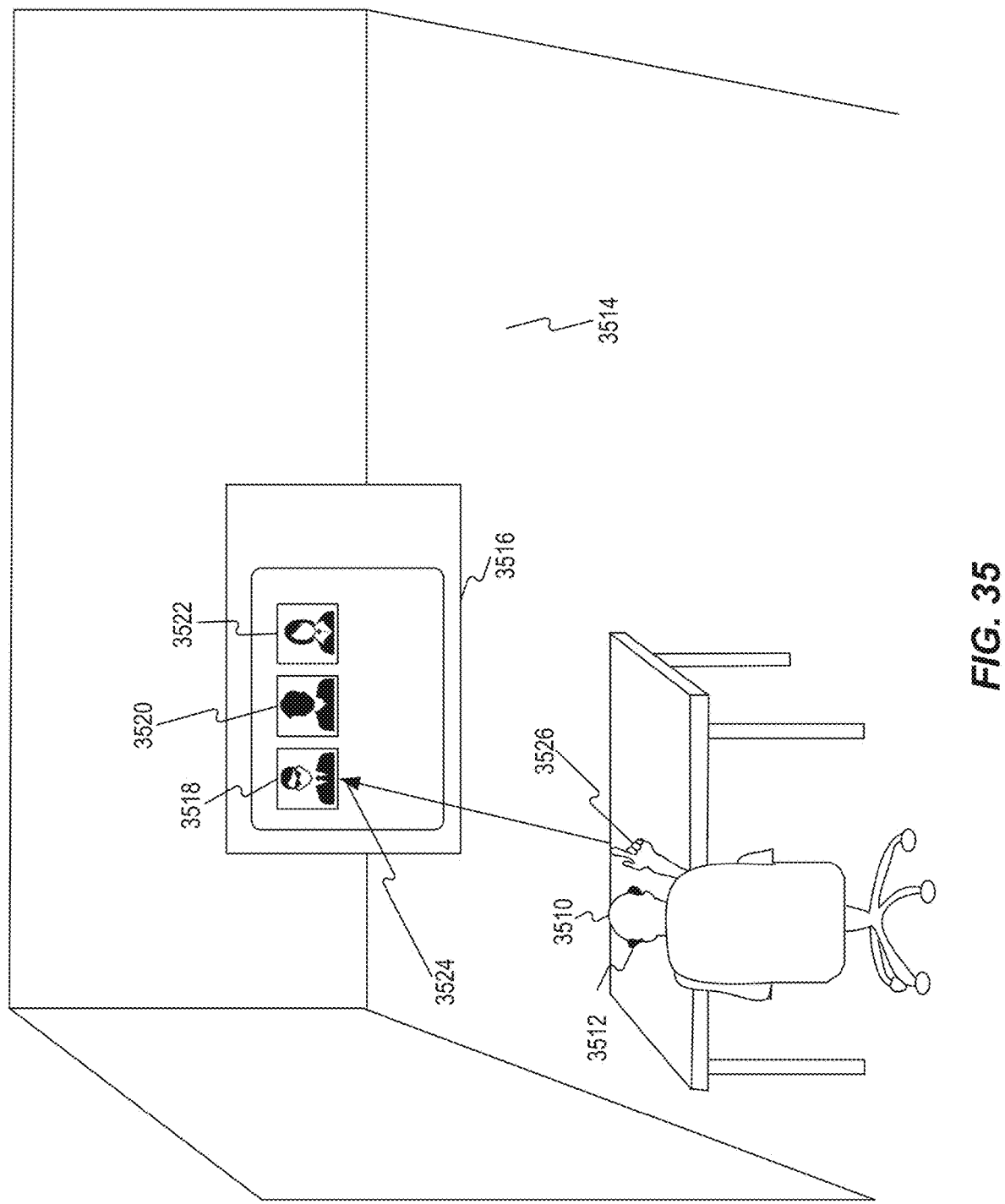
FIGS. 35, 36, 37, 38, and 39 are various use snapshots of perspective views of a physical environment in which video conference participants are extracted to provide an extended reality experience, consistent with some embodiments of the present disclosure.

FIGS. 35, 36, 37, 38, and 39 are schematic diagrams illustrating various use snapshots of an example system for extracting video conference participants to an extended reality environment, consistent with some embodiments of the present disclosure. With reference to FIG. 35, a user 3510 may use a wearable extended reality appliance 3512. At least one processor associated with the wearable extended reality appliance 3512 may facilitate a multi-participant video conference between a plurality of physically dispersed participants. The plurality of physically dispersed participants may be represented with virtual representations (e.g., images, video streams, etc.).

Some embodiments involve enabling, via a wearable extended reality appliance, viewing of a first environment representing a physical space and a second peripheral environment. As with other instances of the use of forms of the term "enabling," enabling in this instance may occur through one or more of providing, operating, storing, or running software, transmitting signals, providing controls (a user interface) or providing or operating a platform that in whole or in part or directly or indirectly permits or aids an occurrence of the associated function. Thus, the viewing via an extended reality appliance may be enabled via software that interacts with hardware to, in whole or in part, authorize, facilitate, allow, or render a wearable extended reality appliance capable of viewing. Thus, providing, operating, storing, or running code, sending signals, and/or making accessible a video conference platform (e.g., via video conference software) in which a wearable extended reality appliance may be used, are each separate examples of enabling viewing via the wearable extended reality appliance.

A physical space may include, for example, a room, a conference room, a classroom, a discussion room, a work room, an office, a home, a house, an apartment, a living room, a bedroom, a kitchen, a hall, a concourse, an indoor space, a playground, an outdoor space, or any other desired physical environment or extent. In some examples, the wearable extended reality appliance may be located in the physical space. A first environment may include, for example, any type of surrounding, condition, circumstance, or extent that may represent the physical space. In some examples, the first environment may include the physical space itself. In some examples, the first environment may include a virtual representation of the physical space (e.g., as generated via a wearable extended reality appliance). The second peripheral environment may include, for example, any type of surrounding, condition, circumstance, or extent. An environment may be considered "peripheral" if it is separate from or beyond a boundary of another environment. Therefore, whether in an edge region or in a center of a field of view, the second environment is considered peripheral to the first environment if it is beyond a boundary of the first environment.

In some examples, the second peripheral environment may be configured to contain a user interface for the multi-participant video conference. For example, the second peripheral environment may include a physical screen, a physical display, a virtual screen, a virtual display, or any other type of suitable element via which a user interface for the multi-participant video conference may be outputted.

Enabling of viewing of the first environment and the second peripheral environment via the wearable extended reality appliance may occur in various manners. For example, the enabling of the viewing via the wearable extended reality appliance may include permitting a view-through of the first environment including the physical space itself and projecting the second peripheral environment virtually. In some examples, the enabling of the viewing via the wearable extended reality appliance may include permitting a view-through of the second peripheral environment (e.g., a physical screen, a physical display, etc.). In some examples, the enabling of the viewing via the wearable extended reality appliance may include projecting the first environment as a virtual representation of the physical space.

In some embodiments, the first environment corresponds to the physical space in which the wearable extended reality appliance is located, and enabling viewing the first environment via the wearable extended reality appliance includes permitting a view-through of the physical space. For example, the wearable extended reality appliance (e.g., a head-mounted display) may be capable of showing images to a user (e.g., using a display via which projected images may be reflected to the user) and configured to allow the user to see through the wearable extended reality appliance. When a user wearing the wearable extended reality appliance is present in the physical space, the wearable extended reality appliance may be configured to permit the user to view the physical space through the wearable extended reality appliance (e.g., a view-through of the physical space).

In some embodiments, the first environment corresponds to the physical space in which the wearable extended reality appliance is located, and enabling viewing the first environment via the wearable extended reality appliance includes enabling projection of a virtual representation of the physical space. For example, the wearable extended reality appliance (e.g., a head-mounted display) may be capable of showing images to a user (e.g., using a display via which projected images may be reflected to the user) and configured to allow the user to see through the wearable extended reality appliance. When a user wearing the wearable extended reality appliance is present in the physical space, the wearable extended reality appliance may be configured to project a virtual representation of the physical space. For example, an image sensor associated with the wearable extended reality appliance may be configured to capture images of the physical space when the wearable extended reality appliance is present in the physical space. Based on the captured images, at least one processor associated with the wearable extended reality appliance may generate the virtual representation of the physical space. The virtual representation of the physical space, when viewed by a user, may have a look same as or similar to the physical space (e.g., by overlying the virtual representation on the physical space), or may have a look different from the physical space (e.g., by changing the size or extent of, or modifying, the virtual representation of the physical space).

In some embodiments, the second peripheral environment corresponds to a physical screen in proximity to the wearable extended reality appliance, and enabling viewing the second peripheral environment via the wearable extended reality appliance includes permitting a view-through of the physical screen. For example, the wearable extended reality appliance (e.g., a head-mounted display) may be capable of showing images to a user (e.g., using a display via which projected images may be reflected to the user) and configured to allow the user to see through the wearable extended reality appliance. A physical screen may include, for example, a display, a light-emitting diode (LED) display, an organic light-emitting diode (OLED) display, a liquid-crystal display (LCD), a dot-matrix display, a touch screen, a light indicator, a light source, or any other device configured to provide optical output. When a user wearing the wearable extended reality appliance is located in proximity to the physical screen (e.g., both the wearable extended reality appliance and the physical screen are in a physical space such as a room), the wearable extended reality appliance may be configured to permit the user to view the physical screen through the wearable extended reality appliance. The view-through of the physical screen may be permitted when the wearable extended reality appliance and the physical screen have any desired distance therebetween (e.g., 1 meter, 2 meters, 3 meters, 5 meters, 10 meters, or any other desired distance). In some examples, the view-through of the physical screen may be permitted based on determining that the distance between the wearable extended reality appliance and the physical screen is less than a threshold (e.g., 10 meters, 20 meters, 30 meters, or any other desired distance), so that the physical screen as viewed by a user through the wearable extended reality appliance may be perceptible to a desired extent from the perspective of the user.

In some embodiments, the second peripheral environment corresponds to a virtual screen in proximity to the wearable extended reality appliance, and enabling viewing the second peripheral environment via the wearable extended reality appliance includes outputting signals for projecting the virtual screen via the wearable extended reality appliance. For example, the wearable extended reality appliance (e.g., a head-mounted display) may be capable of showing images to a user (e.g., using a display via which projected images may be reflected to the user) and configured to allow the user to see through the wearable extended reality appliance. A virtual screen may include, for example, a virtual representation of a physical screen (e.g., as projected or displayed by a wearable extended reality appliance). A virtual screen may have any desired shape, color, contour, form, texture, pattern, or other feature or characteristic. A virtual screen may be configured to show content on the virtual screen. In some examples, a virtual screen may resemble a physical screen. In some examples, the wearable extended reality appliance may be configured to project the virtual screen to a user (e.g., by outputting signals of images representing the virtual screen). The projected virtual screen, as viewed by a user, may be at a desired location for viewing by the user (e.g., at a location in front of the user within a particular distance away from the user). In some examples, a virtual screen may be linked, tied, or attached to a particular location in a physical space, and the wearable extended reality appliance may output signals for projecting the virtual screen based on determining that a distance between the location of the virtual screen and the wearable extended reality appliance is less than a threshold (e.g., 10 meters, 20 meters, 30 meters, or any other desired distance), so that the virtual screen as viewed by a user via the wearable extended reality appliance may be perceptible to a desired extent from the perspective of the user.

With reference to FIG. 35, at least one processor associated with the wearable extended reality appliance 3512 may enable the user 3510 to view a first environment 3514 representing a physical space and a second peripheral environment 3516 (e.g., a physical screen, a physical display, a virtual screen, a virtual display, etc.).

Some embodiments involve enabling a display of the plurality of participants in the second peripheral environment, the plurality of participants including a first participant and a second participant. As with other instances of the use of forms of the term "enabling," enabling may occur through one or more of providing, operating, storing, or running software, transmitting signals, providing controls (a user interface) or providing or operating a platform that in whole or in part or directly or indirectly permits or aids an occurrence of the associated function.

For example, transmitted signals transmitted via a platform may cause the second peripheral environment (e.g., a physical screen, a virtual screen, etc.) to display the plurality of participants of the multi-participant video conference. In some examples, the plurality of participants may be displayed in a user interface with any desired form (e.g., including multiple windows, panes, tabs, or other elements to show the participants). In some examples, video streams of the participants may be displayed. In some examples, images of the participants may be displayed. Additionally or alternatively, the participants may be allowed to configure whether video streams or images may be displayed for the participants. The plurality of participants of the multi-participant video conference may include a first participant and a second participant. The first participant may include any individual or other entity. The second participant may include any individual or other entity. In some examples, the plurality of participants of the multi-participant video conference may include one or more participants in addition to the first participant and the second participant. At least one processor may enable the display of the plurality of participants. For example, the at least one processor may receive data (e.g., video data, image data, audio data, etc.) that may be captured by image sensors, audio sensors, or other suitable devices for the plurality of participants. Based on the received data, the at least one processor may cause display of the plurality of participants. In some examples, the plurality of participants of the multi-participant video conference may include a user of the wearable extended reality appliance, who may be or may not be displayed in the second peripheral environment as desired.

With reference to FIG. 35, at least one processor associated with the wearable extended reality appliance 3512 may enable a display of the plurality of participants 3518, 3520, 3522 in the second peripheral environment 3516. The plurality of participants 3518, 3520, 3522 may include a first participant 3518 and a second participant 3520.

Some embodiments involve receiving a first selection of the first participant in the second peripheral environment for virtual movement to the first environment. Receiving a selection may include, for example, receiving signals that result from a choice or from some other trigger. This may occur for example, via a selection that occurs through interaction with a GUI. The resulting selection may then be received in the form of signals. For example, at least one processor associated with the wearable extended reality appliance (or associated with a platform that is run on a server and or in a cloud computing environment) may receive the first selection of the first participant in the second peripheral environment. The first selection may be based on, for example, input from a user of the wearable extended reality appliance. The user input may be provided to the at least one processor, for example, using any desired input device (e.g., an image sensor, a pointing device, a keyboard, etc.). The user input may be provided in various desired manners, such as using a gesture of the user as captured by an image sensor, using a drag-and-drop process as captured by a pointing device, or using a command that a user may input via a keyboard. The user input may indicate that the user intends to cause the first participant as displayed in the second peripheral environment to be moved to the first environment and to be displayed using a virtual representation of the first participant in the first environment.

In some embodiments, the first selection of the first participant occurs in response to a trigger detected in image data captured by an image sensor associated with the wearable extended reality appliance. A trigger may refer to, for example, an event or circumstance that may be a cause of a particular action, process, or situation. For example, a user of the wearable extended reality appliance may initiate various gestures (e.g., hand gestures, face gestures, etc.). An image sensor associated with (e.g., part of or separate from) the wearable extended reality appliance may be configured to capture image data of the scenes (e.g., including the gestures of the user). The trigger may be detected in various manners, such as by performing an image analysis on the captured image data, and identifying whether any particular pattern, feature, or other characteristic is present in the image data. The trigger may include any desired pattern, feature, or characteristic, such as a hand gesture, a face gesture, any other suitable movement associated with a person, a movement of a designated object, or any other action or pattern. Some embodiments involve analyzing the image data to identify a gesture initiated by a wearer of the wearable extended reality appliance, the gesture serving as the trigger for virtually moving the first participant to the first environment. A gesture may include, for example, any finger or hand motion, such as a drag, a pinch, a spread, a swipe, a tap, a pointing, a scroll, a rotate, a flick, a touch, a zoom-in, a zoom-out, a thumb-up, a thumb-down, a touch-and-hold, or any other action of a hand. In some examples, a gesture may include an action of an eye, mouth, face, or other part(s) of a person's body. The captured image data may be analyzed, for example, using a gesture recognition algorithm. Based on the analysis of the captured image data, at least one processor may identify that a gesture of a wearer (e.g., a user) of the wearable extended reality appliance may indicate an interaction with the first participant as displayed in the second peripheral environment. The identified gesture may serve as the trigger for virtually moving the first participant to the first environment (e.g., causing the first participant as displayed in the second peripheral environment to be moved to the first environment and to be displayed using a virtual representation of the first participant in the first environment).

In some embodiments, the first selection of the first participant occurs in response to a trigger detected by a pointing device associated with the wearable extended reality appliance. A pointing device may include, for example, a physical pointing device, a virtual pointing device, a computer mouse, a joystick, a touchpad, a touch controller, and/or the like. In some instances, the pointing device can be an anatomical element, such as a finger, that is detected as pointing. A pointing device may be communicatively coupled to at least one processor associated with the wearable extended reality appliance. The pointing device may be configured to detect user input, and to transmit the user input to the at least one processor associated with the wearable extended reality appliance. Alternatively, the pointing device may be detected by a sensor, and functionality determined based on the context of the detection. The at least one processor associated with the wearable extended reality appliance may analyze the data of the user input to identify whether a trigger associated with the first selection of the first participant is present in the data of the user input. The trigger may include, for example, a drag-and-drop process, a clicking on an image associated with the first participant, a clicking on a selection button associated with the first participant, or any other action that may indicate a selection of the first participant. Some embodiments involve analyzing pointing device movements to identify a drag-and-drop process, the drag-and-drop process serving as the trigger for virtually moving the first participant to the first environment. A drag-and-drop process may include, for example, a pointing device gesture in which a user may select an item by grabbing it and dragging it from its current location to a different location or onto another item. At least one processor associated with the wearable extended reality appliance may analyze the data of the user input from the pointing device associated with the wearable extended reality appliance and may, based on movements of the pointing device (e.g., as indicated in the data of the user input), identify a drag-and-drop process (e.g., selecting an image, icon, symbol, or any other indication of the first participant as displayed in the second peripheral environment, dragging the selected indication of the first participant to a location in the first environment, and dropping the selected indication at the location in the first environment). The drag-and-drop process may serve as the trigger for virtually moving the first participant to the first environment (e.g., causing the first participant as displayed in the second peripheral environment to be moved to the first environment and to be displayed using a virtual representation of the first participant in the first environment).

In some embodiments, the first selection of the first participant occurs in response to a trigger received from a physical keyboard associated with the wearable extended reality appliance. A physical keyboard may include, for example, a computer keyboard (e.g., a peripheral input device which may use an arrangement of buttons or keys), a typewriter keyboard, and/or the like. A physical keyboard may be communicatively coupled to at least one processor associated with the wearable extended reality appliance. For example, the physical keyboard may detect user input (e.g., as a user types on the physical keyboard), and may transmit the detected user input to the at least one processor associated with the wearable extended reality appliance. The at least one processor associated with the wearable extended reality appliance may analyze the received data of the user input from the physical keyboard, and may identify a trigger associated with the first selection of the first participant. The trigger may include, for example, a command-line command that a user may type in via the physical keyboard to cause the first selection of the first participant, a shortcut command that a user may activate using the physical keyboard to cause the first selection of the first participant, a particular button or key that a user may activate using the physical keyboard to cause the first selection of the first participant, a sequence or combination of keystrokes or other inputs via the physical keyboard that may be configured to cause the first selection of the first participant, or any other action that may indicate a selection of the first participant.

With reference to FIG. 35, at least one processor associated with the wearable extended reality appliance 3512 may receive a first selection 3524 of the first participant 3518 in the second peripheral environment 3516 for virtual movement to the first environment 3514. The first selection 3524 may be, for example, based on a hand gesture 3526 of the user 3510. The hand gesture 3526 may indicate the first selection 3524 of the first participant 3518, for example, by pointing to the first participant 3518 in the second peripheral environment 3516.

Some embodiments involve receiving a first environmental placement location associated with the first selection. In some embodiments, the first environmental placement location corresponds to a first region of the physical space. The first environmental placement location can be any area of choice. For example, it may include any indication of a location for placing a representation of a participant (e.g., the first participant) of the multi-participant video conference. In some examples, at least one processor associated with the wearable extended reality appliance may receive the first environmental placement location in connection with the receiving of the first selection of the first participant. For example, the first environmental placement location may be determined based on user input received from an input device associated with the wearable extended reality appliance (e.g., an image sensor, a pointing device, a physical keyboard, etc.). As one example, an image sensor associated with the wearable extended reality appliance may capture a gesture of a user, and the gesture may indicate the first environmental placement location. As another example, a pointing device associated with the wearable extended reality appliance may detect user input indicating the first environmental placement location (e.g., a dropping location of a drag-and-drop process for the first participant, a clicking on a location that may be used as the first environmental placement location, a selection of a location that may be used as the first environmental placement location, or any other indication of the first environmental placement location). As another example, a physical keyboard associated with the wearable extended reality appliance may detect user input indicating the first environmental placement location (e.g., a user may type in a location that may be used as the first environmental placement location, a user may type in the coordinates of a location that may be used as the first environmental placement location, etc.). The first environmental placement location may correspond to a first region of the physical space (e.g., in which the wearable extended reality appliance may be located). The first region of the physical space may include, for example, any location, area, space, scope, or extent that a user may select as the first environmental placement location. In some examples, input device(s) may be used to allow the user to select the first region of the physical space. For example, the physical space may be measured using a coordinate system, be segmented into a plurality of regions with designated identifiers, or be measured or marked in other suitable manners. Input device(s) may be used to allow a user to select or indicate the first region of the physical space, for example, based on identifying the coordinates of the first region, selecting the designated identifier for the first region from the plurality of segmented regions, or other suitable methods.

Figure 36:
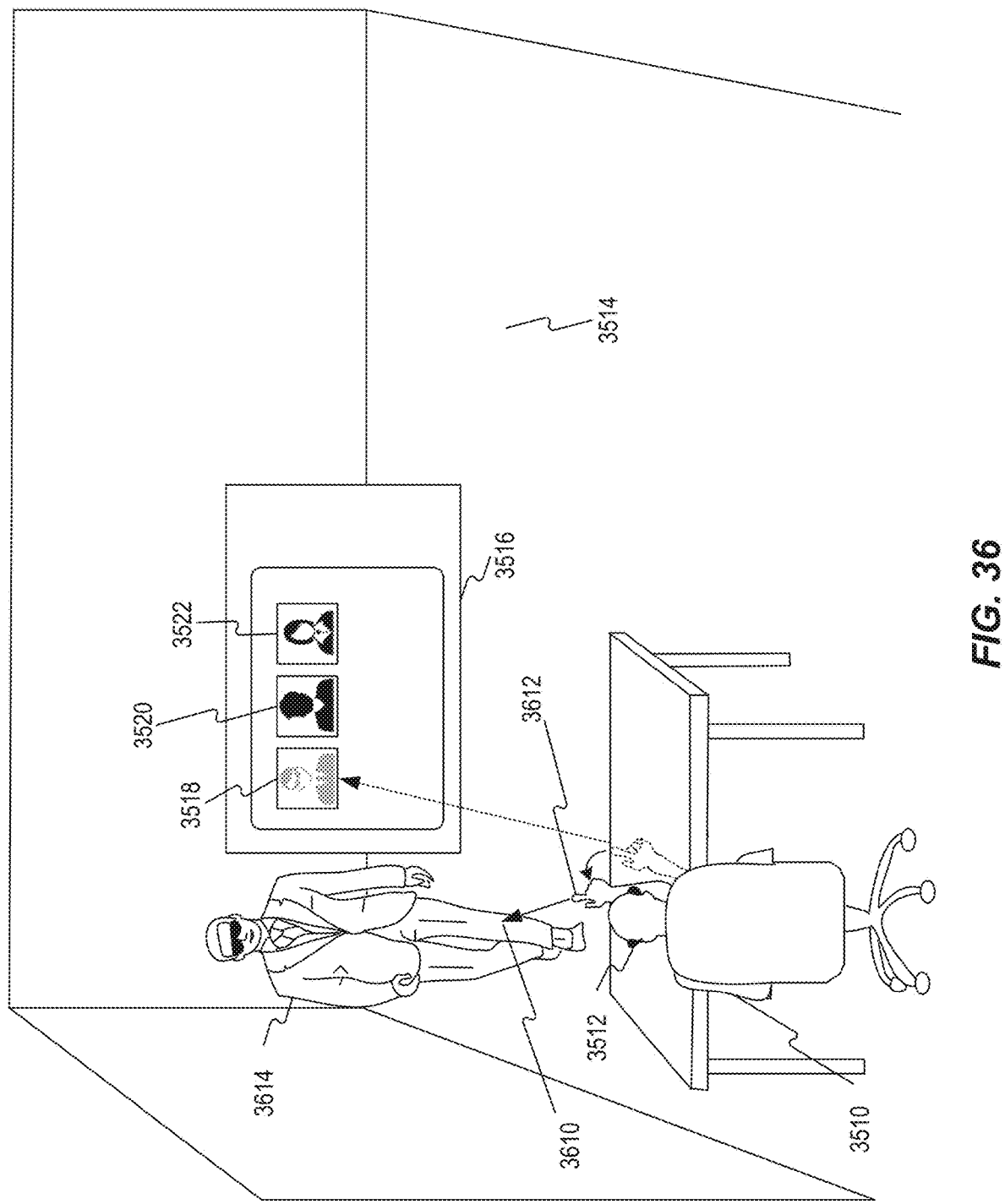

With reference to FIG. 36, at least one processor associated with the wearable extended reality appliance 3512 may receive a first environmental placement location 3610 associated with the first selection 3524. In some examples, the first environmental placement location 3610 may correspond to a first region of the physical space. The first environmental placement location 3610 may be, for example, based on a hand gesture 3612 of the user 3510. The hand gesture 3612 may indicate the first environmental placement location 3610, for example, by pointing to the first region of the physical space.

Some embodiments involve, in response to the first selection and the first environmental placement location, moving a virtual representation of the first participant to the first environment in a manner simulating the first participant physically located in the first region of the physical space while the second participant remains in the second peripheral environment. For example, in response to the first selection and the first environmental placement location, at least one processor associated with the wearable extended reality appliance may cause a virtual representation of the first participant to be displayed in the first environmental placement location in the first environment. The virtual representation of the first participant as displayed in the first environment may include, for example, a two-dimensional icon, image, symbol, or indication, or a three-dimensional graphical model representing the first participant. In some examples, the virtual representation of the first participant as displayed in the first environment may resemble the first participant (e.g., based on images or videos of the first participant). In some examples, the virtual representation of the first participant as displayed in the first environment may include an animated or inanimate avatar for the first participant (e.g., a two-dimensional or three-dimensional model of a person with customizations). The virtual representation of the first participant may be displayed (e.g., via the wearable extended reality appliance) in the first environment in a manner simulating the first participant physically located in the first region of the physical space while the second participant remains in the second peripheral environment. As used throughout, the term "manner simulating" may include providing a sensation that a participant is in a particular location in which the participant is not physically located. In some examples, image data of the first environmental placement location captured using an image sensor associated with the wearable extended reality appliance may be analyzed to move the virtual representation of the first participant to the first environment in a manner simulating the first participant physically located in the first region of the physical space. For example, the image data may be analyzed to detect a floor (for example, using a visual object detection algorithm), and the virtual representation of the first participant may be moved to appear standing on the detected floor. In another example, the image data may be analyzed to determine a distance of the first environmental placement location from the wearable extended reality appliance, and the size of the virtual representation of the first participant may be adjusted based on the distance. In some examples, at least one movement of the wearable extended reality appliance may be detected (for example, using a motion sensor included in the wearable extended reality appliance, using an analysis of the image data using a visual ego-motion algorithm, etc.), and simulating the first participant physically located in the first region of the physical space may include adjusting a location and/or an orientation of the visualization of the virtual representation of the first participant based on the detected movement, for example, to compensate for the movement.

In some embodiments, moving a virtual representation of a particular participant to the first environment in a manner simulating the particular participant physically located in a particular region of the physical space includes processing video streams of the particular participant to remove a background initially associated with the particular participant. Moving may refer to a change in location from one place to another. For example, an image sensor may capture video streams of the particular participant (e.g., the first participant, the second participant, or any other participant of a multi-participant video conference), who may be located in a physical space. The video streams of the particular participant may include a background associated with the particular participant (e.g., the physical environment surrounding the particular participant). A video background removal algorithm may be performed to process the video streams and to remove the background in the video streams as captured by the image sensor. For example, a facial recognition algorithm, a background subtraction algorithm, or any other suitable method may be used to extract the particular participant (e.g., images or videos of the particular participant) from the video streams. The images or videos of the particular participant extracted from the video streams captured by the image sensor may be transmitted to other devices (e.g., the wearable extended reality appliance) and/or may be used to generate a virtual representation of the particular participant (e.g., to be displayed by the wearable extended reality appliance in the first environment). In some examples, when the virtual representation of the particular participant is displayed by the wearable extended reality appliance in the first environment, the displayed virtual representation of the particular participant may not include the removed background of the video streams.

In some embodiments, moving a virtual representation of a particular participant to the first environment in a manner simulating the particular participant physically located in a particular region of the physical space includes generating an avatar of the particular participant. The particular participant (e.g., the first participant, the second participant, or any other participant of a multi-participant video conference) may have an avatar as the virtual representation of the particular participant displayed in the first environment. An avatar may include, for example, an icon, figure, animation, simulation, or other indication representing a person. The avatar, when displayed, may be two-dimensional or three-dimensional, and/or may be animated or inanimate. The avatar may be depicted or designed in any desired artistic styles or character design methods. In some examples, the avatar may include animation that may simulate the facial expressions, body movements, and/or other actions of the particular participant in real-time. For example, an image sensor may capture images or videos of the particular participant, and at least one processor may, based on the captured images or videos, determine the facial expressions, body movements, and/or other actions of the particular participant and cause display of animation of the avatar that may indicate the determined facial expressions, body movements, and/or other actions of the particular participant.

In some embodiments, moving a virtual representation of a particular participant to the first environment in a manner simulating the particular participant physically located in a particular region of the physical space includes processing a two-dimensional video stream of the particular participant to generate a three-dimensional representation of the particular participant. A "manner simulating" may include providing a sensation that the participant is in the other location. For example, an image sensor may be used to capture a two-dimensional video stream of the particular participant (e.g., the first participant, the second participant, or any other participant of a multi-participant video conference). In some examples, a depth map may be created for the particular participant, the depth map indicating information relating to the distance of the surfaces of scene objects from a viewpoint. The depth map may be generated, for example, based on the two-dimensional video stream, such as the motion of a considered object, the motion of the image sensor, the degree of blur or defocus of a considered object, or other suitable aspects associated with the two-dimensional video stream. The depth map, in connection with the two-dimensional video stream, may be used to create the three-dimensional representation of the particular participant. Additionally or alternatively, a three-dimensional model of a person may be used as a template to which imagery details of the particular participant obtained from the two-dimensional video stream may be added, to create the three-dimensional representation of the particular participant. In some examples, an artificial intelligence or machine learning model may be used to generate the three-dimensional representation of the particular participant based on the two-dimensional video stream of the particular participant.

In some embodiments, moving a virtual representation of a particular participant to the first environment in a manner simulating the particular participant physically located in a particular region of the physical space includes displaying the virtual representation of the particular participant in the first environment and omitting the virtual representation of the particular participant from the second peripheral environment. For example, when the virtual representation is moved from a second environment to a first environment, a viewer may be provided with a sensation that the virtual representation is no longer present in the second environment and is present in the first environment. For example, based on a selection of the particular participant (e.g., the first participant, the second participant, or any other participant of a multi-participant video conference) and/or a determined environmental placement location in the first environment for the particular participant, at least one processor associated with the wearable extended reality appliance may cause display of the virtual representation of the particular participant in the first environment, and may cause the virtual representation of the particular participant to be no longer displayed in the second peripheral environment. In some embodiments, moving a virtual representation of a particular participant to the first environment in a manner simulating the particular participant physically located in a particular region of the physical space includes displaying a first version of the virtual representation of the particular participant in the first environment while displaying a second version of the virtual representation of the particular participant in the second peripheral environment. For example, based on a selection of the particular participant (e.g., the first participant, the second participant, or any other participant of a multi-participant video conference) and/or a determined environmental placement location in the first environment for the particular participant, at least one processor associated with the wearable extended reality appliance may cause display of the virtual representation of the particular participant in the first environment, and may continue to cause display of the particular participant in the second peripheral environment. As one example, a first version of the virtual representation of the particular participant may be displayed in the first environment while a second version of the virtual representation of the particular participant is displayed in the second peripheral environment. The first version and the second version may be different. For example, the first version may include a three-dimensional representation of the particular participant, and the second version may include a two-dimensional representation of the particular participant. As another example, the first version may be displayed in a regular or highlighted clarity, and the second version may be displayed in a reduced clarity (e.g., with added visual vagueness, such as with reduced image or video resolution, having an added blur to images or videos, having a reduced brightness or contrast for images or videos, and/or the like). As another example, the first version may show a larger portion of the particular participant (e.g., showing the entirety of the particular participant), and the second version may show a smaller portion of the particular participant (e.g., showing the face of the particular participant only).

In some embodiments, the first region of the physical space includes a physical object, and moving the virtual representation of the first participant includes overlying the virtual representation of the first participant on the physical object. A physical object may include any tangible thing, item, or entity, that exists in the physical world. Overlying refers to a condition where something is positioned at least partially on top of or at least partially covering or blocking something else. For example, the physical object may include a floor of the physical space, and the virtual representation of the first participant may be overlying on the floor (e.g., to simulate the first participant standing on the floor). In some examples, the physical object may include, for example, a chair, seat, or sofa in the physical space, and the virtual representation of the first participant may be overlying on the chair, seat, or sofa (e.g., to simulate the first participant sitting on the chair, seat, or sofa). The physical object may include any other type of physical item that may be located in the physical space as desired.

Figure 37:
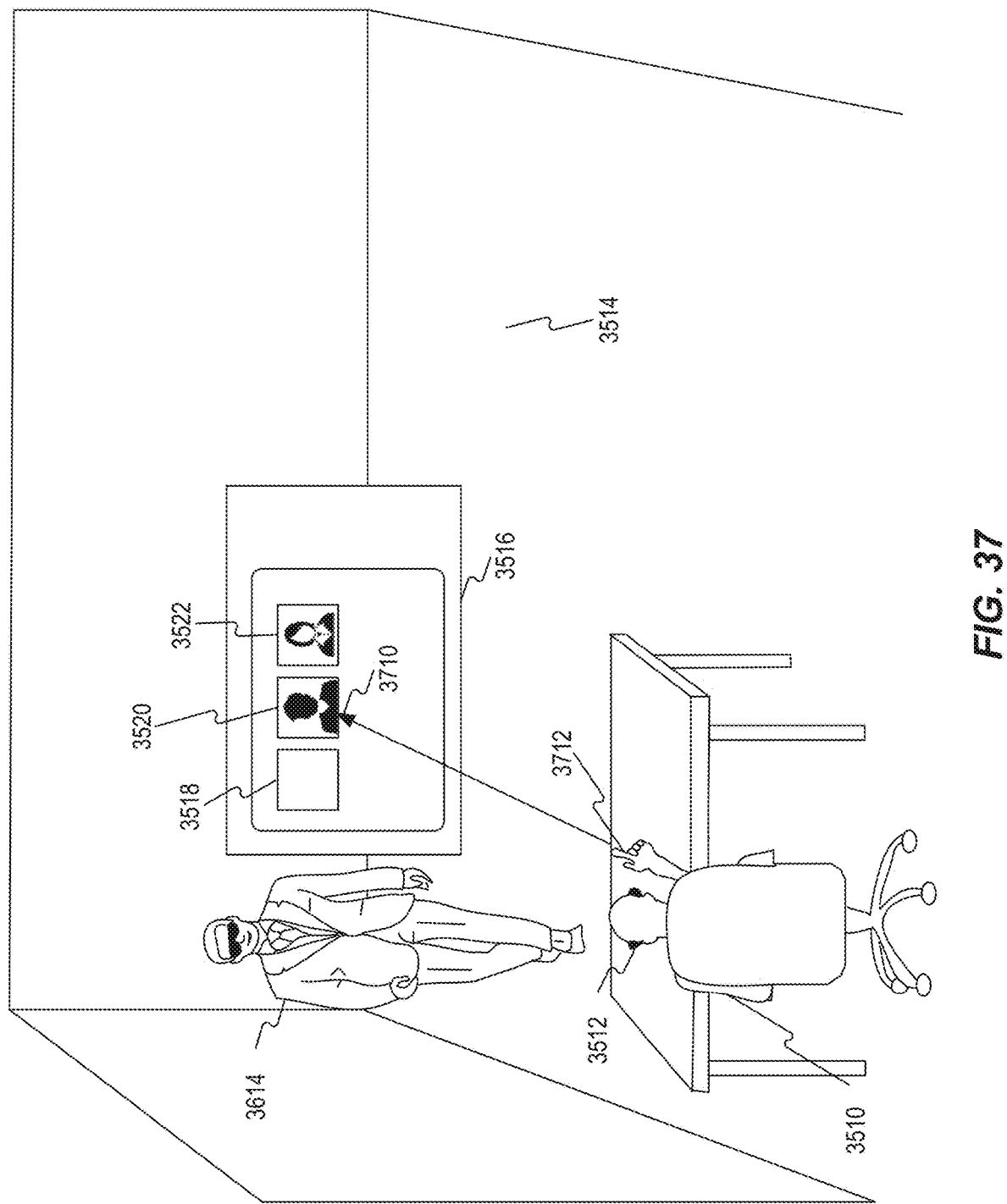

With reference to FIG. 36, in response to the first selection 3524 and the first environmental placement location 3610, at least one processor associated with the wearable extended reality appliance 3512 may move a virtual representation of the first participant 3518 to the first environment 3514 in a manner simulating the first participant 3614 physically located in the first region of the physical space while the second participant 3520 remains in the second peripheral environment 3516. In some examples, the hand gestures 3526, 3612 of the user 3510 may indicate a user intention to move the virtual representation of the first participant 3518 to the first environment 3514 (e.g., by drag-and-drop hand gestures, by hold-and-move hand gestures, by selections of the first participant 3518 and its placement location in the first environment 3514, or other suitable indications). With reference to FIG. 37, after moving the virtual representation of the first participant 3518 to the first environment 3514, the virtual representation of the first participant 3518 may, for example, not be displayed in the second peripheral environment 3516, and the virtual representation of the first participant 3614 may, for example, be displayed in the first environment 3514.

Some embodiments involve receiving a second selection of the second participant in the second peripheral environment for virtual movement to the first environment. Receiving the second selection of the second participant in the second peripheral environment for virtual movement to the first environment may be performed in a similar manner as receiving the first selection of the first participant in the second peripheral environment for virtual movement to the first environment (e.g., as described above). For example, at least one processor associated with the wearable extended reality appliance may receive the second selection of the second participant in the second peripheral environment. The second selection may be based on, for example, input from a user of the wearable extended reality appliance. The user input may be provided to the at least one processor, for example, using any desired input device (e.g., an image sensor, a pointing device, a keyboard, etc.). The user input may be provided in various desired manners, such as using a gesture of the user as captured by an image sensor, using a drag-and-drop process as captured by a pointing device, or using a command that a user may input via a keyboard. The user input may indicate that the user intends to cause the second participant as displayed in the second peripheral environment to be moved to the first environment and to be displayed using a virtual representation of the second participant in the first environment.

With reference to FIG. 37, at least one processor associated with the wearable extended reality appliance 3512 may receive a second selection 3710 of the second participant 3520 in the second peripheral environment 3516 for virtual movement to the first environment 3514. The second selection 3710 may be, for example, based on a hand gesture 3712 of the user 3510. The hand gesture 3712 may indicate the second selection 3710 of the second participant 3520, for example, by pointing to the second participant 3520 in the second peripheral environment 3516.

Some embodiments involve receiving a second environmental placement location associated with the second selection. In some embodiments, the second environmental placement location corresponds to a second region of the physical space different from the first region. Receiving the second environmental placement location associated with the second selection may be performed in a similar manner as receiving the first environmental placement location associated with the first selection (e.g., as described above). For example, the second environmental placement location may include, for example, any indication of a location for placing a representation of a participant (e.g., the second participant) of the multi-participant video conference. In some examples, at least one processor associated with the wearable extended reality appliance may receive the second environmental placement location in connection with the receiving of the second selection of the second participant. For example, the second environmental placement location may be determined based on user input received from an input device associated with the wearable extended reality appliance (e.g., an image sensor, a pointing device, a physical keyboard, etc.). As one example, an image sensor associated with the wearable extended reality appliance may capture a gesture of a user, and the gesture may indicate the second environmental placement location. As another example, a pointing device associated with the wearable extended reality appliance may detect user input indicating the second environmental placement location (e.g., a dropping location of a drag-and-drop process for the second participant, a clicking on a location that may be used as the second environmental placement location, a selection of a location that may be used as the second environmental placement location, or any other indication of the second environmental placement location). As another example, a physical keyboard associated with the wearable extended reality appliance may detect user input indicating the second environmental placement location (e.g., a user may type in a location that may be used as the second environmental placement location, a user may type in the coordinates of a location that may be used as the second environmental placement location, etc.). The second environmental placement location may correspond to a second region of the physical space (e.g., in which the wearable extended reality appliance may be located). The second region of the physical space may include, for example, any location, area, space, scope, or extent that a user may select as the second environmental placement location. In some examples, input device(s) may be used to allow the user to select the second region of the physical space. For example, the physical space may be measured using a coordinate system, be segmented into a plurality of regions with designated identifiers, or be measured or marked in other suitable manners. Input device(s) may be used to allow a user to select or indicate the second region of the physical space, for example, based on identifying the coordinates of the second region, selecting the designated identifier for the second region from the plurality of segmented regions, or other suitable methods. The second region of the physical space may be different from the first region of the physical space. For example, the second region may not overlap with the first region.

Figure 38:
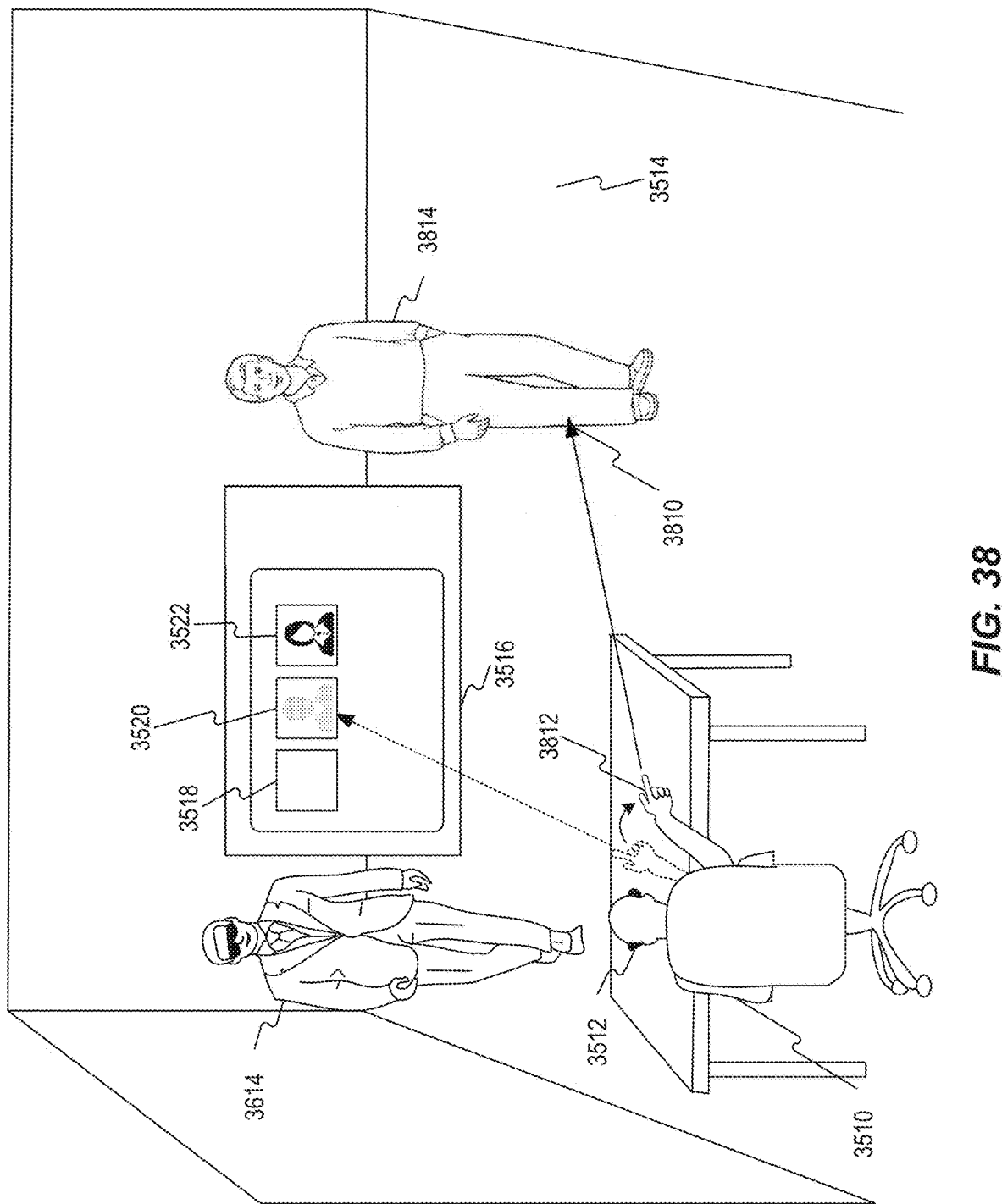

With reference to FIG. 38, at least one processor associated with the wearable extended reality appliance 3512 may receive a second environmental placement location 3810 associated with the second selection 3710. In some examples, the second environmental placement location 3810 may correspond to a second region of the physical space different from the first region. The second environmental placement location 3810 may be, for example, based on a hand gesture 3812 of the user 3510. The hand gesture 3812 may indicate the second environmental placement location 3810, for example, by pointing to the second region of the physical space.

Some embodiments involve, in response to the second selection and the second environmental placement location, moving a virtual representation of the second participant to the first environment in a manner simulating the second participant physically located in the second region of the physical space, such that when viewed through the wearable extended reality appliance, the first participant and the second participant are simulated as being physically present simultaneously in the first environment. In response to the second selection and the second environmental placement location, moving a virtual representation of the second participant to the first environment in a manner simulating the second participant physically located in the second region of the physical space may be performed in a similar manner as described earlier with the movement of a virtual representation of the first. For example, in response to the second selection and the second environmental placement location, at least one processor associated with the wearable extended reality appliance may cause a virtual representation of the second participant to be displayed in the second environmental placement location in the first environment. The virtual representation of the second participant as displayed in the first environment may include, for example, a two-dimensional icon, image, symbol, or indication, or a three-dimensional graphical model representing the second participant. In some examples, the virtual representation of the second participant as displayed in the first environment may resemble the second participant (e.g., based on images or videos of the second participant). In some examples, the virtual representation of the second participant as displayed in the first environment may include an animated or inanimate avatar for the second participant (e.g., a two-dimensional or three-dimensional model of a person with customizations). The virtual representation of the second participant may be displayed (e.g., via the wearable extended reality appliance) in the first environment in a manner simulating the second participant physically located in the second region of the physical space.

After moving the virtual representation of the first participant to the first environment and moving the virtual representation of the second participant to the first environment, the first participant and the second participant, when viewed through the wearable extended reality appliance, may be simulated as being physically present simultaneously in the first environment. The processes associated with selecting a participant (e.g., the first participant, the second participant, or any other participant) from the second peripheral environment and moving the selected participant to a location in the first environment may occur during the multi-participant video conference. The processes may allow a user of the wearable extended reality appliance to conduct the video conference with virtual representation(s) of some participant(s) displayed in the first environment and virtual representation(s) of other participant(s) displayed in the second peripheral environment, and/or may allow the user to change or arrange the manner in which any participant of the multi-participant video conference may be displayed (e.g., in the first environment or in the second peripheral environment).

Figure 39:
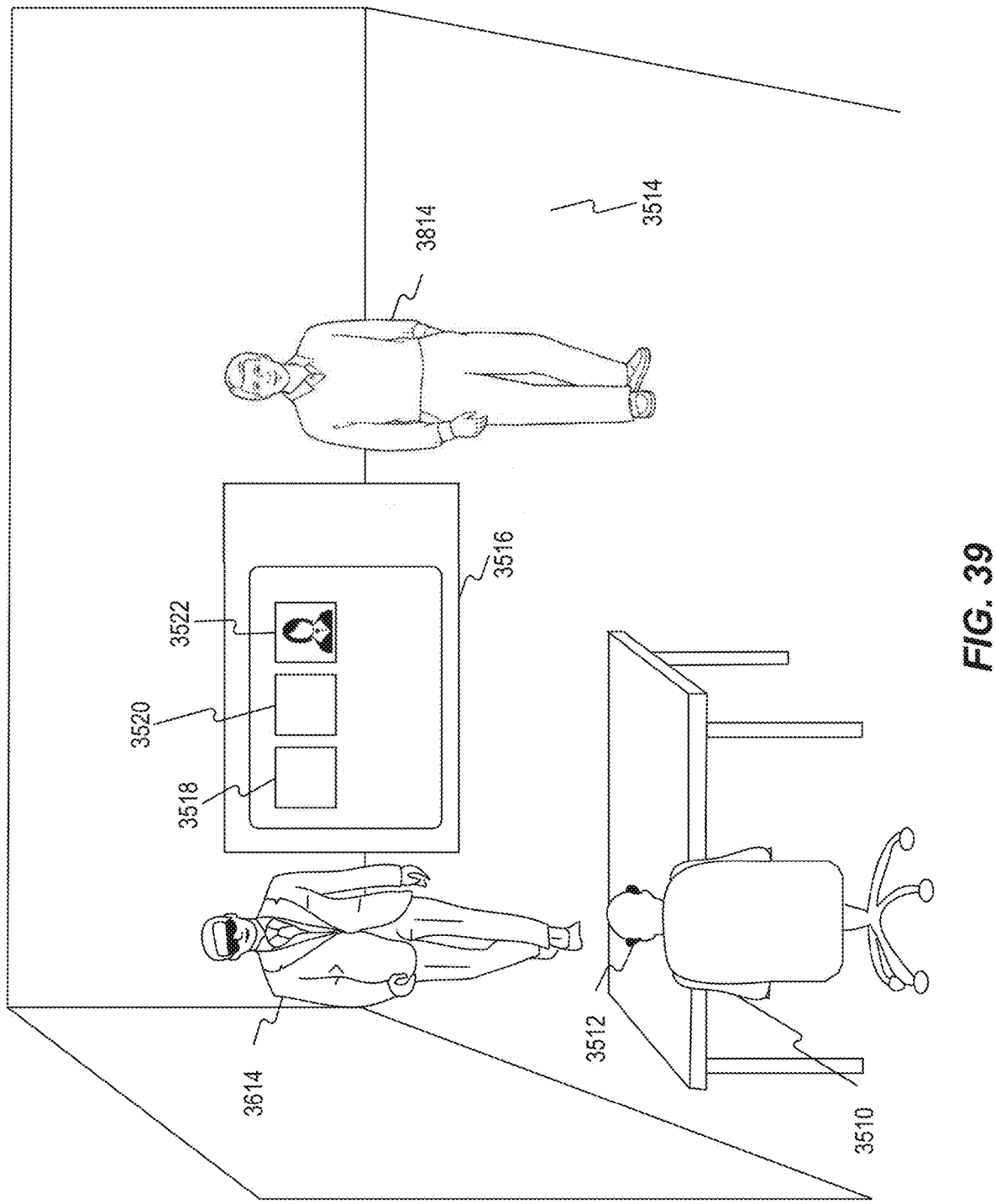

With reference to FIG. 38, at least one processor associated with the wearable extended reality appliance 3512 may, in response to the second selection 3710 and the second environmental placement location 3810, move a virtual representation of the second participant 3520 to the first environment 3514 in a manner simulating the second participant 3814 physically located in the second region of the physical space. In some examples, the hand gestures 3712, 3812 of the user 3510 may indicate a user intention to move the virtual representation of the second participant 3520 to the first environment 3514 (e.g., by drag-and-drop hand gestures, by hold-and-move hand gestures, by selections of the second participant 3520 and its placement location in the first environment 3514, or other suitable indications). With reference to FIG. 39, after moving the virtual representation of the second participant 3520 to the first environment 3514, the first participant 3614 and the second participant 3814, when viewed through the wearable extended reality appliance 3512, may be simulated as being physically present simultaneously in the first environment 3514. With reference to FIG. 39, after moving the virtual representation of the second participant 3520 to the first environment 3514, the virtual representation of the second participant 3520 may, for example, not be displayed in the second peripheral environment 3516, and the virtual representation of the second participant 3814 may, for example, be displayed in the first environment 3514.

Some embodiments involve enabling a remote display of the virtual representation of the physical space with the virtual representations of the first participant and the second participant, while withholding from viewing via the remote display the second peripheral environment. Enabling, as used in this context has the same meaning discussed earlier. By way of non-limiting example, enabling remote display may involve the direct or indirect transmission of signals for causing the display, or the provision of a platform through which the remote display is facilitated. The remote display may be caused to occur on any device or element that may provide visual output, such as a physical screen, a physical display, a virtual screen, a virtual display, a wearable extended reality appliance, and/or the like. The remote display may be located in a location remote from the wearable extended reality appliance described above. For example, the remote display and the wearable extended reality appliance (associated with arranging the display of the first and second participants) may be located in different locations (e.g., in different rooms, in different buildings, in different cities, in different countries, etc.), and/or may have any desired distance therebetween (e.g., 10 meters, 50 meters, 100 meters, 1 kilometer, 2 kilometers, 3 kilometers, 5 kilometers, 10 kilometers, 100 kilometers, 1,000 kilometers, 5,000 kilometers, 10,000 kilometers, or any other distance). In some examples, data representing the physical space in which the wearable extended reality appliance may be located, and data representing the first and second participants as displayed in the first environment may be transmitted to the remote display for output. The second peripheral environment may not be displayed by the remote display. This may allow a view, via the remote display, of a virtual conference in the physical space with the first and second participants virtually represented in the physical space. In some embodiments, enabling the remote display of the virtual representation of the physical space includes outputting signals for causing the virtual representation of the physical space to be viewable on additional wearable extended reality appliances. For example, signals or data representing the physical space in which the wearable extended reality appliance (associated with arranging the display of the first and second participants) may be located may be transmitted to additional wearable extended reality appliances (e.g., wearable extended reality appliances used by the first participant, the second participant, other participants, or other persons). As one example, an image sensor may be used to capture images or videos of the physical space, and a virtual representation of the physical space may be generated based on the captured images or videos. The virtual representation of the physical space may be displayed by the additional wearable extended reality appliances, for example, in a three-dimensional manner (e.g., allowing users of the additional wearable extended reality appliances to have an experience of being present in the physical space).

In some embodiments, the first region of the physical space is associated with physical conditions, and moving the virtual representation of the first participant includes adjusting presentation characteristics of the virtual representation of the first participant based on the physical conditions. A physical condition may refer to, for example, any circumstance, state, status, context, setting, or situation associated with a physical region, area, extent, or location. The physical conditions of the first region may include, for example, lighting conditions associated with the first region (e.g., caused by an artificial source of light such as a lighting element or screen or caused by a location in proximity to a window opening, or reflective surface) which causes one region to be brighter than another, physical functions of the first region (e.g., whether the first region includes at least part of an entrance, pathway, etc.), physical objects in the first region (e.g., moving physical objects, stationary physical objects, etc.), or other circumstances or situations of the first region. Presentation characteristics of the virtual representation of the first participant may be adjusted based on the physical conditions, for example, when the virtual representation of the first participant is displayed in the first environment. A presentation characteristic may refer to, for example, brightness, shade, contrast, size, or any configuration, feature, attribute, aspect, or manner for presentation or display of data or information. The presentation characteristics of the virtual representation of the first participant may include, for example, display dimensions for the virtual representation of the first participant (e.g., configurations for the virtual representation of the first participant to have a larger or smaller display size based on physical objects, in the first region, that may be capable of interfering with the virtual representation of the first participant), a degree of illumination of the virtual representation of the first participant (e.g., based on a degree of brightness of the first region), a color scheme of the virtual representation of the first participant (e.g., based on background color(s) of the first region), or other configurations or features for displaying the virtual representation of the first participant. In some examples, image data captured using an image sensor associated with the wearable extended reality appliance may be analyzed to determine the physical conditions associated with the first region of the physical space. For example, a machine learning model may be trained using training examples to determine physical conditions from images and/or videos. An example of such training examples may include a sample image and/or a sample video of a sample region, together with a label indicating physical conditions associated with the sample region. The trained machine learning model may be used to analyze the image data captured using the image sensor associated with the wearable extended reality appliance to determine the physical conditions associated with the first region of the physical space. In another example, a convolution of the image data captured using an image sensor associated with the wearable extended reality appliance may be calculated to obtain a result value. Further, the physical conditions associated with the first region of the physical space may be determined based on the result value. For example, when the result value is a first numerical value, the physical conditions associated with the first region of the physical space may be identified as a first set of one or more conditions, and when the result value is a second numerical value, the physical conditions associated with the first region of the physical space may be identified as a second set of one or more conditions, the second set of one or more conditions may differ from the first set of one or more conditions. In some examples, a data structure associating regions of the physical space with physical conditions may be accessed (for example, in a memory, in a database, via an external device, via a communication device, etc.) based on the first region of the physical space to obtain the physical conditions associated with the first region of the physical space.

Some embodiments involve analyzing image data captured by an image sensor associated with the wearable extended reality appliance after moving the virtual representation of the first participant to the first environment to identify a change in the physical conditions; and in response to the change in the physical conditions, readjusting the presentation characteristics of the virtual representation of the first participant to account for the changed physical conditions. Analyzing may include performing image analysis on image data. For example, when the virtual representation of the first participant is displayed in the first environment, at least one image sensor associated with the wearable extended reality appliance may capture image data of scenes including the first region in which the virtual representation of the first participant may be displayed. The captured image data may be analyzed, for example, using a light condition analysis algorithm, an object recognition algorithm, and/or any other suitable image processing algorithm, to identify a change in the physical conditions of the first region. In response to the identified change in the physical conditions of the first region, the presentation characteristics of the virtual representation of the first participant may be readjusted to account for the changed physical conditions. For example, the adjustment or readjustment of the presentation characteristics may be based on rules or mappings that may associate different sets of physical conditions with their respective presentation characteristics. Additionally or alternatively, the adjustment or readjustment of the presentation characteristics may be based on presentation preferences configured by a user of the wearable extended reality appliance for different physical conditions. As one example, identifying an increase in brightness of the first region (e.g., when a light bulb associated with the first region is turned on) may cause the degree of illumination of the virtual representation of the first participant to be increased (e.g., so that the virtual representation of the first participant may remain visually clear to a viewer, in view of the brighter ambient light associated with the first region).

Some embodiments involve analyzing image data captured by an image sensor associated with the wearable extended reality appliance after moving the virtual representation of the first participant to the first environment to identify a change in the physical conditions; and in response to the change in the physical conditions, moving the virtual representation of the first participant in the first environment in a manner simulating the first participant physically located in a third region of the physical space different from the first region. For example, when the virtual representation of the first participant is displayed in the first environment, at least one image sensor associated with the wearable extended reality appliance may capture image data of scenes including the first region in which the virtual representation of the first participant may be displayed. The captured image data may be analyzed, for example, using a light condition analysis algorithm, an object recognition algorithm, and/or any other suitable image processing algorithm, to identify a change in the physical conditions of the first region. In response to the identified change in the physical conditions of the first region, the virtual representation of the first participant may be moved in the first environment in a manner simulating the first participant physically located in a third region of the physical space different from the first region (e.g., the virtual representation of the first participant may be moved from the first region to the third region). The third region may, for example, not overlap with the first region. In some examples, the virtual representation of the first participant may be moved from the first region to the third region based on the identified change in the physical conditions of the first region, for example, to avoid a collision or interference of a physical object entering the first region (e.g., a physical person walking into the first region) with the virtual representation of the first participant. For example, the image data may be analyzed using a visual object detection algorithm to identify the position of a physical object. In one example, when the position of the physical object is in the first region, the virtual representation of the first participant may be moved from the first region to the third region. In another example, the image data may be further analyzed using a visual motion detection algorithm to identify a movement of the physical object. Based on the position of the physical object and the motion of the physical object, a prospective entrance of the physical object into the first region may be anticipated. Further, in response to the anticipation of the prospective entrance of the physical object into the first region, the virtual representation of the first participant may be moved from the first region to the third region.

In some embodiments, the change in the physical conditions (associated with the first region) has no effect on physical conditions associated with the second region. Some embodiments involve, in response to the change in the physical conditions associated with the first region, moving the virtual representation of the second participant in the first environment in a manner simulating the second participant physically located in a fourth region of the physical space different from the first region and the second region. For example, when the third region overlaps with the second region, moving the virtual representation of the first participant from the first region to the third region may be capable of causing the virtual representation of the first participant to overlap or interfere with the virtual representation of the second participant in the second region. Thus, if the third region overlaps with the second region, when the changed physical conditions associated with the first region causes the virtual representation of the first participant to move from the first region to the third region, the virtual representation of the second participant may be moved from the second region to the fourth region, even when the physical conditions of the second region is not changed by such an extent that may cause moving of the virtual representation of the second participant from the second region to another region (e.g., the change in the physical conditions associated with the first region may have little or no effect on the physical conditions associated with the second region). In some examples, the fourth region may be different from the first region, the second region, and/or the third region. For example, the fourth region may not overlap with the first region, the second region, and/or the third region. As one example, the changed physical conditions associated with the first region may cause moving of each of the first and second participants by a position (e.g., by any desired distance, such as 0.5 meters, 0.6 meters, 0.7 meters, 0.8 meters, 0.9 meters, 1 meter, 2 meters, etc.) in a direction (e.g., in the left direction, in the right direction, in the front direction, in the back direction, etc.).

Some embodiments involve after moving the virtual representation of the first participant and the virtual representation of the second participant to the first environment, receiving input from an individual using the wearable extended reality appliance. In some embodiments, the input is indicative of a particular position in the physical space. For example, when the virtual representations of the first and second participants are displayed in the first environment by the wearable extended reality appliance, at least one processor associated with the wearable extended reality appliance may receive input from an individual using the wearable extended reality appliance. The input may include, for example, a user gesture as captured by an image sensor, a user action as received by a pointing device, a user command as received by a keyboard, or any other desired information or indication that a user may provide. The input may indicate a particular position in the physical space (e.g., the particular position may be represented using coordinates of a coordinate system, using a designated identifier for a location from a plurality of designated locations in the physical space, or represented in any other desired manner).

Some embodiments involve determining that the particular position is associated with the first region. The particular position being associated with the first region of the physical space may include, for example, the particular position being within the first region, or the particular position being outside of the first region and having a distance to the first region less than a threshold distance (e.g., 0.05 meters, 0.1 meters, 0.2 meters, 0.3 meters, 0.5 meters, 1 meter, 2 meters, or any other desired threshold distance). Determining whether the particular position is associated with the first region may be based on, for example, comparing the coordinates describing the particular position with the coordinates describing the first region, or comparing other spatial descriptors for the particular position and the first region (e.g., to determine whether the particular position is within the first region, or whether the distance between the particular position and the first region is less than the threshold distance when the particular position is outside of the first region).

Some embodiments involve, in response to the determination that the particular position is associated with the first region, presenting through the wearable extended reality appliance a plurality of actionable virtual objects. In some embodiments, each actionable virtual object of the plurality of actionable virtual objects enables the individual to activate a different functionality associated with the first participant. A virtual object may refer to, for example, a visual representation rendered by a computing device and configured to represent an object. An actionable virtual object may refer to, for example, a virtual object that, when activated, selected, or triggered, may cause performance of actions, processes, or functionalities. The plurality of actionable virtual objects may include, for example, icons, symbols, images, widgets, or other indications of applications or functionalities. The plurality of actionable virtual objects may be animated or inanimate. In response to the determination that the particular position is associated with the first region, the plurality of actionable virtual objects may be presented via the wearable extended reality appliance. The presentation of the plurality of actionable virtual objects may include, for example, listing the plurality of actionable virtual objects (e.g., in a line, in multiple lines, in a circle, etc.) near (e.g., next to, on the left side of, on the right side of, above, below, in front of, behind, around, etc.) the virtual representation of the first participant in the first environment, surrounding the virtual representation of the first participant in the first environment with the plurality of actionable virtual objects, showing the plurality of actionable virtual objects in a designated location (e.g., in the first environment or in the second peripheral environment), or presenting the plurality of actionable virtual objects in any other desired manner. Each actionable virtual object of the plurality of actionable virtual objects may enable the individual using the wearable extended reality appliance to activate a different functionality associated with the first participant (e.g., by selecting the actionable virtual object). Each actionable virtual object of the plurality of actionable virtual objects, when activated, may cause performance of one or more of various functionalities (e.g., initiating email communication with the first participant, initiating instant message communication with the first participant, initiating assignment of control of the video conference to the first participant, initiating assignment of presentation control for the video conference to the first participant, initiating adjustment of display parameters for the virtual representation of the first participant in the first environment, initiating adjustment of the display location of the virtual representation of the first participant in the first environment, causing the virtual representation of the first participant to be moved from the first environment to the second peripheral environment, or any other desired functionality).

Some embodiments involve receiving a selection of a particular actionable virtual object of the plurality of actionable virtual objects. In some embodiments, the particular actionable virtual object is associated with a particular functionality associated with the first participant. For example, at least one processor associated with the wearable extended reality appliance may receive a selection of a particular actionable virtual object of the plurality of actionable virtual objects. The selection of the particular actionable virtual object may be based on, for example, user input from an input device (e.g., an image sensor, a pointing device, a keyboard). For example, the selection of the particular actionable virtual object may include a user gesture directed to the particular actionable virtual object as captured by an image sensor, a clicking or activation of the particular actionable virtual object using a pointing device, a user command directed to the particular actionable virtual object that a user may type in using a keyboard, or any other suitable information or indication received from an input device. The particular actionable virtual object may be associated with a particular functionality associated with the first participant. For example, the particular actionable virtual object, when selected or activated, may cause performance of the particular functionality associated with the first participant. In some examples, the particular actionable virtual object may be associated with the particular functionality, for example, based on the particular actionable virtual object (e.g., an identifier, an icon, a symbol, an image, a widget) serving as an electronic hyperlink, a link, a shortcut, a handle, a reference, an application programming interface (API), or any other trigger, activator, connector, or indicator for the particular functionality.

Some embodiments involve, in response to the selection of the particular actionable virtual object, initiating the particular functionality associated with the first participant. For example, in response to the selection of the particular actionable virtual object, at least one processor associated with the wearable extended reality appliance may cause performance of the particular functionality associated with the first participant. In some embodiments, initiating the particular functionality includes establishing a private communication channel between the individual and the first participant. The private communication channel may be configured to allow the individual using the wearable extended reality appliance to communicate with the first participant. The private communication channel may include, for example, any type of connection between the individual and the first participant, such as email communication, instant message communication, voice communication, video communication, or any other type of connection. Users other than the individual and the first participant may not be able to access the private communication channel (e.g., users other than the individual and the first participant may not be able to transmit information via the private communication channel, or to receive information via the private communication channel) In some embodiments, initiating the particular functionality includes moving the virtual representation of the first participant back to the second peripheral environment. For example, in response to the selection of the particular actionable virtual object, at least one processor associated with the wearable extended reality appliance may discontinue display of the virtual representation of the first participant in the first environment (e.g., a three-dimensional virtual representation), and may cause display of the first participant in the second peripheral environment (e.g., an image or video stream of the first participant).

Some embodiments involve a method for managing an extended reality conference, the method including: facilitating a multi-participant video conference between a plurality of physically dispersed participants; enabling, via a wearable extended reality appliance, viewing of a first environment representing a physical space and a second peripheral environment; enabling a display of the plurality of participants in the second peripheral environment, the plurality of participants including a first participant and a second participant; receiving a first selection of the first participant in the second peripheral environment for virtual movement to the first environment; and receiving a first environmental placement location associated with the first selection. In some embodiments, the first environmental placement location corresponds to a first region of the physical space. Some embodiments involve: in response to the first selection and the first environmental placement location, moving a virtual representation of the first participant to the first environment in a manner simulating the first participant physically located in the first region of the physical space while the second participant remains in the second peripheral environment; receiving a second selection of the second participant in the second peripheral environment for virtual movement to the first environment; and receiving a second environmental placement location associated with the second selection. In some embodiments, the second environmental placement location corresponds to a second region of the physical space different from the first region. Some embodiments involve, in response to the second selection and the second environmental placement location, moving a virtual representation of the second participant to the first environment in a manner simulating the second participant physically located in the second region of the physical space, such that when viewed through the wearable extended reality appliance, the first participant and the second participant are simulated as being physically present simultaneously in the first environment.

Some embodiments involve a system for managing an extended reality conference, the system including at least one processing device configured to: facilitate a multi-participant video conference between a plurality of physically dispersed participants; enable, via a wearable extended reality appliance, viewing of a first environment representing a physical space and a second peripheral environment; enable a display of the plurality of participants in the second peripheral environment, the plurality of participants including a first participant and a second participant; receive a first selection of the first participant in the second peripheral environment for virtual movement to the first environment; and receive a first environmental placement location associated with the first selection. In some embodiments, the first environmental placement location corresponds to a first region of the physical space. In some embodiments, the at least one processing device is configured to: in response to the first selection and the first environmental placement location, move a virtual representation of the first participant to the first environment in a manner simulating the first participant physically located in the first region of the physical space while the second participant remains in the second peripheral environment; receive a second selection of the second participant in the second peripheral environment for virtual movement to the first environment; and receive a second environmental placement location associated with the second selection. In some embodiments, the second environmental placement location corresponds to a second region of the physical space different from the first region. In some embodiments, the at least one processing device is configured to, in response to the second selection and the second environmental placement location, move a virtual representation of the second participant to the first environment in a manner simulating the second participant physically located in the second region of the physical space, such that when viewed through the wearable extended reality appliance, the first participant and the second participant are simulated as being physically present simultaneously in the first environment.

Figure 40:
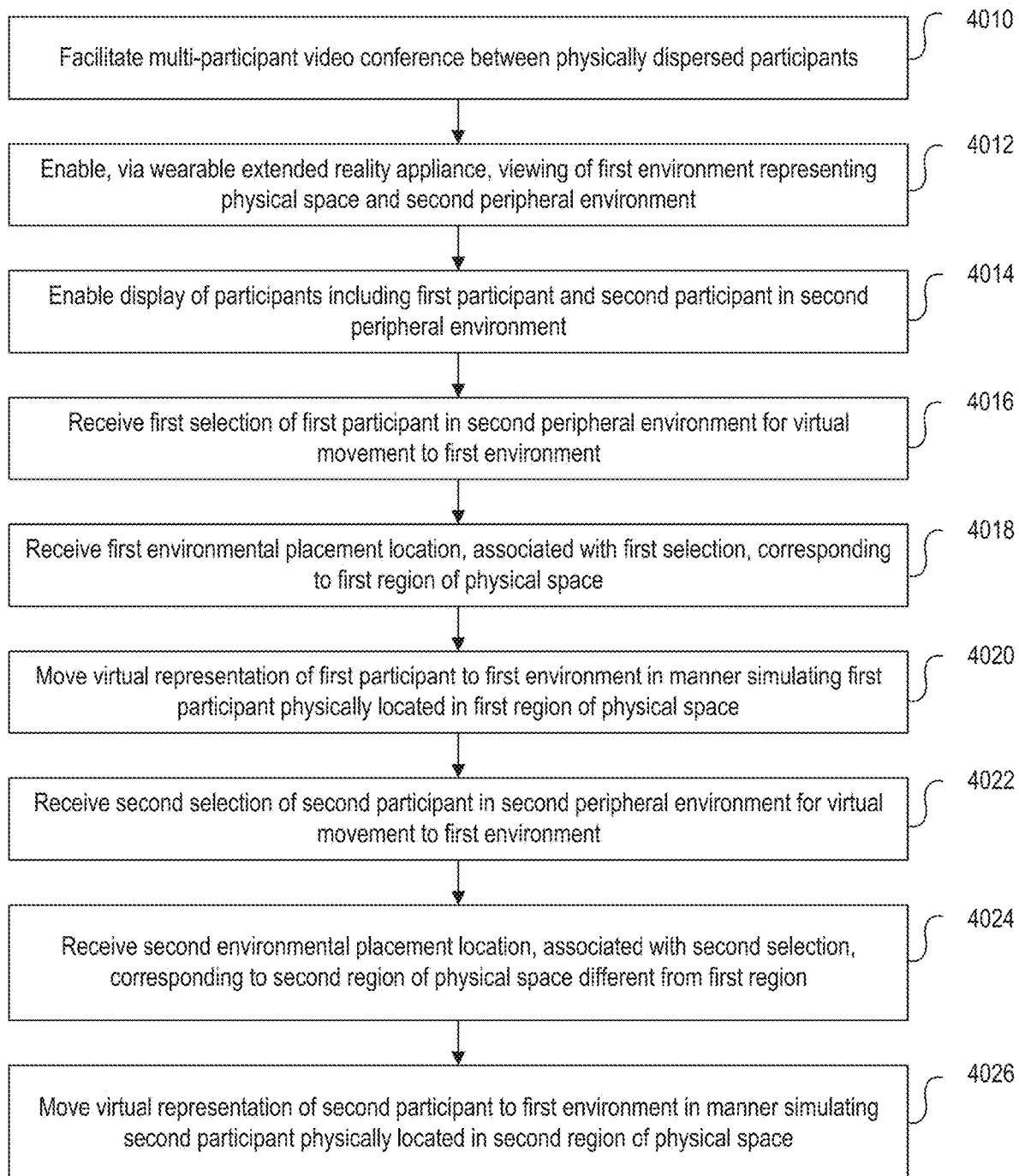
FIG. 40 is a flowchart illustrating an exemplary process for extracting video conference participants to an extended reality environment, consistent with some embodiments of the present disclosure.

FIG. 40 is a flowchart illustrating an exemplary process 4000 for extracting video conference participants to an extended reality environment, consistent with some embodiments of the present disclosure. With reference to FIG. 40, in step 4010, the process 4000 may include facilitating a multi-participant video conference between a plurality of physically dispersed participants. In step 4012, the process 4000 may include enabling, via a wearable extended reality appliance, viewing of a first environment representing a physical space and a second peripheral environment. In step 4014, the process 4000 may include enabling a display of the plurality of participants in the second peripheral environment, the plurality of participants including a first participant and a second participant. In step 4016, the process 4000 may include receiving a first selection of the first participant in the second peripheral environment for virtual movement to the first environment. In step 4018, the process 4000 may include receiving a first environmental placement location associated with the first selection. In some examples, the first environmental placement location may correspond to a first region of the physical space. In step 4020, the process 4000 may include, in response to the first selection and the first environmental placement location, moving a virtual representation of the first participant to the first environment in a manner simulating the first participant physically located in the first region of the physical space while the second participant remains in the second peripheral environment. In step 4022, the process 4000 may include receiving a second selection of the second participant in the second peripheral environment for virtual movement to the first environment. In step 4024, the process 4000 may include receiving a second environmental placement location associated with the second selection. In some examples, the second environmental placement location may correspond to a second region of the physical space different from the first region. In step 4026, the process 4000 may include, in response to the second selection and the second environmental placement location, moving a virtual representation of the second participant to the first environment in a manner simulating the second participant physically located in the second region of the physical space, such that when viewed through the wearable extended reality appliance, the first participant and the second participant are simulated as being physically present simultaneously in the first environment.

Disclosed embodiments may involve determining default positions for the representations of participants in an extended reality conference based on information associated with a physical environment of the user of a wearable extended reality appliance. For example, if a physical environment includes a bright window or a door that may interfere with a viewing experience for the user, the system may avoid placing virtual representations of participants in those locations.

Some embodiments involve a non-transitory computer readable medium containing instructions that when executed by at least one processor cause the at least one processor to perform operations for managing extended reality video conferences. The term "non-transitory computer readable medium" may be understood as described elsewhere in this disclosure. The term "instructions" may refer to program code instructions that may be executed by a processor. The instructions may be written in any type of computer programming language, such as an interpretive language (e.g., scripting languages such as HTML and JavaScript), a procedural or functional language (e.g., C or Pascal that may be compiled for converting to executable code), object-oriented programming language (e.g., Java or Python), logical programming language (e.g., Prolog or Answer Set Programming), or any other programming language. In some examples, the instructions may implement methods associated with machine learning, deep learning, artificial intelligence, digital image processing, and any other computer processing technique. The term "processor" may be understood as described elsewhere in this disclosure. For example, the at least one processor may be one or more of the server 210 of FIG. 2, the mobile communications device 206 of FIG. 2, the processing device 360 of FIG. 3, the processing device 460 of FIG. 4, or the processing device 560 of FIG. 5, and the instructions may be stored at any of the data structure 212, the memory devices 311, 411, or 511, or a memory of the mobile communications device 206.

An extended reality conference may refer to, for example, any gathering, meeting, conversation, discussion, seminar, call, dialogue, chat, or interaction associated with an extended reality environment. An extended reality conference may allow participants to exchange ideas, thoughts, notes, opinions, or other desired information. An extended reality conference may be held in an extended reality environment, where one or more participants are presented in a virtual manner. For example, extended reality conferences may occur using hardware, such as one or more wearable extended reality appliances for simulating presentation of one or more participants in a scene. For example, wearable extended reality appliances may be used to establish a platform for the extended reality conference, by generating a user interface for the extended reality conference, capturing, receiving, or transmitting various types of data associated with the extended reality conference, displaying video associated with the extended reality conference, outputting audio associated with the extended reality conference, or performing any other suitable action or functionality associated with the extended reality conference.

An extended reality video conference may occur completely in real time or may include some content recorded in real time and additional content prerecorded. In some examples, one or more participants in an extended reality conference may physically appear in a scene while one or more others may be simulated in the scene. As one example, an extended reality video conference may involve capturing, transmitting, receiving, and/or displaying videos of participants of the conference. A video conference may include a live meeting or conversation conducted over a communications network using multimedia technology, such as video and audio communications. Participants in a video conference may communicate with each other and collaborate in real-time, from any location. Video conferencing may allow participants to see and hear each other, share documents, and use collaborative tools such as virtual whiteboards or shared screens, to simulate a real (e.g., physical) conference. An extended reality video conference may include a video conference where some or all of the participants may communicate via wearable extended reality appliances. For example, each participant may see and/or hear the other participants as virtual content presented via a wearable extended reality appliance. Managing extended reality video conferences may include controlling, organizing, supervising, administering, conducting, performing, guiding, or running extended reality video conferences. In some examples, managing extended reality video conferences may include acts or processes of positioning visual representations of participants in a completely or partially simulated environment, as described in greater detail herein.

Some embodiments involve receiving a request to initiate a video conference between a plurality of participants. Participants may refer to entities (e.g., including individuals, humans, avatars, devices, and/or other objects) engaging, partaking, or otherwise performing actions in a shared activity with other entities. The plurality of participants may be located in different locations (e.g., in different rooms, in different buildings, in different cities, in different countries, etc.). Two or more of the locations of the plurality of participants may have any desired distance therebetween (e.g., 10 meters, 50 meters, 100 meters, 1 kilometer, 2 kilometers, 3 kilometers, 5 kilometers, 10 kilometers, 100 kilometers, 1,000 kilometers, 5,000 kilometers, 10,000 kilometers, or any other distance). In some examples, some participants of the plurality of participants may be located relatively closer to each other, and some other participants of the plurality of participants may be located relatively further from each other.

Receiving may refer to, for example, taking delivery of, accepting, acquiring, retrieving, generating, obtaining, detecting, or otherwise gaining access to. For example, information or data may be received in a manner that is detectable by or understandable to a processor, as described elsewhere in this disclosure. Receiving may involve obtaining data via wired and/or wireless communications links. A request may include, for example, an appeal, petition, demand, asking, call, and/or instruction (e.g., to a computing device to provide information or perform an action or function). A request to initiate a video conference between a plurality of participants may refer to, for example, a request to commence, institute, launch, establish, set up, or start a video conference between a plurality of participants, or to cause a video conference between a plurality of participants to begin. A request to initiate a video conference between a plurality of participants may include information regarding the time of the video conference, the duration of the video conference, and/or the topic of the video conference, contact information of participants, and/or any other information that may be used to initiate the video conference. In some embodiments, a request to initiate a video conference between a plurality of participants may include permissions granted to participants (e.g., permissions to speak and/or share documents during the video conference may be granted to selected participants). A video conference may include, for example, any gathering, meeting, conversation, discussion, seminar, call, dialogue, chat, or interaction that may involve video (e.g., video communication).

At least one processor associated with a wearable extended reality appliance may receive a request to initiate a video conference between a plurality of participants. Receiving of the request to initiate the video conference may be performed in a variety of manners. As one example, the at least one processor associated with the wearable extended reality appliance may receive a video conference call from another device (e.g., in real-time), and a user of the wearable extended reality appliance may take the call to initiate a video conference. Receiving of the request to initiate the video conference may include or be based on, for example, receiving the video conference call and/or the user taking the call. As another example, the at least one processor associated with the wearable extended reality appliance may receive a link to a video conference (e.g., in a meeting invite), and a user of the wearable extended reality appliance may activate (e.g., select or click) the link to initiate the video conference. Receiving of the request to initiate the video conference may include or be based on, for example, receiving the link to the video conference and/or the user activating the link.

Figure 41:
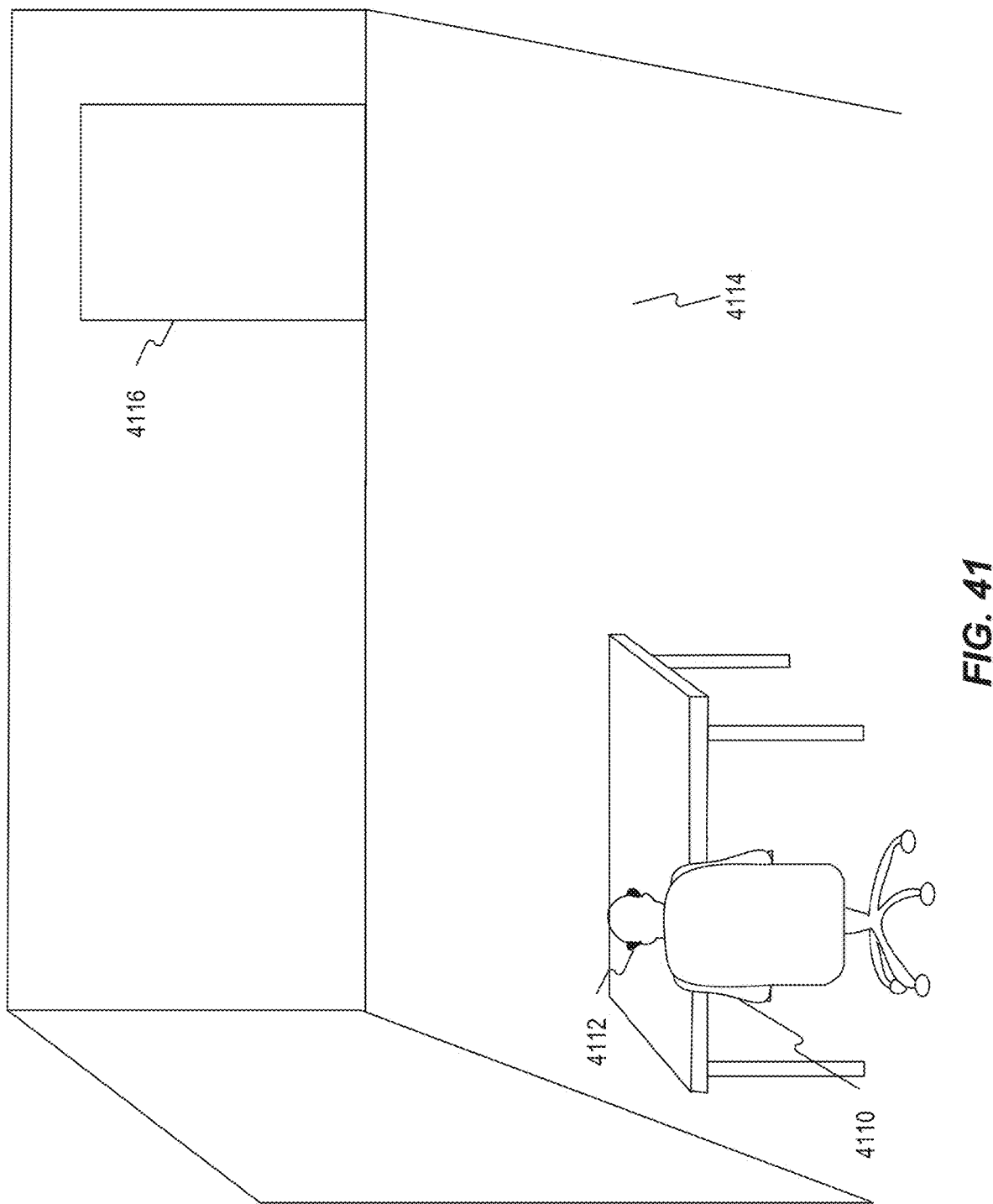
FIGS. 41, 42, and 43 are exemplary use snapshots of perspective views of a physical environment associated with the positioning of participants in an extended reality conference, consistent with some embodiments of the present disclosure.
Figure 42:
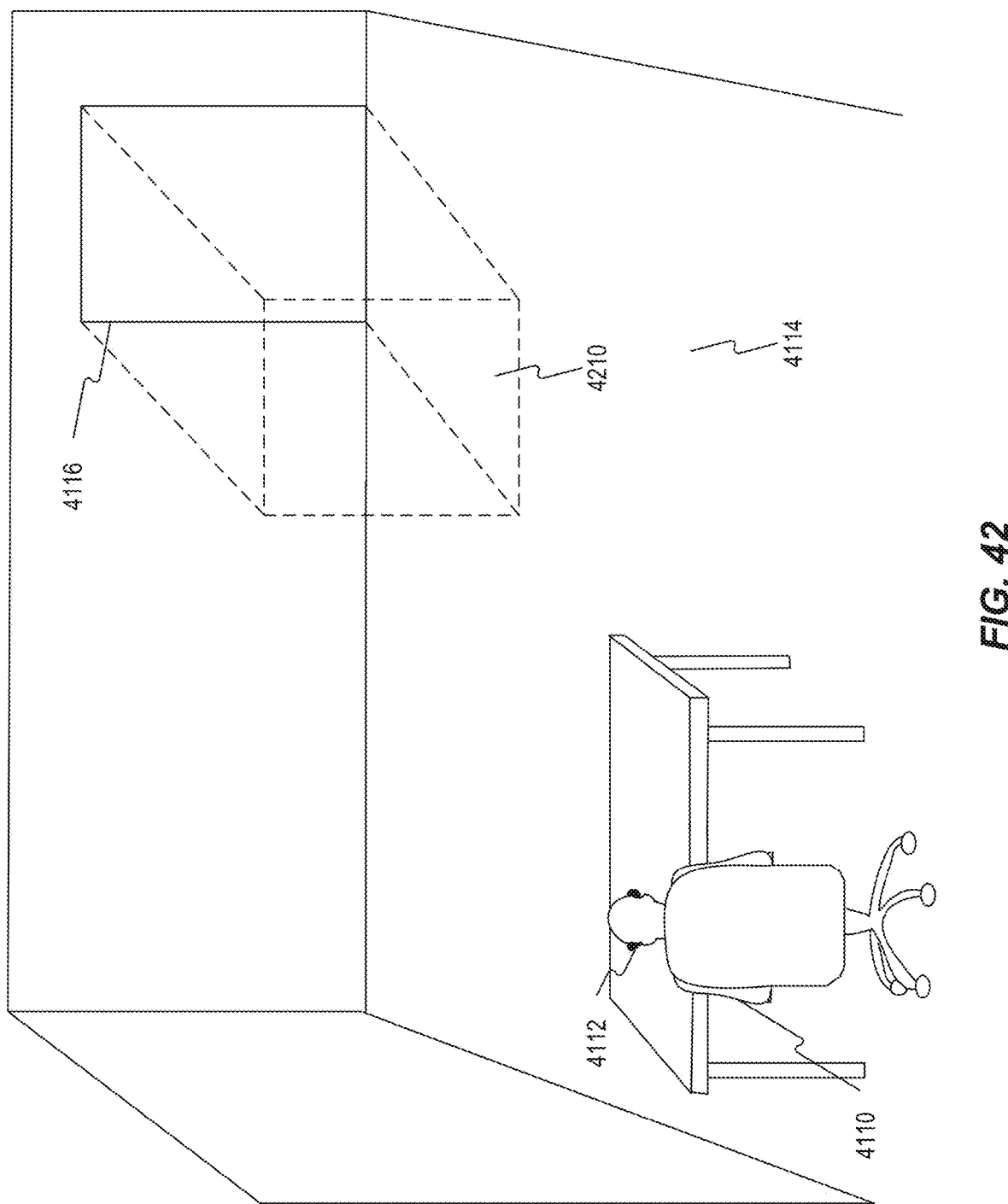
Figure 43:
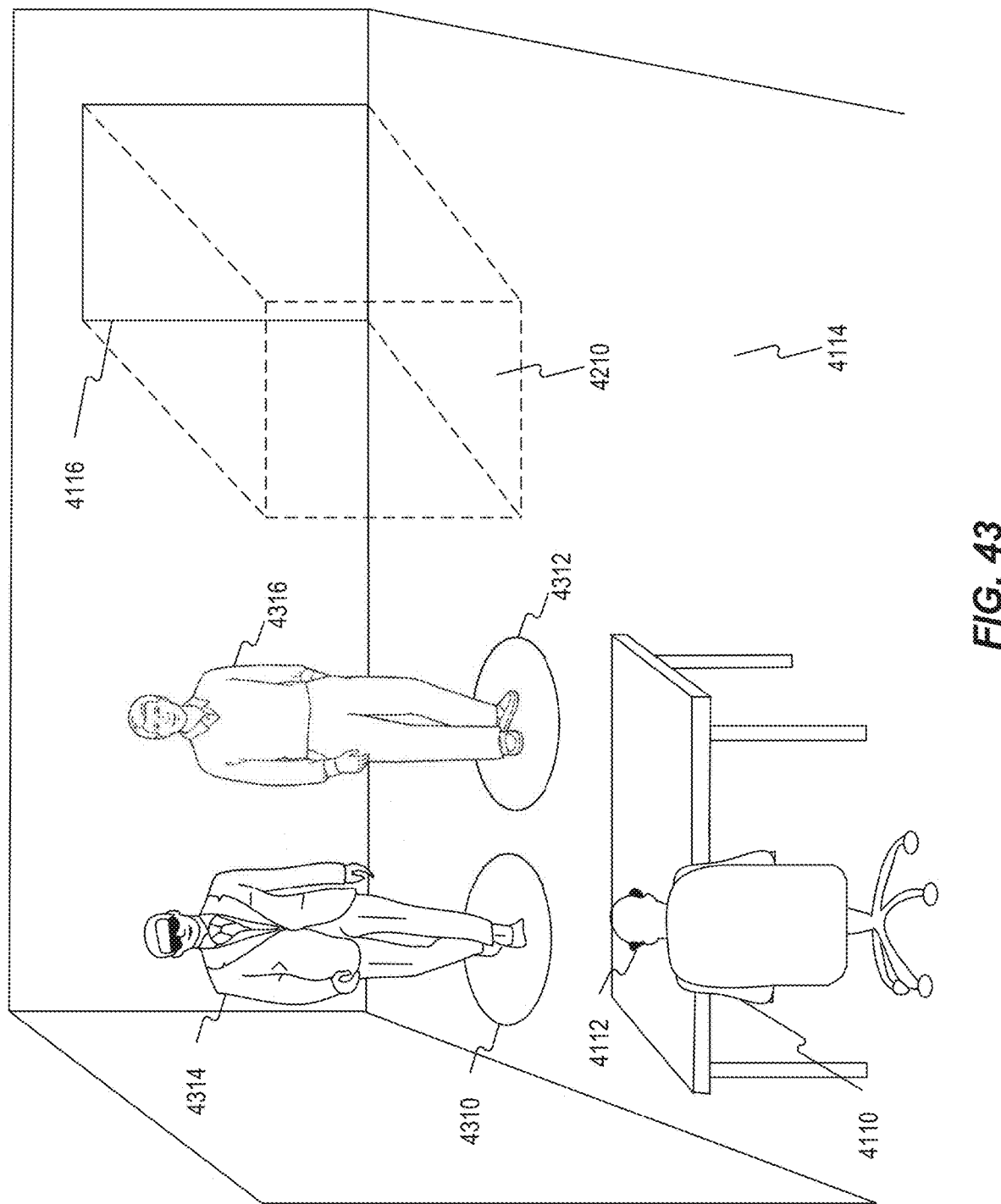

FIGS. 41, 42, and 43 are exemplary use snapshots of perspective views of a physical environment associated with positioning participants of an extended reality conference, consistent with some embodiments of the present disclosure. With reference to FIG. 41, a user 4110 may use a wearable extended reality appliance 4112. At least one processor associated with the wearable extended reality appliance 4112 may receive a request to initiate a video conference between a plurality of participants.

Some embodiments involve receiving image data captured by at least one image sensor associated with a wearable extended reality appliance, the image data reflecting a layout of a physical environment in which the wearable extended reality appliance is located. The terms "image data" and "image sensor" may be understood as described elsewhere in this disclosure. After, based on, and/or in response to receiving the request to initiate the video conference between the plurality of participants, at least one processor associated with the wearable extended reality appliance may, for example, cause an image sensor associated with the wearable extended reality appliance to capture image data of a location or environment in which the wearable extended reality appliance may be located. The image sensor may be, for example, part of or separate from the wearable extended reality appliance. For example, the image sensor may be integrated with, or positioned in proximity to the wearable extended reality appliance (e.g., allowing at least one processor to detect one or more features of the physical environment surrounding the wearable extended reality appliance). The image sensor may transmit the captured image data to the at least one processor associated with the wearable extended reality appliance. The at least one processor associated with the wearable extended reality appliance may receive the image data from the image sensor.

The image data may reflect a layout of a physical environment in which the wearable extended reality appliance is located. A physical environment may refer to, for example, any physical space, area, scene, region, location, or extent. The physical environment may include, for example, a room, a conference room, a classroom, a discussion room, a work room, an office, a home, a house, an apartment, a living room, a bedroom, a kitchen, a hall, a concourse, an indoor space, a playground, an outdoor space, or any other desired physical space, area, region, location, or extent in which the wearable extended reality appliance may be located. A layout may refer to, for example, any a spatial arrangement, organization, setup, configuration, or structure. A layout of the physical environment may include, for example, the way in which the physical environment and/or parts thereof may be arranged or positioned. The layout of the physical environment in which the wearable extended reality appliance may be located may include, for example, the real-world surroundings of the wearable extended reality appliance, such as walls, surfaces, floors, ceilings, table tops, plants, furniture, doors, windows, tables, chairs, shelves, humans, animals, robots, light sources, light conditions, and/or other physical characteristics of the physical environment in which the wearable extended reality appliance may be located. The image data may reflect (e.g., show, indicate, display, demonstrate, reveal, exhibit, or express) the layout of the physical environment in which the wearable extended reality appliance is located. For example, the image data may be obtained based on the image sensor capturing the scenes of the physical environment.

With reference to FIG. 41, at least one processor associated with the wearable extended reality appliance 4112 may receive image data captured by at least one image sensor associated with the wearable extended reality appliance 4112. The image data may reflect a layout of a physical environment 4114 in which the wearable extended reality appliance 4112 is located.

Some embodiments involve analyzing the image data to identify at least one interference region in the physical environment. Analyzing the image data may include, for example, performing one or more image processing techniques, such as edge detection techniques, object detection techniques, pattern recognition techniques, facial recognition techniques, convolution, Fourier transforms, artificial intelligence techniques (e.g., neural networks), machine learning techniques, deep learning techniques, and/or other suitable techniques (e.g., to identify or distinguish one or more features in the image data). At least one processor associated with the wearable extended reality appliance may analyze the image data to identify at least one interference region in the physical environment. An interference region in the physical environment may refer to a location in a physical environment that, due to one or more attributes specific to the location, may inhibit, obstruct, adversely affect, or interfere with viewing of virtual content presented in the location by a wearable extended reality appliance. Examples of such attributes may include a bright light (e.g., due to a window or light fixture nearby), an obstructing object (e.g., furniture or a support column in proximity to the location), an area of egress such as a doorway that may result in prospective interference, a display screen, a detected area of motion (e.g., an active hallway, road, or other pathway), mirror or other reflective placement, and/or any other characteristic or feature of the physical environment that may have an adverse effect on the viewing of the virtual content presented in the location by a wearable extended reality appliance. Identifying at least one interference region in the physical environment may include, for example, extracting one or more features from the image data (e.g., using one or more suitable image processing techniques), and comparing the extracted features to features stored in memory (e.g., using a list, a library, or any other desired data structure) that may be associated with interfering with the viewing of virtual content, to identify any matches. Additionally or alternatively, by way of non-limiting examples, extracting may be based on artificial intelligence tools such as Convolutional Neural Networks (CNNs), object detection tools (e.g. YOLO, R-CNN, Faster R-CNN), image segmentation tools (e.g. Mask R-CNN, U-Net), image recognition tools (e.g. ResNet, Inception), Generative Adversarial Networks (GANs), Autoencoders, Deep Belief Networks (DBNs), Transfer Learning, Image Captioning models, facial recognition tools, object tracking tools, scene understanding models, image super-resolution models, generative models, neural style transfer, and/or visual question answering (VQA). In some examples, a machine learning model may be trained using training examples to identify interference regions in physical environments from images and/or videos. An example of such training examples may include a sample image of a sample physical environment, together with a label indicating that a sample region of the sample physical environment is an interference region. The trained machine learning model may be used to analyze the image data and identifying the at least one interference region in the physical environment. In some examples, a convolution of at least part of the image data may be calculated to obtain a result value, and the identification of the at least one interference region in the physical environment may be based on the result value. For example, when the result value is a first numerical value, a particular region of the physical environment may be identified as an interference region, and when the result value is a second numerical value, identifying the particular region of the physical environment as an interference region may be avoided.

In some embodiments, analyzing the image data to identify at least one interference region includes performing image recognition analysis to identify in the physical environment at least one of a window, a display, or an egress. A window may refer to, for example, any opening or aperture in a surface. For example, a window may include an opening or aperture in a surface (e.g., a wall or roof of a building or vehicle) that may be fitted with glass or other transparent material in a frame to admit light and/or allow people to see out. A display may refer to, for example, any device configured to permit exterior viewing. A display may include, for example, a light-emitting diode (LED) display, an organic light-emitting diode (OLED) display, a liquid-crystal display (LCD), a dot-matrix display, a screen, a touch screen, a light indicator, a light source, or any other device configured to provide visual or optical output. Displays may also include whiteboards, blackboards, smartboards, flipcharts, glassboards, projection screens, and dry-erase boards. An egress may refer to, for example, any physical space, area, location or object that may be used for accessing a site or scene. For example, an egress may include an entrance, an exit, a door, a doorway, a door frame, a pathway, a passage, a corridor, or any other physical space, extent, or object that may be used for access to a place.

Image recognition analysis may refer to, for example, any process, method, or algorithm, such as examples provided earlier, that may be configured to obtain understanding for computing devices from images. For example, the image recognition analysis may transform visual images into descriptions or understandings that may trigger or cause appropriate actions or processes. The image recognition analysis may include, for example, object recognition algorithms, object classification algorithms, object detection algorithms, image annotation algorithms, activity recognition algorithms, face recognition algorithms, or any other suitable algorithms or methods that may be used for computer vision or image processing. At least one processor associated with the wearable extended reality appliance may perform the image recognition analysis to identify in the physical environment at least one of a window, a display, or an egress. For example, the at least one processor may extract features from the image data and compare the extracted features with features stored in memory corresponding to at least one of a window, a display, or an egress. In some examples, an artificial intelligence or machine learning model (e.g., neural networks, convolutional neural networks, etc.) may be used to process the image data to identify at least one of a window, a display, or an egress.

The at least one interference region may be determined based on the identified window, display, or egress in the physical environment. For example, the interference region may include a space or area near the identified window or display (e.g., a particular space or area in front of the identified window or display). Depending on design, the interference region may extend beyond the particular window, display, or egress, where interference may be expected to occur. As another example, the interference region may include a space or area of the identified egress. In some examples, the interference region may be determined based on a location or angle of the wearable extended reality appliance relative to the identified window, display, or egress. For example, the interference region may extend from the identified window, display, or egress towards the wearable extended reality appliance. In some examples, the interference region may correspond to a portion of a field of view of the wearable extended reality appliance, where the portion of the field of view may cover the identified window, display, or egress. In some examples, the interference region may include a pyramid-shaped space, where the base of the pyramid is the identified window, display, or egress, and where the apex of the pyramid is the wearable extended reality appliance. In some examples, the interference region may include the space directly above the identified egress (e.g., a pathway) and/or nearby space. In some examples, the interference region may include a space having any desired volume (e.g., 1 cubic meter, 2 cubic meters, 5 cubic meters, 10 cubic meters, 20 cubic meters, 30 cubic meters, 50 cubic meters, 100 cubic meters, 200 cubic meters, 500 cubic meters, or any other volume).

In some embodiments, analyzing the image data to identify at least one interference region includes performing image recognition analysis to identify in the physical environment an area with light brighter than light in other areas of the physical environment. Image recognition analysis may refer to, for example, any type of method, processor, or algorithm for image processing. As one example, the image recognition analysis may include a light condition analysis algorithm, an object recognition algorithm, or any other algorithm associated with computer vision or image processing. An area may refer to, for example, any region, location, space, or extent (e.g., in the physical environment). Light may refer to, for example, any radiance, illumination, or brightness. In some examples, at least one processor associated with the wearable extended reality appliance may determine pixel brightness of the image data and may, based on the determined pixel brightness, identify in the physical environment an area with light brighter than light in other areas of the physical environment. For example, at least one processor associated with the wearable extended reality appliance may determine a region in one or more images of the image data with a greater degree of brightness than other regions in the one or more images. The determined region in the image(s) may correspond to the area in the physical environment with light brighter than light in other areas of the physical environment. In some examples, the interference region may be determined based on the area in the physical environment with light brighter than light in other areas of the physical environment. For example, the interference region may be determined based on an area, in the physical environment, associated with (e.g., near or next to) a window, a display, an opening in a wall, a light source (e.g., a light bulb, a lamp, etc.), or any other object that may provide illuminance or brightness.

In some embodiments, the identification of the at least one interference region includes analyzing the image data to identify an inanimate object in the physical environment. An inanimate object may refer to, for example, any item, article, device, utensil, device, or entity that may be motionless, stationary, immobile, or not moving. An inanimate object may include, for example, a chair, a desk, a shelf, a lamp, a book, a wall, or any other item that may not move on its own (e.g., when not being moved by external forces). In some examples, an inanimate object may include an item that may have partial or insignificant movements or motions but may be considered stationary overall, such as a printer, a refrigerator, a washing machine, a dishwasher, and/or the like. Analyzing the image data may include, for example, using any suitable image processing algorithms, processes, or methods to process the image data, such as object recognition algorithms, object classification algorithms, object detection algorithms, image annotation algorithms, and/or the like. In some examples, at least one processor associated with the wearable extended reality appliance may analyze the image data to identify an inanimate object in the physical environment. The interference region may be determined based on the identified inanimate object. For example, the interference region may include the physical area, location, space, or extent that may be occupied by the identified inanimate object. Additionally or alternatively, the interference region may include the physical area, location, space, or extent that may surround the identified inanimate object (e.g., to provide a buffer zone beyond the occupied space of the identified inanimate object).

With reference to FIG. 41, at least one processor associated with the wearable extended reality appliance 4112 may analyze the image data of the physical environment 4114. For example, at least one processor associated with the wearable extended reality appliance 4112 may, based on analyzing the image data, identify a physical object 4116 in the physical environment 4114. The physical object 4116 may include, for example, a window, a display, an egress, a door, an entrance, an exit, a pathway, or any other object or item that may be associated with potential interference with a user's viewing of a visual representation displayed in proximity to the object or item. With reference to FIG. 42, at least one processor associated with the wearable extended reality appliance 4112 may analyze the image data of the physical environment 4114 to identify at least one interference region 4210 in the physical environment 4114. The at least one interference region 4210 may be determined, for example, based on the identified physical object 4116 (e.g., the interference region 4210 may include the space, area, region, or extent that may extend from the identified physical object 4116 towards the wearable extended reality appliance 4112).

Some embodiments involve receiving visual representations of the plurality of participants. Visual representations of the plurality of participants may refer to, for example, any data, signals, or information encoding, characterizing, indicating, or representing the plurality of participants visually. The visual representations of the plurality of participants may be displayed via a wearable extended reality appliance (e.g., by causing images or videos of the plurality of participants to appear, for example, to a user of the wearable extended reality appliance). The visual representations of the plurality of participants may be static (e.g., images) or dynamic (e.g., videos), may be two-dimensional or three-dimensional, and/or may have any desired color scheme (e.g., in color or grey scale). The visual representations of the plurality of participants may be configured in accordance with any display parameters or settings of the wearable extended reality appliance. In some examples, the visual representations of the plurality of participants may be adjusted or modified (e.g., the display size of the visual representations may be adjusted, the background of the visual representations may be modified, the visual representations may be cropped and/or filtered, and/or avatars may be used to substitute the visual representations of participants).

At least one processor associated with the wearable extended reality appliance may receive the visual representations of the plurality of participants. For example, each participant of the video conference (e.g., located in a particular physical location) may be associated with an image sensor. Image data of each participant may be captured by the image sensor for the participant, and may be used to generate a visual representation of the participant. In some examples, one or more image processing and/or editing processes or methods may be performed on the image data of a participant captured by an image sensor to generate a visual representation of the participant. The visual representation of each participant may be transmitted via a communications network to the at least one processor associate with the wearable extended reality appliance. Additionally or alternatively, the at least one processor associate with the wearable extended reality appliance may receive the visual representations of the plurality of participants, for example, based on accessing a memory (e.g., locally or remotely via a communications network) storing the visual representations of the plurality of participants.

With reference to FIG. 42, at least one processor associated with the wearable extended reality appliance 4112 may receive visual representations of the plurality of participants.

Some embodiments involve causing the wearable extended reality appliance to display the visual representations of the plurality of participants at multiple distinct locations other than in the at least one interference region, such that the at least one interference region is devoid of any of the visual representations of the plurality of participants. Distinct locations may refer to, for example, any definitive or defined areas, regions, spaces, or extents (e.g., delineated with borders or boundaries). In some examples, distinct locations may include individual or discrete locations, separated from each other. In some examples, distinct locations may not overlap with each other. Multiple distinct locations other than in the at least one interference region may refer to, for example, areas, regions, spaces, or extents of the physical environment outside of or excluded from the at least one interference region. In some examples, the multiple distinct locations may not overlap with the at least one interference region.

Based on identifying the at least one interference region, at least one processor associated with the wearable extended reality appliance may determine the multiple distinct locations for placing the visual representations of the plurality of participants. In some examples, a three-dimensional model of the physical environment may be created to facilitate the determination of the multiple distinct locations. For example, based on the three-dimensional model representing the physical environment, the at least one processor may exclude the at least one interference region from the physical environment for selecting placement locations, and may select other regions in the physical environment for placing the visual representations of the plurality of participants. Additionally or alternatively, the at least one processor associated with the wearable extended reality appliance may, based on analyzing the image data of the physical environment, determine a placement condition score for each of a plurality of designated locations in the physical environment. The placement condition scores may be used for selecting the locations in the physical environment that may be preferable to place the visual representations of the plurality of participants. For example, locations in the physical environment with higher placement condition scores may be selected for placing the visual representations of the plurality of participants. The placement condition score for a location in the physical environment may be determined based on one or more of various factors, such as the light condition of the location (e.g., whether the location is near a window, a display, or a light source), the physical function associated with the location (e.g., whether the location is part of or near a pathway, entrance, or exit), or other suitable factors or features of the location.

At least one processor associated with the wearable extended reality appliance may cause the wearable extended reality appliance to display the visual representations of the plurality of participants at multiple distinct locations other than in the at least one interference region, such that the at least one interference region is devoid of any of the visual representations of the plurality of participants. For example, the visual representations of the plurality of participants (e.g., two-dimensional or three-dimensional) may not be present in the at least one interference region. The at least one interference region may not include any of the visual representations of the plurality of participants. For example, the at least one processor associated with the wearable extended reality appliance may not cause the wearable extended reality appliance to display any of the visual representations of the plurality of participants in the at least one interference region. In some examples, the at least one processor associated with the wearable extended reality appliance may periodically or continuously monitor the physical environment to determine if the at least one interference region changes (e.g., moves its location, becomes larger, becomes smaller, etc.), and may change the manner in which the visual representations of the plurality of participants may be displayed, based on any changes of the at least one interference region (e.g., so that the at least one interference region may not include any of the visual representations of the plurality of participants).

In some embodiments, causing the wearable extended reality appliance to display the visual representations of the plurality of participants includes virtually inserting the visual representations of the plurality of participants into a portrayal of the physical environment. A portrayal of the physical environment may refer to, for example, any image, representation, depiction, or rendering of the physical environment. In some examples, the portrayal of the physical environment may include a virtual representation of the physical environment. For example, the wearable extended reality appliance (e.g., a head-mounted display) may be capable of showing images to a user (e.g., using a display via which projected images may be reflected to the user) and configured to allow the user to see through the wearable extended reality appliance. When a user wearing the wearable extended reality appliance is present in the physical environment, the wearable extended reality appliance may be configured to project a virtual representation of the physical environment. For example, an image sensor associated with the wearable extended reality appliance may be configured to capture images of the physical environment when the wearable extended reality appliance is present in the physical environment. Based on the captured images, at least one processor associated with the wearable extended reality appliance may generate the virtual representation of the physical environment. The virtual representation of the physical environment, when viewed by a user, may have a look same as or similar to the physical environment (e.g., by overlying the virtual representation on the physical environment), or may have a look different from the physical environment (e.g., by changing the size or extent of, or modifying, the virtual representation of the physical environment). Causing the wearable extended reality appliance to display the visual representations of the plurality of participants may include virtually inserting the visual representations of the plurality of participants into a portrayal of the physical environment. For example, the visual representations of the plurality of participants may be virtually inserted into (e.g., added to, placed in, displayed in, etc.) the portrayal of the physical environment (e.g., the virtual representation of the physical environment). The visual representations of the plurality of participants may be inserted, placed, or displayed at suitable locations (e.g., corresponding to the multiple distinct locations) in the portrayal of the physical environment.

In some embodiments, causing the wearable extended reality appliance to display the visual representations of the plurality of participants includes enabling permitting a view-through of the physical environment and overlaying the visual representations at the multiple distinct locations of the physical environment. For example, the wearable extended reality appliance (e.g., a head-mounted display) may be capable of showing images to a user (e.g., using a display via which projected images may be reflected to the user) and configured to allow the user to see through the wearable extended reality appliance. When a user wearing the wearable extended reality appliance is present in the physical environment, the wearable extended reality appliance may be configured to enable permitting the user to view the physical environment through the wearable extended reality appliance (e.g., a view-through of the physical environment). Overlaying may refer to, for example, a condition where something is positioned at least partially on top of or at least partially covering or blocking something else. At least one processor associated with the wearable extended reality appliance may cause display of the visual representations of the plurality of participants, for example, by overlaying the visual representations at the multiple distinct locations of the physical environment (e.g., in a manner simulating the plurality of participants physically located in the multiple distinct locations of the physical environment).

With reference to FIG. 43, at least one processor associated with the wearable extended reality appliance 4112 may cause the wearable extended reality appliance 4112 to display the visual representations 4314, 4316 of the plurality of participants at multiple distinct locations 4310, 4312 other than in the at least one interference region 4210, such that the at least one interference region 4210 is devoid of any of the visual representations 4314, 4316 of the plurality of participants.

Some embodiments involve receiving additional image data captured after causing the wearable extended reality appliance to display the visual representations. For example, at least one processor associated with the wearable extended reality appliance may periodically or continuously monitor the physical environment (e.g., by receiving additional image data of the physical environment captured by an image sensor). The physical environment may be monitored after, during, or before the visual representations of the plurality of participants are displayed via the wearable extended reality appliance (e.g., in a manner simulating the plurality of participants physically located in the physical environment).

Some embodiments involve analyzing the additional image data to identify a change of the at least one interference region in the physical environment. In some embodiments, the change causes at least part of the multiple distinct locations to overlap with the changed at least one interference region. The change of the at least one interference region may refer to, for example, any variation, alteration, modification, or adjustment of the at least one interference region. The change of the at least one interference region may include, for example, a change of the shape, size, volume, dimension, contour, number, or any other feature or characteristic, of the at least one interference region. The change of the at least one interference region may be determined based on, for example, changed physical conditions of the physical environment (e.g., as determined based on analyzing the additional image data). The change of the at least one interference region may cause at least part of the multiple distinct locations at which the visual representations of the plurality of participants may be displayed, to overlap with the changed at least one interference region. For example, the changed at least one interference region may extend over so as to cover at least partly the multiple distinct locations. Non-limiting examples of changes in an interference region may include a closed window shade, a display powered off, or any interfering object altered or moved in a way rendering the object no longer interfering.

Some embodiments involve causing the wearable extended reality appliance to move at least one visual representation to a different location that has no overlap with the changed at least one interference region, such that the changed at least one interference region is devoid of any of the visual representations the plurality of participants. For example, at least one processor associated with the wearable extended reality appliance may determine which one(s) of the multiple distinct locations may overlap with the changed at least one interference region (e.g., based on comparing the coordinates or other spatial descriptors for the multiple distinct locations and the changed at least one interference region). Based on identifying the location(s), of the multiple distinct locations, that may overlap with the changed at least one interference region, the at least one processor may move the visual representation(s) displayed at the identified location(s) to other location(s), in the physical environment, that may not overlap with the changed at least one interference region. Based on the moving of the visual representation(s), the changed at least one interference region may be devoid of or may not include any of the visual representations the plurality of participants. In some examples, the other location(s) to which the visual representation(s) may be moved may be selected in such a manner that, after the moving of the visual representation(s), the visual representations of the plurality of participants may not overlap or interfere with each other.

Some embodiments involve analyzing the image data to determine presentation characteristics for at least one of the visual representations. A presentation characteristic may refer to, for example, brightness, shade, contrast, size, or any configuration, feature, attribute, aspect, or manner for presentation or display of data or information. The presentation characteristics for at least one of the visual representations may include, for example, display dimensions for the visual representation (e.g., configurations for the visual representation to have a larger or smaller display size based on physical objects, that may be capable of interfering with the visual representation, in or near the location in which the visual representation may be placed), a degree of illumination of the visual representation (e.g., based on a degree of brightness of the location in which the visual representation may be placed), a color scheme of the visual representation (e.g., based on background color(s) of the location in which the visual representation may be placed), or other configurations or features for displaying the visual representation. Analyzing the image data may use any suitable image processing technique. For example, the image data of the physical environment may be analyzed using a light condition analysis algorithm, an object recognition algorithm, and/or any other suitable image processing algorithm, to identify the physical conditions or characteristics of the physical environment (e.g., any circumstance, state, status, context, setting, or situation associated with a physical region, area, extent, or location). The presentation characteristics may be determined based on the identified physical conditions or characteristics of the physical environment.

In some embodiments, determining the presentation characteristics for the at least one of the visual representations includes at least one of performing a lookup of stored preferences of a wearer of the wearable extended reality appliance or performing a lookup of preference data of a corresponding participant of the video conference. Stored preferences of the wearer of the wearable extended reality appliance may refer to, for example, any rules, configurations, selections, or arrangements associated with the presentation characteristics. Via the preferences, the wearer may specify a mapping between physical conditions associated with the physical environment and corresponding presentation characteristics. The preferences of the wearer may be stored in any desired data structure or storage (e.g., a table, a list, etc.). A lookup may refer to, for example, any search, retrieval, exploration, examination, or inspection. In some examples, at least one processor may search the stored preferences for a preferred set of presentation characteristics corresponding to a particular set of physical conditions or characteristics of the location in which the visual representation may be displayed.

In some examples, a particular participant of the video conference may be allowed to configure the manner in which the visual representation of the particular participant may be displayed (e.g., by a wearable extended reality appliance), based on the physical conditions or characteristics of the location in which the visual representation may be displayed. The particular participant may be allowed to input the preference data (e.g., any information or data that may indicate rules, configurations, selections, or arrangements). Via the preference data, the particular participant may specify the particular participant's preferences for presentation characteristics. In some examples, at least one processor may search the preference data for a preferred set of presentation characteristics corresponding to a particular set of physical conditions or characteristics of the location in which the visual representation of the particular participant may be displayed.

In some embodiments, the presentation characteristics include dimensions, and the dimensions of at least one of the visual representations are determined to account for an existence of one or more physical objects in the physical environment. A dimension may refer to, for example, any size, measurement, extent, volume, or capacity. In some examples, a dimension may include, for example, a length, width, depth, or breadth. A physical object may include any tangible thing, item, article, or entity that exists in the physical world. The dimensions of the visual representation of a participant of the video conference may be determined based on one or more physical objects in the physical environment. For example, the visual representation may not be displayed in a location where one or more physical objects (e.g., a desk, a shelf, etc.) are placed, and the dimensions of the visual representation may be adjusted so that the visual representation may fit within the remaining areas of the physical environment (e.g., not including the one or more physical objects). In some examples, the dimensions of at least one of the visual representations may be scaled to match the scale of the one or more physical objects (e.g., a desk, a door, etc.). For example, the dimensions of at least one of the visual representations may be determined to be suitably proportional to (e.g., not be giant sized or miniature relative to) the size of the one or more physical objects (e.g., a desk, a door, etc.).

In some embodiments, the presentation characteristics include an illumination intensity associated with at least one of the visual representations. An illumination intensity may refer to, for example, any degree, magnitude, or amount of radiance, light, or brightness (e.g., as emitted or reflected by something). In some examples, the illumination intensity associated with at least one of the visual representations may be determined to account for light conditions in the physical environment. For example, the visual representation may be displayed with a higher illumination intensity when the background of the physical environment for the visual representation has a higher degree of brightness, and the visual representation may be displayed with a lower illumination intensity when the background of the physical environment for the visual representation has a lower degree of brightness.

In some embodiments, the presentation characteristics include a color scheme associated with a background color in the physical environment. A color scheme may refer to, for example, the choice, arrangement, pattern, or configuration of colors (e.g., to be used in various contexts, such as artistic and design contexts). A background color in the physical environment may refer to, for example, a color that may be present in the physical environment as a background for a visual representation (e.g., displayed by a wearable extended reality appliance). In some examples, the background color may include a color that may occupy a large portion (e.g., a majority portion) of the background for a visual representation, or a color that may be more prominent than other colors in the background for a visual representation. The color scheme for a visual representation may be determined, for example, based on the background color for the visual representation. For example, the color scheme for a visual representation may be configured in such a manner that may create a significant degree of contrast between the visual representation and the background for the visual representation (e.g., which may allow a user of a wearable extended reality appliance that may display the visual representation to view the visual representation more easily). Additionally or alternatively, the color scheme for a visual representation may be configured in such a manner that may not tend to conceal the visual representation in view of the background for the visual representation.

Some embodiments involve receiving a location selection corresponding to a portion of the physical environment; confirming that the selected portion of the physical environment is devoid of any interference regions; and causing the wearable extended reality appliance to display the visual representation of at least one of the plurality of participants at the portion of the physical environment. A location selection may refer to, for example, any user input that may indicate a selection, preference, choice, pick, or decision of a location. Receiving the location selection may include, for example, capturing, detecting, or obtaining the location selection via an input device (e.g., an image sensor, a pointing device, a keyboard, etc.). At least one processor associated with the wearable extended reality appliance may receive the location selection corresponding to a portion of the physical environment. For example, a user may indicate a selection of the portion of the physical environment (e.g., by a hand gesture captured by an image sensor, by a clicking on the portion using a pointing device, or by typing a command indicating the portion using a keyboard, etc.). In response to the location selection, the at least one processor may confirm (e.g., determine, decide, verify, etc.) that the portion of the physical environment is devoid of any interference regions. For example, coordinates or other spatial descriptors may be used to describe the portion of the physical environment, and/or to describe any interference regions. The at least one processor may determine that the portion of the physical environment is devoid of (e.g., does not include, or does not overlap with) any interference regions, for example, based on comparing the coordinates or other spatial descriptors for the portion of the physical environment and for any interference regions. Based on determining that the portion of the physical environment does not include or overlap with any interference regions, the at least one processor may cause the wearable extended reality appliance to display the visual representation of at least one of the plurality of participants at the portion of the physical environment.

In some embodiments, the plurality of participants is a selected part of a group of participants. Some embodiments involve receiving a selection of the plurality of participants; and causing the wearable extended reality appliance to display the visual representations of participants included in the selected part of the group of participants while omitting from the display the visual representations of participants excluded from the selected part of the group of participants. A group of participants may refer to, for example, one or more participants of a video conference that may be considered as a group, collection, or set. The plurality of participants for which visual representations may be displayed by the wearable extended reality appliance may be a selected part (e.g., a portion, subset, or section) of the total group of participants. Receiving the selection of the plurality of participants may be performed in various manners. In some examples, the selection may be received from a user (e.g., a wearer) of the wearable extended reality appliance via an input device (e.g., an image sensor, a pointing device, a keyboard, etc.). In some examples, the selection may be made automatically (e.g., when the number of the group of participants exceeds a selected threshold, when the volume of the physical environment may not allow all of the group of participants to be displayed in the physical environment in a manner that may provide a preferable viewing experience for the user of the wearable extended reality appliance considering the number of the group of participants of the video conference, etc.). For example, the selected part of the group of participants may include those participants selected based on a measured frequency or amount of activity (e.g., speaking, content sharing, etc.) for each participant during a video conference, or other characteristics, features, metrics, or statistics for each participant (e.g., participants who may tend to speak more or be more active during the video conference may be selected to be included in the selected part of the group of participants).

During the video conference, and based on the selected part of the group of participants, at least one processor associated with the wearable extended reality appliance may cause the wearable extended reality appliance to display the visual representations of participants included in the selected part of the group of participants while omitting from the display the visual representations of participants excluded from the selected part of the group of participants. For example, the visual representations of the particular participants included in the selected part of the group of participants may be displayed by the wearable extended reality appliance in a manner simulating the particular participants physically located in the physical environment.

Omitting from the display the visual representations of participants excluded from the selected part of the group of participants may refer to, for example, forgoing, excluding, or preventing the displaying of the visual representations of participants excluded from the selected part of the group of participants via the wearable extended reality appliance in a manner simulating those excluded participants physically located in the physical environment. For example, at least one processor associated with the wearable extended reality appliance may not cause display of the visual representations of participants excluded from the selected part of the group of participants via the wearable extended reality appliance in a manner simulating those excluded participants physically located in the physical environment. In some examples, based on the omitting of the visual representations of the excluded participants, at least one processor may cause the excluded participants and/or their visual representations to be displayed via a physical display or screen (e.g., separate from the wearable extended reality appliance) in the physical environment, or via a virtual display or screen presented by the wearable extended reality appliance. In some examples, the excluded participants and/or their visual representations may not be displayed to any extent during the video conference (e.g., in connection with the physical environment or the wearable extended reality appliance).

Some embodiments involve, after causing the wearable extended reality appliance to display the visual representations, identifying a speaking participant and moving a particular visual representation associated with the speaking participant to a designated area. The term "identifying a speaking participant" may include processing sensor data captured from one or more sensors (e.g., image sensor, microphone, and/or any other sensor configured to capture data indicative of a participant speaking) and/or digital media streams to determine which of the participants is currently the speaker. Specifically, any combination of known audio detection algorithms and known video analysis algorithms may be used to determine which of the participants is speaking. Examples of audio detection algorithms that can be used for identifying a speaking participant may include Voice Activity Detection (VAD), energy-based VAD, spectral-energy-based VAD, pitch-based VAD, non-negative matrix factorization, Gaussian mixture model, and/or other suitable algorithms. Examples of video detection algorithms that can be used for identifying a speaking participant may include facial recognition, lip movement detection, body language analysis, head pose estimation, eye gaze tracking, speaker diarisation, and/or other suitable algorithms. The accuracy and performance of these algorithms may depend on various factors such as the quality of audio and video, the complexity of the environment, and the presence of noise or other interfering factors. In some examples, there may be a group of participants that may speak at the same time and the system may select one of the group of participants as the speaker (e.g., based on rules associated with the participants). Alternatively, the system may identify all of the members of the group of participants as the co-speakers and address each of them as a speaker in the context of the embodiments disclosed below.

Some embodiments involve, after causing the wearable extended reality appliance to display the visual representations, identifying that a first participant and a second participant are speaking during a particular time span (for example, conversing, talking in turns, etc.), and moving a first visual representation associated with the first participant to a first designated area and a second visual representation associated with the second participant to a second designated area. The orientation of the first visual representation and the second visual representation may be selected, for example, to make the first and second participants appear as facing one another, to make the first and second participants appear as facing the wearable extended reality appliance, and so forth.

The term "a particular visual representation associated with the speaking participant" may refer to data encoded information characterizing the speaking participant such that displaying the data via an electronic display of a wearable extended reality appliance may cause digital (e.g., virtual)

images of the speaking participant to appear (e.g., to the wearer of the wearable extended reality appliance). The digital images may be presented as static or dynamic (e.g., video) images, in two-dimensions or three-dimensions, in color or grey scale, and/or in accordance with any display parameters or settings of the wearable extended reality appliance. In some examples, the visual representation can be associated with various data such as name, title, and role of the participant, which can be displayed alongside the visual representation to help the participants identify who is speaking. In some examples, the visual representation of the speaking participant may undergo one or more modifications or adjustments (e.g., the size may be adjusted, the background may be modified, the image may be cropped and/or filtered, or an avatar may substitute a participant) to indicate the speaker role.

The term "moving the particular visual representation" may refer to causing a change in a location of the particular visual representation of the speaking participant such that the particular visual representation is positioned in a new location in the extended environment. For example, a visual representation of a particular participant may move from point A to point B upon detecting that the particular participant started to speak. In some examples, moving the particular visual representation associated with the speaking participant to the designated area may include a step of stopping from displaying the particular visual representation associated with the speaking participant at a previous location different from the designated area. In some examples, moving the particular visual representation associated with the speaking participant to the designated area may include causing the wearable extended reality appliance to display the particular visual representation associated with the speaking participant at the new location while continuing to display the particular visual representation associated with the speaking participant at the previous location. In some embodiments, moving the particular visual representation associated with the speaking participant to the designated area includes moving a specific visual representation associated with a previously speaking participant different from the speaking participant from the designated area. The specific visual representation associated with a previously speaking participant may be moved to a prior location used by the previously speaking participant or to a new location outside the designated area.

The term "designated area" may refer to a specific location or region within the extended environment that is assigned for presenting a visual representation of a speaking participant. The designated area may be defined by a set of coordinates or by using a bounding box and may be marked by visual cues such as color or texture. In some examples, the designated area may be fixed in the extended environment. In some embodiments, the designated area includes a predetermined speaker location. The predetermined speaker location may refer to a specific location, within the extended environment, where a speaker is expected to be located. For example, the predetermined speaker location may be selected based on the layout of the physical environment (e.g., the speaker designated area may be on a table) and/or the layout of the extended environment (e.g., the speaker designated area may be adjacent a virtual screen). Alternatively, the predetermined speaker location may be selected based on the multiple distinct locations of the visual representations of the plurality of participants. Additionally or alternatively, the predetermined speaker location may be selected on the identified location of the at least one interference region. In some examples, image data captured using an image sensor associated with the wearable extended reality appliance may be analyzed to select the designated area. For example, a machine learning model may be trained using training examples to select designated areas from images and/or videos. An example of such training examples may include a sample image of a sample physical environment, together with a label indicating a sample selection of a sample designated area in the sample physical environment. The trained machine learning model may be used to analyze the captured image data and select the designated area. In some examples, a convolution of image data captured using an image sensor associated with the wearable extended reality appliance may be calculated to obtain a result value, and the designated area may be selected based on the result value. For example, when the result value is a first numerical value, a first designated area may be selected, and when the result value is a second numerical value, a second designated area may be selected (e.g., the second designated area may differ from the first designated area).

In some examples, the predetermined speaker location may be a fixed position in relation to the wearable extended reality appliance (e.g., 1 meter in front of the wearable extended reality appliance). In this case, the predetermined speaker location may move with the movement of the wearable extended reality appliance. Some embodiments involve selecting the designated area based on a vision problem of a wearer of the wearable extended reality appliance. The vision problem of a wearer of the wearable extended reality appliance may refer to a specific challenge or disability related to visual perception that the wearer may experience while interacting with the wearable extended reality appliance. For example, the vision problem may include limited field of view and the designated area may be selected within the wearer's field of view.

In some examples, the designated area may be dynamic and may change over time based on the actions or interactions of the wearer of the wearable extended reality appliance or other agents within the extended environment. Some embodiments involve determining a region of focus of a wearer of the wearable extended reality appliance, and moving the particular visual representation to a new location in the region of focus. The term "region of focus" may refer to a specific area within the extended environment toward which the wearer's gaze or attention is directed. For example, the wearer's gaze or attention may be tracked through the wearable extended reality appliance that use sensors to detect the wearer's head movements and gaze direction. This may allow the system to determine where the wearer is looking and adjust the region of focus accordingly. Upon identifying the speaking participant, the particular visual representation associated with the speaking participant may be moved to a new location in the region of focus. In cases where the speaking participant is already located in the region of focus, visual characteristics of the particular visual representation associated with the speaking participant may be changed to designate who is the speaking participant.

Figure 45:
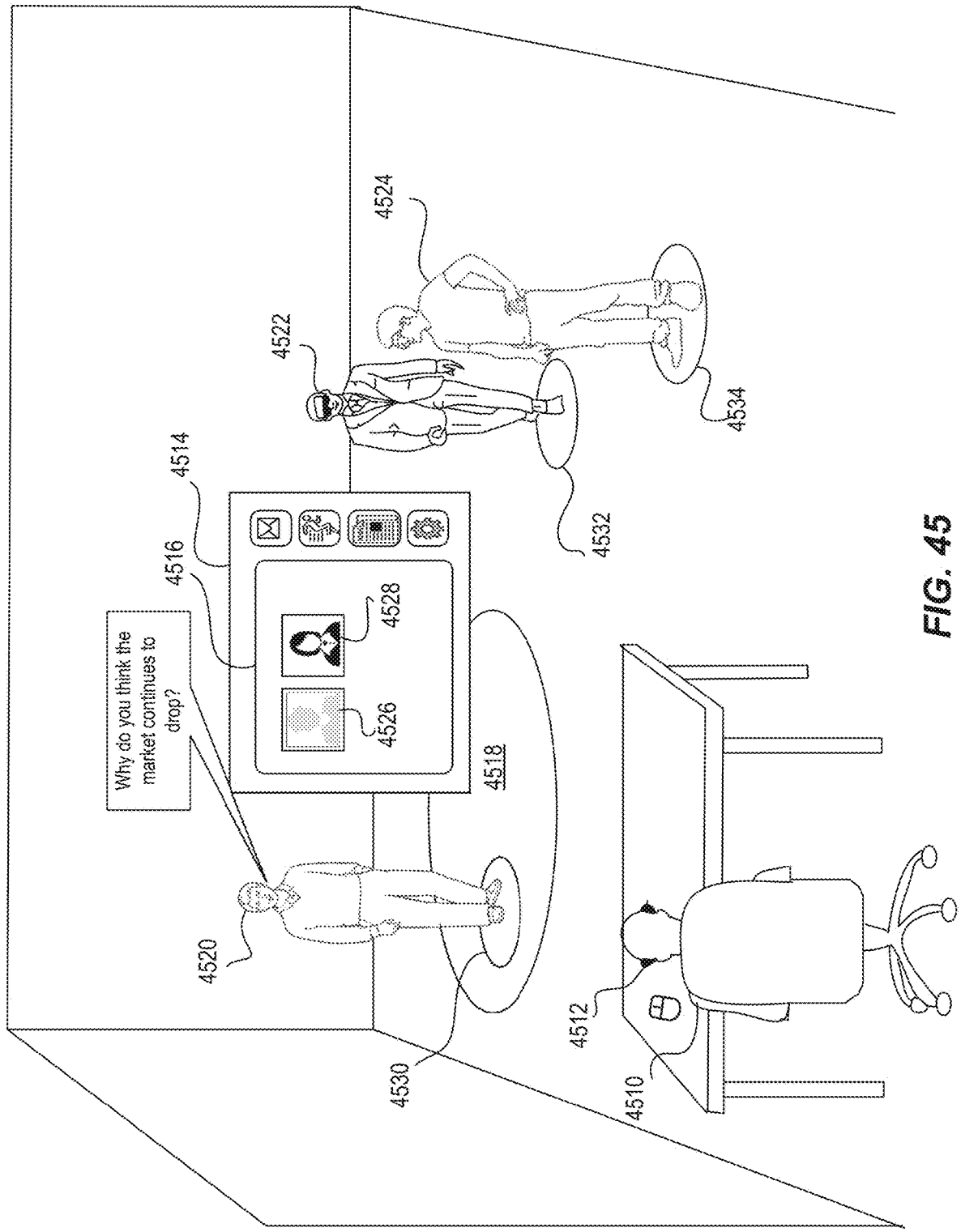
FIGS. 45, 46, and 47 are exemplary use snapshots of perspective views of a physical environment associated with designating a speaking participant, consistent with embodiments of the present disclosure.
Figure 46:
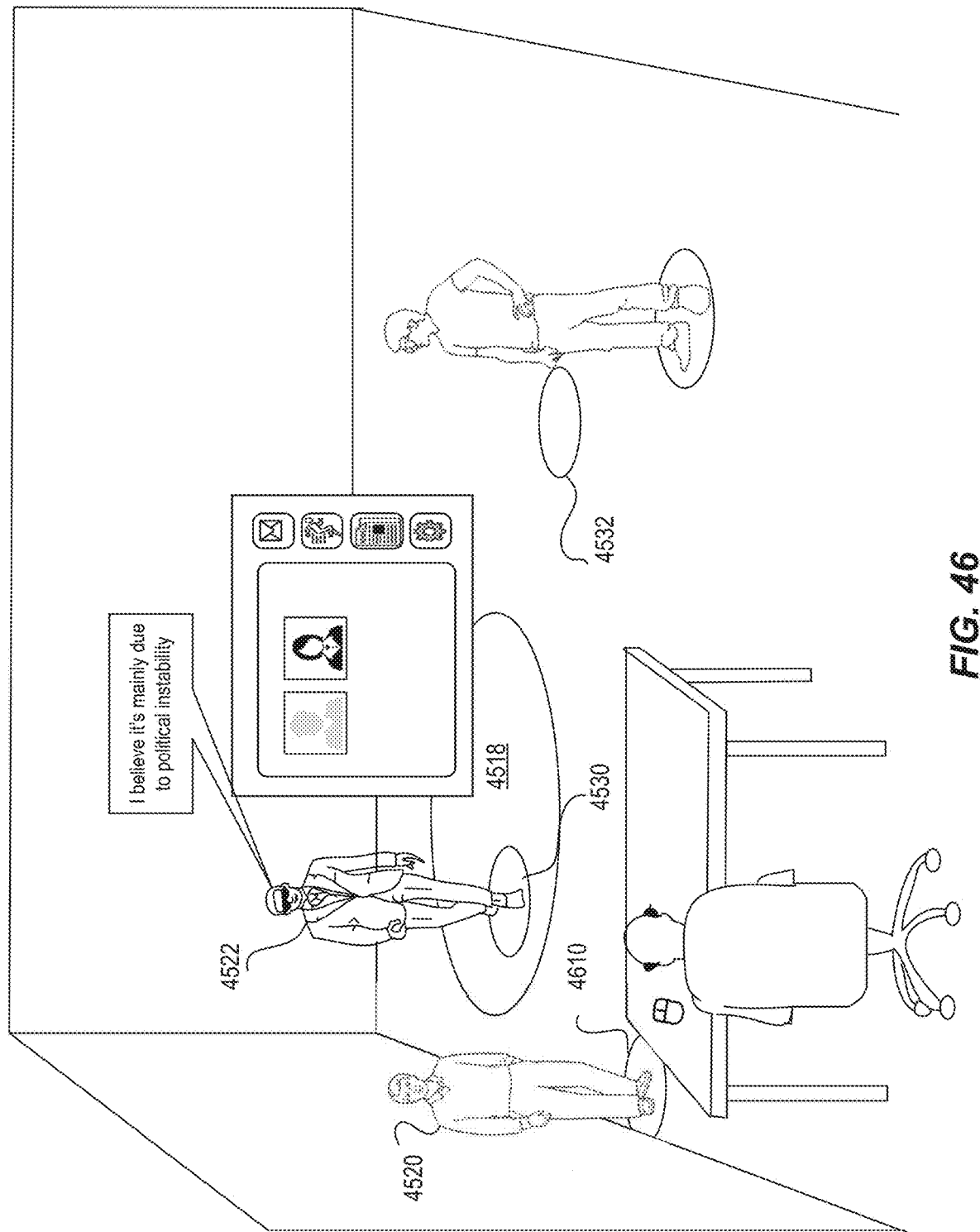
Figure 47:
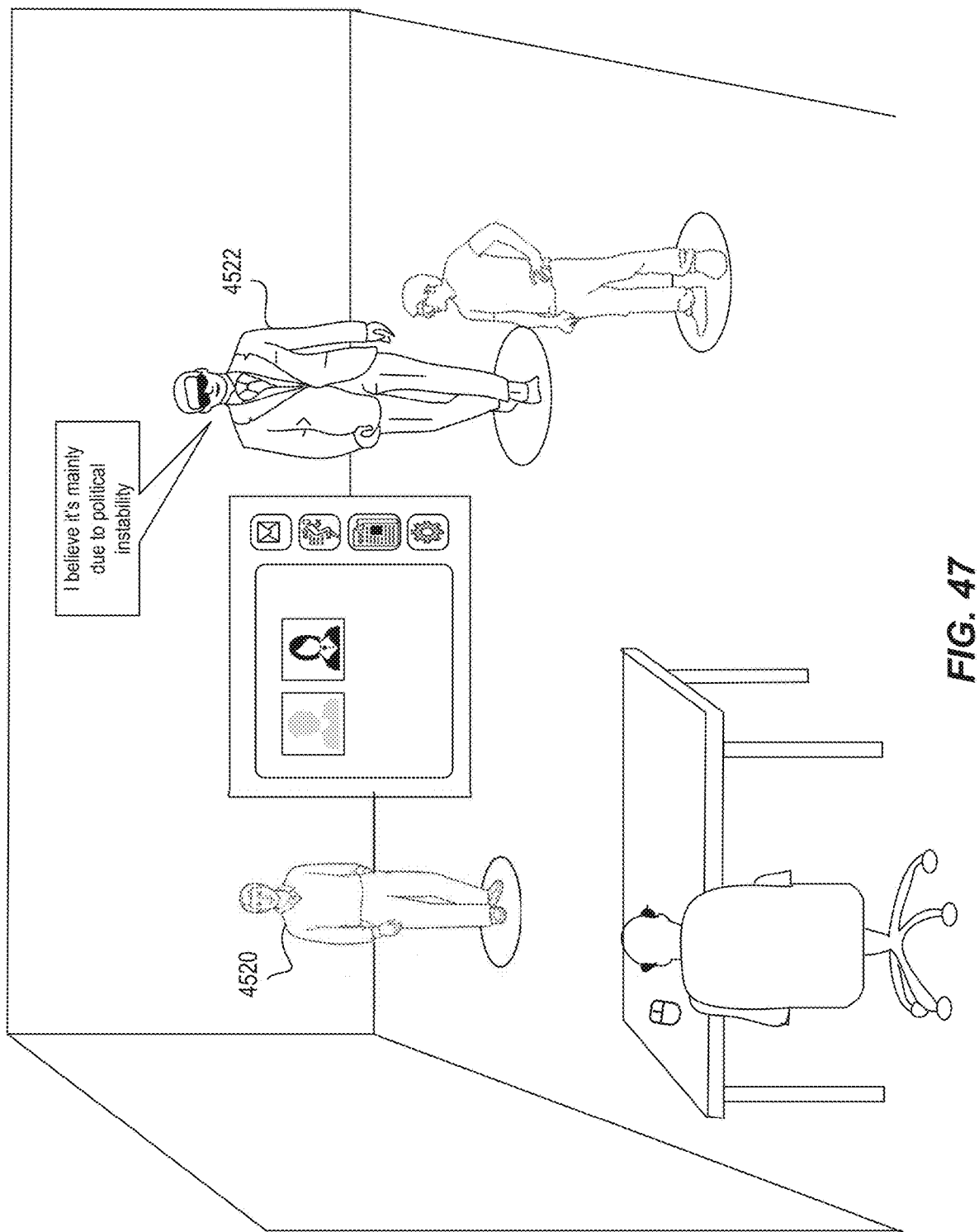

FIGS. 45, 46, and 47 are exemplary use snapshots of perspective views of a physical environment associated with designating a speaking participant, consistent with embodiments of the present disclosure. By way of a non-limiting example, reference is now made to FIG. 45 and FIG. 46 that together illustrate moving a particular visual representation associated with a speaking participant to a designated area. FIG. 45 depicts a user 4510 that may use a wearable extended reality appliance 4512. At least one processor associated with the wearable extended reality appliance 4512 may facilitate a multi-participant video conference between a plurality of physically dispersed participants. The at least one processor may cause the presentation of virtual screen 4514 and conference call window 4516 in it. The speaking participant may be presented in a designated area 4518. The plurality of physically dispersed participants may be represented with visual representations (e.g., images, video streams, virtual avatars, etc.). For example, participants may be associated with avatars as their visual representations displayed in the extended environment. An avatar may include, for example, an icon, figure, or other indication representing a person. The avatar, when displayed, may be two-dimensional or three-dimensional, and/or may be animated or inanimate.

The multi-participant video conference may be between user 4510 and a first participant represented by a first avatar 4520 positioned at first location 4530, a second participant represented by a second avatar 4522 positioned at second location 4532, a third participant represented by a third avatar 4524 positioned at third location 4534, a fourth participant represented by an image 4526 positioned in virtual screen 4514, and a fifth participant represented by video stream 4528 also positioned in virtual screen 4514. First location 4530 may be determined to be the speaker location out of all the multiple distinct locations of the visual representations of the plurality of participants. For example, first location 4530 may be determined to be the speaker location because it is closest to user 4510.

With reference to FIG. 46, once the second participant answers to the first participant's question, the at least one processor may identify the second participant as the speaking participant and the visual representation of the second participant may be moved into designated area 4518. For example, first avatar 4520 may be moved from first location 4530 to new location 4610, and second avatar 4522 may be moved from second location 4532 to first location 4530. New location 4610 may be outside designated area 4518. In some examples, moving the visual representation of the second participant may include displaying a first copy of second avatar 4522 at first location 4530, and displaying a second copy of second avatar 4522 at second location 4532. Consistent with the present disclosure, once the second participant stops speaking, the second avatar 4522 may be moved back to second location 4532.

As shown in FIG. 45, some of the visual representations of participants in the video conference may be displayed in a physical screen or a virtual screen. For example, fourth participant is represented by image 4526 and fifth participant is represented by video stream 4528. In some examples, moving the visual representation of the speaking participant to the designated area may include automatically extracting the visual representation from virtual screen 4514 and displaying a visual representation in designated area 4518. In some examples, the process of extracting the visual representation from a virtual screen and displaying the visual representation in the designated area may involve generating a three-dimensional representation of the particular participant based on the two-dimensional video stream of the particular participant, as described herein.

Some embodiments involve after causing the wearable extended reality appliance to display the visual representations, identifying a speaking participant and changing visual characteristics of a particular visual representation associated with the speaking participant to designate the speaking participant. The term "visual characteristics" of the particular visual representation may refer to the visual properties or attributes that define how the visual representation of a participant may appear in the extended environment. In some examples, the visual characteristics may include geometric characteristics, for example, the visual characteristics may include the visual representation's size, shape, and position in the extended environment. The visual representation's size and shape may affect the perception of its distance, while its position may affect the perception of its relationship with other objects in the extended environment. In some examples, the visual characteristics may include non-geometric characteristics. For example, the visual characteristics may include the visual representation's color, texture, and illumination. The visual representation's color and texture may affect the perception of the surface properties of the visual representation, while the illumination may affect how the visual representation may stand out in the extended environment.

In some examples, the visual characteristics of a visual representation may be changed to designate the speaking participant. Changing a visual characteristic may refer to the process of altering or modifying one or more of the visual characteristics that may define how the visual representation of the speaking participant may appear in the extended environment. Consistent with the presented disclosure, the degree by which the visual characteristics of a visual representation may be changed may be based on the distance of the visual representation to a region of focus of the wearer. In some embodiments, changing the visual characteristics of the particular visual representation includes enlarging the particular visual representation. Enlarging the particular visual representation may refer to causing, making, or rendering the particular visual representation to take up more space in the user's field of view. For example, when the particular visual representation is located within the region of focus of the wearer, the size of the particular visual representation may be enlarged by a desired percentage (e.g., by 3%, 5%, 10%, or any other desired percentage). Additionally or alternatively, when the particular visual representation is located outside the region of focus of the wearer, the particular visual representation may be enlarged by another desired percentage (e.g., 10%, 15%, 25%, 35%, or any other desired percentage). In some embodiments, changing the visual characteristics of the particular visual representation includes virtually illuminating the particular visual representation. Virtually illuminating the particular visual representation may include changing a manner in which the particular visual representation may be virtually illuminated. For example, changing the manner in which the particular visual representation may be virtually illuminated may include adjusting the virtual environment's lighting (e.g., changing the intensity, color, and direction of the virtual lights that may illuminate the particular visual representation), using post-processing effects (e.g., applying visual effects such as bloom, lens flares, and color correction to enhance the overall lighting on the particular visual representation), implementing high dynamic range lighting (e.g., rendering the particular visual representation with a wider range of brightness, which may make the virtual environment appear more realistic), or any other processing technique.

By way of a non-limiting example, reference is now made to FIG. 45 and FIG. 47 that together illustrate changing visual characteristics of a particular visual representation associated with the speaking participant to designate the speaking participant. FIG. 45 is described above. FIG. 47 illustrates that once the second participant (e.g., corresponding to second avatar 4522) answers to the question from the first participant (e.g., corresponding to first avatar 4520), the at least one processor may identify the second participant as the speaking participant and the visual characteristics of the visual representation associated with the second participant may be altered to designate that the second participant is the speaking participant. For example, the size of second avatar 4522 may grow. Consistent with the present disclosure, once the second participant stops speaking, the size of second avatar 4522 may return to its original size (e.g., the size of second avatar 4522 may return to its size as shown in FIG. 45).

Figure 48:
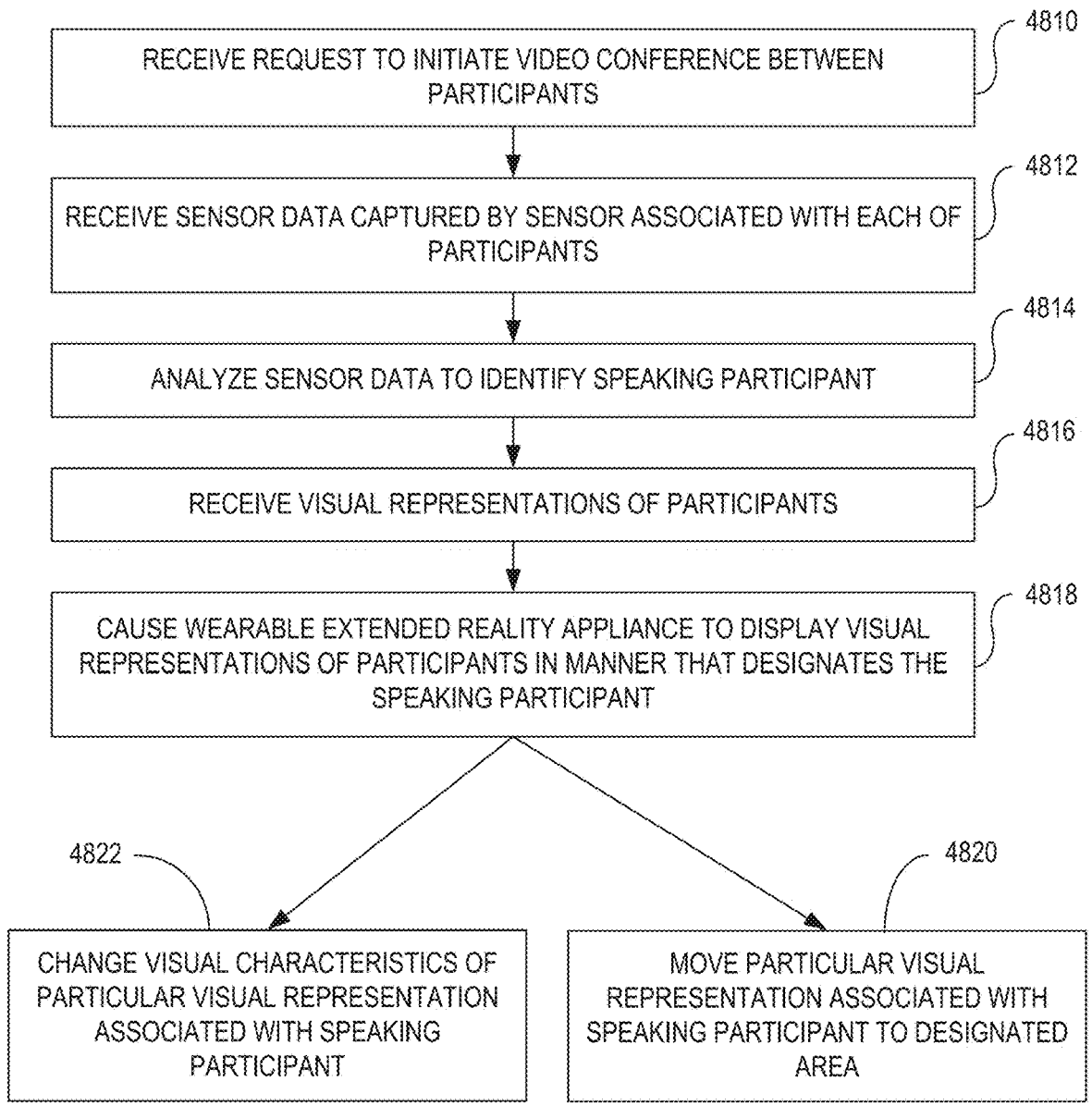
FIG. 48 is a flowchart of an exemplary process for identifying and designating a speaking participant, consistent with embodiments of the present disclosure.

FIG. 48 illustrates a flowchart of an exemplary process 4800 for identifying and designating a speaking participant, consistent with embodiments of the present disclosure. In some examples, process 4800 may be performed by at least one processor (e.g., processing device 460) to perform operations or functions described herein. In some examples, some aspects of process 4800 may be implemented as software (e.g., program codes or instructions) that may be stored in a memory (e.g., memory device 411 of extended reality unit 204, as shown in FIG. 4) or a non-transitory computer readable medium. In some examples, some aspects of process 4800 may be implemented as hardware (e.g., a specific-purpose circuit). In some examples, process 4800 may be implemented as a combination of software and hardware.

With reference to FIG. 48, process 4800 may include a step 4810 of receiving a request to initiate a video conference between a plurality of participants. Process 4800 may also include a step 4812 of receiving sensor data captured by at least one sensor associated with each of the plurality of participants. The sensor data may indicate that a corresponding participant is speaking. For example, the sensor data may include image data and/or audio data. Process 4800 may include a step 4814 of analyzing the sensor data to identify a speaking participant. Process 4800 may include a step 4816 of receiving visual representations of the plurality of participants. Process 4800 may include a step 4818 of causing the wearable extended reality appliance to display the visual representations of the plurality of participants in a manner that designates the speaking participant. Process 4800 may additionally or alternatively include an optional step 4820 of moving a particular visual representation associated with the speaking participant to a designated area. Process 4800 may additionally or alternatively include an optional step 4822 of changing visual characteristics of a particular visual representation associated with the speaking participant.

Some embodiments involve accessing a group of placement rules associating possible locations with layout of physical spaces; determining that the layout of the physical environment corresponds to one or more of the placement rules; and implementing the corresponding one or more rules to cause the wearable extended reality appliance to display the visual representations at the multiple distinct locations. A placement rule may refer to, for example, any configuration, arrangement, association, connection, instruction, guidance, or direction for placing visual representations in a scene. Accessing may refer to, for example, receiving, obtaining, retrieving, acquiring, detecting, or gaining access to. A group of placement rules may associate possible locations with layout of physical spaces, and the possible locations may indicate locations suitable for placing visual representations. For example, a layout of physical spaces indicating a floor without any other object on the floor or nearby may indicate a suitable location for placement of a visual representation (e.g., by placing the visual representation in a manner simulating the participant physically standing on the floor). As another example, a layout of physical spaces indicating an empty chair may indicate a suitable location for placement of a visual representation (e.g., by placing the visual representation in a manner simulating the participant physically sitting on the chair). Determining that the layout of the physical environment corresponds to one or more of the placement rules may include, for example, searching, examining, or analyzing the layout of the physical environment for areas that may have the suitable features as indicated in one or more of the placement rules (e.g., a feature of a floor without any other object on the floor or nearby, or a feature of an empty chair). Implementing the corresponding one or more rules to cause the wearable extended reality appliance to display the visual representations at the multiple distinct locations may include, for example, displaying the visual representations at the identified areas or locations (e.g., corresponding to the multiple distinct locations) in the physical environment in the corresponding manners as specified in the one or more rules (e.g., displaying a visual representation in a manner simulating a participant physically standing on the floor, or displaying a visual representation in a manner simulating a participant physically sitting on the chair).

Some embodiments involve a method for managing extended reality video conferences, the method including: receiving a request to initiate a video conference between a plurality of participants; receiving image data captured by at least one image sensor associated with a wearable extended reality appliance, the image data reflecting a layout of a physical environment in which the wearable extended reality appliance is located; analyzing the image data to identify at least one interference region in the physical environment; receiving visual representations of the plurality of participants; and causing the wearable extended reality appliance to display the visual representations of the plurality of participants at multiple distinct locations other than in the at least one interference region, such that the at least one interference region is devoid of any of the visual representations of the plurality of participants.

Some embodiments involve a system for managing extended reality video conferences, the system including at least one processing device configured to: receive a request to initiate a video conference between a plurality of participants; receive image data captured by at least one image sensor associated with a wearable extended reality appliance, the image data reflecting a layout of a physical environment in which the wearable extended reality appliance is located; analyze the image data to identify at least one interference region in the physical environment; receive visual representations of the plurality of participants; and cause the wearable extended reality appliance to display the visual representations of the plurality of participants at multiple distinct locations other than in the at least one interference region, such that the at least one interference region is devoid of any of the visual representations of the plurality of participants.

Figure 44:
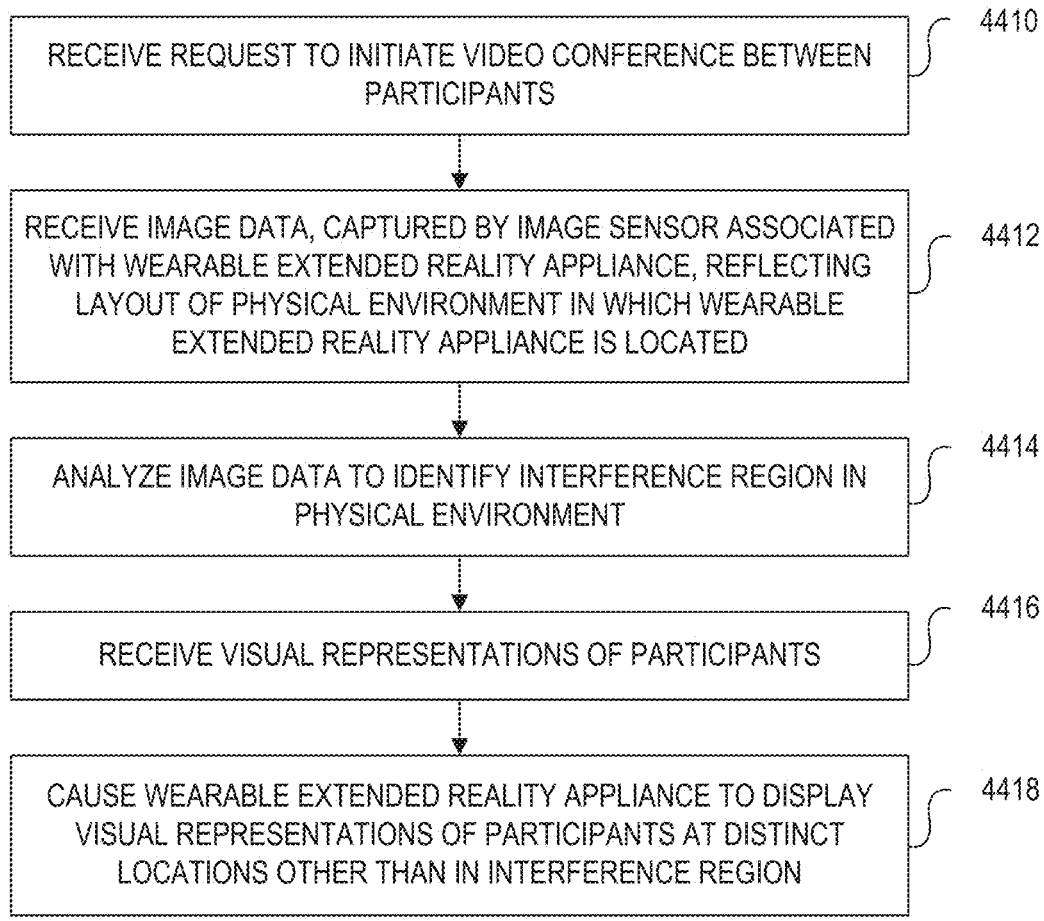
FIG. 44 is a flowchart illustrating an exemplary process for positioning participants in an extended reality conference, consistent with some embodiments of the present disclosure.

FIG. 44 is a flowchart illustrating an exemplary process 4400 for positioning participants of an extended reality conference, consistent with some embodiments of the present disclosure. With reference to FIG. 44, in step 4410, the process 4400 may include receiving a request to initiate a video conference between a plurality of participants. In step 4412, the process 4400 may include receiving image data captured by at least one image sensor associated with a wearable extended reality appliance, the image data reflecting a layout of a physical environment in which the wearable extended reality appliance is located. In step 4414, the process 4400 may include analyzing the image data to identify at least one interference region in the physical environment. In step 4416, the process 4400 may include receiving visual representations of the plurality of participants. In step 4418, the process 4400 may include causing the wearable extended reality appliance to display the visual representations of the plurality of participants at multiple distinct locations other than in the at least one interference region, such that the at least one interference region is devoid of any of the visual representations of the plurality of participants.

In some examples, display signals representing a group of one or more participants of an extended reality conference may be received (for example, from a memory unit, from an external device, from an analysis of information, from external devices associated with the one or more participants, and so forth). The one or more participants may not be physically present in a physical room of a user of a wearable extended reality appliance. Selection of positions in the physical room for the one or more participants may be received (for example, from a memory unit, from a data-structure, from an external device, from a user, from an analysis of information, and so forth). The selected positions may include a first position in the physical room for a particular participant of the one or more participants. The display signals may be used to cause a first presentation of the one or more participants via the wearable extended reality appliance. The first presentation may be based on the selected positions. After causing the first presentation, an indication that the particular participant is speaking may be received (for example, from a memory unit, from a data-structure, from an external device, from a user, from an analysis of information, and so forth). In response to the received indication that the particular participant is speaking, the display signals may be used to cause a second presentation of the particular participant at a designated position (e.g., the designated position differs from the first position).

In some embodiments, systems, methods, and non-transitory computer readable media for enabling merging of virtual content in extended reality conference(s) are provided.

In some embodiments, an indication of a participant of an extended reality conference with a user of a wearable extended reality appliance may be received. For example, a digital signal may be analyze to identify the indication of the participant. In another example, the indication may include an indication of the existence of the participant and/or an indication of an identity of the participant. The user may be associated with a first extended reality environment (for example, the user may be physically present in a physical space corresponding to the first extended reality environment). The participant may be associated with a second extended reality environment (for example, the participant may be physically present in a physical space corresponding to the second extended reality environment). The first extended reality environment may include a first virtual object. Further, display signals representing the first virtual object may be received, and display signals representing the participant may be received. A position for the first virtual object in the first extended reality environment may be determined. A position for the participant in the first extended reality environment may be determined. The display signals representing the first virtual object and the display signals representing the participant may be used to cause a first presentation of the first virtual object and the participant via the wearable extended reality appliance. The first presentation may be based on the position for the first virtual object in the first extended reality environment and the position for the participant in the first extended reality environment. After the first presentation is presented, an indication that a second virtual object is included in the second extended reality environment may be received. Further, display signals representing the second virtual object may be received. A position for the second virtual object in the first extended reality environment may be determined. The display signals representing the first virtual object, the display signals representing the participant, and the display signals representing the second virtual object may be used to cause a second presentation of the first virtual object, the participant, and the second virtual object via the wearable extended reality appliance. The second presentation may be based on the position for the first virtual object in the first extended reality environment, the position for the participant in the first extended reality environment, and/or the position for the second virtual object in the first extended reality environment. In some examples, a virtual control element may be presented to the user, for example, via the wearable extended reality appliance. The virtual control element may enable the user to toggle between two modes of presentation (e.g., in the first mode the second virtual object is presented via the wearable extended reality appliance with the first virtual object and the participant, whereas in the second mode the first virtual object and the participant are presented via the wearable extended reality appliance while the second virtual object is not presented).

In some examples, the position for the second virtual object in the first extended reality environment may be determined based on the position for the participant in the first extended reality environment. In some examples, the position for the second virtual object in the first extended reality environment may be determined based on the position for the participant in the first extended reality environment and the position for the first virtual object in the first extended reality environment. In some examples, the position for the second virtual object in the first extended reality environment may be determined based on the position of the user, the position for the participant in the first extended reality environment, and the position for the first virtual object in the first extended reality environment. In some examples, the position for the second virtual object in the first extended reality environment may be determined based on the position for the participant in the first extended reality environment and on a relative direction of the second virtual object with respect to the participant in the second extended reality environment. In some examples, the position for the second virtual object in the first extended reality environment may be determined based on the position for the participant in the first extended reality environment and on a distance of the second virtual object from the participant in the second extended reality environment. In some examples, the position for the second virtual object in the first extended reality environment may be determined based on a motion pattern associated with the first virtual object. In some examples, the position for the second virtual object in the first extended reality environment may be determined based on a motion pattern associated with the participant. In some examples, the position for the second virtual object in the first extended reality environment may be determined based on a motion pattern associated with the user. In some examples, the position for the second virtual object in the first extended reality environment may be determined based on a position of a second participant of the extended reality conference. In some examples, a size for the second virtual object in the first extended reality environment may be determined, and the second presentation may be further based on the size for the second virtual object in the first extended reality environment. In one example, the size for the second virtual object in the first extended reality environment may be determined based on a size of the second virtual object in the second extended reality environment. In one example, the size for the second virtual object in the first extended reality environment may be determined based on a size of the second virtual object in the second extended reality environment, a distance of the second virtual object from the participant in the second extended reality environment, and a distance of the second virtual object from the participant in the first extended reality environment. In some examples, the position for the participant in the first extended reality environment may be updated in response to the indication that the second virtual object is included in the second extended reality environment. In some examples, the position for the first virtual object in the first extended reality environment may be updated in response to the indication that the second virtual object is included in the second extended reality environment. In some examples, the user may be enabled to perform an action on the first virtual object and is prevented from performing the action on the second virtual object. In some examples, when the user performs an action on the first virtual object, a first reaction may be initiated, and when the user performs the action on the second virtual object, a second reaction may be initiated. The second reaction may differ from the first reaction. In some examples, the appearance of the second virtual object in the first extended reality environment visually may differ from the appearance of the second virtual object in the second extended reality environment. In some examples, in response to an interaction between the second virtual object and a physical object in the environment of the user, information configured to cause a visual indication of the interaction in the second extended reality environment may be transmitted.

In some embodiments, systems, methods, and non-transitory computer readable media for selective actions in extended reality conference(s) are provided.

In some examples, display signals representing a group of one or more participants of an extended reality conference may be received, for example, as described above. The one or more participants may not be physically present in a physical room of a user of a wearable extended reality appliance. Further, positions in the physical room for the one or more participants may be received. For example, the positions may be read from memory, may be received from an external device, may be selected (for example, as described above), and so forth. The display signals may be used to cause a first presentation of the one or more participants via the wearable extended reality appliance. The first presentation may be based on the selected positions. An input from the user may be received, for example, through a user interface, through gesture(s) (for example, using gesture recognition algorithms), through an input device, and so forth. The input may be associated with a particular position in the physical room. It may be determined that the input is associated with a particular participant of the one or more participants, for example, based on the particular position and the positions in the physical room for the one or more participants. In one example, in response to the received input, an action associated with the particular participant may be initiated.

In some examples, in response to the received input, a plurality of actionable items may be presented (for example, in a menu), each actionable item may enable the user to activate a different functionality associated with the particular participant, and the action associated with the particular participant may be selected based on a selection by the user of an actionable item of the plurality of actionable items. In one example, the plurality of actionable items may be determined based on the particular participant. In one example, the plurality of actionable items may be determined based on the position in the physical room for the particular participant. In some examples, the action may include presenting information associated with the particular participant. In some examples, the action may include enabling the user to use a physical keyboard paired with the wearable extended reality appliance to text chat with the particular participant. In some examples, the action may include establishing a private communication channel including the user and the particular participant. In some examples, the action may include repositioning of the particular participant. In some examples, the action may include sharing with the particular participant a video captured using an image sensor included in the wearable extended reality appliance from a point of view of the user. In some examples, the action may include sharing with the particular participant a virtual object presented to the user via the wearable extended reality appliance. In some examples, the action may include sharing with the particular participant a video captured using an image sensor included in the wearable extended reality appliance from a point of view of the user together with an overlay over the video of a virtual object presented to the user via the wearable extended reality appliance. In some examples, the action may include switching from a three-dimensional presentation of the particular participant to a two-dimensional presentation of the particular participant. In some examples, the action may include switching from a two-dimensional presentation of the particular participant to a three-dimensional presentation of the particular participant. In one example, the display signals may include a two-dimensional video stream of a particular participant, and the video stream may be analyzed to generate the three-dimensional presentation of the particular participant. In some examples, the action may be selected of a plurality of alternative actions based on the particular participant. In some examples, the action may be selected of a plurality of alternative actions based on the position in the physical room for the particular participant. In some examples, the input may be further associated with a filter, and the action may include applying the filter to modify the presentation of the particular participant in the first presentation. In one example, applying the filter may be configured to lessen but not completely dissipate movements of the particular participant. In one example, applying the filter may be configured to completely dissipate movements of the particular participant. In one example, applying the filter may be configured to reduce intensity of presentation of the particular participant. In one example, applying the filter may be configured to reduce opacity associated with the presentation of the particular participant. In some examples, a signal indicating a notification originating from a specific participant of the one or more participants may be received, and in response to the received signal, a presentation of a visual indication of the notification via the wearable extended reality appliance may be caused to appear in connection with the presentation of the specific participant in the first presentation. In some examples, the display signals may include a two-dimensional video stream of a specific participant of the one or more participants, the video stream may be analyzed to generate a three-dimensional presentation of the specific participant, and the first presentation may include a presentation of the three-dimensional presentation of the specific participant. In some examples, the first presentation may further include a presentation of a virtual replica of the user in the physical room.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet. The computing system can include clients and servers. A client and server are generally remote from each other and typically interact through a communication network. The relationship of client and server arises by virtue of computer programs running on the respective computers and having a client-server relationship to each other.

Disclosed embodiments may include any one of the following bullet-pointed features alone or in combination with one or more other bullet-pointed features, whether implemented as a system, a method, by at least one processor or circuitry, and/or stored as executable instructions on non-transitory computer readable media or computer readable media.

operations for enabling user interface display mode toggling:
presenting information in a first display region, the first display region having predefined boundaries, wherein the information is manipulatable via a user interface presentable in the first display region
presenting, via a wearable extended reality appliance, a second display region beyond the predefined boundaries of the first display region
wherein the second display region is visible via the wearable extended reality appliance
providing a control for altering a location of the user interface, wherein in a first mode, the user interface is presented in the first display region while the information is presented in the first display region and in a second mode
the user interface is presented in the second display region outside the predefined boundaries of the first display region while the information is presented in the first display region
enabling toggling between the first mode and the second mode via the control
the predefined boundaries are associated with a physical screen and the display of the information occurs via the physical screen
in the first mode the user interface is presented in a two dimensional form and in the second mode the user interface is presented in a three dimensional form
the predefined boundaries are associated with a physical object and the display of the information is performed by the wearable extended reality appliance by overlaying the information in virtual form, on the physical object
in the first mode the user interface has a first appearance, and in the second mode the user interface has a second appearance different than the first appearance
the first appearance is a minimized version of the user interface, and the second appearance is an unminimized version of the user interface
the first mode, an unminimized version of the user interface is presented in the first display region and in the second mode, the unminimized version of the user interface is presented in the second display region outside the predefined boundaries of the first display region while a minimized version of the user interface is presented in the first display region
activation of a particular UI element in the first mode causes a predetermined action within the predefined boundaries, and activation of the particular UI element in the second mode causes the predetermined action outside the predefined boundaries
activation of a particular UI element in the first mode causes a first action, and activation of the particular UI element in the second mode causes a second action different from the first action
providing an additional control for presenting a minimized version of the user interface in the first display region or in the second display region
the control is configured to receive an input to enable the toggling between the first mode and the second mode
the input is received from an image sensor associated with the wearable extended reality appliance
the input is received from a pointer associated with the wearable extended reality appliance
the wearable extended reality appliance is paired with a physical keyboard, the keyboard enables insertion of textual content to the information, and the input is received from the keyboard
in the first mode, manipulation of the information in the first display region is enabled from within the first display region, and in the second mode, manipulation of the information in the first display region is enabled from the second display region.

in the first mode, the information in the first display region is presented at a first size, and in the second mode, the information in the first display region is presented at a second size greater than the first size in the second mode, a volume of information presented in the first display region is greater than a volume of information presented in the first mode receiving image data captured using an image sensor associated with the wearable extended reality appliance; analyzing the image data to detect a physical object; based on the detected physical object, selecting a position outside the predefined boundaries of the first display region for the presentation of the user interface in the second mode; and in the second mode, enabling interaction with the user interface through interaction with the physical object operations for enabling location-based virtual content receiving an indication of an initial location of a particular wearable extended reality appliance performing a first lookup in a repository for a match between the initial location and a first extended reality display rule associating the particular wearable extended reality appliance with the initial location the first extended reality display rule permits a first type of content display in the initial location and prevents a second type of content display in the initial location implementing the first extended reality display rule to thereby enable first instances of the first type of content to be displayed at the initial location via the particular wearable extended reality appliance while preventing second instances of the second type of content from being displayed at the initial location via the particular wearable extended reality appliance receiving an indication of a subsequent location of the particular wearable extended reality appliance performing a second lookup in the repository for a match between the subsequent location and a second extended reality display rule associating the particular wearable extended reality appliance with the subsequent location the second extended reality display rule prevents the first type of content display in the subsequent location and permits the second type of content display in the subsequent location implementing the second extended reality display rule to enable third instances of the second type of content to be displayed at the subsequent location via the particular wearable extended reality appliance while preventing fourth instances of the first type of content from being displayed at the subsequent location via the particular wearable extended reality appliance the initial location and the subsequent location are each a location category the initial location and the subsequent location are associated with different establishments while the particular wearable extended reality appliance is in the initial location, receiving via the particular wearable extended reality appliance a toggle signal permitting display of the second instances of the second type of content at the initial location via the particular wearable extended reality appliance first type of content includes layers of content and receiving revisions to the first extended reality display rule in real time for selectively enabling content layer display at the initial location via the particular wearable extended reality appliance the layers of content include at least one of a virtual facilities layer, a mapping layer, an advertising layer, a coupon layer, an information layer, or an age-restricted layer.

the first instances of the first type of content include a first plurality of virtual objects, and wherein the second instances of the second type of content include a second plurality of virtual objects at least one of the second plurality of virtual objects includes a location-based description of associated services at least one of the second plurality of virtual objects includes a virtual user interface for enabling purchases of location-based services at least one of the second plurality of virtual objects includes an interactive virtual object for assisting a wearer of the particular wearable extended reality appliance to navigate in the subsequent location of the particular wearable extended reality appliance at least one of the second plurality of virtual objects includes promoted content receiving an indication of a new location of the particular wearable extended reality appliance; performing a third lookup in the repository for a match between the new location and an extended reality display rule associating the particular wearable extended reality appliance with the new location; and when no match associating the particular wearable extended reality appliance with the new location is found, implementing a default extended reality display rule.

the default extended reality display rule is predetermined by a wearer of the particular wearable extended reality appliance receiving an indication that an additional wearable extended reality appliance is at the initial location performing a third lookup in the repository for a match between the initial location and a third extended reality display rule associating the additional wearable extended reality appliance with the initial location, wherein the third extended reality display rule permits the first type of content and the second type of content to be displayed in the initial location implementing the third extended reality display rule to thereby enable the first instances of the first type of content and the second instances of the second type of content to be displayed at the initial location via the additional wearable extended reality appliance while preventing the second instances of the second type of content from being displayed at the initial location via the particular wearable extended reality appliance accessing a user profile associated with the particular wearable extended reality appliance, the user profile associating permitted types of content with locations, wherein performing a lookup in the repository to identify an extended reality display rule is based on the user profile while the particular wearable extended reality appliance is in the initial location, causing the particular wearable extended reality appliance to display a graphical user interface (GUI) element indicative of an existence of the second instances of the second type of content identifying an interaction with the GUI element for permitting a display of the second instances of the second type of content at the initial location via the particular wearable extended reality appliance in response to the identified interaction, causing a display of the second instances of the second type of content at the initial location via the particular wearable extended reality appliance receiving an indication of a third location of the particular wearable extended reality appliance performing a third lookup in the repository for a match between the third location and a third extended reality display rule associating the particular wearable extended reality appliance with the third location, wherein the third extended reality display rule permits the first type of content and the second type of content to be displayed in the third location implementing the third extended reality display rule to enable fifth instances of the first type of content and sixth instances of the second type of content to be displayed at the third location via the particular wearable extended reality appliance receiving an indication of a fourth location of the particular wearable extended reality appliance performing a fourth lookup in the repository for a match between the fourth location and a fourth extended reality display rule associating the particular wearable extended reality appliance with the fourth location, wherein the fourth extended reality display rule prevents the first type of content display and the second type of content from being displayed in the fourth location implementing the fourth extended reality display rule to prevent seventh instances of the first type of content and eighth instances of the second type of content from being displayed at the fourth location via the particular wearable extended reality appliance operations for managing privacy in an extended reality environment receiving image data from an image sensor associated with a wearable extended reality appliance, the image data is reflective of a physical environment accessing data characterizing a plurality of virtual objects for association with locations in the physical environment, the data representing a first virtual object and a second virtual object accessing privacy settings classifying at least one of the first virtual object and a location of the first virtual object as private, classifying a first extended reality appliance as approved for presentation of private information, and classifying a second extended reality appliance as non-approved for presentation of the private information simultaneously enabling a presentation of an augmented viewing of the physical environment, such that during the simultaneous presentation, the first extended reality appliance presents the first virtual object and the second virtual object in the physical environment, and the second extended reality appliance presents the second virtual object, omitting presentation of the first virtual object in compliance with the privacy settings when the privacy settings classify as private a first location associated with the first virtual object, designating other virtual objects in the first location as private and blocking the other virtual objects from display via the second extended reality appliance when the privacy settings classify as private a first location associated with the first virtual object, detecting a user-initiated movement of the first virtual object to a second location in response to the user-initiated movement, enabling the second extended reality appliance to present the first virtual object and the second virtual object when the privacy settings classify as private a first location associated with the first virtual object, detecting a user-initiated movement of the second virtual object to the first location, and in response to the user-initiated movement, preventing the second extended reality appliance from presenting the second virtual object when the privacy settings classify the first virtual object as private, detecting a user-initiated movement of the first virtual object to a second location, and in response to the user-initiated movement, preventing the second extended reality appliance from presenting the first virtual object at the second location when the privacy settings classify the first virtual object as private, detecting a user-initiated movement of the second virtual object to a first location associated with the first virtual object, and enabling the second extended reality appliance to present the second virtual object at the first location the privacy settings further classify at least one of the second virtual object and a location of the second virtual object as public when the privacy settings classify a second location associated with the second virtual object as public, detecting a user-initiated movement of the first virtual object to the second location, and in response to the user-initiated movement, enabling the second extended reality appliance to present the first virtual object enabling the simultaneous presentation includes causing the second extended reality appliance to present the second virtual object at a second location associated with the second virtual object and to present a distorted representation of the first virtual object at the location of the first virtual object in compliance with the privacy settings presenting via the wearable extended reality appliance at least one of an indication that the first virtual object is classified as private, an indication that a location associated with the first virtual object is classified as private and an indication that at least one of the first virtual object and the location associated with the first virtual object is classified as private receiving an input identifying a specific region of the physical environment as private when the received input includes image data, analyzing the image data using an object detection algorithm to detect a physical object in the specific region of the physical environment, and identifying the specific region of the physical environment as private based on the detected physical object when the physical object is movable, analyzing the image data to identify a movement of the physical object out of the specific region of the physical environment, and reclassifying the specific region of the physical environment as public in response to the movement of the physical object classifying the first virtual object as private when a distance of the first virtual object from the specific region of the physical environment is less than a threshold distance reclassifying the first virtual object as public when a location of the first virtual object changes from the specific region to a location outside the specific region of the physical environment classifying the first virtual object as private when the first virtual object is docked to a physical object included in the specific region of the physical environment when the physical object is movable, during the simultaneous presentation, other virtual objects in proximity to a current location of the physical object are also blocked from display via the second extended reality appliance analyzing the image data using an object detection algorithm to detect a physical object in a particular region of the physical environment, and classifying the particular region of the physical environment as public based on the detected physical object operations for capturing extended reality environments receiving image data representing at least a 140 degrees field of view of a physical environment, the image data being received from at least one image sensor associated with a wearable extended reality appliance virtually associating at least two extended reality objects with a composite perspective of the physical environment the at least two extended reality objects are spaced apart by at least 140 degrees from a point of view of the wearable extended reality appliance displaying, via the wearable extended reality appliance and during a particular time period, changes in one of the at least two extended reality objects while refraining from displaying changes in another of the at least two extended reality objects enabling non-synchronous display of concurrent changes in the at least two extended reality objects that took place during the particular time period when the at least one image sensor includes a plurality of image sensors, constructing the composite perspective of the physical environment from image data captured by the plurality of image sensors when the at least one image sensor includes a single image sensor configured to sequentially capture differing portions of the field of view, constructing the composite perspective of the physical environment from the sequentially captured differing portions of the field of view the composite perspective of the physical environment is based on image data captured prior to the particular time period updating the composite perspective of the physical environment based on image data captured during the particular time period using the composite perspective to generate a representation of the physical environment during the particular time period, and wherein the non-synchronous display includes a presentation of the representation of the physical environment a portion of the representation of the physical environment is generated artificially based on the captured image data the portion of the representation artificially generated has display parameters different from display parameters of other portions of the representation associated with regions of the physical environment that were captured by the at least one image sensor at differing times during the particular time period, differing portions of the representation are artificially generated analyzing the image data to identify a private portion of the physical environment and a public portion of the physical environment including the public portion of the physical environment in the representation of the physical environment while excluding the private portion of the physical environment from the representation of the physical environment the non-synchronous display includes a virtual representation of at least one of a wearer of the wearable extended reality appliance or the wearable extended reality appliance the non-synchronous display includes a bird's-eye view of an extended reality environment including the at least two extended reality overlying the composite perspective of the physical environment enabling the non-synchronous display includes enabling a viewer to toggle between viewing only a representation of the physical environment, viewing only an extended reality environment including the at least two extended reality objects, or viewing a representation of both the physical environment and the extended reality environment the non-synchronous display depicts a first extended reality object included in a first portion of an extended reality environment differently from a second extended reality object included in a second portion of the extended reality environment to differentiate between the first portion previously viewed and the second portion previously not viewed the non-synchronous display depicts a first extended reality object included in a first portion of an extended reality environment differently from a second extended reality object included in a second portion of the extended reality environment to differentiate between the first portion displayed via the wearable extended reality appliance and the second portion not displayed via the wearable extended reality appliance enabling the non-synchronous display includes enabling a viewer-selectable perspective for viewing the at least two extended reality objects enabling at least one viewer other than a wearer of the wearable extended reality appliance to view the concurrent changes in real time enabling the non-synchronous display includes enabling a first viewer other than a wearer of the wearable extended reality appliance to view the concurrent changes from a first perspective and enabling a second viewer other than the wearer to view the concurrent changes from a second perspective operations for managing an extended reality conference facilitating a multi-participant video conference between a plurality of physically dispersed participants enabling, via a wearable extended reality appliance, viewing of a first environment representing a physical space and a second peripheral environment enabling a display of the plurality of participants in the second peripheral environment, the plurality of participants including a first participant and a second participant receiving a first selection of the first participant in the second peripheral environment for virtual movement to the first environment receiving a first environmental placement location associated with the first selection, wherein the first environmental placement location corresponds to a first region of the physical space in response to the first selection and the first environmental placement location, moving a virtual representation of the first participant to the first environment in a manner simulating the first participant physically located in the first region of the physical space while the second participant remains in the second peripheral environment receiving a second selection of the second participant in the second peripheral environment for virtual movement to the first environment receiving a second environmental placement location associated with the second selection, wherein the second environmental placement location corresponds to a second region of the physical space different from the first region in response to the second selection and the second environmental placement location, moving a virtual representation of the second participant to the first environment in a manner simulating the second participant physically located in the second region of the physical space, such that when viewed through the wearable extended reality appliance, the first participant and the second participant are simulated as being physically present simultaneously in the first environment the first environment corresponds to the physical space in which the wearable extended reality appliance is located, and enabling viewing the first environment via the wearable extended reality appliance includes permitting a view-through of the physical space the first environment corresponds to the physical space in which the wearable extended reality appliance is located, and enabling viewing the first environment via the wearable extended reality appliance includes enabling projection of a virtual representation of the physical space enabling a remote display of the virtual representation of the physical space with the virtual representations of the first participant and the second participant, while withholding from viewing via the remote display the second peripheral environment enabling the remote display of the virtual representation of the physical space includes outputting signals for causing the virtual representation of the physical space to be viewable on additional wearable extended reality appliances the second peripheral environment corresponds to a physical screen in proximity to the wearable extended reality appliance, and enabling viewing the second peripheral environment via the wearable extended reality appliance includes permitting a view-through of the physical screen the second peripheral environment corresponds to a virtual screen in proximity to the wearable extended reality appliance, and enabling viewing the second peripheral environment via the wearable extended reality appliance includes outputting signals for projecting the virtual screen via the wearable extended reality appliance moving a virtual representation of a particular participant to the first environment in a manner simulating the particular participant physically located in a particular region of the physical space includes processing video streams of the particular participant to remove a background initially associated with the particular participant moving a virtual representation of a particular participant to the first environment in a manner simulating the particular participant physically located in a particular region of the physical space includes processing a two-dimensional video stream of the particular participant to generate a three-dimensional representation of the particular participant moving a virtual representation of a particular participant to the first environment in a manner simulating the particular participant physically located in a particular region of the physical space includes displaying the virtual representation of the particular participant in the first environment and omitting the virtual representation of the particular participant from the second peripheral environment the first region of the physical space includes a physical object, and moving the virtual representation of the first participant includes overlying the virtual representation of the first participant on the physical object the first region of the physical space is associated with physical conditions, and moving the virtual representation of the first participant includes adjusting presentation characteristics of the virtual representation of the first participant based on the physical conditions analyzing image data captured by an image sensor associated with the wearable extended reality appliance after moving the virtual representation of the first participant to the first environment to identify a change in the physical conditions in response to the change in the physical conditions, readjusting the presentation characteristics of the virtual representation of the first participant to account for the changed physical conditions analyzing image data captured by an image sensor associated with the wearable extended reality appliance after moving the virtual representation of the first participant to the first environment to identify a change in the physical conditions in response to the change in the physical conditions, moving the virtual representation of the first participant in the first environment in a manner simulating the first participant physically located in a third region of the physical space different from the first region the change in the physical conditions has no effect on physical conditions associated with the second region, and in response to the change in the physical conditions associated with the first region, moving the virtual representation of the second participant in the first environment in a manner simulating the second participant physically located in a fourth region of the physical space different from the first region and the second region after moving the virtual representation of the first participant and the virtual representation of the second participant to the first environment, receiving input from an individual using the wearable extended reality appliance, wherein the input is indicative of a particular position in the physical space determining that the particular position is associated with the first region in response to the determination that the particular position is associated with the first region, presenting through the wearable extended reality appliance a plurality of actionable virtual objects, wherein each actionable virtual object of the plurality of actionable virtual objects enables the individual to activate a different functionality associated with the first participant receiving a selection of a particular actionable virtual object of the plurality of actionable virtual objects, wherein the particular actionable virtual object is associated with a particular functionality associated with the first participant in response to the selection of the particular actionable virtual object, initiating the particular functionality associated with the first participant initiating the particular functionality includes establishing a private communication channel between the individual and the first participant initiating the particular functionality includes moving the virtual representation of the first participant back to the second peripheral environment operations for managing extended reality video conferences receiving a request to initiate a video conference between a plurality of participants receiving image data captured by at least one image sensor associated with a wearable extended reality appliance, the image data reflecting a layout of a physical environment in which the wearable extended reality appliance is located analyzing the image data to identify at least one interference region in the physical environment receiving visual representations of the plurality of participants causing the wearable extended reality appliance to display the visual representations of the plurality of participants at multiple distinct locations other than in the at least one interference region, such that the at least one interference region is devoid of any of the visual representations of the plurality of participants analyzing the image data to identify at least one interference region includes performing image recognition analysis to identify in the physical environment at least one of a window, a display, or an egress analyzing the image data to identify at least one interference region includes performing image recognition analysis to identify in the physical environment an area with light brighter than light in other areas of the physical environment the identification of the at least one interference region includes analyzing the image data to identify an inanimate object in the physical environment analyzing the image data to determine presentation characteristics for at least one of the visual representations the presentation characteristics include dimensions, and the dimensions of at least one of the visual representations are determined to account for an existence of one or more physical objects in the physical environment receiving a location selection corresponding to a portion of the physical environment; confirming that the selected portion of the physical environment is devoid of any interference regions causing the wearable extended reality appliance to display the visual representation of at least one of the plurality of participants at the portion of the physical environment when the plurality of participants is a selected part of a group of participants, receiving a selection of the plurality of participants causing the wearable extended reality appliance to display the visual representations of participants included in the selected part of the group of participants while omitting from the display the visual representations of participants excluded from the selected part of the group of participants after causing the wearable extended reality appliance to display the visual representations, identifying a speaking participant and moving a particular visual representation associated with the speaking participant to a designated area the designated area includes a predetermined speaker location determining a region of focus of a wearer of the wearable extended reality appliance, and moving the particular visual representation to a new location in the region of focus selecting the designated area based on a vision problem of a wearer of the wearable extended reality appliance moving the particular visual representation associated with the speaking participant to the designated area includes moving a specific visual representation associated with a previously speaking participant different from the speaking participant from the designated area after causing the wearable extended reality appliance to display the visual representations, identifying a speaking participant and changing visual characteristics of a particular visual representation associated with the speaking participant to designate the speaking participant changing the visual characteristics of the particular visual representation includes enlarging the particular visual representation changing the visual characteristics of the particular visual representation includes virtually illuminating the particular visual representation accessing a group of placement rules associating possible locations with layout of physical spaces; determining that the layout of the physical environment corresponds to one or more of the placement rules; and implementing the corresponding one or more rules to cause the wearable extended reality appliance to display the visual representations at the multiple distinct locations While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above-described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above-described modules/units can be combined as one module or unit, and each of the above-described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof. And other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

The invention claimed is:

1. A non-transitory computer readable medium containing instructions that when executed by at least one processor cause the at least one processor to perform operations for enabling location-based virtual content, the operations comprising:
receiving an indication of an initial location of a particular wearable extended reality appliance;
performing a first lookup in a repository for a match between the initial location and a first extended reality display rule associating the particular wearable extended reality appliance with the initial location, wherein the first extended reality display rule permits a first type of content display in the initial location and prevents a second type of content display in the initial location;
implementing the first extended reality display rule to thereby enable first instances of the first type of content to be displayed at the initial location via the particular wearable extended reality appliance while preventing second instances of the second type of content from being displayed at the initial location via the particular wearable extended reality appliance;
receiving an indication of a subsequent location of the particular wearable extended reality appliance;
performing a second lookup in the repository for a match between the subsequent location and a second extended reality display rule associating the particular wearable extended reality appliance with the subsequent location, wherein the second extended reality display rule prevents the first type of content display in the subsequent location and permits the second type of content display in the subsequent location; and
implementing the second extended reality display rule to enable third instances of the second type of content to be displayed at the subsequent location via the particular wearable extended reality appliance while preventing fourth instances of the first type of content from being displayed at the subsequent location via the particular wearable extended reality appliance.

2. The non-transitory computer readable medium of claim 1, wherein the initial location and the subsequent location are each a location category.

3. The non-transitory computer readable medium of claim 1, wherein the initial location and the subsequent location are associated with different establishments.

4. The non-transitory computer readable medium of claim 1, wherein the operations further comprise, while the particular wearable extended reality appliance is in the initial location, receiving via the particular wearable extended reality appliance a toggle signal permitting display of the second instances of the second type of content at the initial location via the particular wearable extended reality appliance.

5. The non-transitory computer readable medium of claim 1, wherein the first type of content includes layers of content and wherein the operations further include receiving revisions to the first extended reality display rule in real time for selectively enabling content layer display at the initial location via the particular wearable extended reality appliance.

6. The non-transitory computer readable medium of claim 5, wherein the layers of content include at least one of a virtual facilities layer, a mapping layer, an advertising layer, a coupon layer, an information layer, or an age-restricted layer.

7. The non-transitory computer readable medium of claim 1, wherein the first instances of the first type of content include a first plurality of virtual objects, and wherein the second instances of the second type of content include a second plurality of virtual objects.

8. The non-transitory computer readable medium of claim 7, wherein at least one of the second plurality of virtual objects includes a location-based description of associated services.

9. The non-transitory computer readable medium of claim 7, wherein at least one of the second plurality of virtual objects includes a virtual user interface for enabling purchases of location-based services.

10. The non-transitory computer readable medium of claim 7, wherein at least one of the second plurality of virtual objects includes an interactive virtual object for assisting a wearer of the particular wearable extended reality appliance to navigate in the subsequent location of the particular wearable extended reality appliance.

11. The non-transitory computer readable medium of claim 7, wherein at least one of the second plurality of virtual objects includes promoted content.

12. The non-transitory computer readable medium of claim 1, wherein the operations further comprise: receiving an indication of a new location of the particular wearable extended reality appliance; performing a third lookup in the repository for a match between the new location and an extended reality display rule associating the particular wearable extended reality appliance with the new location; and when no match associating the particular wearable extended reality appliance with the new location is found, implementing a default extended reality display rule.

13. The non-transitory computer readable medium of claim 12, wherein the default extended reality display rule is predetermined by a wearer of the particular wearable extended reality appliance.

14. The non-transitory computer readable medium of claim 1, wherein the operations further comprise:
receiving an indication that an additional wearable extended reality appliance is at the initial location;
performing a third lookup in the repository for a match between the initial location and a third extended reality display rule associating the additional wearable extended reality appliance with the initial location, wherein the third extended reality display rule permits the first type of content and the second type of content to be displayed in the initial location; and
implementing the third extended reality display rule to thereby enable the first instances of the first type of content and the second instances of the second type of content to be displayed at the initial location via the additional wearable extended reality appliance while preventing the second instances of the second type of content from being displayed at the initial location via the particular wearable extended reality appliance.

15. The non-transitory computer readable medium of claim 1, wherein the operations further comprise accessing a user profile associated with the particular wearable extended reality appliance, the user profile associating permitted types of content with locations, wherein performing a lookup in the repository to identify an extended reality display rule is based on the user profile.

16. The non-transitory computer readable medium of claim 1, wherein the operations further comprise, while the particular wearable extended reality appliance is in the initial location:
causing the particular wearable extended reality appliance to display a graphical user interface (GUI) element indicative of an existence of the second instances of the second type of content;
identifying an interaction with the GUI element for permitting a display of the second instances of the second type of content at the initial location via the particular wearable extended reality appliance; and
in response to the identified interaction, causing a display of the second instances of the second type of content at the initial location via the particular wearable extended reality appliance.

17. The non-transitory computer readable medium of claim 1, wherein the operations further comprise:
receiving an indication of a third location of the particular wearable extended reality appliance;
performing a third lookup in the repository for a match between the third location and a third extended reality display rule associating the particular wearable extended reality appliance with the third location, wherein the third extended reality display rule permits the first type of content and the second type of content to be displayed in the third location; and
implementing the third extended reality display rule to enable fifth instances of the first type of content and sixth instances of the second type of content to be displayed at the third location via the particular wearable extended reality appliance.

18. The non-transitory computer readable medium of claim 17, wherein the operations further comprise:
receiving an indication of a fourth location of the particular wearable extended reality appliance;
performing a fourth lookup in the repository for a match between the fourth location and a fourth extended reality display rule associating the particular wearable extended reality appliance with the fourth location, wherein the fourth extended reality display rule prevents the first type of content display and the second type of content from being displayed in the fourth location; and
implementing the fourth extended reality display rule to prevent seventh instances of the first type of content and eighth instances of the second type of content from being displayed at the fourth location via the particular wearable extended reality appliance.

19. A method for enabling location-based virtual content, the method comprising:
receiving an indication of an initial location of a particular wearable extended reality appliance;
performing a first lookup in a repository for a match between the initial location and a first extended reality display rule associating the particular wearable extended reality appliance with the initial location, wherein the first extended reality display rule permits a first type of content display in the initial location and prevents a second type of content display in the initial location;
implementing the first extended reality display rule to thereby enable first instances of the first type of content to be displayed at the initial location via the particular wearable extended reality appliance while preventing second instances of the second type of content from being displayed at the initial location via the particular wearable extended reality appliance;

receiving an indication of a subsequent location of the particular wearable extended reality appliance;

performing a second lookup in the repository for a match between the subsequent location and a second extended reality display rule associating the particular wearable extended reality appliance with the subsequent location, wherein the second extended reality display rule prevents the first type of content display in the subsequent location and permits the second type of content display in the subsequent location; and implementing the second extended reality display rule to enable third instances of the second type of content to be displayed at the subsequent location via the particular wearable extended reality appliance while preventing fourth instances of the first type of content from being displayed at the subsequent location via the particular wearable extended reality appliance.

20. A system for enabling location-based virtual content, the system comprising:

at least one processing device configured to:

receive an indication of an initial location of a particular wearable extended reality appliance;

perform a first lookup in a repository for a match between the initial location and a first extended reality display rule associating the particular wearable extended reality appliance with the initial location, wherein the first extended reality display rule permits a first type of content display in the initial location and prevents a second type of content display in the initial location;

implement the first extended reality display rule to thereby enable first instances of the first type of content to be displayed at the initial location via the particular wearable extended reality appliance while preventing second instances of the second type of content from being displayed at the initial location via the particular wearable extended reality appliance;

receive an indication of a subsequent location of the particular wearable extended reality appliance;

perform a second lookup in the repository for a match between the subsequent location and a second extended reality display rule associating the particular wearable extended reality appliance with the subsequent location, wherein the second extended reality display rule prevents the first type of content display in the subsequent location and permits the second type of content display in the subsequent location; and implement the second extended reality display rule to enable third instances of the second type of content to be displayed at the subsequent location via the particular wearable extended reality appliance while preventing fourth instances of the first type of content from being displayed at the subsequent location via the particular wearable extended reality appliance.

* * * * *